Figure 1:
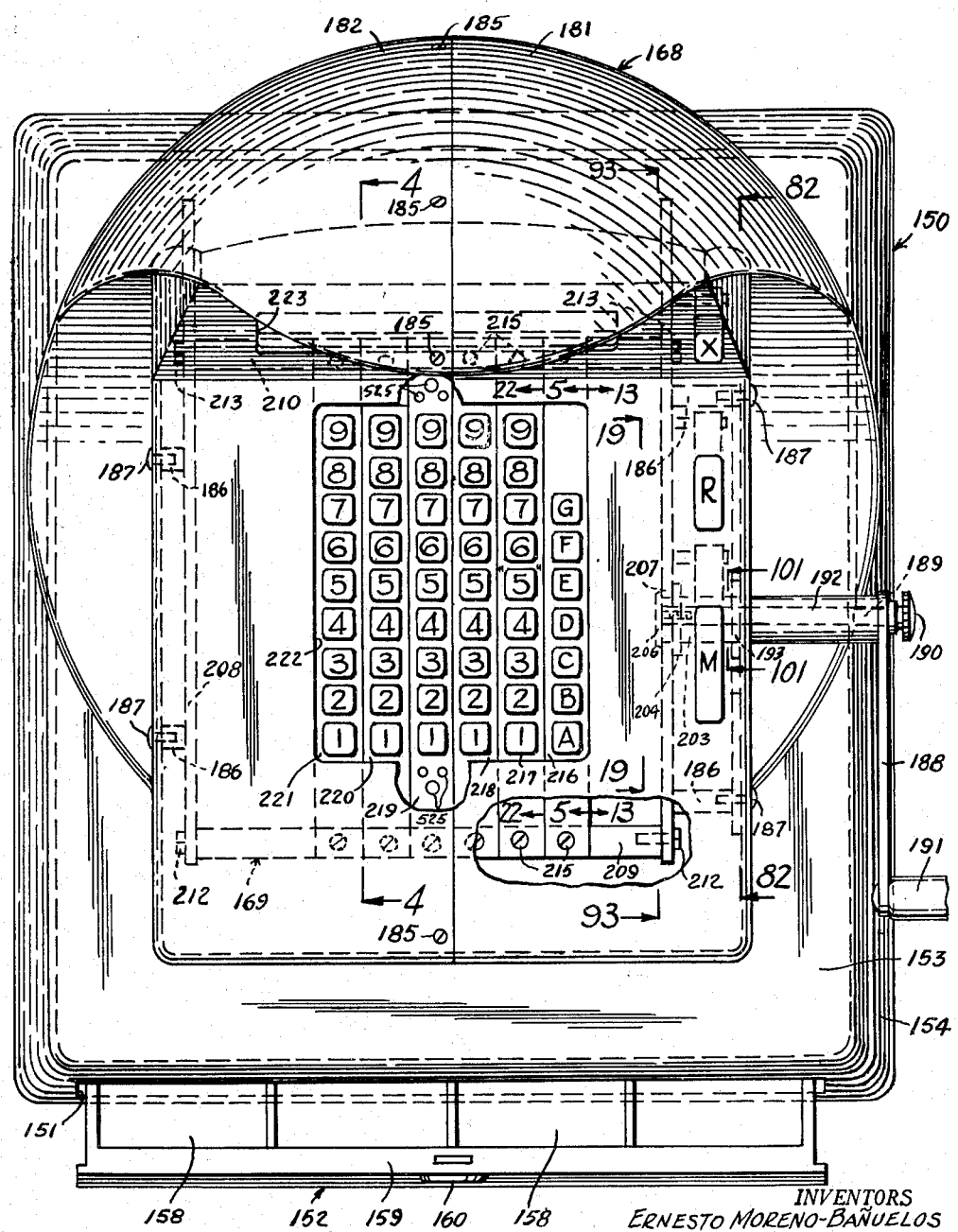

March 31, 1964 E. MORENO-BAÑUELOS ETAL 3,127,101
COMBINED CASH REGISTER AND ADDING MACHINE
Filed April 1, 1960 27 Sheets-Sheet 1

INVENTORS
ERNESTO MORENO-BAÑUELOS
LORENZO B. SHELLEY
BY
L. S. Saulsbury
ATTORNEY

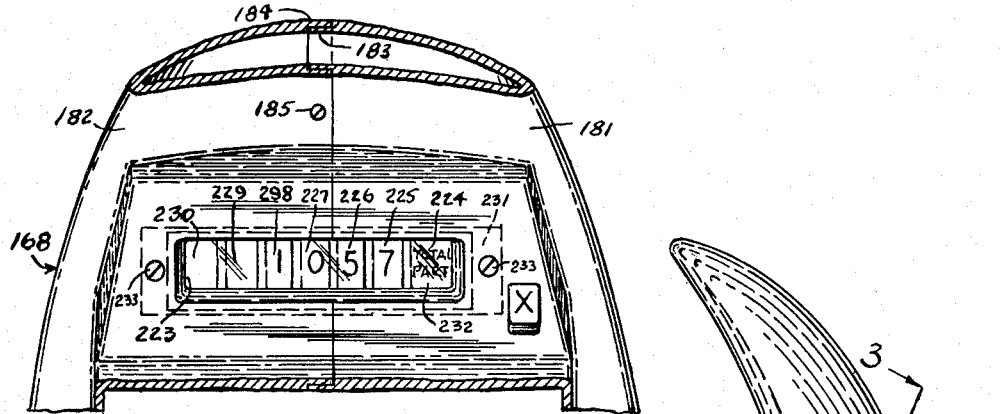
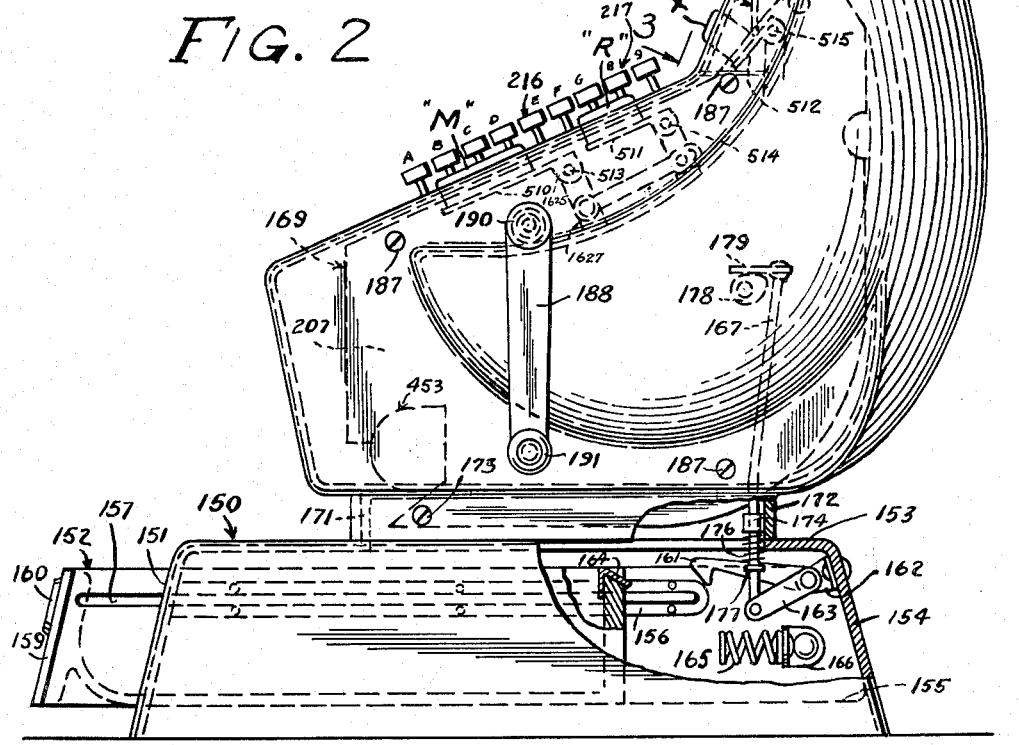

March 31, 1964  E. MORENO-BAÑUELOS ETAL  3,127,101
COMBINED CASH REGISTER AND ADDING MACHINE
Filed April 1, 1960  27 Sheets-Sheet 3

INVENTORS
ERNESTO MORENO-BAÑUELOS
BY LORENZO B. SHELLEY
L. S. Saulsbury
ATTORNEY

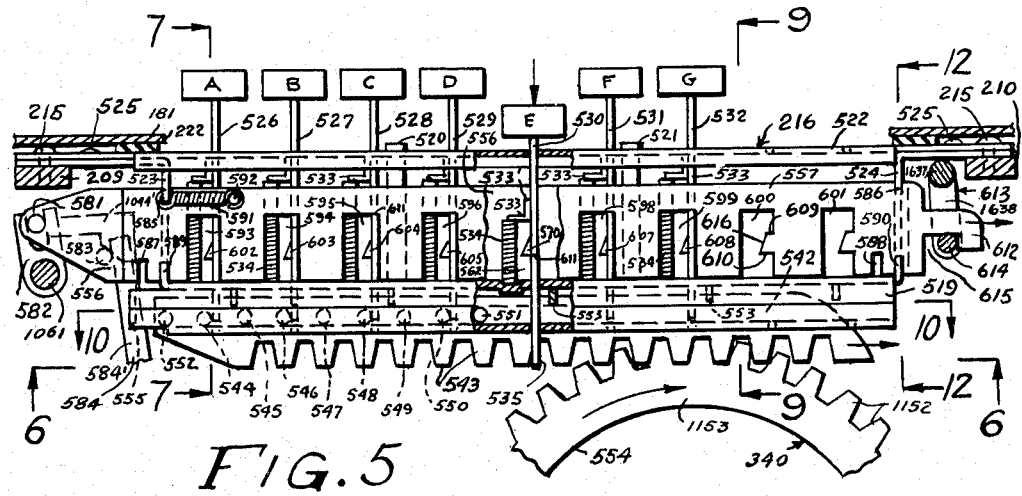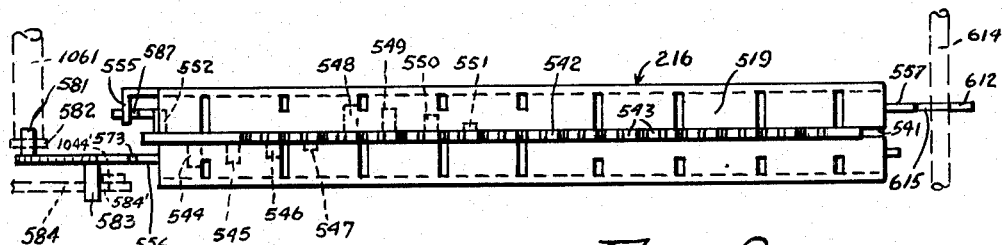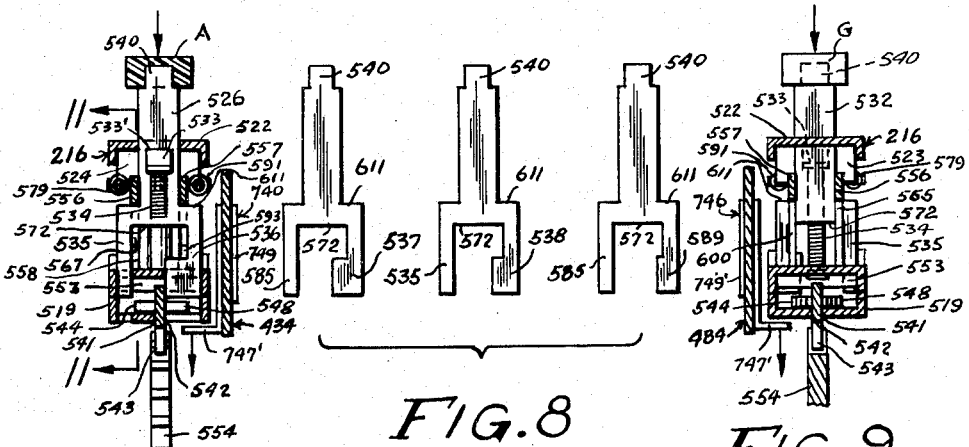

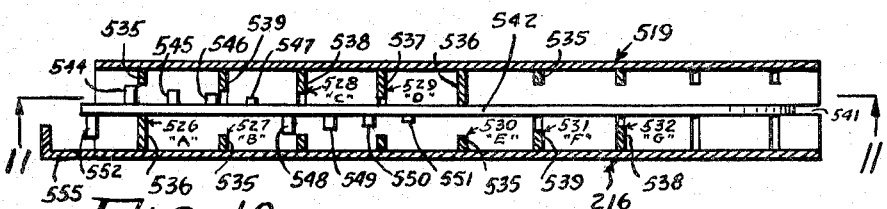
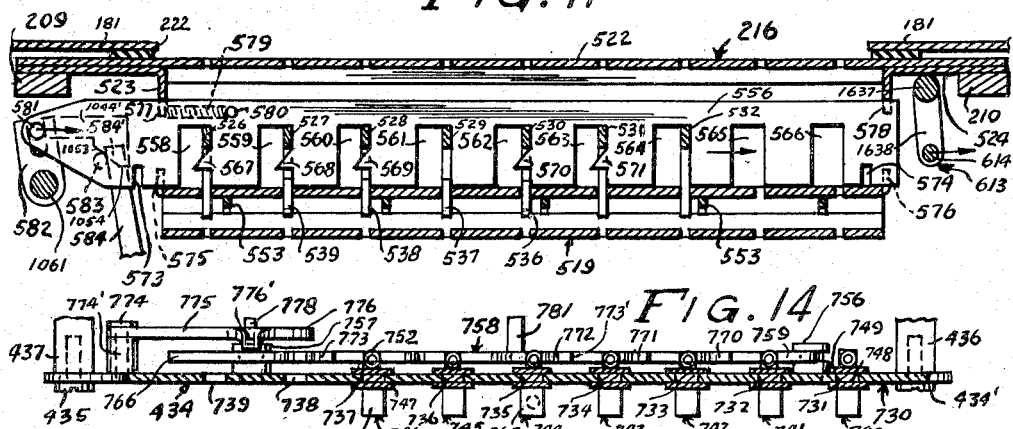

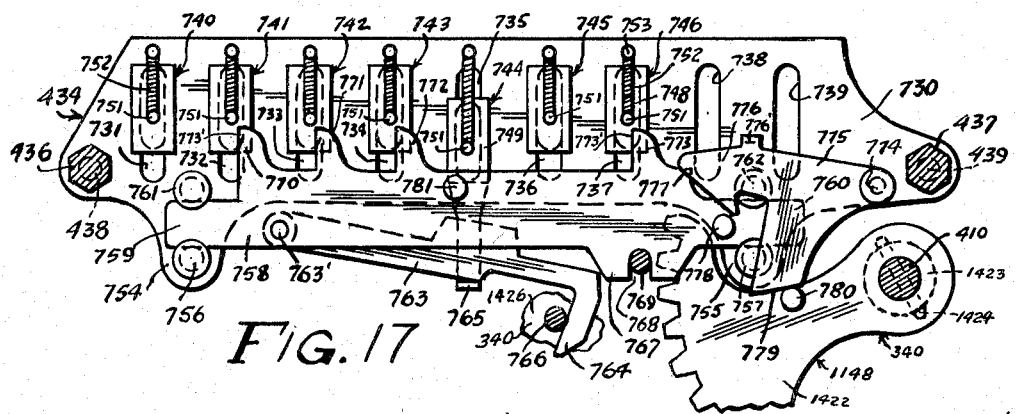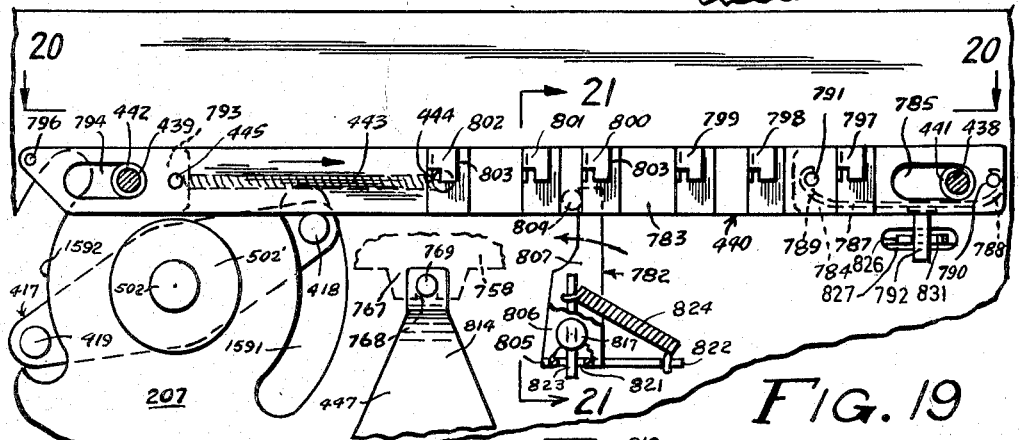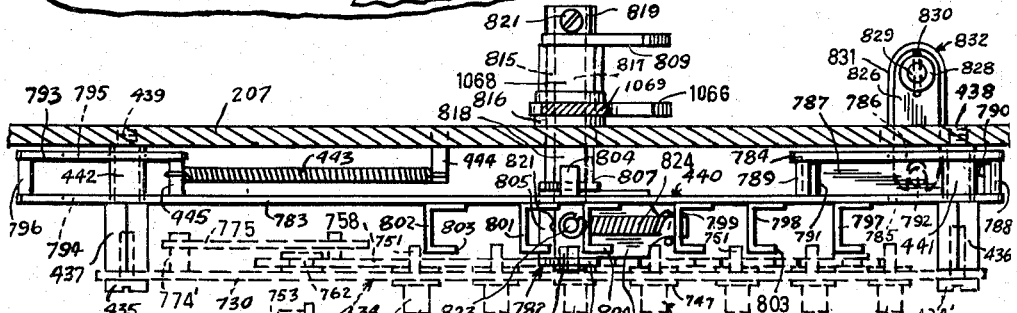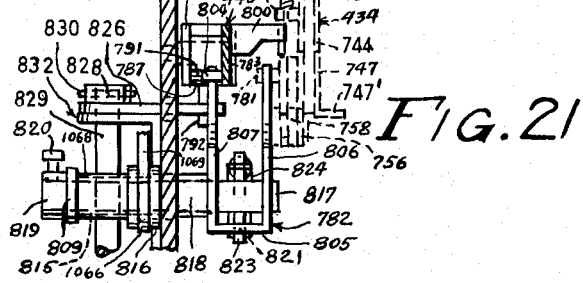

March 31, 1964 E. MORENO-BAÑUELOS ETAL 3,127,101
COMBINED CASH REGISTER AND ADDING MACHINE
Filed April 1, 1960 27 Sheets-Sheet 8
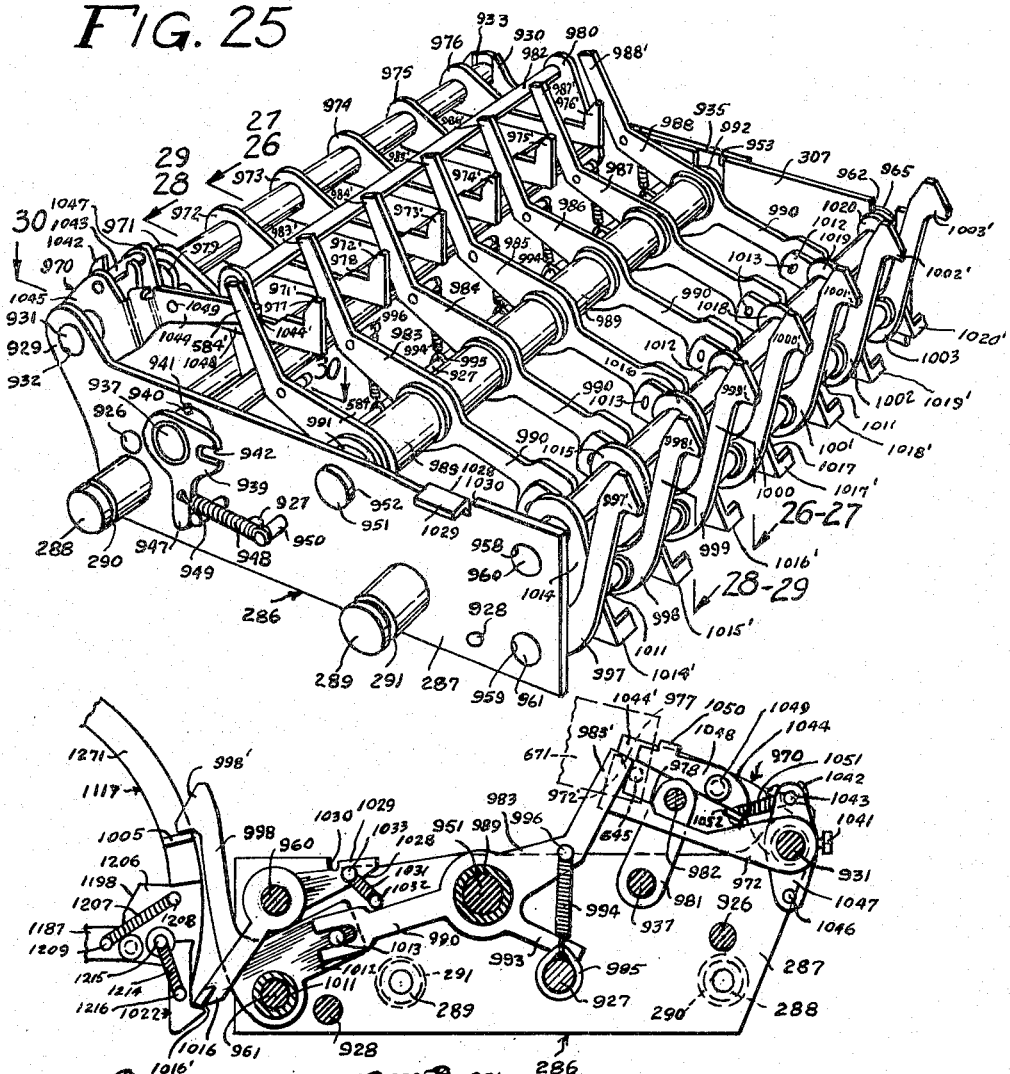
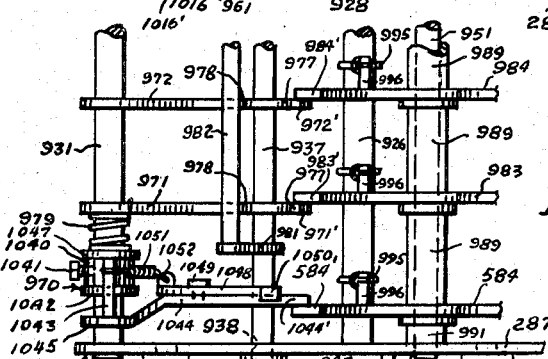
INVENTORS
ERNESTO MORENO-BAÑUELOS
LORENZO B. SHELLEY
BY L. S. Saulsbury
ATTORNEY

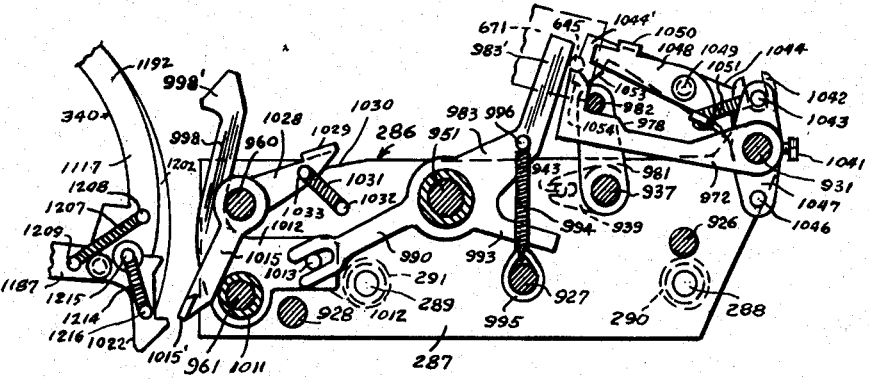
FIG. 27
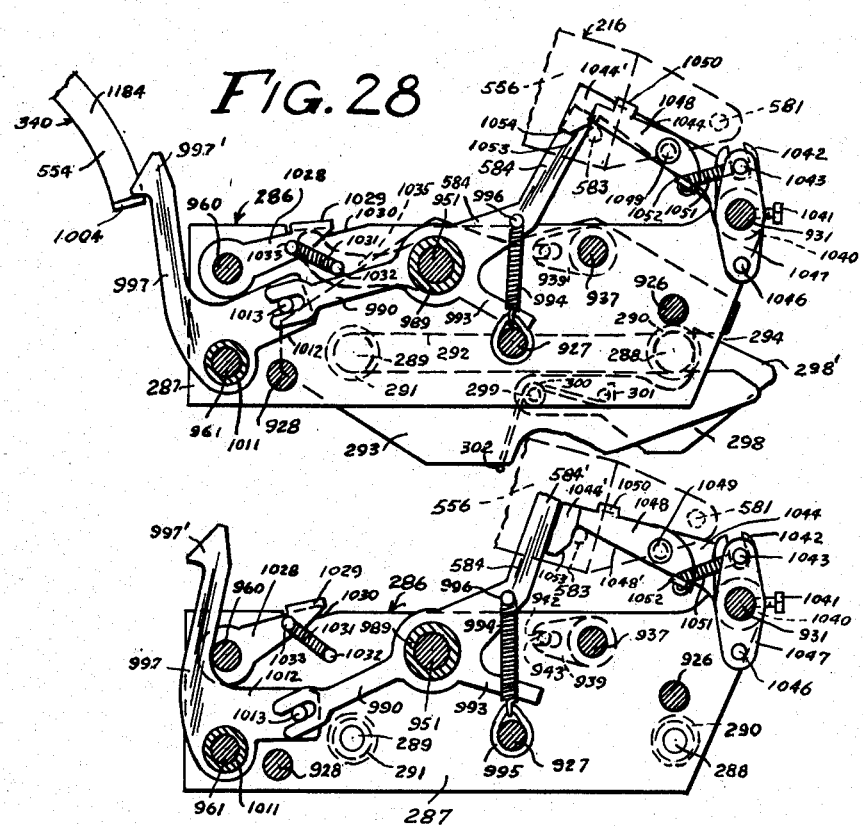
FIG. 28
FIG. 29
INVENTORS
ERNESTO MORENO-BAÑUELOS
LORENZO B. SHELLEY
BY
L. S. Saulsbury
ATTORNEY March 31, 1964  E. MORENO-BAÑUELOS ETAL  3,127,101
COMBINED CASH REGISTER AND ADDING MACHINE
Filed April 1, 1960  27 Sheets-Sheet 10

INVENTORS
ERNESTO MORENO-BAÑUELOS
LORENZO B. SHELLEY
BY
L. S. Saulsbury
ATTORNEY

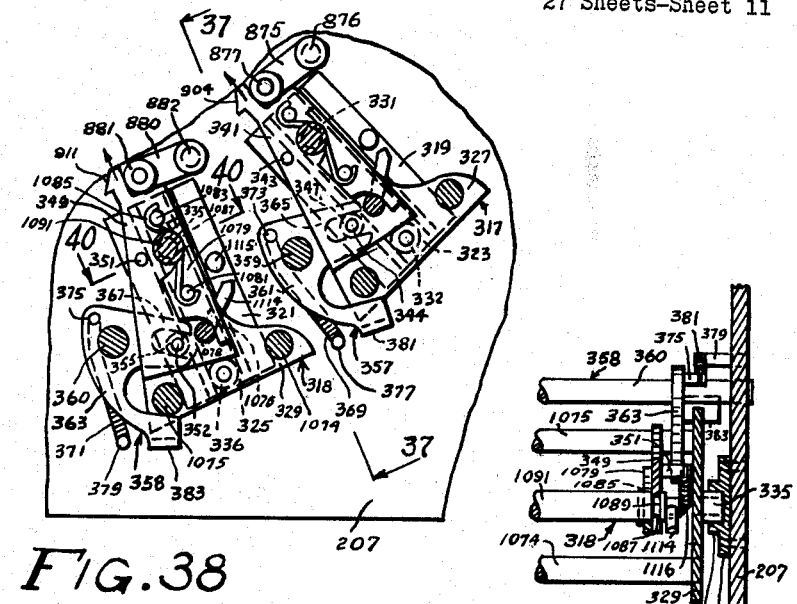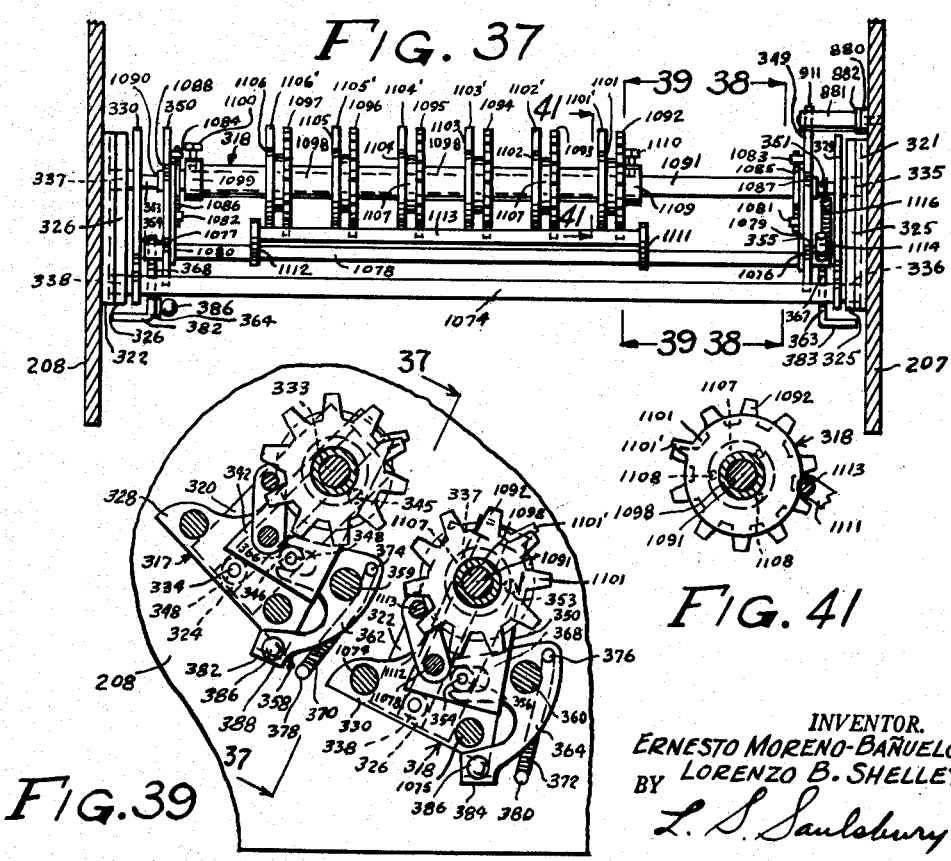

INVENTORS
ERNESTO MORENO-BAÑUELOS
LORENZO B. SHELLEY
BY
L. S. Saulsbury
ATTORNEY March 31, 1964   E. MORENO-BAÑUELOS ETAL   3,127,101
COMBINED CASH REGISTER AND ADDING MACHINE
Filed April 1, 1960   27 Sheets-Sheet 14
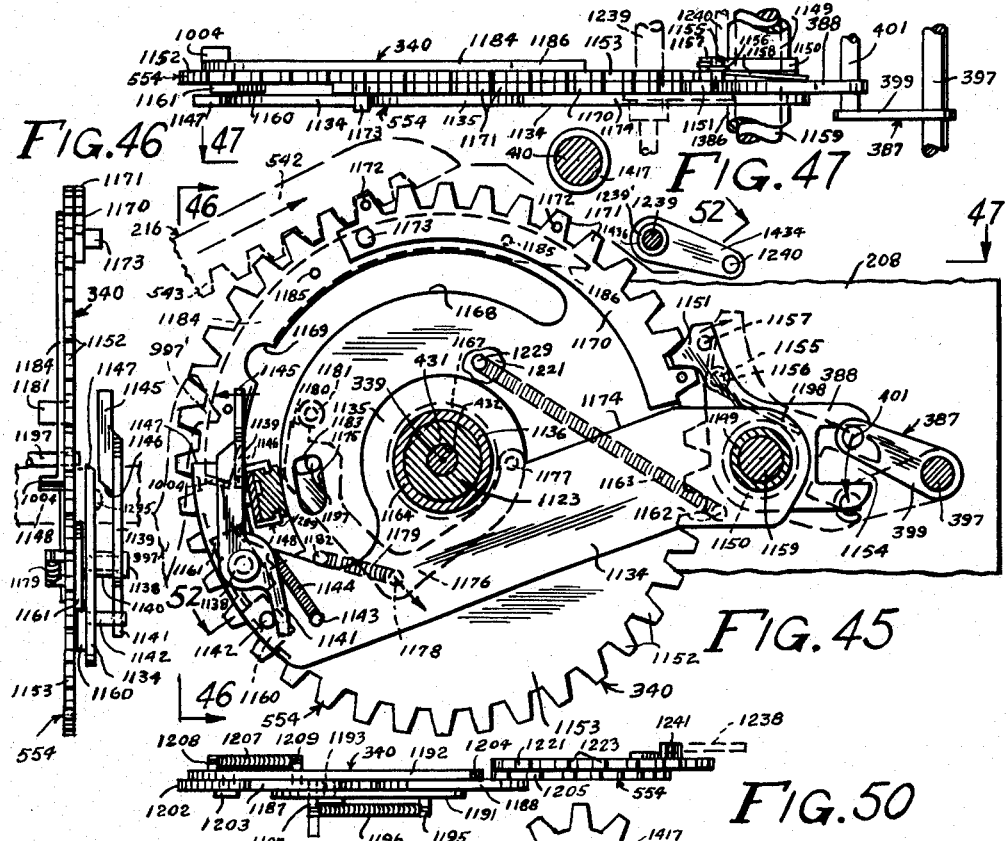
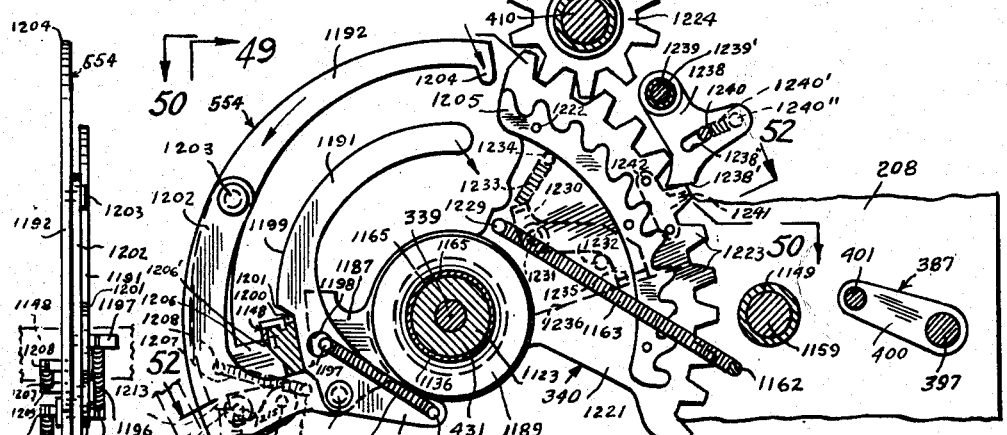
INVENTORS
ERNESTO MORENO-BAÑUELOS
LORENZO B. SHELLEY
BY
L. S. Saulsbury
ATTORNEY March 31, 1964  E. MORENO-BAÑUELOS ETAL  3,127,101
COMBINED CASH REGISTER AND ADDING MACHINE
Filed April 1, 1960  27 Sheets-Sheet 15
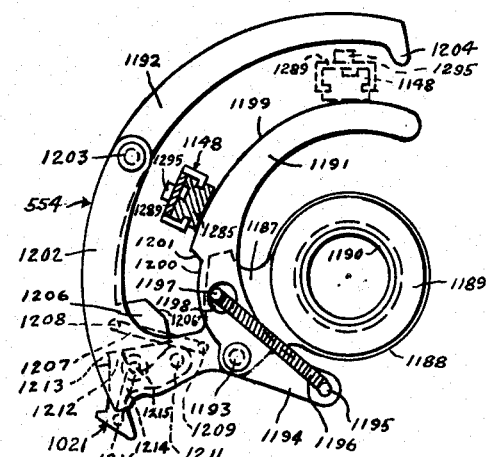
FIG. 51
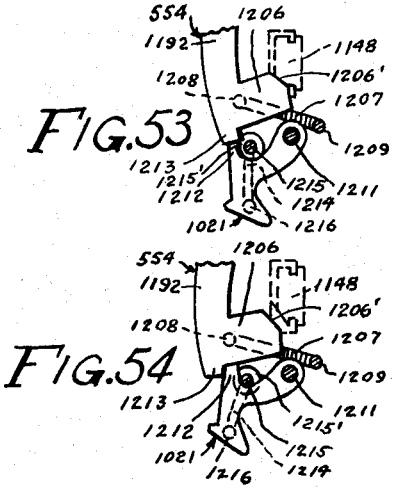
FIG. 53
FIG. 54
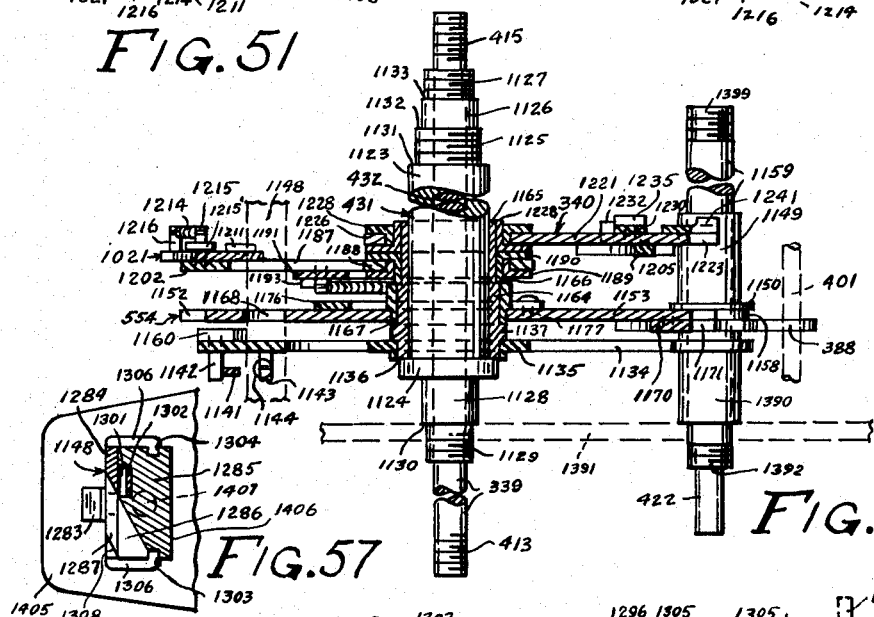
FIG. 57
FIG. 52
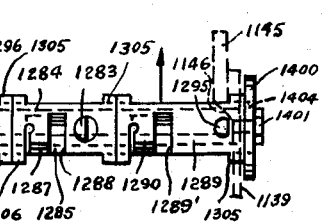
FIG. 55
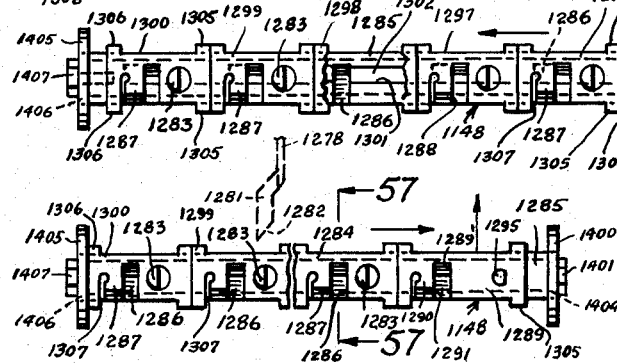
FIG. 56
INVENTOR.
ERNESTO MORENO-BAÑUELOS
LORENZO B. SHELLEY
BY
L. S. Saulebury
ATTORNEY

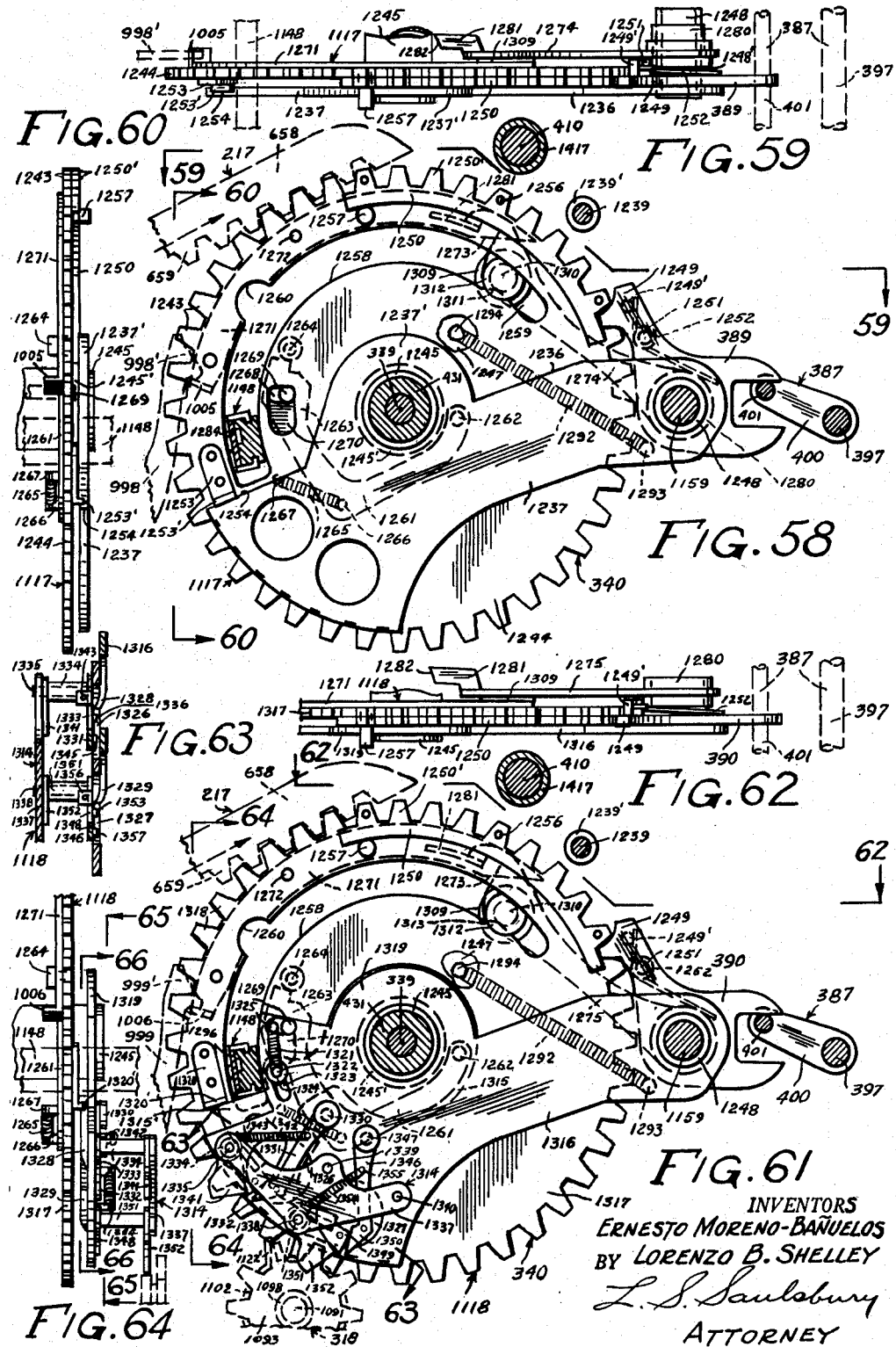

March 31, 1964  E. MORENO-BAÑUELOS ETAL  3,127,101
COMBINED CASH REGISTER AND ADDING MACHINE
Filed April 1, 1960  27 Sheets—Sheet 17
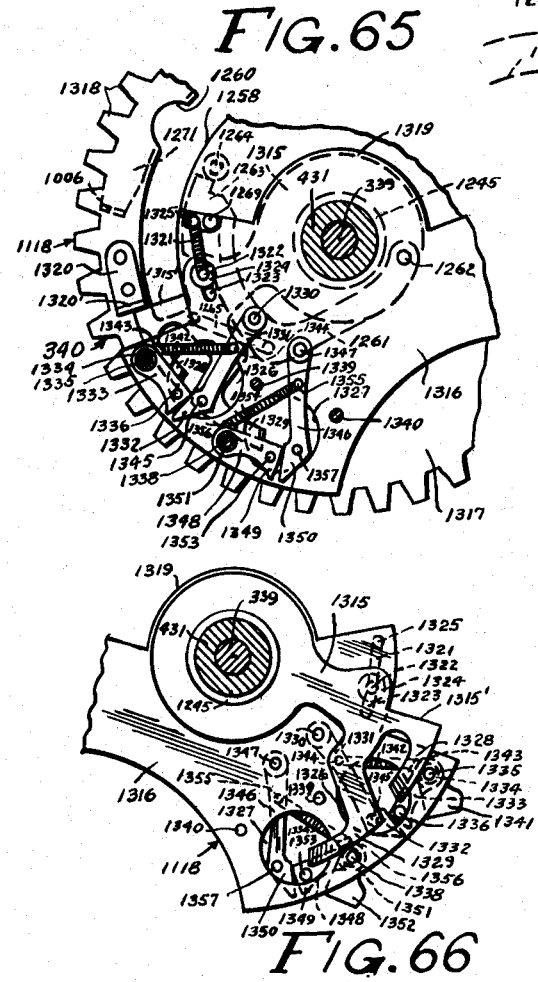
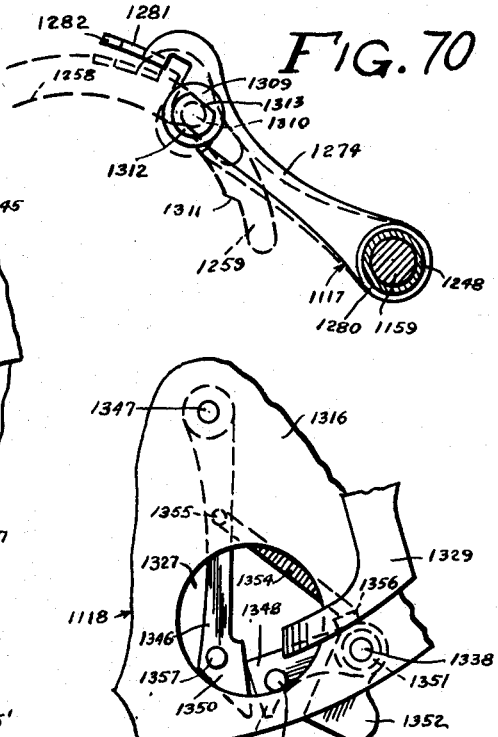
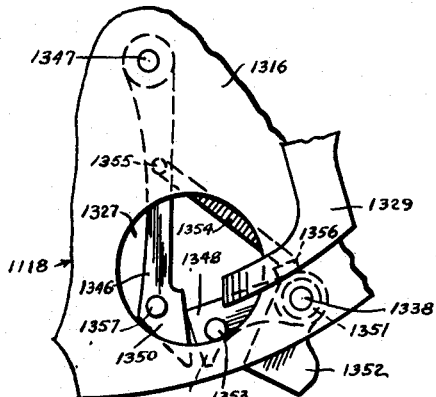
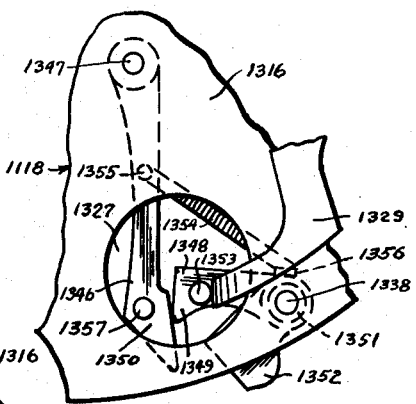
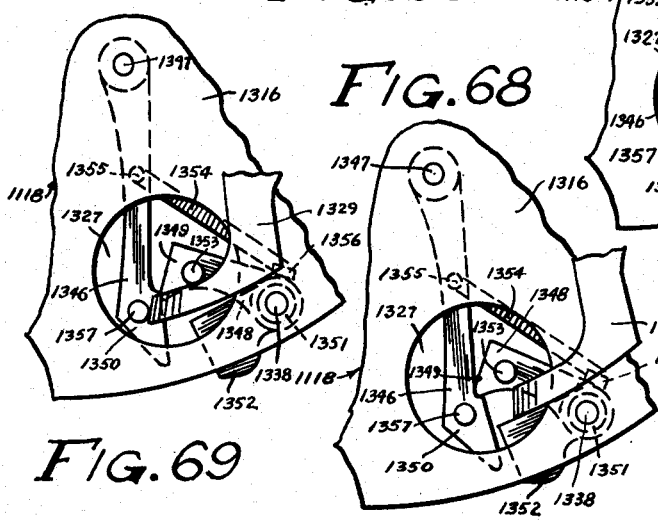
INVENTORS
ERNESTO MORENO-BAÑUELOS
LORENZO B. SHELLEY
BY
L. S. Saulsbury
ATTORNEY March 31, 1964  E. MORENO-BAÑUELOS ETAL  3,127,101
COMBINED CASH REGISTER AND ADDING MACHINE
Filed April 1, 1960  27 Sheets-Sheet 18
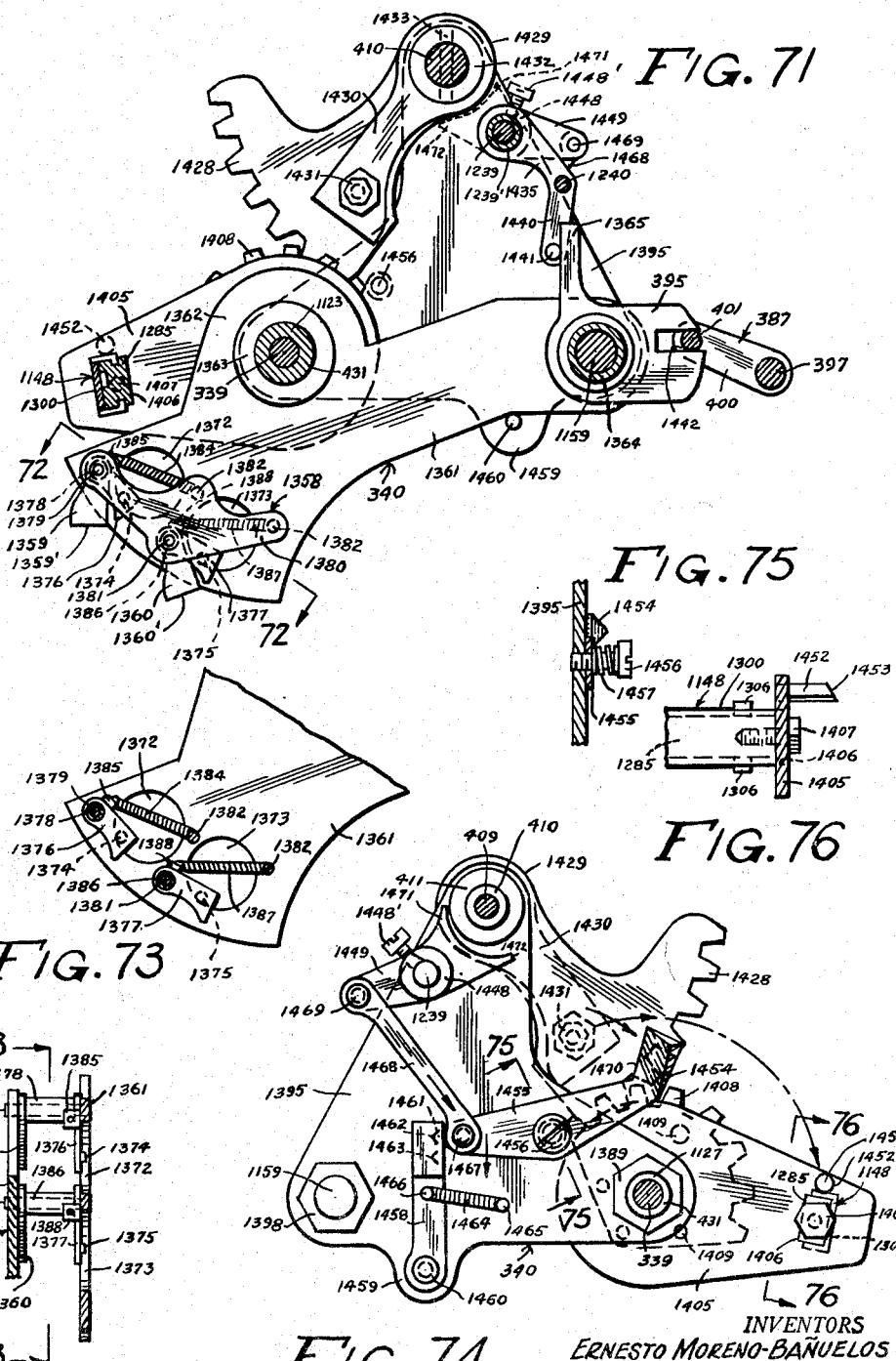
INVENTORS
ERNESTO MORENO-BAÑUELOS
BY LORENZO B. SHELLEY
L. S. Saulsbury
ATTORNEY March 31, 1964  E. MORENO-BAÑUELOS ETAL  3,127,101
COMBINED CASH REGISTER AND ADDING MACHINE
Filed April 1, 1960  27 Sheets-Sheet 19
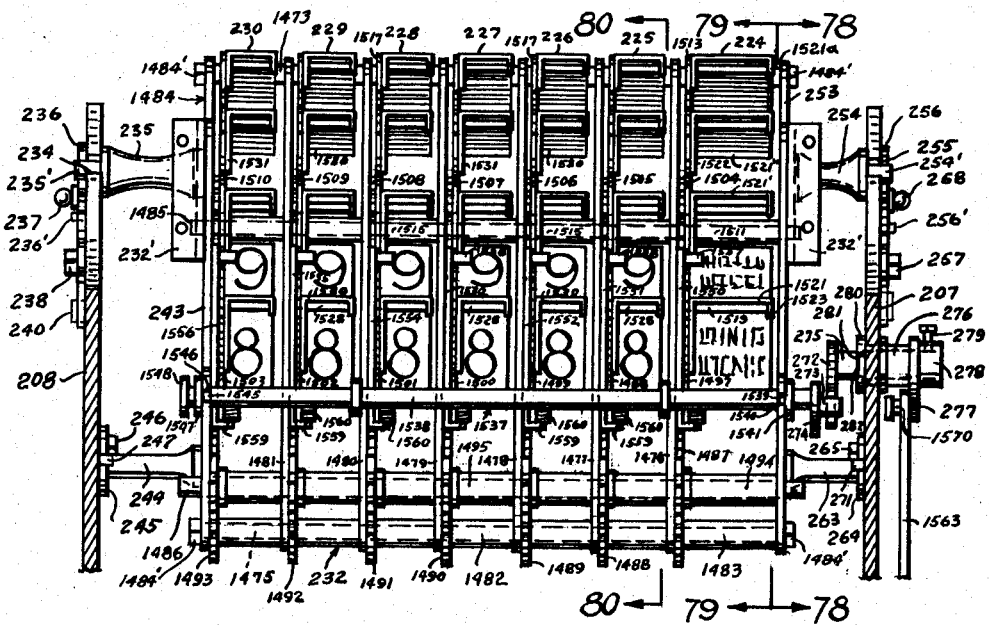
FIG. 77
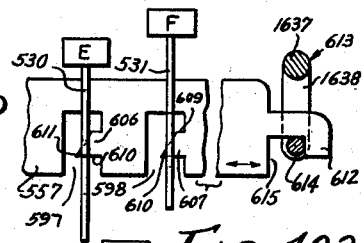
FIG. 102
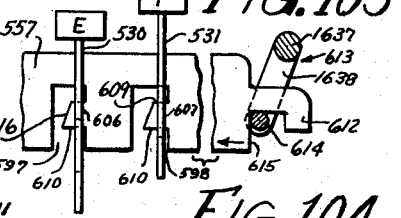
FIG. 103
FIG. 104
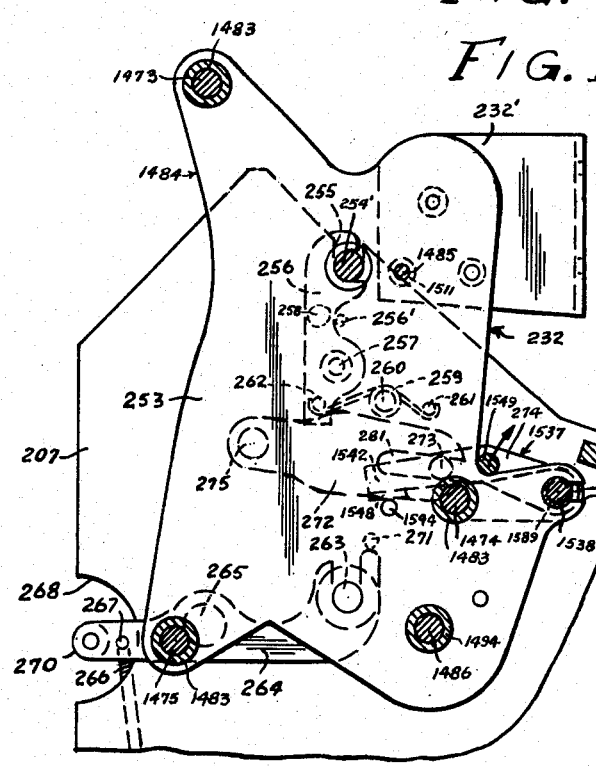
FIG. 78
INVENTORS
ERNESTO MORENO-BAÑUELOS
LORENZO B. SHELLEY
BY
L. S. Saulsbury
ATTORNEY March 31, 1964  E. MORENO-BAÑUELOS ETAL  3,127,101
COMBINED CASH REGISTER AND ADDING MACHINE
Filed April 1, 1960  27 Sheets-Sheet 20

INVENTORS
ERNESTO MORENO-BAÑUELOS
LORENZO B. SHELLEY
BY
L. S. Saulsbury
ATTORNEY March 31, 1964  E. MORENO-BAÑUELOS ETAL  3,127,101
COMBINED CASH REGISTER AND ADDING MACHINE
Filed April 1, 1960  27 Sheets-Sheet 21
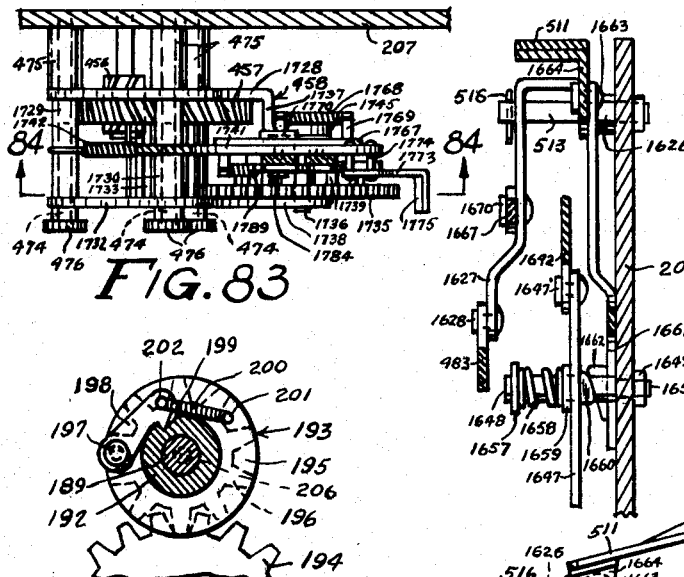
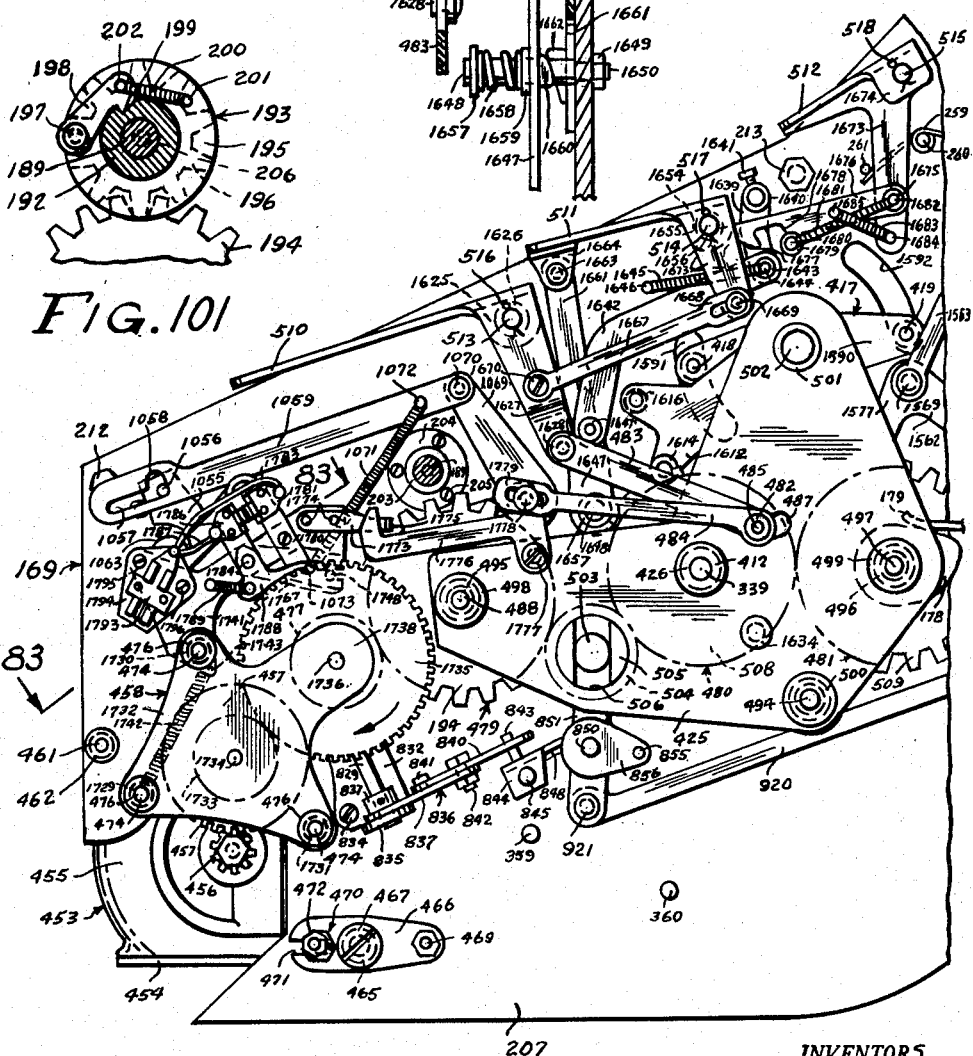
INVENTORS
ERNESTO MORENO-BAÑUELOS
BY LORENZO B. SHELLEY
L. S. Saulsbury
ATTORNEY

INVENTORS
ERNESTO MORENO-BAÑUELOS
BY LORENZO B. SHELLEY
ATTORNEY

March 31, 1964  E. MORENO-BAÑUELOS ETAL  3,127,101
COMBINED CASH REGISTER AND ADDING MACHINE
Filed April 1, 1960                                27 Sheets—Sheet 23
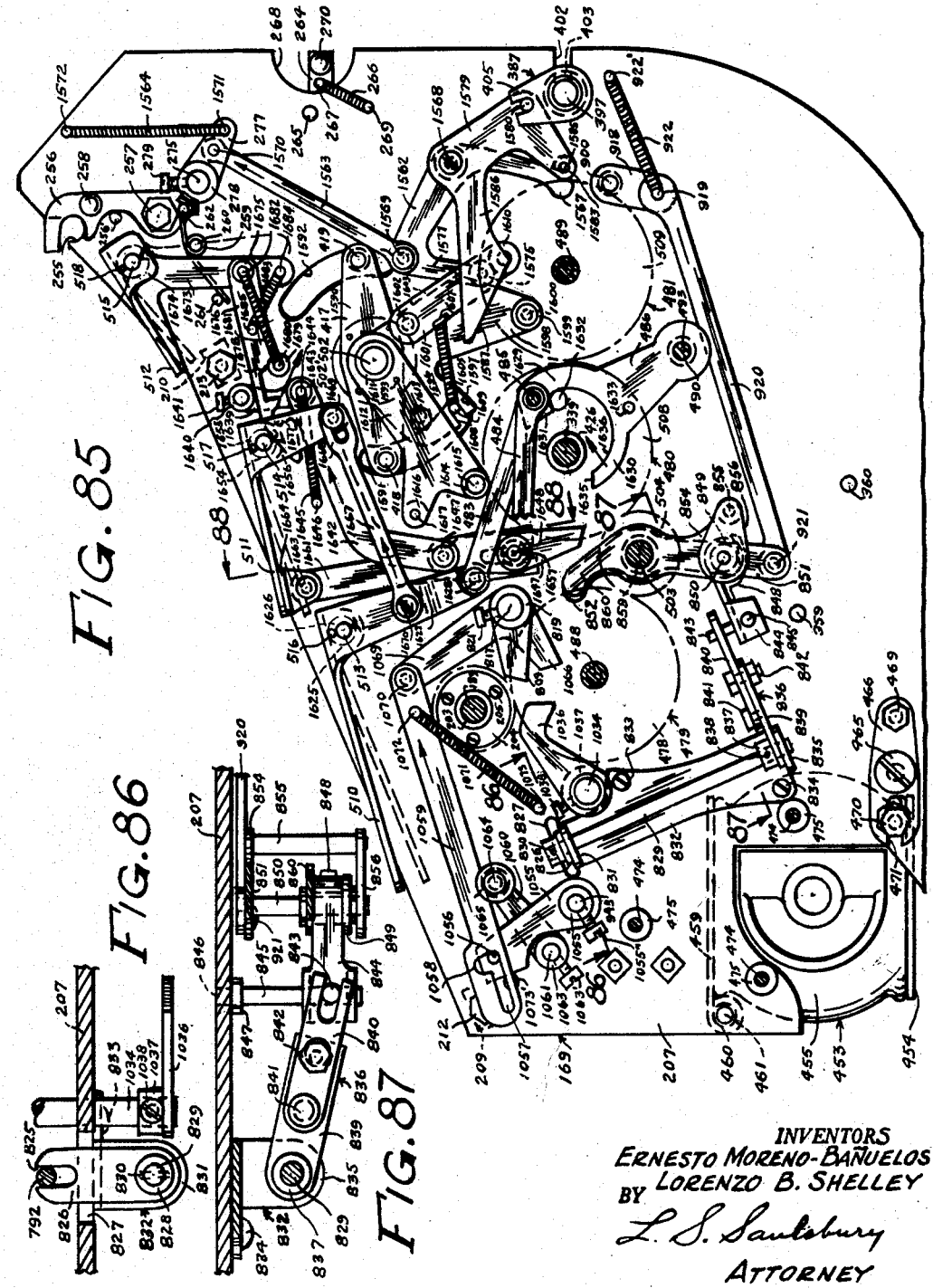
INVENTORS
ERNESTO MORENO-BAÑUELOS
BY LORENZO B. SHELLEY
ATTORNEY March 31, 1964  E. MORENO-BAÑUELOS ETAL  3,127,101
COMBINED CASH REGISTER AND ADDING MACHINE
Filed April 1, 1960  27 Sheets-Sheet 25

INVENTORS
ERNESTO MORENO-BAÑUELOS
BY LORENZO B. SHELLEY
L. S. Saulsbury
ATTORNEY

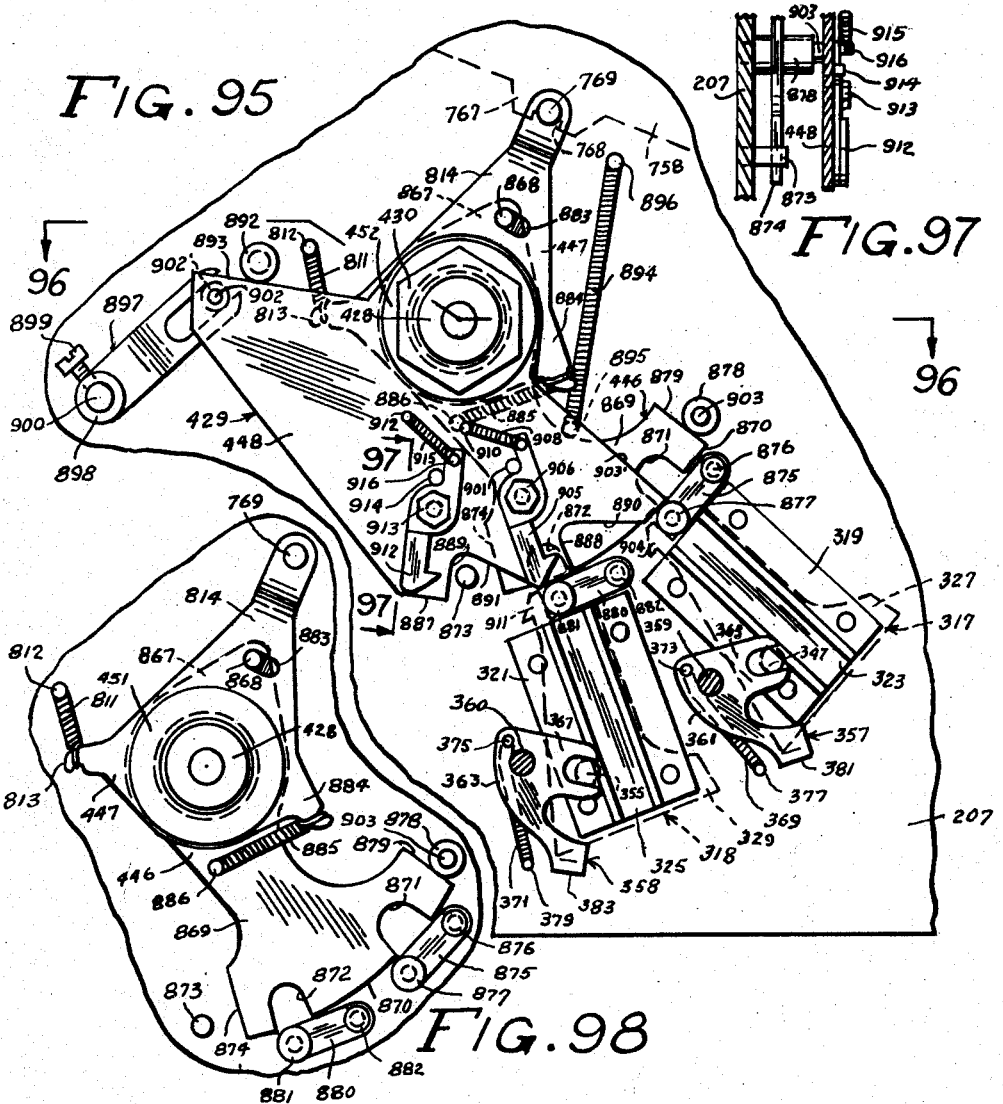

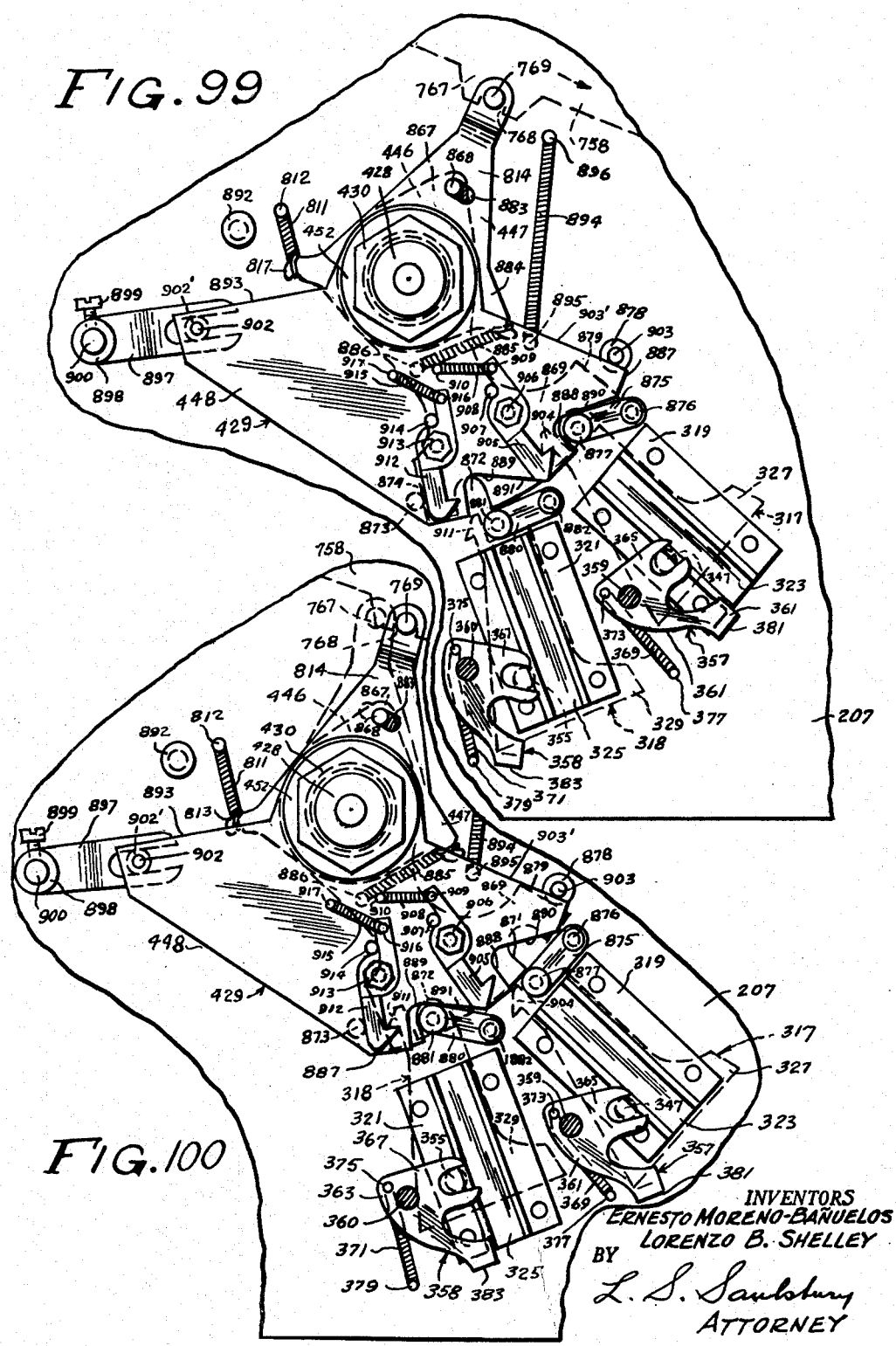

United States Patent Office 3,127,101
Patented Mar. 31, 1964

3,127,101
COMBINED CASH REGISTER AND ADDING MACHINE
Ernesto Moreno-Bañuelos, Colego Salesiano 8, and Lorenzo B. Shelley, Patrarca 233, both of Mexico City, Mexico
Filed Apr. 1, 1960, Ser. No. 20,509
7 Claims. (Cl. 235—9)

This invention relates to a combined cash register and adding machine.

It is the principal object of this invention to provide a combined cash register and adding machine that for the purposes of assembling and disassembling for repair or replacement of parts the various principal assemblies can be quickly and easily assembled and disassembled as units into and from the supporting frame of the machine, the connections of these assemblies or units being made upon the frame with quick detachable parts, such as releasable latches, rods and the like and assembled or disassembled from the frame in the matter of minutes and without interfering with the operative parts of any one of the other non-defective assemblies while this is being done, and wherein an assembly which has become defective can be readily replaced by a new assembly and the defective assembly taken to the shop for repair, thereby leaving the machine on the premises of the owner and with him having little interruption of its use.

It is another object of the invention to provide a combined cash register and adding machine in which the various assemblies are assembled and removed as a unit wherein not only are these assemblies quickly detachable from the frame parts but the parts of the individual assemblies are so formed and made into them that they too are quickly detachable from one another so that the time required for repair or replacement of defective parts in such assemblies can be lessened at the shop.

It is still another object of the invention to provide a combined cash register and adding machine formed of easily removable assemblies and in which the total number of parts subjected to use in the machine will have been reduced greatly in number over the standard machines now in use, and wherein the cost of these machines can be brought to a minimum and a cash register put in the hands of the small business owner who heretofore could not have afforded the present day machines now on the market, not only from the point of view of the initial cost cut from cost of repair and maintenance.

It is still another and important object of the invention to provide a combined cash register and adding machine in which no zeros or other indications will appear to the left of the highest denominational amount in the indicating mechanism window and in which these rows to the left will show clear with no members at all but wherein the zeros to the right of the highest denominational digit will in accordance with the amounts recorded display the zeros to thereby give the full clear amount in the window that can be readily read by the user of the machine.

It is still another object of the invention to provide a combined cash register and adding machine in which the indicating numbers appearing in the window opening do not appear until the end of the complete cycle of the indicating mechanism and whereby the user of the machine will not be required to watch the numbers pass by or be apt to take a wrong reading from the indication mechanism, due to the tendency to make a quick reading, while watching the mechanism but will have only the one reading shown and at the end of the cycle, and wherein no numbers are seen until the true full amount figures are displayed.

It is still another object of the invention to provide a combined cash register and adding machine in which the user of the cash register may depress a key at any time during the day and determine directly by reading on the indicating mechanism window itself the total take for the time period, either as a subtotal or at the end of the day as a grand total and wherein the machine when being used as an adding machine separate for recording monies being put into the cash register, such total will be indicated not in small figures but in the regular indicating mechanism window at the front and top of the machine.

It is still another object of the invention to provide a combined cash register and adding machine wherein the indicating mechanism has an additional wheel at the left thereof in order that the added sums amounting to more than can be depressed on the keyboard, will be recorded on the machine and in the window indicating mechanism, the total receipts or take for the given period of time as made and recorded with five value key units and if the total be more than the five digits and extended to six, be indicated with the mix indicating wheels in the indicating mechanism window at the top of the machine and without reference to any small totaling indications elsewhere on the machine and difficult to be seen.

It is a further object of the invention to provide a combined cash register and adding machine wherein for repetitive adding of the same number the number of movements impressing the repeat and general levers will be reduced by two over the movements required in the present standard machines, and wherein the repetitive adding is effected after selection of the key amount by depressing the repeat key each time the key amount is repeated up until the last repeat without touching the general key and finally with the last repeat, touching the general key to erase the effect of the repeat key and without having to lift or touch the repeat key to do this, thereby saving two key or lever depressing movements.

It is a still further object of the invention to provide a combined cash register and adding machine with a simple and effective safety or lockout means for preventing the actuation of the transaction keys after the value keys have been depressed or the depressing of value keys after a transaction key has been depressed.

It is a still further object of the invention to provide a combined cash register and adding machine with a more simple tens transfer arrangement and which will be more effective and accurate and wherein the tens transfer arrangement need not be wholly incorporated in the totalizer unit.

It is a still further object of the invention to provide a combined cash register and adding machine in which the totalizing can be effected with but two turns of a crank instead of with four turns as required with the present day machines.

It is a still further object of the invention to provide a combined cash register and adding machine which has all of the transfer mechanism including the tens transfer mechanism, the transfer mechanism for the totalizer connection with the keys, the transfer from the totalizer to the indicating mechanism, and the transfer of the keys to the indicating mechanism in a single assembly with transfer operations performed with a rotary motion and to thereby lessen the number of subassemblies of the machine.

It is a still further object of the invention to provide a combined cash register and adding machine in which not only is the motor drive separable from the frame as a unit and adapted to be hinged easily outwardly thereof but the motor driving gear and the control switches are incorporated with one another and likewise easily removable from the supporting frame as a unit.

It is a still further object of the invention to provide a combined cash register and adding machine in which the numerous operating cams are assembled into three groups and removable from the supporting frame as units and the cam groups including gears for interlocking the groups into driving relation with one another and the three groups in the driving relation with the motor drive mechanism.

It is a still further object of the invention to provide in a combined cash register and adding machine a selector cam follower system serving to operate the totalizer controls wherein the number of cam followers will be reduced to a minimum for the system, and the system thereby simplified with the reduction of parts.

It is a still further object of the invention to provide a combined cash register and adding machine having a transaction key unit and the selector mechanism therefor more simple with all of the parts thereof incorporated in a unit for unitary assembly and removal upon and from the supporting frame.

It is a still further object of the invention to provide a combined cash register and adding machine in which the transaction and value key units have the key transfer racks provided with stops and these stop racks incorporated in and mountable with and disassembled from the supporting frame with the key units.

Other objects of the invention are to provide a combined cash register and adding machine, having the above objects in mind, which is of more simple construction, than the present day machines, has a minimum number of parts, inexpensive to manufacture, compact, light in weight, of pleasing appearance, easy to operate, efficient, has little noise, automatic in operation, and effective in use.

Figure 4A:
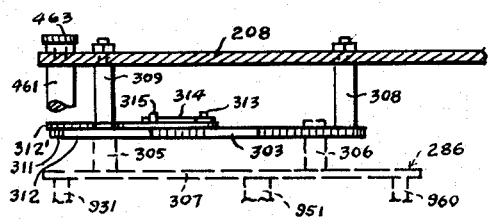
Figure 4:
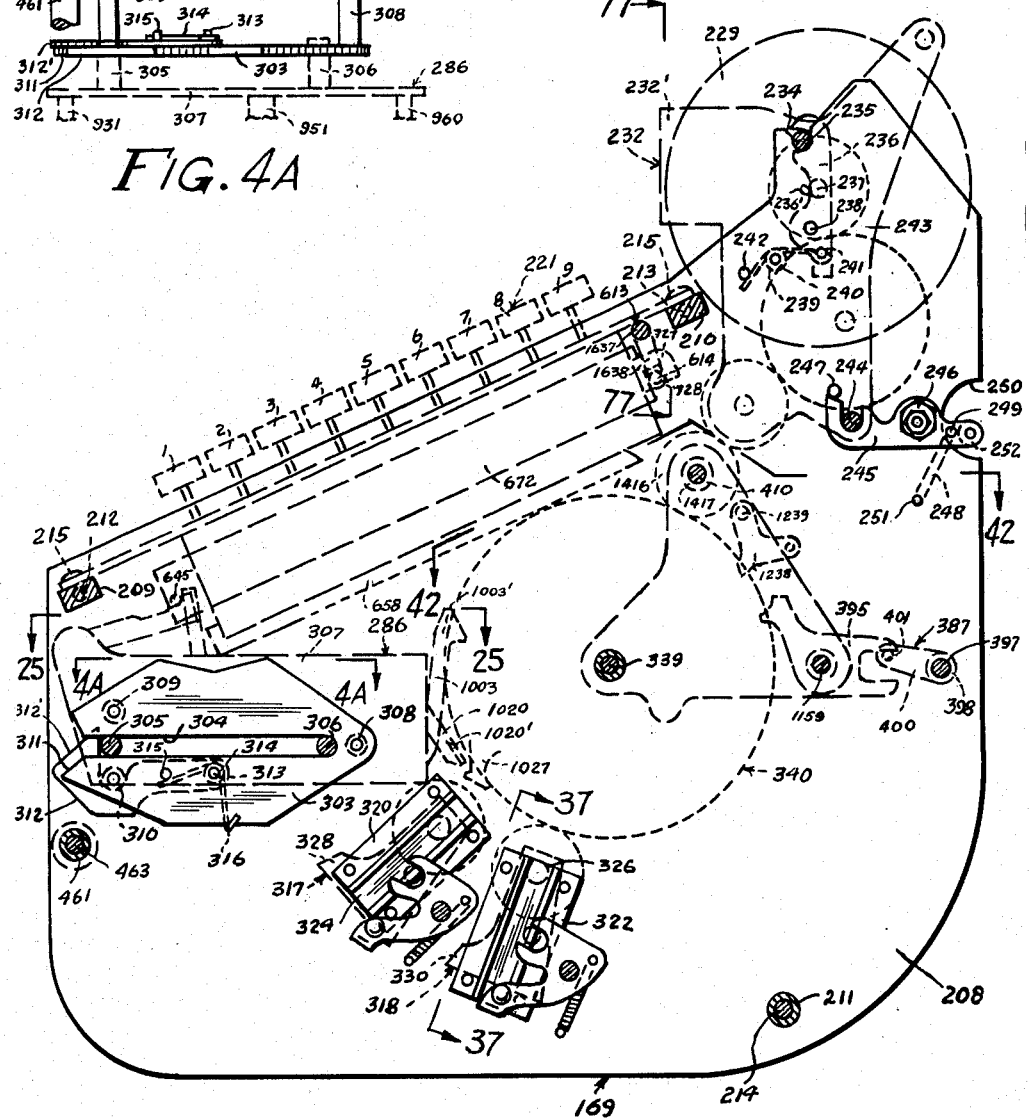

For other objects and for a better understanding of the invention, reference may be had to the following detailed description taken in connection with the accompanying drawing, in which:

FIGURE 1 is a top plan view of the machine looking down upon the key board and upon the top of the separable outer casing and with portions broken away to show the interior construction thereof, FIG. 2 is a side elevational view of the machine with the cash drawer partly opened and with the rear of the machine broken away to show the cash drawer latch mechanism, FIG. 3 is a fragmentary elevational view of the machine, the view being taken generally on line 3—3 of FIG. 2 and looking upon the indicating mechanism through the window opening at the top of the machine, FIG. 4 is a vertical sectional view taken through the machine on line 4—4 of FIG. 1, and looking upon the inner face of the left side supporting frame plate of the machine, FIG. 4a is a fragmentary detail sectional view taken on line 4a—4a of FIG. 4 and looking downwardly upon the mounting bracket for the quick detachable rotary transfer release and keys lock unit, FIG. 5 is a vertical sectional view taken through the machine on line 5—5 of FIG. 1 and looking in elevation upon the transaction key unit and with the intermediate portions of this key unit broken away to show the interior construction thereof, FIG. 6 is a bottom plan view of the transaction key unit with the slide stop rack bar having the key stops incorporated therein, the view being taken looking up generally on line 6—6 of FIG. 5, FIG. 7 is a detail vertical sectional view of the transaction key unit as viewed on line 7—7 of FIG. 5, FIG. 8 is a collective and side face elevational view of three of the key elements removed from the transaction key unit, and looking in plan upon their respective faces, FIG. 9 is a vertical sectional view of the transaction key unit as viewed on line 9—9 of FIG. 5 intermediate the length thereof, FIG. 10 is a horizontal sectional view of the transaction key unit as viewed on line 10—10 of FIG. 5, and through the tubular base thereof, FIG. 11 is a longitudinal sectional view of the transaction key unit taken in elevation and as viewed on line 11—11 of either FIG. 7 or FIG. 10, FIG. 12 is a vertical sectional view of the transaction key unit as viewed on line 12—12 of FIG. 5 near the rear end thereof, FIG. 13 is a side elevational view of the selector stop assembly for the transaction key unit as viewed on line 13—13 of FIG. 1 or FIG. 12 and looking to the right and upon the left side face of the assembly, FIG. 14 is a longitudinal sectional view of the selector stop assembly as viewed on line 14—14 of FIG. 13, FIG. 15 is a vertical sectional view of the selector stop assembly as viewed on line 15—15 of FIG. 13.

Figure 22:
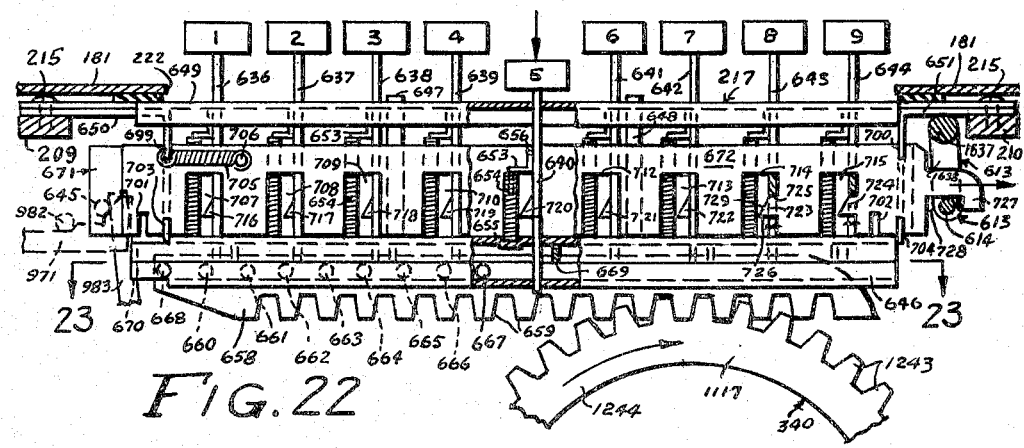
Figure 23:
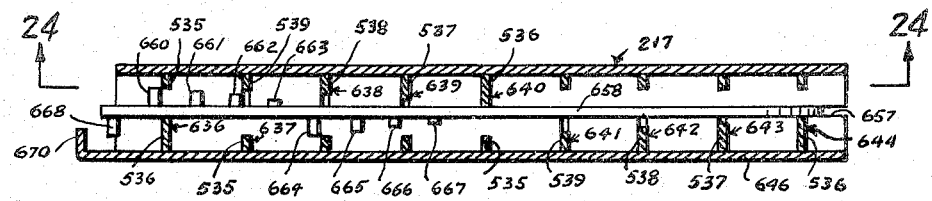
Figure 24:
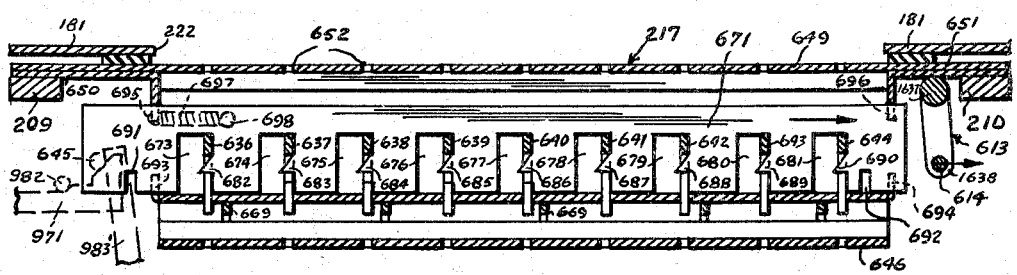
Figure 18:
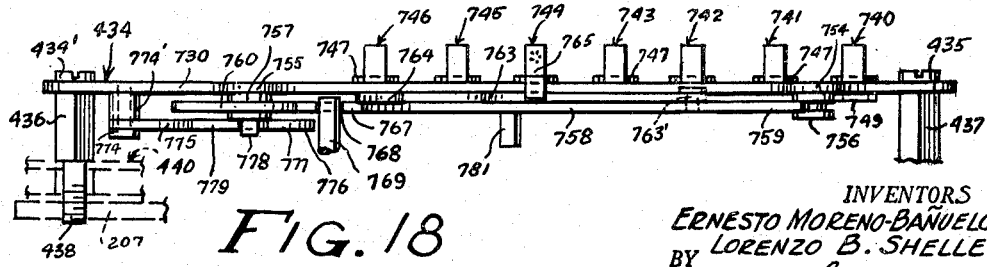
Figure 31:
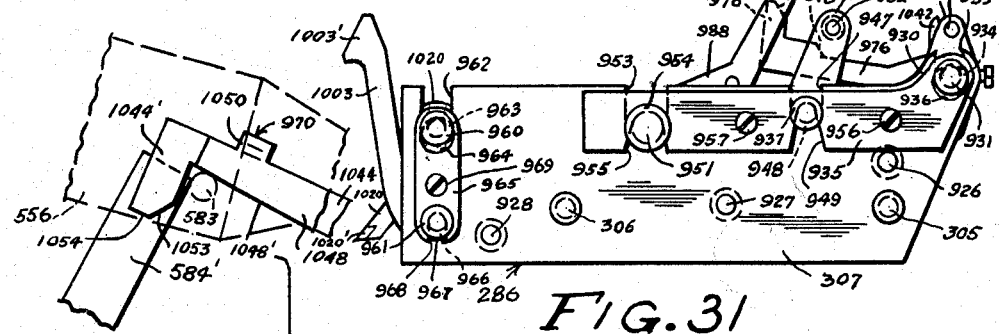
Figure 32:
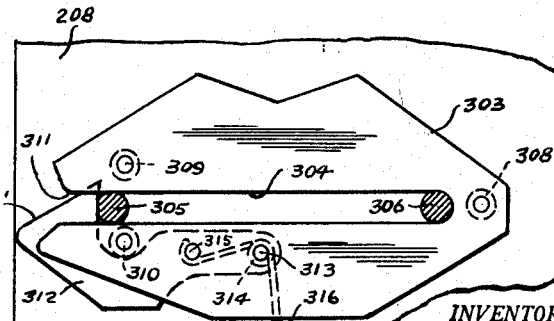
Figure 42:
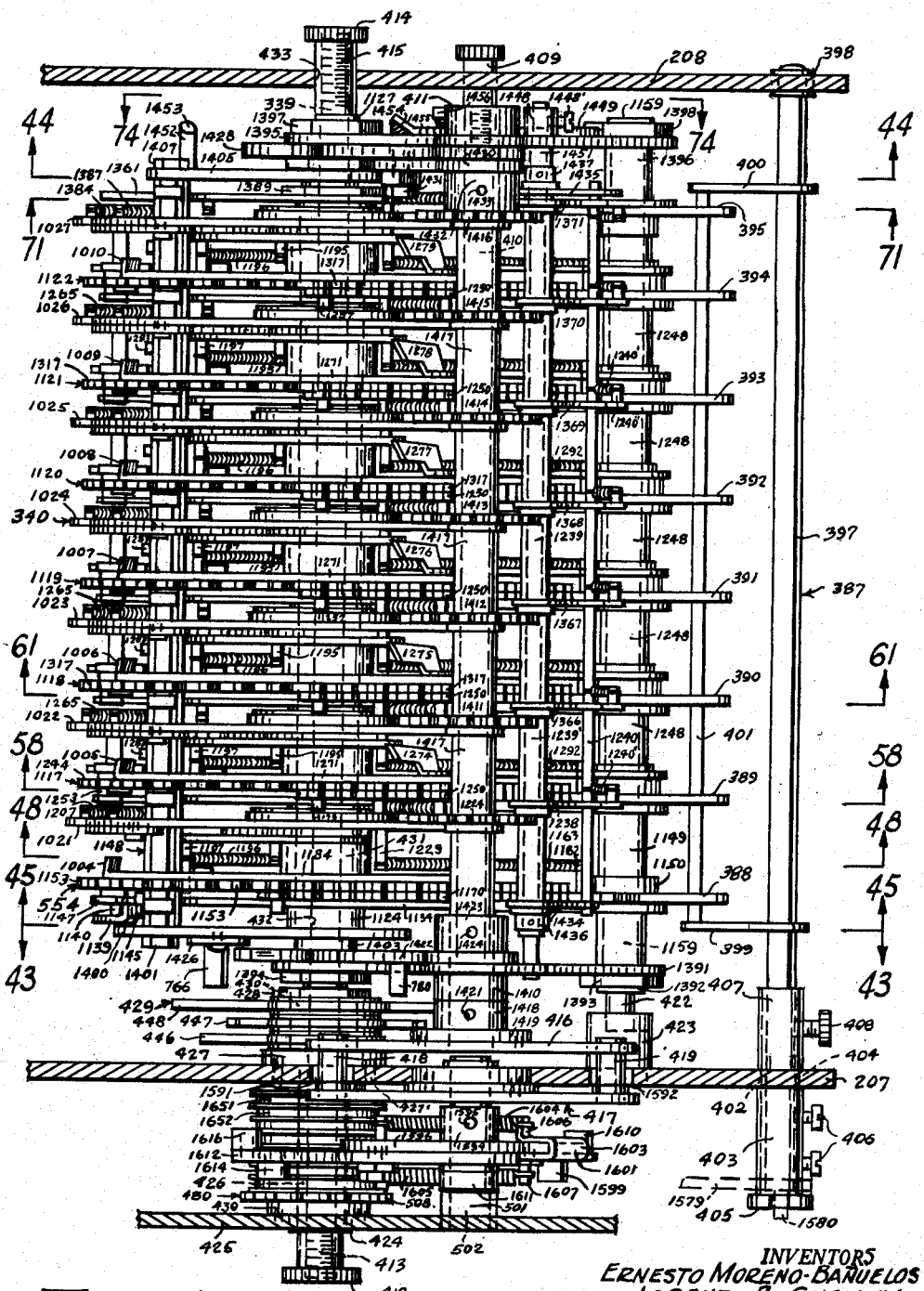
Figure 43:
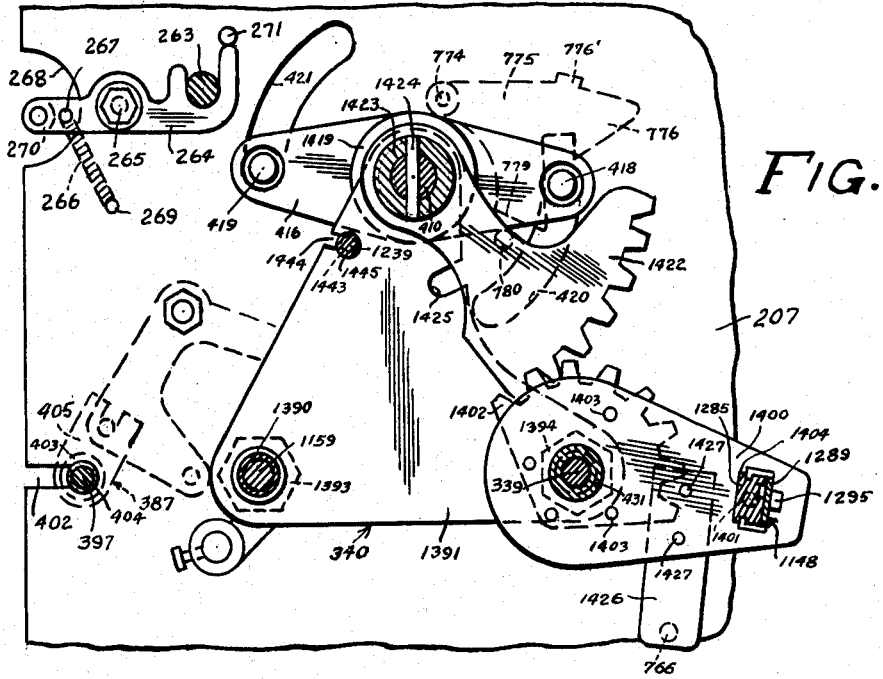
Figure 44:
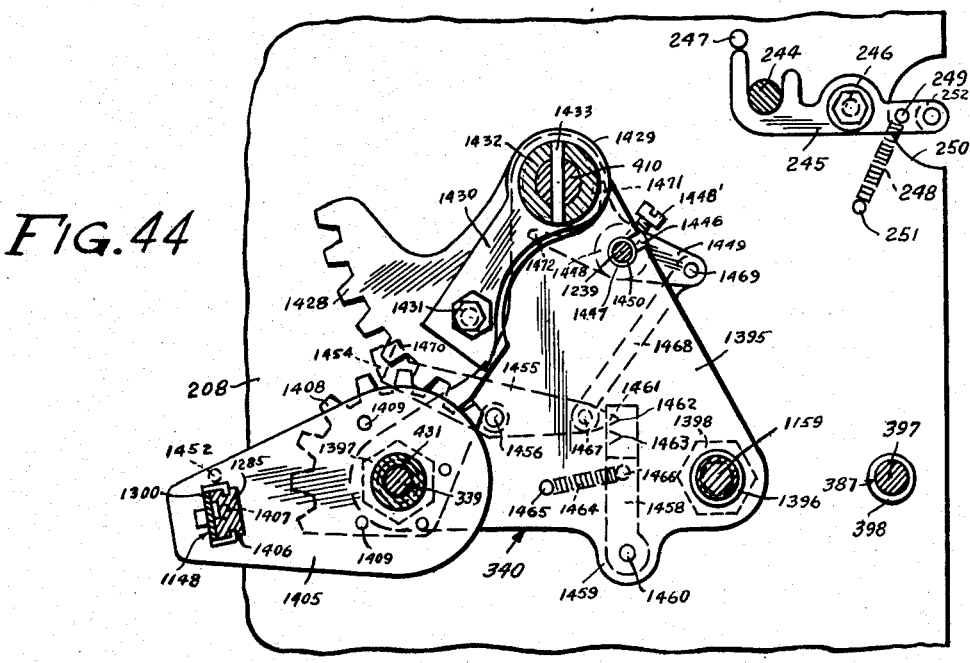
Figure 79:
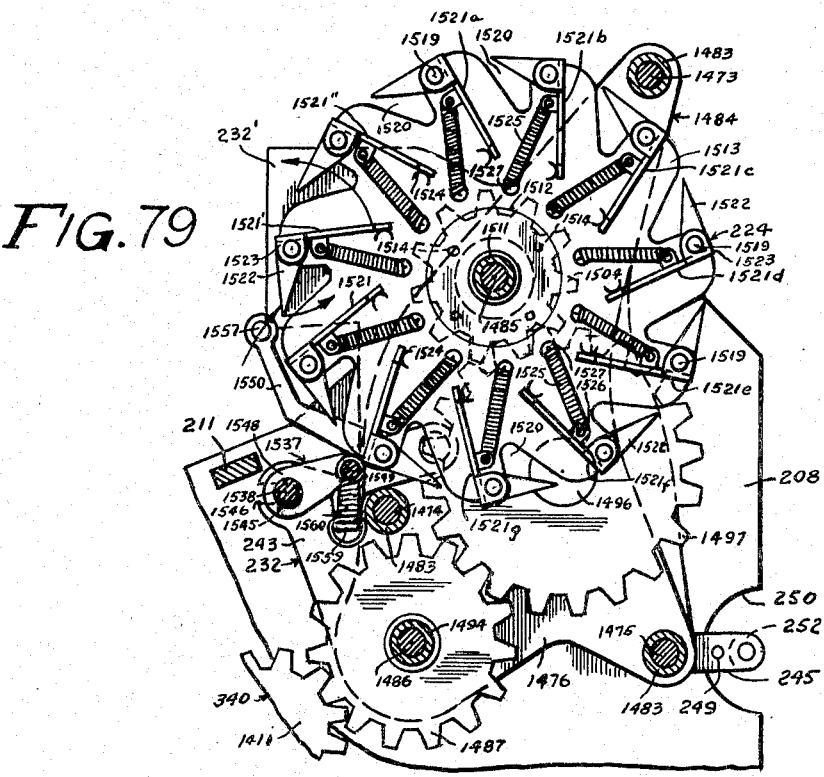
Figure 80:
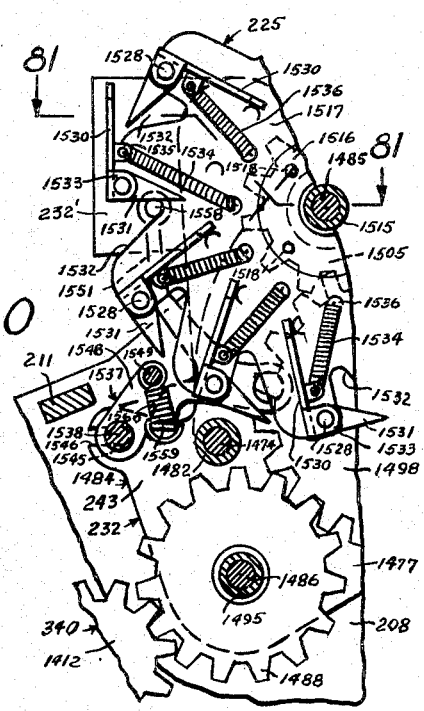
Figure 81:
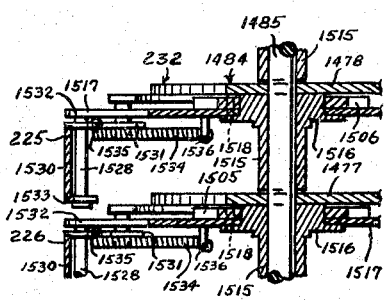
Figure 90:
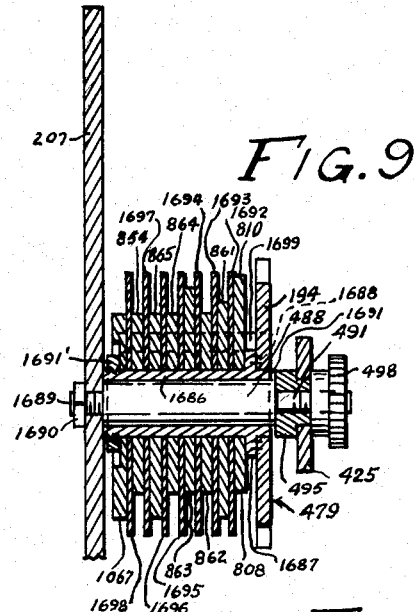
Figure 91:
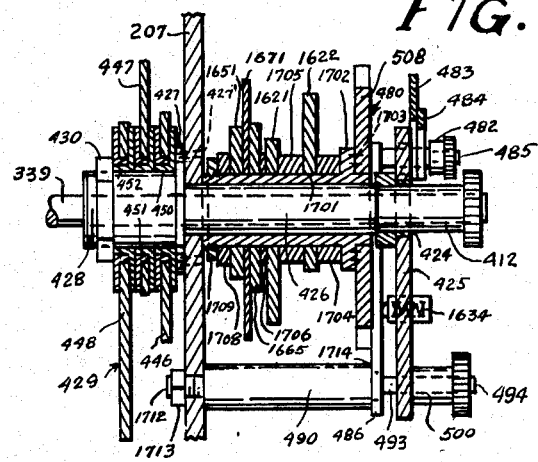
Figure 92:
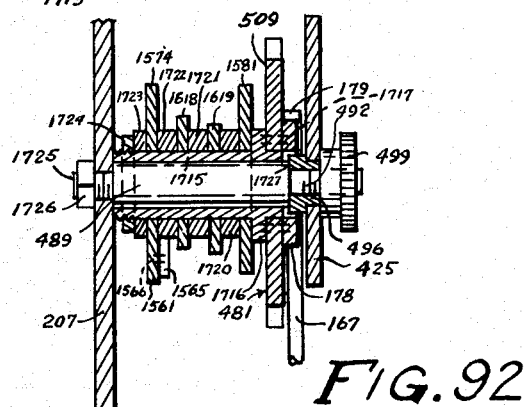
Figure 84:
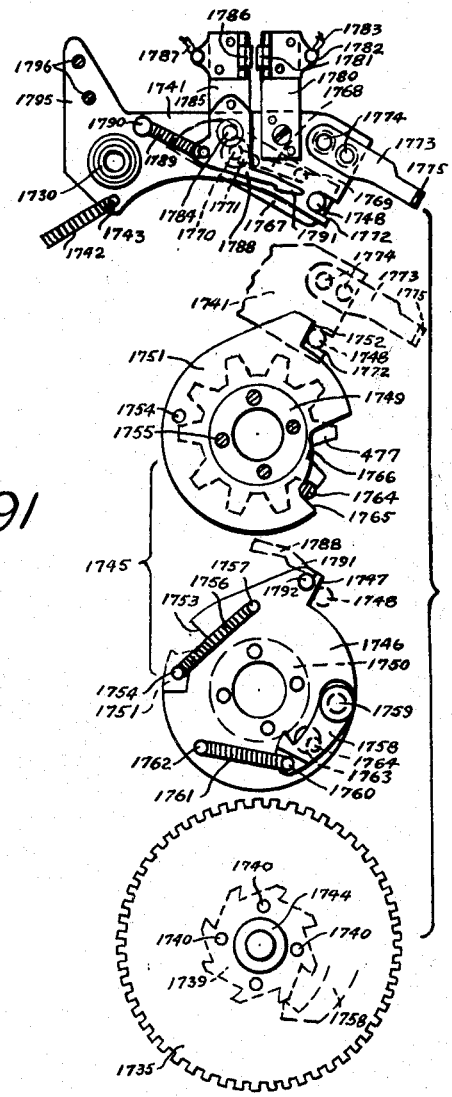
Figure 89:
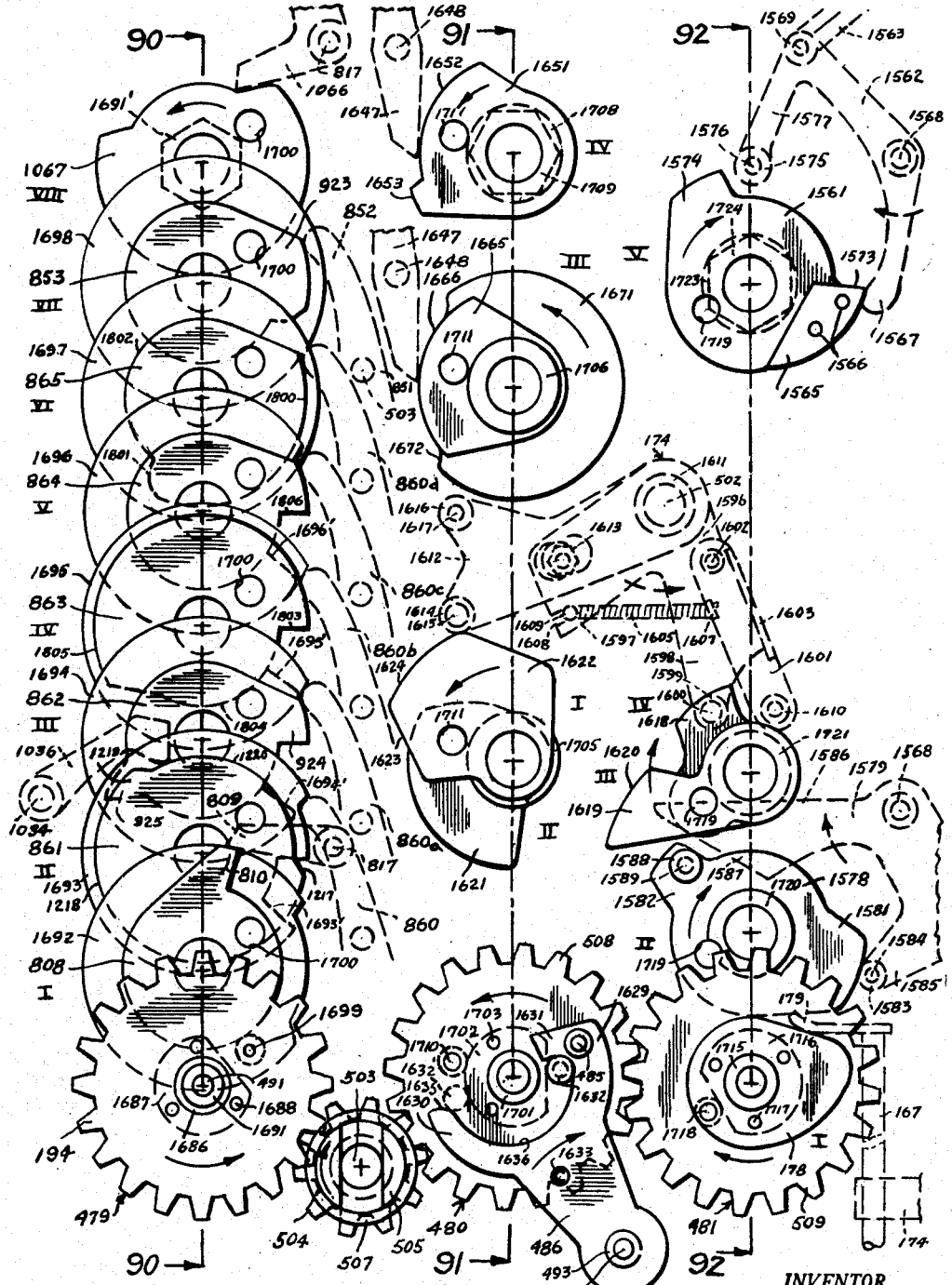
Figures 93, 94:
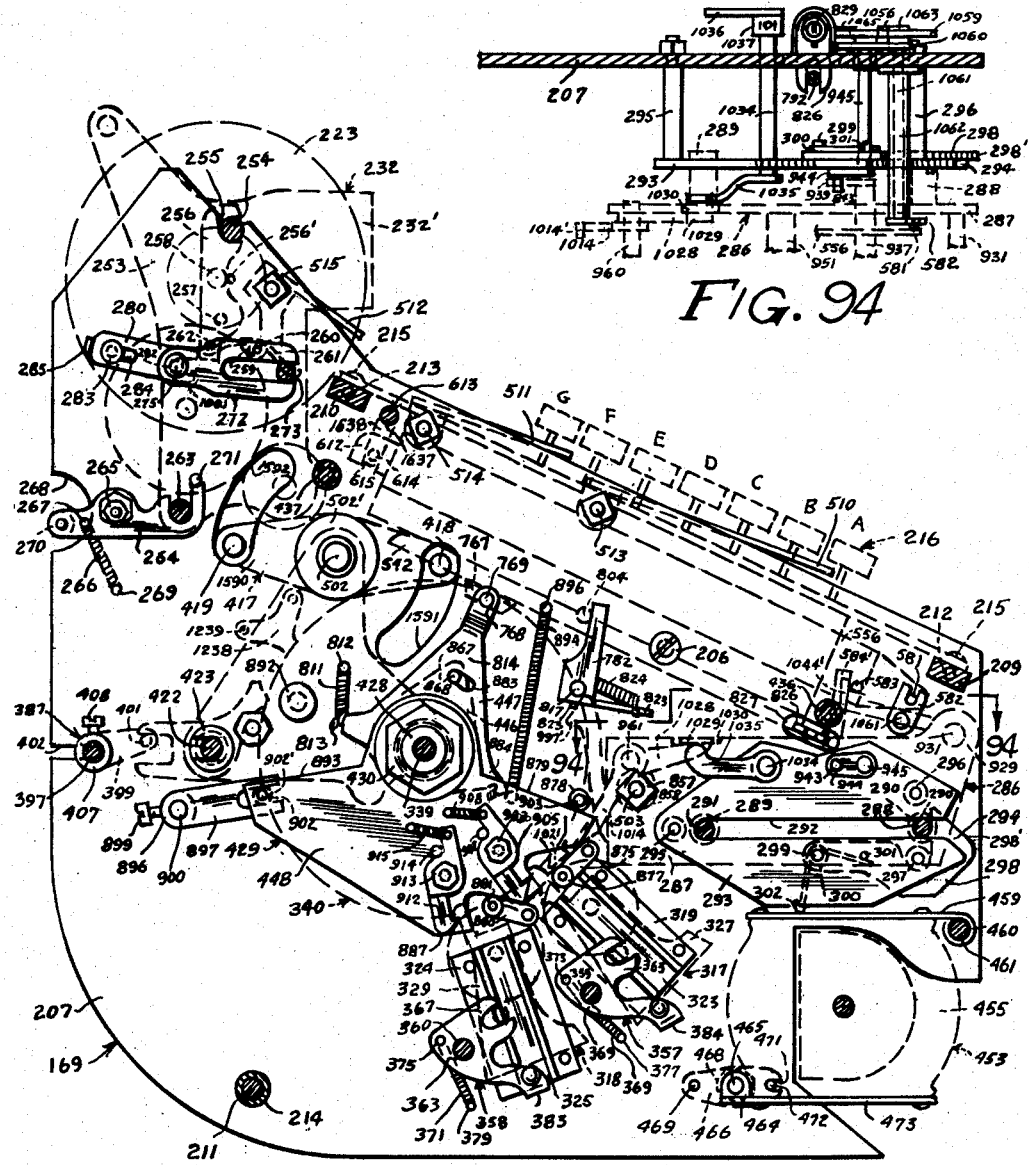

FIG. 16 is a vertical sectional view of the selector stop assembly as viewed on line 16—16 of FIG. 13, FIG. 17 is a longitudinal elevational view of the selector stop assembly for the transaction key unit as viewed on line 17—17 of FIG. 16 looking from right to left upon the slide plate thereof and with the stops being depressed, FIG. 18 is a bottom longitudinal plan view of the selector stop assembly as viewed from line 18—18 of FIG. 13, FIG. 19 is a longitudinal elevational view of the slide stop bar associated with the selector stop assembly, the view being taken on line 19—19 of FIG. 1, looking upon the left face of the stop bar, the right side frame plate and the operating arm for rearwardly moving and positioning the stop bar, FIG. 20 is a top plan view of the stop slide bar and the selector stop assembly of the transaction key unit in phantom connection therewith, the view being taken on line 20—20 of FIG. 19 and showing the cam operated arm for moving the same, FIG. 21 is a vertical sectional view of the slide bar, looking in elevation upon the cam operated arm that moves the slide bar and other parts forwardly thereof, the view being taken through the side frame plate on line 21—21 of FIG. 19, FIG. 22 is a longitudinal sectional view taken through the machine and as viewed on line 22—22 of FIG. 1 and looking in elevation upon the right face of the first value key unit with portions of the unit broken away to show the interior thereof and with its stock rack bar connected to a transfer unit gear assembly, FIG. 23 is a horizontal sectional view of the value key unit and rack bar as viewed on line 23—23 of FIG. 22, FIG. 24 is a longitudinal sectional view of the value key unit as viewed on line 24—24 of FIG. 23, FIG. 25 is a perspective view looking upon the right side and top of the combined rotary transfer release and keys lock unit removed from the supporting frame, and as viewed generally upon line 25—25 of FIG. 4, FIG. 26 is a longitudinal sectional view of the rotary transfer release and keys lock unit as viewed on 26—26 of FIG. 25, showing the neutral positions of the release latches for the first value key unit locking position with the transfer unit parts, FIG. 27 is a longitudinal sectional view of the rotary transfer release and keys lock unit as viewed on the same section line 26—26 of FIG. 25 but with the release latches released from transfer unit parts, FIG. 28 is a longitudinal sectional view of the rotary transfer release and keys lock unit as viewed on line 28—28 of FIG. 25 with the right mounting bracket therebehind with the upstanding hook arm in locking position with the transfer unit gear assembly and the lockout device elevated upon the transaction key unit, FIG. 29 is a longitudinal sectional view of the rotary transfer release and keys lock unit taken on the same section line 28—28 of FIG. 25 with the upstanding hook arm retracted and the lockout device lowered in its locking position upon the transaction key unit, FIG. 30 is a fragmentary top plan view of the rotary transfer release and keys lock unit as viewed generally in the right side area of line 30—30 of FIG. 25, FIG. 31 is a side elevational view of the left end of the rotary transfer release and keys lock unit showing the pivot and supporting rod lock plates and the left end quick attaching projections of the unit, FIG. 32 is an elevational view of the release and keys lock unit mounting plate bracket at the left side of the machine, FIGS. 33 to 36 inclusive, are respectively fragmentary elevational and collective views of the transaction and value key lockout latches and illustrating their corresponding different positions, FIG. 37 is a front elevational view of the rear totalizer that is slidably supported between the side plates of the supporting frame, the view being taken on line 37—37 of FIGS. 4, 38 or 39, FIG. 38 is a fragmentary longitudinal sectional view of the machine as viewed generally on line 38—38 of FIG. 37 including both front and rear totalizers and looking outwardly toward the right side frame plate, FIG. 39 is a fragmentary longitudinal sectional view of the machine as viewed generally on line 39—39 of FIG. 37, including both front and rear totalizers and looking toward the left side frame plate, FIG. 40 is a fragmentary horizontal sectional view of the rear totalizer taken through the right side frame plate as viewed on line 40—40 of FIG. 38, FIG. 41 is a vertical sectional view of the rear totalizer as viewed on line 41—41 of FIG. 39 and looking in elevation upon one of totalizer gears and its tens transfer cam, FIG. 42 is a top plan view of the rotary transfer mechanism unit, and of the several gear assemblies thereof taken generally on line 42—42 of FIG. 4, FIG. 43 is a vertical sectional view of the rotary transfer unit as viewed on line 43—43 of FIG. 42 and looking in elevation upon the right side operating gears for the swing bar assembly that is a part of the transfer unit, FIG. 44 is a vertical sectional view of rotary transfer unit taken on line 44—44 of FIG. 42 and looking in elevation upon the left side swing bar sector gears, FIG. 45 is a vertical sectional view of the rotary transfer unit taken through the transaction gear assembly of the unit and as viewed on line 45—45 of FIG. 42, FIG. 46 is a front vertical elevational view of the transaction gear assembly as viewed upon line 46—46 of FIG. 45, FIG. 47 is a fragmentary top plan view of the transaction gear assembly as viewed on line 47—47 of FIG. 45, FIG. 48 is a vertical sectional view of the rotary transfer unit as viewed on line 48—48 of FIG. 42 and looking upon other parts of the transaction gear assembly, FIG. 49 is a front elevational view of the transaction gear assembly parts as viewed on line 49—49 of FIG. 48, FIG. 50 is a top plan view of the transaction gear assembly parts as viewed on line 50—50 of FIG. 48, FIG. 51 is a side elevational view of the drag lever part of the transaction gear assembly removed from the supporting sleeve bushing, FIG. 52 is a fragmentary sectional view of the transfer unit taken through the complete transaction transfer gear assembly as viewed on line 52—52 of FIG. 45, and looking in plan upon the central bushing, the transfer unit attaching pull rod and the rear transverse pivot shaft, FIGS. 53 and 54 are fragmentary elevational views of the heel of the drag lever shown in FIG. 51 showing respectively the catch trip arm out of and in engagement with the drag lever, FIG. 55 is a fragmentary top plan view of the transverse swing bar assembly with its slides moved to the right and about to be moved to the left by the end lever cam edge, FIG. 56 is still a fragmentary top plan view of the transverse swing bar assembly with the slides having been moved to the left and about to be moved to the right by the cam edge of another lever, FIG. 57 is an enlarged transverse sectional view of the transverse swing bar assembly taken on line 57—57 of FIG. 56 with the slot of a slide aligned with the inclined slot of the bar, FIG. 58 is a vertical sectional view of the rotary transfer unit as viewed on line 58—58 of FIG. 42 and looking in elevation upon the first value key unit transfer gear assembly, FIG. 59 is a top plan view of the first value key unit gear assembly as viewed on line 59—59 of FIG. 58, FIG. 60 is a vertical view looking upon the front end of the value key unit gear assembly and as viewed on line 60—60 of FIG. 58, FIG. 61 is a vertical sectional view of the rotary transfer mechanism unit as viewed on line 61—61 of FIG. 42 and looking in elevation upon the second value key transfer gear assembly which has the tens transfer device, FIG. 62 is a top plan view of the second value key transfer gear assembly as viewed generally on line 62—62 of FIG. 61, FIG. 63 is a fragmentary sectional view of the second value key assembly taken on line 63—63 and looking through the tens transfer device, FIG. 64 is a fragmentary end elevational view of the second value key transfer gear assembly as viewed on line 64—64 of FIG. 61, and looking upon the tens transfer device, FIG. 65 is a fragmentary side elevational view of second value key transfer gear assembly as viewed on line 65—65 of FIG. 64 and looking upon the operating catch arms of the tens transfer device, FIG. 66 is a vertical sectional view of the second value key gear assembly as viewed on line 66—66 of FIG. 64, and looking in rear elevation upon the tens transfer part of the assembly, FIGS. 66a, 67, 68 and 69 are respectively enlarged fragmentary rear elevational views of the tens transfer device showing respectively the different stages of the operation thereof, FIG. 70 is an elevational view of the swing bar slide operating arm for the respective value key transfer gear assemblies as viewed on line 70—70 of FIG. 59, FIG. 71 is a vertical sectional view of the rotary transfer unit as viewed on line 71—71 of FIG. 42 and looking to the left upon the last plate assembly unit at the left side of the unit and upon the tens stop device thereof, FIG. 72 is a transverse sectional view of the transfer unit last plate assembly and of the tens stop device thereof as viewed on line 72—72 of FIG. 71, FIG. 73 is a fragmentary sectional view of the last plate assembly taken on line 73—73 of FIG. 72 and looking upon the tens transfer stop device thereof, FIG. 74 is a left end elevational view of the rotary transfer unit as viewed generally on line 74—74 of FIG. 42, showing the gear segments for operating the swing bar assembly and the ratchet control mechanism operated thereby, FIG. 75 is a fragmentary sectional view of the rotary transfer unit as viewed on line 75—75 of FIG. 74 and through the swing bar operated ratchet control mechanism, FIG. 76 is a fragmentary sectional view of the swing bar assembly taken on line 76—76 of FIG. 74 to show the pin projection on the bar assembly that operates the ratchet control mechanism, FIG. 77 is a front elevational view of the indicating mechanism unit showing its quick detachable pins connected with the supporting frame and as viewed generally on line 77—77 of FIG. 4, FIG. 78 is a vertical sectional view of the indicating mechanism unit as viewed upon line 78—78 of FIG. 77 looking upon the right end plate thereof, FIG. 79 is a vertical sectional view of the indicating mechanism unit as viewed on line 79—79 of FIG. 77 and looking in elevation upon the transaction indicating assembly thereof and the gears that operate the same, FIG. 80 is a vertical sectional view of the indicating mechanism unit as viewed on line 80—80 of FIG. 77 and looking in elevation upon the cents value key indicating assembly and the gears that operate the same, FIG. 81 is a horizontal sectional view of the indicating mechanism unit as viewed on line 81—81 of FIG. 80, FIG. 82 is a fragmentary right side elevational view of the supporting frame showing the cam groups and their cam followers, the cover plate therefor, motor and drive gear units, the main press levers associated therewith, and other external parts of the machine, FIG. 83 is a transverse sectional view taken through the motor drive gear and switch control unit as viewed on line 83—83 of FIG. 82, FIG. 84 is a collective and elevational view showing the various parts of the motor drive gear and control switch unit disassembled from one another and as viewed generally on line 84—84 of FIG. 83, FIG. 85 is an elevational view of the right side of the machine with the cover plate, cam units and motor driving gear unit removed to expose all of the main press levers, linkages and cam followers associated with the cam units, FIG. 86 is a fragmentary sectional view of the right side of the machine viewed on line 86—86 of FIG. 85, and looking in plan upon the slide bar swing plate and the transfer unit drag lever release catch cam follower, FIG. 87 is a fragmentary sectional view of the right side of the machine looking in plan upon the shiftable cam follower, FIG. 88 is a vertical sectional view of the right side of the machine as viewed on line 88—88 of FIG. 85, showing in particular the repeating lever linkage, FIG. 89 is an exploded view of the three cam groups with the individual cams being shown in full plan and the followers therefor in dotted lines, FIG. 90 is a longitudinal sectional view of the first cam group as viewed on line 90—90 of FIG. 89, but with the cams assembled together and mounted on their group supporting post, FIG. 91 is a longitudinal sectional view of the second cam group as viewed on line 91—91 of FIG. 89, but with cams assembled together and mounted on totalizer control plates and transfer unit attaching pin sleeve support, FIG. 92 is a longitudinal sectional view of the third cam group taken on line 92—92 of FIG. 89 but with cams assembled together and mounted on the group supporting post, FIG. 93 is a longitudinal sectional view of the machine as viewed on line 93—93 of FIG. 1 and looking in elevation upon the various mechanisms and parts assembled upon the right side frame plate and extending from the inner face thereof, FIG. 94 is a fragmentary horizontal sectional view of the right side frame plate taken on line 94—94 of FIG. 93 and looking upon certain of the operating rods extending through the side plate, and drivingly connected with the combined rotary transfer release and keys lock unit, FIG. 95 is a fragmentary longitudinal sectional view similar to FIG. 93 looking in enlarged elevation upon the operating plates for controlling the raising and lowering of the front and rear totalizers, and with both totalizers lowered, FIG. 96 is a fragmentary horizontal sectional view of the cluster of totalizer operating plates as viewed on line 96—96 of FIG. 95, FIG. 97 is a fragmentary detail vertical sectional view of the totalizer operating plates as viewed on line 97—97 of FIG. 95, and looking in elevation upon one of the hook levers for locking the rear totalizers in their elevated position, FIG. 98 is an elevational view of the two of the totalizer operating plates that select the totalizers, FIG. 99 is an elevational view of the totalizer operating plates similar to FIG. 95 but adapted for the front totalizer to be raised while the rear totalizer is lowered, FIG. 100 is an elevational view of the totalizer operating plates similar to FIGS. 95 and 99 but adapted for the rear totalizer to be elevated while the front totalizer is lowered, FIG. 101 is a vertical sectional view of the slip clutch for the hand crank for permitting the rotation of the motor independently of the crank, this view being taken on line 101—101 of FIG. 1, FIGS. 102, 103 and 104 are respectively fragmentary rear end elevational views of the key units, showing respectively the positions of the lock slide plates thereof as held by general lock and release device when the machine is in neutral, in operation, and just before the end of the operating cycle.

TABLE OF CONTENTS

I. General Description
   A. Base, Cash Drawer, Separable Top Housing and Supporting Frame Structure
   B. Hand Crank and One Way Clutch Connection
   C. Supporting Frame Structure, Key Units, Control Buttons, and Indications Window II. Quick Detachment of Various Assemblies from the Supporting Frame
   A. Removal of Indicating Mechanism Unit 232
   B. Removal of a Combined Rotary Transfer Release and Keys Lock Unit
   C. Insertion and Removal of Totalizer Units
   D. Removal of the Rotary Transfer Unit Vertically-Swingable Latch Arms Operating Device 387
   E. Removal of the Rotary Transfer Mechanism Unit 340
   F. Removal of Selectro Stop Assembly and Slide Stop Bar Units 434 and 440
   G. Removal of Totalizer Operating Plates 429
   H. Removal of Electric Motor Drive Unit 453
   I. Removal of Motor Drive Gear and Motor Switch Control Unit 458
   J. Removal of Cover Plate 425, Cam Group Assemblies 479, 480 and 481, Operating Levers 510, 511, 512, Cam Followers, etc.

III. Detail Construction and Operation of the Various Units, Assemblages and Parts
   A. Transaction Key Unit 216
   B. Value Key Units Construction
   C. Selector Stop Assembly 434 for Controlling the Operating of the Totalizer Operating Plates Cluster 429.
   D. Slide Stop Bar 440 to Return Totalizer Operating Plates to Their Neutral Positions
   E. Double Pivot Arm Assembly 782
   F. Shiftable Cam Follower Positioning, Linkage Operated by Slide Bar
   G. Totalizers Operating Plates Cluster 429
   H. Detail Construction of Transfer Release and Keys Lock Unit
      1. Transfer Gear Assembly Release Parts
      2. Keys Lock Out Device 970
      3. Transverse Push Rod Pivot Shaft Operating Linkage 937
   I. Detail Construction of Front and Rear Totalizers 317 and 318
   J. Detail Construction and Operation of Rotary Transfer Unit 340
      1. Description of Transaction Gear Assembly 554
      2. First Value Key Unit Gear Assembly 1117
      3. Second Value Gear Assembly 1118 with Tens-Transfer Device 1314

4. Swing Bar Assembly Operating Parts 1148
5. Operating Mechanisms for Quadrant Gear Plate Depending Catch Arms 1238, 1366 to 1371

K. Detail Construction and Operation of Indicating Mechanism Unit 232
L. Cam Operated Mechanism for Driving Indicia Bearing Flash Plates Pivot Shaft Device
M. Cam Operated Mechanism for Driving Transfer Unit Vertically-Swingable Bifurcated Latch Arms Operating Device 387
N. Removable Drive Clutch Rocker 417 and its Cam Operated Mechanism
O. Main Starting Lever and Cycle Stop Latch Lever Assembly 510 and 486
P. Cam Operated General Release Bar Device 613 and the Operating Mechanism Therefor
Q. Repeat Lever "R" Operating Mechanism
R. The Erasing Lever "X" and its Cam Operating Mechanism
S. First Cam Group Assembly 479
T. The Second Cam Group Assembly 480
U. The Third Cam Group Assembly 481
V. Construction of Motor Drive Gear and Switch Control Unit 458

IV. The General Operation of the Machine
A. Neutral Positions of the Parts
B. Upon Pressing a Value Key Button, Sequence of Operation
C. Upon Pressing a Value Key Button to Total with Previous Key Button more than "Ten"
D. Upon Depressing of Repeat Lever—Sequence of Operation
E. Upon Depressing Transaction "A" Key Button—Sequence of Operation
F. Upon Depressing the "F" Sub-Total Items Button—Sequence of Operation
G. Upon Depressing "E" Total Items Button—Sequence of Operation
H. Upon Depressing the "D" Single Item Button—Sequence of Operation
I. Upon Depressing the "G" Received on Account Button—Sequence of Operation
J. Upon Depressing "B" Sub-Total Button—Sequence of operation
K. Upon Depressing the "C" Grand Total Button—Sequence of Operation A general description will now first be made of the various units and parts and particularly to the quick detachable manner in which the units and parts are assembled upon the internal supporting frame.

I. GENERAL DESCRIPTION

*A. Base, Cash Drawer, Separable Top Housing and Internal Supporting Frame Structure (FIGS. 1, 2, 3, 4, 93 and 100)*

Referring now particularly to FIGS. 1, 2 and 3, 150 represents the machine base that has a cash drawer opening 151 in the front thereof through which a cash drawer 152 is slidable into and out of the base 150. This base 150 is preferably molded from plastic of any desired color and has a top portion 153 and a downwardly and outwardly inclined side wall portion 154 extending therearound. In the bottom of the base is a floor 155 over which the cash drawer 152 is slidably supported.

Fastened to the opposite sides of the interior of the base 150 are guideways 156 that cooperate with grooves 157 in the opposite sides of the cash drawer, only one set being shown that guides the cash drawer while it is being moved into and out of the machine base 150.

The cash drawer 152 has the usual money denomination compartments 158 and a front plate 159 having a key lock 160 that cooperates with the opening 151 so that the drawer can be locked into the base when the machine is left at night and independently of a machine-operated hook latch 161 pivoted upon a wall bracket 162 on the rear of the base and operated by an operating arm 163. This hook latch 161 is adapted to hook over the rear end of the cash drawer 152 by riding over a wear member 164 carried on the upper edge of the cash drawer.

In order for the hook latch 161 to make the engagement with the rear end of the drawer, a compression spring 165 extended forwardly from a bracket 166 secured to the base side wall 154, is compressed by the cash drawer. Energy is stored in the spring 165 and upon the hook latch 161 being released the force of the spring will crack the drawer out of the front opening 151 so that the user of the machine can then easily pull the drawer to have access to the compartments 158 thereof for the purpose of putting money therein or removing the change therefrom, if necessary, as the result of some sale which may have been made. The hook latch 161 is lifted by a vertically-extending lift rod 167 that extends upwardly from the operating arm 163 through the top 153 of the base and into a well-shaped top housing 168 also preferably made of plastic, that contains a supporting frame structure 169 on which the various units and parts of the machine are assembled for quick detachment therefrom.

The top portion 153 of the base 150 has an upstanding sleeve portion 171 to which a depending sleeve 172 of the top housing 168 is slide fitted and secured thereto by fastening screws 173 disposed therearound, only one being shown, FIG. 2. On the base top depending sleeve 172 is a guide bracket 174 through which the vertically-extending rod 167 slides. A compression return spring 176 abuts the underside of the guide bracket 174, surrounds the rod 167 and reacts against a collar 177 thereon to bias the hook latch 161 to a lowered position for spring engagement with the wear member 164 on the rear of the cash drawer 152. The lift rod 167 is elevated against the action of the compression spring 176 to lift the hook latch 161 and permit the cash drawer to be cracked open, by a drawer latch cam 178 forming the part of the operating mechanism of the internal supporting frame structure 169, and which will be better identified later in the description. The upper end of the rod 167 has a horizontally-extending cam follower arm 179 that overlies the cam 178. The cam 178 is arranged to lift the arm 179 and the rod 167 at the beginning of the cycle of operation of the machine to immediately release the cash drawer 152. The cash drawer will, of course, be closed manually with sufficient force to overcome the action of the springs 165 and 176.

The top housing 168 is preferably formed of separable right and left parts 181 and 182 that separate from the middle of the housing and which are respectively provided with securing lips 183 and 184 that fit tightly to one another and which are further secured by a series of fastening screws 185 placed about the housing, FIGS. 1 and 3. It will now be seen at this point that to gain access to the supporting frame structure 169 and the various units and parts thereon, the bottom screws 173 are first removed, and the top housing 168 and the supporting structure 169 are lifted from the base 150. Thereafter other fastening screws 187 are removed from pin projections 186 on the sides of the supporting frame 169 and with the fastening screws 185 having been removed then can be dropped from the opposite sides of the supporting frame, the supporting frame with the various units having thereby been made free of the base and the top housing parts. The top housing 168 with the supporting frame 169 will thus have been easily separated from the base 150 by removing the base screws 173 and then upon the screws 185 and 187 being removed the housing parts 181 and 182 are easily separated from one another and from the supporting frame whereby quick access is readily had to the working parts of the machine that are carried on the supporting frame.

B. Hand Crank and One Way Clutch Connection (FIGS. 1, 2, 82, 85 and 101)

An operating hand crank 188 extends from one side of the top housing 168 and is detachably connected to a turn clutch shaft 189 by removing a finger screw 190. The hand crank 188 is removed from the turn shaft 189 before the housing part 182 can be separated from supporting frame 169. This hand crank 188 has a laterally-extending hand roller 191 to facilitate the turning of the hand crank. The inner end of the hand crank 188 has a long hub 192 for receiving the shaft 189 and the finger screw 190 which is threaded into the end of this shaft 189 so as to secure the hand crank thereto against outward displacement therefrom. While the machine is preferably motor-operated in a manner to be hereinafter described, the hand crank 188 is provided on the machine for emergency turning and for hand operated models of the machine by which the hand crank would be the full source of power.

In order that the hand crank 188 is not turned as the motor is operated, there is provided a one-way drive clutch connection 193 on the turn shaft 189 between the crank hub 192 and a motor driven gear 194 as best seen in FIGS. 1 and 101. The drive clutch connection 193 has a circular plate 195 thereon to the inner face of which is fixed a crank drive pinion 196 that meshes with the motor driven gear 194. Pivoted on a pivot pin 197 on the circular plate 195 is a ratchet pawl 198 that is engageable with a ratchet slot 199 in the outer surface of the crank hub 192 so that the crank drive pinion 196 overruns the hand crank as the motor drive is operated. The ratchet pawl 198 is held in the ratchet slot 199 by a tension spring 200 anchored to a pin post 201 on the circular plate 195 and connected at its other end to a pin post 202 on the hook end of the pawl 198. The turn shaft 189 is journalled in a supporting sleeve 203 fixed to the frame structure 169 by its flange 204 and fastening screws 205, FIGS. 82, 85, and is made secure against outward displacement from the sleeve 203 by a large head retaining screw 206 extending from the inner face of a right sideplate 207 of the supporting frame structure 169, FIG. 93, the shaft supporting sleeve 203 extending through the right side plate 207.

C. Supporting Frame Structure, Key Units, General, Repeat Button Release Lever Buttons and Indicating Window and Wheels (FIGS. 1 to 5, 22, 77, 79 to 82, 85 and 93)

The supporting frame 169 has right and left side supporting frame plates 207 and 208 that are held in laterally-spaced relationship by transversely-extending front and rear flat top bars 209 and 210 and a transversely-extending bottom round rod 211 to which the supporting plates 207 and 208 are respectively secured by fastening screws 212, 213, and 214. These transversely-extending bars 209 and 210 are of rectangular section with flat top faces having small threaded holes for receiving fastening screws 215 to removably secure a transaction key unit 216 at the right thereof and five value key units 217, 218, 219, 220 and 221 to the left of the transaction key unit 216. These key units are accessible for removal when the housing parts 181 and 182 have been removed from the supporting frame structure 169.

All of the key units lie in an inclined manner within a key unit opening 222 provided in the top of the housing 168 and the several keys of each unit bearing appropriate identifying marks project upwardly thereabove and are operated by depressing them inwardly with the fingers in the usual manner. The transaction key unit 216 has seven key buttons, FIGS. 1, 2 and 5, but with space for two other key buttons at the upper end thereof, if two other totalizers are to be used. The transaction key buttons may define the use to which the machine is to be put and for the present are being identified by letters "A," "B," "C," "D," "E," "F" and "G," FIGS. 2, 4 and 5.

With all of the transaction key buttons except one, readings of the amounts of money being put into or already in the cash register drawer can be had, and with the other one of the keys being depressed, a summation reading is taken as in an adding machine and without interfering with the other operations.

Each of the value key units have nine numbered key buttons "1," "2," "3," "4," "5," "6," "7," "8" and "9," FIGS. 1, 2, 4 and 22. There are no "zero" key buttons on the value key unit. Decimal amounts are made on the cents and cents by tens value key units 217 and 218 and the dollar amounts mounting up to nine hundred and ninety-nine dollars are made on the remaining respective dollars, dollars by tens and dollars by hundreds value key units 219, 220 and 221. The construction and operation of the transaction and value key units will be set forth later in detail.

Once the selected key buttons have been depressed, the machine is made ready for operation. Thereafter a general starting lever button "M," FIGS. 1, 2, 82, 85 is depressed, the motor is started, and the machine is then immediately put into operation. If the machine does not have any motor or the motor is not to be used, the machine after pressing general starting lever button "M" may be similarly put into operation by turning the hand crank 188 through two complete turns. If it is desired to have a repeat operation made of the amount depressed on the key units, a repeat lever starting button "R" need only be depressed, without having to depress the general lever button "M," the machine thus being immediately put into operation, or if there is no motor, by two turns of the hand crank 188 as when the general lever button "M" has been depressed. The repeat button "R" is thereafter depressed for each repeat operation desired except for the last repeat operation, and then the general lever button "M" is used. The amount key buttons will, after the general button "M" is depressed, be automatically released and cleared following that operation in a manner to be more fully set forth later on. Should there have been an error in the pressing of the key buttons, and it is desired to release the buttons before depressing the "M" or "R" buttons to put the machine into operation, an erasure can be made simply by depressing a general key release button "X." The key buttons are thus thereby released and then can be depressed in the right manner.

In the upper part of machine top housing 168 and at the front thereof is a window opening 223 through which transaction indications can be observed from an indicating wheel 224 at the right thereof and the amount indications can be observed on the respective indicating wheels 225, 226, 227, 228, 229 and 230 from cents to thousands of dollars, FIGS. 3, 77, 79, 80 and 81. The last indicating wheel 230 at the extreme left of the window opening 223 comes into play to indicate thousands up to nine. These indicating wheels form a part of the indicating mechanism unit indicated generally at 232. A window glass 231 is secured to brackets 232' provided on the unit and over the indicating wheels by fastening screws 233 so that it can easily be removed to repair the unit or replace when broken, FIGS. 1, 2, 3 and 77.

II. QUICK DETACHMENT OF VARIOUS UNITS AND PARTS FROM THE SUPPORTING FRAME 169

The quick detachment of the units and parts will be discussed more or less in the order in which they are removed from the supporting frame if it were desired to have a complete disassembly of the machine, while some of the units are not accessible until certain of the units are first removed it should be understood that the ease in which all of the units can be removed does not make this a deterrent factor. It will also be further clear that the various units themselves have quick detachable parts to permit their quick disassembly with like ease.

The top housing 168 and mechanism supporting frame 169 having been removed from the base 150 and the housing parts 181 and 182 from the supporting frame 169 access is readily had to the various unitary assemblies supported with the frame. These various unitary assemblies are best shown in assembled relationship within the supporting frame diagrammatically in FIGS. 4 and 93. With the supporting frame 169 free of the base 150 and housing parts 181 and 182 the key units are removed by simply detaching the screws 215 on the front and rear transverse bars 209 and 210.

*A. Removal of Indicating Mechanism Unit 232*
*(FIGS. 4, 43, 44, 77 to 79, 85 and 93)*

The indicating mechanism unit 232 is removably carried at the top and rear of the supporting frame 169. This indicating unit 232 when detached from the side plates 207 and 208 by its simple release connections, is pushed from the rear of the supporting frame 169 without interfering with any of the other units. In the upper end of the left side plate 208 is a top open notch 234 into which is saddled a mounting stud 235 extending from the left end of the indicating mechanism unit 232. The end of the mounting stud 235 has an extension 235' that extends through the open notch 234 beyond the side plate face and is held saddled in place within the notch by a vertically-extending biased latch hook lever 236 that hooks over the outer end of the stud 235 but when free of stud is held against a stop pin 236' extending outwardly from the side plate 208, FIGS. 4 and 77. A small finger knob 237 is used to pivot the lever 236 rearwardly upon its pivot connection 238 on the side plate 208 to release the stud 235. This is done against the action of a torsion spring 239 carried on a pin support 240 extending outwardly from the side plate 208 with one end engaging with a work pin 241 on the lower end of the lever 236 and the other end anchored against a stop pin 242 also projecting outwardly from the side plate 208. The torsion spring 239 is so shaped about the work pin 241 on the lever and positioned that an over center like effect is had to hold the lever in its rearwardly retracted and released position, leaving the hand free to lift the unit from the supporting frame 169. The indicating mechanism unit 232 has a left end plate 243 from which the stud 235 extends.

Also, on the indicating unit left end plate 243 and below the stud 235, there extends outwardly a lower stud 244 that is of such length as to extend only to the inner face of the left side frame plate 208, FIGS. 4, 44 and 47. To hold the indicating unit against fore and aft swing displacement while vertically supported by the stud 235 saddled in the notch 234, a latch hook lever 245 is pivoted upon an adjustable eccentric pivot pin 246 fixed to the inner face of the left side plate 208 so that its hook end extends upwardly from under the lower stud 244. The hook end is held against a stop pin 247 by a tension spring 248, connected to the outer side of the hook lever 245 on a pin post 249 extending outwardly through a finger notch 250 in the rear edge of the left side frame plate 208. The tension spring 248 is anchored to a pin post 251 extending outwardly from the side frame plate 208. The hook lever 245 has a finger knob 252 that is accessible in the finger notch 250.

A similar stud arrangement is provided on the opposite or right end of the indicating mechanism unit 232 as is best shown in FIGS. 77, 78, 85 and 93. On a plate 253 at the right end of the indicating mechanism unit 232 is an upper outwardly extending stud 254 that an extension 254' saddled in a stud-receiving notch 255 in the upper and rear end of the right frame side frame plate 207 and is retained therein by a vertically-extending hook latch lever 256 on the outer face of the right side plate 207. This hook latch lever is pivoted on a adjustable eccentric pivot pin 257 and is limited in its forward movement by a stop pin 256' by grasping finger knob 258 it can be retracted rearwardly against the action of an over center torsion spring 259 carried on a pin support 260 on the right side plate 207 and anchored at one end against a pin 261 on the side plate 207 and worked over another pin 262 on the hook lever 256, this spring 259 serving to hold the hook latch lever 256 in its rearwardly-retracted position and leave the hand free to lift out the indicating unit 232.

A lower stud 263 extends from the right end plate 253 of the indicating mechanism unit 232 only to the inner face of the right side frame plate 207 and is held against fore and aft movement by a hook latch lever 264 pivoted on an adjustable eccentric pivot pin 265, FIGS. 43, 77, 78, 85 and 93. The hook latch lever is held elevated against the lower stud 263 by a tension spring 266 that is connected to a pin 267 that extends outwardly from a finger notch 268 and is anchored to a pin 269 on the outer face of the right side frame plate 207. A finger knob 270 also extends into the finger notch 268 and is used to lower the lever 264 and disengage the hook end thereof from its stop pin 271 and free the lower stud 263.

Before removing the indicating mechanism unit 232, a bifurcated swing arm 272 extending inwardly from the right side frame plate 207, FIGS. 77, 78, 85 and 93, must be pushed outwardly in order to free a laterally-extending pin 273 of a working shaft pivot arm 274 at the right end of the indicating unit 232 that is worked by the bifurcated swing arm 272, for a purpose to be later described. This swing arm 272 is fixed to the inner end of an operating shaft 275 that is journalled and slidable in a bushing 276 that extends through and is fixed to the right side plate 207 and projects outwardly therefrom. The outer end of the operating shaft 275 has a pivot arm 277 fixed to the shaft 275 by a set collar 278 and its set screw 279, FIG. 77. In order that the bifurcated swing arm 272 be held connected to the lever pin 273 on the indicating mechanism unit 232 against accidental outward displacement therefrom, a bifurcated slide latch 280 is provided on the inner face of the right side plate 207 movable forwardly so that its slot edge 281 enters a groove 282 in the shaft 275 whereby to hold the shaft 275 inwardly and the swing arm 272 operatively connected to the shaft pivot arm pin 273 on the indicating mechanism unit 232. The bifurcated slide latch 280 in further supported on a pin support 283 on the inner face of the right side plate 207 that extends through an elongated slot 284 in the latch, FIG. 93. A pull handle 285 is provided on the rear end of the slide latch 280. Accordingly, before removing the indicating unit 232, the slide latch 280 is pulled rearwardly to release its slot edge 281 from the groove 282 in the shaft 275 and the swing arm 272 and the shaft 275 are slid outwardly off the pivot arm pin 273.

Thereafter, to lift the indicating unit 232 from the supporting frame 169, it is only necessary to snap rearwardly the hook ends of the upper hook latch levers 236 and 256, their torsion springs 239 and 259 being so shaped and connected to the lever pins 241 and 262 as to bear against them to hold the latch levers snapped in either their home or retracted positions. The lower latch levers 245 and 264, by grasping the hand knobs 252 and 270 with the opposite hands are pulled upwardly against the action of their springs 248 and 266 to lower their hook ends and to free the lower studs 244 and 263. At the same time, the indicating unit 232 is pivoted rearwardly on the upper studs 235 and 254 and then lifted free from their notches 234 and 255 and rearwardly out of the supporting frame 169. Thereafter, the indicating mechanism unit 232 can be returned to the supporting frame 169 by placing the upper studs 235 and 254 in the notches 234 and 255, lifting the lower hook levers 245 and 264 to receive the lower studs 244 and 263 and snap home the upper latch hook levers 236 and 256. After the indicating mechanism unit 232 has been installed with its studs in the supporting frame 169, the bifurcated swing arm 272 is placed over the pivot arm pin 273 of the indicating unit 232 and the slide latch 280 is pushed forwardly to insert the slide latch slot edge in the shaft groove 282 of the swing arm shaft 275. It can be seen that the operations for removing and replacing the indicating unit 232 from and within the supporting frame 169 can be done quickly and without tools.

B. Removal of Combined Rotary Transfer Release and Keys Lock Unit 286 (FIGS. 4, 4a, 25 to 32, 93, 94)

To remove other units from the interior of the supporting frame 169, it is well that all the transaction and value key units 216 to 221, inclusive, be first removed, and this is done by simply detaching their fastening screws 215 from the transverse supporting bars 209 and 210 and lifting the key units there off. A combined rotary transfer release and keys lock unit 286 that lies under the key units can now be easily removed from the front of the supporting frame 169 by simply releasing its latch parts and forwardly pulling it. This lock unit 286 has a right end plate 287 from which extend longitudinally-spaced front and rear round attaching studs 288 and 289. These studs 288 and 289 are grooved respectively at 290 and 291, FIG. 25, to be slidably received, one stud ahead of the other, in a long horizontally-extending slot 292 of a mounting bracket plate 293 and open at its forward end 294, FIGS. 93, 94, the rear stud 289 being slid to the closed end of the bracket slot 292 and the upper and lower side edges of the long slot 292 receiving the stud grooves 290 and 291. These grooves hold the lock unit 286 against lateral displacement when it is in place in the supporting frame 169. The mounting bracket plate 293 is rigidly supported on three pin projections extending inwardly from and fixed to the inner face of the right side frame plate 207, one at the rear end of the bracket at 295 and two other vertically-spaced pin projections 296 and 297 at the forward end of the bracket 293 and respectively lying above and below a flared open end 294 of the slot 292.

To hold the studs 288 and 289 and the combined rotary transfer release and keys lock unit 286 against forward displacement, there is provided a drop hook latch arm 298 having an upwardly and rearwardly inclined front edge 298' that is pivoted on a pivot pin 299 projecting outwardly to the right from the right side face of the mounting bracket plate 293 and normally held elevated against the underside of the plate bottom pin projection 297 by a torsion spring 300 mounted on the pivot pin 299 and reacting between a stop pin 301 on the hook latch arm 298 and the under edge of the mounting bracket plate 293 as indicated at 302. By pressing downwardly on the forward end of the hook latch arm 298 that normally extends vertically across the flared open end 294 of the slot 292, the studs 288 and 289 can slide outwardly from the horizontally-extending slot 292 in the mounting bracket plate 293.

Extending to the right inwardly from the left side frame plate 208 of the supporting frame 169, is a mounting bracket plate 303, FIGS. 4, 4a, 32, having a horizontally-extending slot 304 for receiving front and rear ungrooved stud pins 305 and 306 projecting from a left end plate 307 of the transfer release and keys lock unit 286, FIGS. 4, 31, 32 and 105. The stud pins 305 and 306 while extending through this slot 304 are without the retaining grooves of the studs 288 and 289 at the opposite side of the unit as the grooves in the one set of studs will suffice to hold the unit against lateral displacement on its stud pins and its parts will thereby be kept aligned with the cooperating parts of other units.

The slotted mounting bracket plate 303 is mounted on the inner face of the left side frame plate 208 by fixed pin projections extending inwardly therefrom, one pin projection 308 being at the closed end of the slot 304 and vertically-spaced pin projections 309 and 310 being respectively lying above and below the flared open forward end 311 of the horizontally-extending slot 304 in the mounting bracket plate 303.

A forwardly-extending hook latch arm 312 having an upwardly and rearwardly inclined front edge 312' is pivoted at its rear end on a pivot pin 313 on the left face of the slotted mounting bracket plate 303 and is urged upwardly by a torsion spring 314 mounted on this pivot pin 313 and reacting between a spring stop pin 315 on the latch arm 312 and the under edge of the slotted plate 303 at an anchor point 316. The latch arm 312 comes to rest upwardly against the bottom front pin projection 310 with its hook end lying in front of the front stud pin 305 on the left end plate of the unit 286 and almost in the flared open end 311 of the slot 304 until such time as it is depressed with the latch arm 298 at the right side of the unit to forwardly remove the unit 286 from the front of the supporting frame 169.

It can thus be seen that the combined rotary transfer release and keys lock unit 286 can thus be quickly removed from and inserted in the supporting frame 169 by simply depressing the inverted hook latch arms 298 and 312. Upon inserting the lock unit 286 the rear studs 289 and 306 at the respective right and left sides of the unit 286 will automatically depress the latch arms 298 and 312 by engagement with their respective upwardly and rearwardly inclined forward edges 298' and 312' and permit the studs to slide readily home in the long slots 292 and 304 of the respective mounting plates 293 and 303, the latch arms 298 and 306 elevating themselves when the right and left front studs 288 and 305 have moved rearwardly behind them.

C. Insertion and Removal of Totalizer Units (FIGS. 4, 37 to 41, 93, 95, 98 to 100)

In the bottom of the supporting frame 169 and extending between right and left side plates 207 and 208 thereof, are front and rear totalizer units 317 and 318 that are respectively slidable in pairs of opposing, right and left, front and rear, upwardly and rearwardly inclined guide plates 319, 320 and 321, 322 fixed to the inner faces of the respective right and left side plates 207 and 208. These guide plates 319, 320 and 321, 322 respectively have open ended guideways 323, 324 and 325, 326.

These front and rear totalizers units 317 and 318 respectively have right and left end plates 327, 328 and 329, 330 which when the totalizers are in place face respectively the respective right and left guide plates 319, 321 fixed to the right side frame plate 207 and 320, 322 fixed on the left side frame plate 208 and their respective open ended guideways. The right and left end plates 327 and 328 of the front totalizer 317 have respective upper and lower guide rollers 331, 332 and 333, 334 that respectively roll in guideways 323 and 324, FIGS. 37 to 41. The right and left end plates 329 and 330 of the rear totalizer unit 318 have respective upper and lower guide rollers 335, 336 and 337, 338 that respectively roll in the guideways 325 and 326.

Both totalizer units 317 and 318 are inserted from the bottom of the supporting frame 169 and are located in the arc of a circle struck about a center attaching pull rod 339 that detachably supports a rotary transfer mechanism unit 340 in the supporting frame 169 in a manner to be described in detail later on. While there are only two totalizer units shown, it will be apparent as the description proceeds that other totalizers could be disposed in the same arc about the transfer unit center pull pin 339, and by making slight changes in the construction of the machine. Spaced inwardly from the respective right and left end plates 327 and 328 of the front totalizer unit 317 are respective right and left inner plates 341 and 342 used for locking the totalizer in its elevated position in engagement with the rotary transfer unit 340 for a purpose and in a manner to be later described in detail.

These inner plates 341 and 342 are respectively supported on the respective end plates 327 and 328 by respective upper and lower spacing pins 343, 344 and 345, 346. The right and left lower spacing pins 344 and 346 respectively have rollers 347 and 348 thereon, FIGS. 38 and 39.

Spaced inwardly from the respective right and left end plates 329 and 330 of the rear totalizer unit 318 are respective right and left inner plates 349 and 350. These inner plates 349 and 350 are respectively supported on the respective end plates 329 and 330 by respective upper and lower spacing pins 351, 352 and 353, 354. The right and left lower spacing pins 352 and 354 respectively have rollers 355 and 356 thereon.

The front and rear totalizer units 317 and 318 are respectively inserted in the respective guideways 323, 324 and 325, 326 with the right hand while with the left hand on a hand knob pivoting downwardly respective front and rear spring-biased feeding and retaining devices indicated generally at 357 and 358 and aligning their respective guide rollers of the units with the open lower ends of their respective guideways and pushing the totalizer unit upwardly home with the right hand, FIGS. 37 to 40.

These respective front and rear spring-biased feeding and retaining devices 357 and 358 have respectively pivot shafts 359 and 360 that have their respective right and left ends reduced in diameter and journalled in the side plates 207 and 208, the shoulders provided by the reduced ends serving to retain the shafts against axial displacement in the side plates 207 and 208. Spaced totalizer roller engaging feed plates 361, 362 and 363, 364 are fixed to the respective shafts 359 and 360 adjacent to their respective ends and respectively receive right and left lower spacing pin rollers 347, 348 and 355, 356 in their respective open notch or bifurcated arms 365, 366 and 367, 368, FIGS. 38 and 39, which are pivoted downwardly to free the guideways for insertion of the totalizer units but upon being pivoted upwardly by their springs retain and feed the totalizers in their guideways. Tension feed springs 369, 370 and 371, 372 are respectively connected to outwardly-extending pins 373, 374, and 375, 376 on the respective feed plates 361, 362 and 363, 364 of the feed devices 357 and 358. These tension springs are respectively anchored to inwardly-extending pins 377, 378 and 379, 380 fixed to the frame side plates 207 and 208. By these tension springs and the feed plates with the bifurcated arms of which the totalizers are connected, the totalizers 317 and 318 are supported and biased upwardly toward engagement with the rotary transfer unit 340, the upward turning movement of the feed devices being limited by engagement of their respective outwardly-extending stop projections 381, 382 and 383, 384 with the lower ends of the respective guide plates 319, 320 and 321, 322, on the frame side plates 207 and 208. The left feed plates 362 and 364 of the feed devices 357 and 358 have respectively finger knobs 385 and 386 by which the respective feed devices are pivoted downwardly with the left hand for the removal of the totalizers by the right hand from the supporting frame 169.

To return the totalizer units to the supporting frame 169, the same knobs 385 and 386 of the feed devices 357 and 358 are depressed to clear the feed plate bifurcated feed arms from the guideways 323, 324 and 325, 326. The totalizer end rollers are simply aligned with the lower ends of the guideways and the totalizer is pushed upwardly home therebetween. These operations of removing and returning or replacing the totalizer with another in better repair is done quickly and with little effort.

D. Removal of the Rotary Transfer Unit Arms Operating Device 387 (FIGS. 4, 42, 43, 44, 71, 85 and 93)

Having now removed the indicating mechanism unit 232 from the rear of the supporting frame 169, the key units 216 to 221, the combined rotary transfer release and keys lock unit 286 from the front thereof and the totalizer units 317 and 318 from beneath the supporting frame, the rotary transfer mechanism unit 340, the heart of the machine, now may be removed easily from the rear of the supporting frame. Before removing the rotary transfer mechanism unit 340 from the supporting frame 169, an independently-mounted, transfer unit, vertically-swingable latch, arms operating device 387 used with the transfer unit must be first removed from the rear of the supporting frame 169 and detached from eight vertically-swingable bifurcated latch arms 388, 389, 390, 391, 392, 393, 394 and 395 pivoted on the rotary transfer unit 340, FIG. 42. This swingable lock arms operating device 387 includes a long pivot rod 397 having its left end journalled in a bushing 398 near the rear edge of the left side frame plate 208. Extending forwardly from the pivot rod 397 and fixed thereto are spaced right and left parallel arms 399 and 400 that fixedly carry a transversely-extending rod 401 at their outer ends which runs through all of the above vertically-swingable bifurcated arms extending from the rear of the rotary transfer unit 340, FIG. 42. The right side frame plate 207 has a narrow entrance notch 402 in its rear edge that receives the opposite end of the pivot rod 396 that extends through and outwardly from the side plate 207. On the outer end of the pivot rod 397 is a long bushing 403 that has a reduced diameter inner end projection 404 that is axially fitted into the large inner part of the narrow entrance notch 402 of the plate 207, and the rod 397 being assembled first with its left end started in the bushing 398 on the left side frame plate 208 and then the right end passed sideways through the narrow entrance of the notch 402 and then the rod slid home to the left to locate the reduced end projection 404 of the bushing 403 in the large inner part of the notch 402. The outer end of the bushing 403 has a short bifurcated work pivot arm 405 and bushing itself is fixed to the end of rod by set screws 406. In order to hold the pivot rod 397 and the arms operating device 387 against removal to the right of the reduced diameter end projection 404 of its bushing 403 and the operating device 387 from the supporting frame 169, a slidable retaining sleeve 407 is provided on the right end of the pivot rod 397 that can be slid into a position against the bushing reduced diameter projection 404 and the inner face of the right side frame plate 207 and made secure on the rod by a finger turned set screw 408. Thus, to remove the vertically-swingable arm operating device 387, the set screw 408 or the slidable sleeve 407 is loosened, the sleeve 407 is slid inwardly away from the bushing reduced diameter projecting 404 and the frame plate 207. The device 387 is moved axially to the right so that the bushing reduced diameter projection 404 is moved axially out of the large diameter part of the narrow entrance notch 402 and the pivot rod pulled from the bushing 398. Then the operating device 387 simply taken rearwardly from the narrow entrance notch 402 of the right side plate 207 and from the supporting frame 169.

E. Removal of the Rotary Transfer Mechanism Unit 340 (FIGS. 42, 52, 91 and 96)

The manner in which the rotary transfer unit 340 is removed from the supporting frame 169 will now be described. This transfer unit when released is lifted from the rear of the supporting frame 169.

At first, a hand turned bushing support screw 409, that is journalled in the left side frame plate 208 and threaded into the left end of a rocker shaft 410 journalled in a bushing support 411 on the left end of the transfer unit 340, is unscrewed and removed clear of the shaft 410 and of the supporting frame 169. This leaves the transfer unit 340 supported on the attaching pull rod 339 that is next removed and a further connection of the right side of the supporting frame. The attaching pull rod 339 may be removed from either side of the supporting frame 169 but it is preferable that it be removed from the left side thereof. To do this a hand turned bushing nut 412 is removed from a right threaded end 413 of the rod 339. The rod 339 is then pulled by its left hand turned bushing nut 414 on a threaded end 415 of the rod outwardly from the left side of the frame and clear of the left side plate 208 with one hand while supporting the unit from underneath with the other hand preferably while facing the rear of the supporting frame. The rotary transfer unit 340, however, before being dropped downwardly must be moved slightly toward the left side plate 208 to free its rocker driven arm 416 from a removable drive clutch rocker 417 that is journalled in and is powered from mechanism on the right side frame plate 207 of the frame 169 in a manner to be described and through which the drive power for the transfer unit 340 is furnished. By moving the transfer unit 340 to the left disengagement of rocker pins 418 and 419 is made from the corresponding pin receiving holes 420 and 421 in the rocker arm 416 and at the same time a rod extension 422 on the right end of the transfer unit is detached from a slotted stud 423 projecting inwardly from the right side frame plate 207.

The right hand bushing nut 412 threaded upon the right end 143 of the attaching rod 339 extends into a bushing 424 carried on a cam cover plate 425, FIGS. 42 and 91, until it comes into engagement with an outer end of a sleeve support 426 that projects outwardly from the right side frame plate 207. The sleeve support 426 has an integral circular flange portion 427 which is riveted by rivets 427' to the inner face of the right side plate 207 to hold the sleeve support against displacement with respect thereto. Extending inwardly from the circular flange portion 427 is a heavy bushing portion 428 for supporting a cluster of totalizer operating plates indicated generally at 429. The end of the bushing portion 428 is threaded to accommodate a retaining nut 430 that holds the parts against axial displacement therefrom.

On assembling the transfer unit 340 into the supporting frame, the rod bushing nuts 412 and 414 are tightened on the rod 339 until the transfer unit 340 drawn to the right abuts the outer end of the sleeve support bushing portion 428 at the right side of the supporting frame 169.

Thus the attaching rod 339 is slidable through a central mounting sleeve bushing 431 that has a central hole 432 extending fully therethrough for receiving the pull rod 339 and when the right and left hand nuts 412 and 414 are fully tightened so that the right hand nut 412 engages the end of the sleeve support 426 and the left hand nut 414 engages the left end of the mounting sleeve bushing 431, the right end of the central mounting sleeve bushing 431 is thus brought to bear against the inner end of the bushing portion 428 that is fixed to the right side frame plate 207, FIG. 52. Thus, the transfer unit 340 is held in alignment with the other parts of the machine and against lateral displacement to the left as well as against downward displacement by the attaching pull rod 339 that anchors the unit to the sleeve support 426, the left hand turned bushing nut 414 being only journalled and slidable in a hole 433 in the left side plate 208. It should thus now be apparent that to lift out the rotary transfer unit 340 from the supporting frame 169, only the left hand screw 409 and right hand turned bushing nut 412 from the pull rod 339 are removed. Then it is only necessary to grasp the left hand turned bushing nut 414, pull the attaching rod 339 out of the supporting frame 169 while holding the transfer unit in the other hand and when the unit is free, moving slightly to the left within the supporting frame to free the rocker arm 416 from the rocker pins 418 and 419 and the right end rod extension 422 from the slotted stud 423 and lift the transfer unit 340 from the rear of the supporting frame 169.

*F. Removal of Selector Stop Assembly and Slide Stop Bar Units 434 and 440 (FIGS. 13, 14, 17, 18, 19, 20, 21)*

A selector stop assembly 434, that has engagement with and is operated by the transaction key unit 216, can be readily removed from the inside of the supporting frame 169 by simply removing front and rear fastening screws 434' and 435 from the respective front and rear slide stop bar hexagonal screw pin supports 436 and 437 respectively threaded into the inner face of the right side frame plate 207, FIGS. 13, 14 and 20.

The slide stop bar supporting screw pin supports 436 and 437 are respectively threaded and shouldered by reduced diameter threaded portions 438 and 439 by which they are connected to the right side frame plate 207, FIG. 20. After the selector stop assembly 434 is removed, and if desired to remove a slide stop bar 440 the hexagonal supporting screw pins 436 and 437 are removed from the side plate 207, FIGS. 19 and 20. These screw pins 436 and 437 respectively carry rollers 441 and 442 on which the slide stop bar 440 rolls. The slide stop bar 440 can be finally detached from the side frame plate 207 by removing an end of a tension spring 443 from a pin projection 444 on the inner face of the right side plate 207 and that is carried on a spacer pin 445 of the slide stop bar 440.

*G. Removal of Totalizer Operating Plates 429 (FIGS. 93 to 100)*

On the inner face of the right side frame plate 207 and upon the sleeve support bushing portion 428 of the sleeve support 426 and against the circular flange portion 427 thereof is assembled the cluster 429 of three independently-rotatable totalizer operating plates 446, 447 and 448 that are held on the bushing portion 428 by a large retaining nut 430, FIGS. 42 and 96. These operating plates 446, 447 and 448 respectively have mounting hub bushings 450, 451 and 452 that are fixed by the nut 430 to the bushing portion 428, and against the circular flange portion 427 thereof. These operating plates are rotatable upon their bushings. Thus, by simply removing the retaining nut 430 the full cluster of operating plates can be removed together. These operating plates are returned to the bushing portion 428 in an equally simple manner and secured thereto by the retaining nut 430.

*H. Removal of Electric Drive Motor Unit 453 (FIGS. 2, 82, 84 and 93)*

At the front of the supporting frame 169 is an electric drive motor unit 453 that has a motor base plate 454 attached to a motor housing 455, and a motor drive pinion 456 that meshes with an input gear 457 of a combined driving gear and switch control unit 458, FIGS. 82, 83, 84. A motor top plate 459 is secured to the top of the motor housing 455, FIG. 85, and on the front of this motor top plate 459 is hinge sleeve portion 460 that pivots on a detachable motor supporting rod 461. This motor supporting rod extends between supporting frame side plates 207 and 208 and is fixedly secured thereto by a hand fastening screw 462 that is tightened through the right side frame plate 207 and into the right end of the rod, FIG. 82, and by a hand fastening screw 463, FIG. 4, for similarly securing the rod 461 to the left side frame plate 208. This motor supporting rod 462 serves as a hinge pin on which the motor housing 455 can hinge downwardly and forwardly away from the driving gear and switch control unit 458 or toward the same to connect the motor drive pinion 456 with the input gear 457 of the driving gear and switch control unit 458.

The motor base plate 454 has fixed to its rear edge a transversely-extending threaded sleeve 464, FIGS. 82 and 93, into which a vertically-adjustable hand screw 465 is threaded from through the right side frame plate 207 to support the electric motor drive unit 453 at the rear thereof against downward and outward pivotal displacement upon the hinge pin motor supporting rod 461. For the purpose of adjusting the motor drive pinion 456 relative to the input gear 457 of the driving gear and switch control unit 458, the hand turned screw 465 is carried on a vertically-adjustable hand screw support pivot arm 466 having a bushing 467 through which the screw extends and this bushing 467, inwardly through an enlarged opening 468 in the frame right side plate 207. The hand screw support pivot arm 466 is pivoted on the right side frame plate 207 upon a screw pivot pin 469 threaded thereinto and is adjusted while carrying the hand screw 465 about the pivot pin 469 by eccentric nut means 470 that works in an elongated slot 471 in the opposite end of the hand screw support pivot arm 466, FIG. 82. By this eccentric nut means 470, the electric motor drive unit 453 can be adjusted to place the motor pinion 456 into proper meshing engagement with the input drive gear 457 of the drive gear switch control unit 458. The eccentric nut means 470 is pivoted on a screw pivot pin 472 on the side plate 207 that is tightened to retain the eccentric nut and the pivot arm 466 in their new positions when the adjustment has been made.

When it is desired to swing the electric motor unit outwardly the hand turned screw 465 is removed from the threaded sleeve 464 on the base of the motor unit and the unit is pivoted downwardly. Then if it is desired to remove the entire motor unit from the supporting frame 169, the right and left hand fastening screws 462 and 463 securing the ends of the motor supporting rod 461 to the right and left side frame plates 207 and 208 are removed and the entire unit including the rod is removed from the supporting frame 169. To reinstall the motor unit, the motor supporting rod 461 is fastened in the frame 169 with the hand fastening screws 462 and 463 and pivoted upwardly into place and secured there by the vertically-adjustable hand fastening screw 465.

The electric motor drive unit 453 will have the usual controls associated with it that may be mounted upon an inward extension 473 of its base plate 454 for controlling its operation. Any standard make motor operable preferably upon alternating current and with appropriate controls and that always starts and turns the motor in the same direction, and with appropriate supply wiring, not shown except for the connections of the switch control unit 458, may be used for the connection of this motor to a supply current source. The removal of all of the internal units and assemblies has now been set forth. Emphasis will now be placed upon the removal of the external units and assemblies that can be also made with the same rapidity and ease.

*I. Removal of Motor Drive Gear and Motor Switch Control Unit 458 (FIGS. 82 to 85, 87, 89, 90)*

The motor drive gear and switch control unit 458 is mounted on the outer face of the right side plate 207 by means of three long mounting pins 474 that are small in diameter, threaded on their outer ends and extend outwardly from respective spacing studs 475 and which are, in turn, fixed to the outer face of the rightside plate 207, FIG. 85, spaced apart from one another. The combined motor drive gear and switch control unit 458 has correspondingly spaced small holes for receiving the threaded long pins and the unit 458 is held upon these pins by hand fastening nuts 476, tightened against the outer side of the unit. This drive and switch control unit 458 in addition to the input gear 457 has an output pinion gear 477, FIGS. 82, 83, that meshes with a large drive gear 194 of a first cam group 479. Simply by removing the hand nuts 476 from the mounting pins 474, the drive and control unit 458 may be readily removed from the supporting frame side plate 207. A detailed description of the construction of the motor drive and switch control unit 458 will be made later on.

*J. Removal of Cover Plate 425, Rocker 417, Cam Group Assemblies 479, 480, 481, Operating Levers 510, 511, 512, Cam Followers etc. (FIGS. 2, 82, 85, 88 to 93)*

In addition to the first cam group 479, there are second and third cam groups 480 and 481 that are mounted upon the right side frame plate 207 behind the cams cover plate 425, FIG. 82. In order to provide access to these cam groups, the cam cover plate 425 must be first removed. The hand turned bushing nut 412 on the attaching pull rod 339 that supports the rotary transfer unit 34 lying outside of the cam cover plate 425 will have been disconnected with removal of the transfer unit. This bushing nut 412 is merely tightened upon the pull rod 339 through the cover plate bushing 424 that supports the outer end of the sleeve support 426 and against the end thereof and really has little part in retaining the cover plate fixed to the supporting frame 169. But, nevertheless, because of the large knob portion of the hand nut 412, it must be removed to free the cover plate 425. Also there must be removed a small hand nut 482 that holds starting links 483 and 484 on a pin 485 extending from a combined cycle stop latch and cammed lever 486 through and operable in an elongated slot 487 in the cam cover plate 425 and that has little part in holding the cam cover plate 425 fixed to the supporting frame 169. The purpose of these parts will be described later on since the only concern now is to show how the cover plate 425 and, the cam groups 479, 480 and 481 are removed.

Projecting outwardly from the right hand plate 207 are three longitudinally-spaced supporting posts 488, 489 and 490, the posts 488 and 489 serving respectively to support the respective first and third cam group assemblies 479 and 481 and respectively having reduced diameter threaded outer ends 491 and 492, FIGS. 90, 91, 92, the post 490 has a smooth reduced diameter pivot portion 493 for pivotally supporting the cycle stop latch and cammed lever 486 and having further a reduced diameter threaded end 494, FIG. 82. The cam cover plate 425 has bushings 495 and 496 projecting from the inner face thereof through which the respective threaded ends 491 and 492 extend while the end faces of the bushings 495 and 479 respectively bear against the cam group assemblies 479 and 481 to hold them against axial movement on their respective supporting posts 488 and 489 while being rotated thereon. The reduced diameter threaded end 494 of supporting post 490 extends merely through a hole in the cover plate 425 below the bushings 495 and 496. The cam cover plate 425 is made secure upon the three supporting posts 488, 489 and 490 by respective hand turned nuts 498, 499 and 500 fixed to their respective threaded ends 491, 492 and 494.

At the rear upper end of the cam cover plate 425 there extends inwardly a bushing 501 that pivotally supports a journal extension 502 of the removable drive clutch rocker 417, FIGS. 82, 85. The rocker 417 has a circular boss portion 502' that is journalled in a corresponding hole in the right side frame plate 207 to further support the rocker 417, FIG. 93. Thus, by merely removing the cam cover plate 425 access is immediately had to the drive clutch rocker 417 to remove it from the supporting frame 169.

Extending rigidly outwardly from the right side plate 207 intermediate the first and second cam group assemblies 479 and 480, is a cam follower and intermediate pinion gear supporting post 503 on the outer end of which is journalled an intermediate pinion gear 504 that has a bifurcated shank extension 505 that extends outwardly through a large hole 506 in the forward part of the cam cover plate 425 with a spacing washer 507 thereon bearing against the inner face of the cover plate, FIGS. 82, 85 and 89. This pinion gear 504 drivingly connects the drive gear 194 of the first cam group 479 with a drive gear 508 of the second cam group assembly 480 and this drive gear 508 in turn is drivingly connected with a drive gear 509 of the third cam group assembly 481. With the hand nuts 498, 499 and 500 removed from the outer threaded ends of supporting posts 488, 489 and 490 the cam cover plate 425 can thus be quickly removed and immediate access and removal head of the drive clutch rocker 417, the intermediate pinion gear 504, the cycle stop latch and cammed lever 486, and the cam group assemblies 479, 480 and 481. By slight manipulation of certain of the cam followers, to be later named, the cam group assemblies can be readily picked off their respective supporting posts, and the few remaining parts left on the outer side of the right side plate are readily made accessible so that they may also be removed and replaced. Thus, quick access has also been had to these remaining parts including cam followers, operating levers and so forth. A general main starting lever 510, a repeat lever 511 and an eraser lever 512 bearing respectively the buttons "M," "R," and "X" are readily removed from their respective support pins 513, 514, and 515 that extend outwardly from the right side plate 207, by simply removing their respective cotter pins 516, 517 and 518 thereon, FIG. 82. With the above part removed the various cam followers links and levers can then be easily detached by releasing their set screw collars serving to fix them in place upon the various pivot shafts and supports.

There has now been described the quick detachable features of this machine giving in detail the manner in which the various units, assemblages and parts are supported on the supporting frame 169 and how they can be quickly detached therefrom. A detailed description of the construction and operation of the various units and parts, their connections with one another, their internal parts, the manner in which the units themselves are disassembled once taken from the supporting frame will now be made. Thereafter, the general operation of the machine will be made.

III. DETAIL CONSTRUCTION AND OPERATION OF THE VARIOUS UNITS, ASSEMBLAGES AND PARTS

A. Transaction Key Unit 216 (FIGS. 5 to 12)

First, a description of the construction of the transaction key unit 216 will be made. As has been stated, this key unit 216 is removed from the supporting frame 169 by removing fastening screws 215 from the front and rear transversely-extending spacing bars 209 and 210.

The transaction key unit 216 has a slotted tubular base 519, made of parts braised together, to which there is rigidly secured intermediate upstanding supporting members 520 and 521 for supporting a slotted top plate 522 intermediate its length thereof. At the ends the tubular base 519 and supporting the top plate 522, there are end bracket supports 523 and 524 extending upwardly from tubular base 519 and secured respectively to the ends of the top plate 522 by rivets 525. The fastening screws 205 for securing the key unit 216 to the transversely-extending spacing bars extend through the top plate 522 and end members 523 and 524 and is firmly retained upon spacing bars.

The top plate 522 has a series of transverse slots running therealong and upwardly through which respectively key plates 526, 527, 528, 529, 530, 531 and 532 which respectively have their upper ends key buttons "A", "B", "C", "D", "E", "F" and "G" by which the key plates are depressed.

"A"—Adding Machine Total Button
"B"—Adding Machine Sub-Total Button
"C"—Grand Total Cash Register Button
"D"—One Item Cash Register Button
"E"—Total Items Cash Register Button
"F"—Sub-Total Items Cash Register Button
"G"—Received on Account Cash Register Button Each key plate has a side bracket projection 533 fixed thereto for receiving the upper end of a compression lift spring 534 that bears against a depression in the top surface of the tubular base 519 and that extends upwardly under the bracket projection 533. The compression lift spring 534 returns the key plate when it has been released from either a depressed or latched down position. The bracket projection 533 has an upper edge 533' that engages the underside of the top plate 522 to limit the upward movement of the key plate against the action of its compression lift spring 534, FIGS. 5, 7. All of the key plates are generally shaped the same and are provided with a bifurcated lower end with one guide leg 535, the latter having the same width for all the key plates, while the other key leg is of four different widths, the large width leg being as shown in FIG. 7 at 536, a next smaller width leg 537, a still next smaller width leg 538, and finally a smallest width leg 539 as shown in FIG. 8. The key plates 526 ("A") and 530 ("E") have the large width legs 536 shown in FIGS. 7 and 10, but the key plates are reversed to have large width legs extend respectively from opposite sides. The key plate 529 ("B") has the next smaller width leg 537. The key plates 528 ("C") and 532 ("G") have the still next smaller width legs 538, while the key plates 527 ("B") and 531 ("F") have the smallest width legs 539. The key plates 528 and 532 are however in reverse positions and so also are key plates 527 and 531 in reverse positions. The upper end of each key plate has a reduced width end 540 to which lettered key buttons are attached.

The tubular base 519 has a longitudinally-extending guideway 541 running through the bottom thereof in which a long rack bar 542 slides and from which some fourteen teeth 543 of the rack bar depend. The rack bar is supported in the guideway by two series of four stop pins varying in length rearwardly from long to short, one series extending from the left side of the rack bar 542 as indicated at 544, 545, 546 and 547 and the other series of stop pins rearwardly from long to short extending from the right side as indiacted at 548, 549, 550 and 551. A second long right side stop pin 552 extends to the right from the forward end of the rack bar. In order to hold down the rack bar 542 through the guideway 541 and against being elevated into the tubular base 519 there is provided a series of longitudinally-spaced hold down projections 553 from under the top of the base 519, FIG. 11. The rack bar 542 is thus longitudinally-adjustable through the open ends of the tubular base 519 and has its rack teeth 543 extending downwardly therefrom. These rack teeth 543 as shown in FIG. 5 engage with a gear wheel plate assembly 554 forming a part of the rotary transfer unit 340, the purpose of which will become apparent from the description of the transfer unit and of the general operation of the machine. The rack bar 542 forward long right side pin 522 strikes an inwardly bent stop 555 at the forward end of the base 519 to limit the forward sliding movement of the rack bar and against which the rack bar comes home at the end of a cycle of operation.

If the "A" key button and its key plate 526 are depressed the large width leg 536 is put in the way of the long right side forward pin 552 that will engage the large width leg 536 as the rack bar is pulled rearwardly by the transfer unit gear assembly 554 to the first operating position permitting the movement of the transfer unit gear wheel 554 to its minimum rotation amount. The large width leg 536 is used here because the long pin 552 must be long enough to engage the inwardly bent stop 555 on its return movement to its neutral position. If the "B" key button and its key plate 527 are depressed the left side long pin 544 will engage the smallest width leg 539 of the key plate 527, the smaller pins 545, 546 and 547 sliding thereby. If the "C" button and its plate 528 are depressed the next shorter pin 545 will engage the still next smaller width leg 538 of the plate 528. If the "D" button and its plate 529 are depressed, the still next shorter pin 546 will engage the next smaller width leg 537 of the key plate 529. If the "E" button and its plate 530 are depressed, the shortest pin 547 will engage the reversed large width leg 536 of the key plate 530 at the left side of rack bar 542. If the "F" button and its key plate 531 are depressed the long pin 548 on the right and opposite side of the rack bar 542 will engage the smallest width leg 539 of the key plate 531. If the last or "G" button and its key plate 532 are depressed the next shorter pin 549 will engage the still next smaller width leg 538 of the key plate 532.

The transaction key unit 216 has been left free of two key plates at the rear end thereof since there are not extra totalizers to have use for the same. Thus, the stop pins 550 and 551 on the right side of the rack bar 542 will not be needed.

At the left side of the transaction key unit 216, is a push slide 556 and at the right side is a releasable key lock slide plate 557. The push slide plate 556 has a series of slots 558, 559, 560, 561, 562, 563, 564, 565 and 566, the last two slots not now being put to use, that extend upwardly from the lower edge thereof and spaced apart to respectively receive the left side of the bifurcated portions of the respective key plates 526, 527, 528, 529, 530, 531 and 532. The rear edges of the slots 558, 559, 560, 562 and 563 have respectively downwardly and forwardly inclined slide key pushed projections 567, 568, 569, 570 and 571 while the slots 561, 564, 565 and 566 are free of the inclined slide pushed projections for reasons that will become apparent later on in the description. These inclined slide key pushed projections are engaged by the under inside edges 572 of the bifurcated leg portions of the respective key plates, FIG. 8. This push slide plate 556 has small assemblying slots 573 and 574 at the respective opposite ends of the plate and in the under edge thereof to accommodate respectively upwardly extending bendable projections 575 and 576 on the ends of the tubular base 519 while locating the upper edge of the push plate 519 in under guide slots 577 and 578 on the respective forward and rear end brackets 523 and 524, FIG. 11. When the lower edge of the push plate 519 has cleared the base upstanding projections 575 and 576, they are bent inwardly to place them out of true alignment with the respective slots 573 and 574 to thereby retain the push plate upon the base and against outward displacement therefrom until the upstanding projections are straightened at a later time to remove the push plate.

A tension spring 579 is anchored to the end bracket 523 and connected to a pin 580 on the left outer side of the push plate 556 and tends to always pull the push plate 556 forwardly and against the rear faces of the key plates. The forward end of the push slide plate 556 has at its very end and extending from its right face, a pin projection 581 that is received in a bifurcated swing arm 582. As the key plate is depressed and pushes the slide plate 556 rearwardly, the pivot arm 582 will be pivoted rearwardly and upon release of the push plate, the pivot arm is swung forwardly by the spring return of the push plate. The purpose of the operation will be set forth later on.

At the left side of the push slide plate 556, rearwardly of the pin 581, is an outwardly extending pin 583 that engages the upstanding forward end 584' of a bifurcated rock lever 584 on the rotary transfer release and keys lock unit 286 through which the transfer unit gear wheel assembly 554 is released in a manner and for a purpose to be later described. The pin 583 allows the rock lever to be pivoted forwardly when the push slide plate is released. As long as a key plate is kept depressed the slide plate 556 cannot be returned to its neutral position, since the key plates will have been locked down by the releasable lock slide plate 551 at the right side of the transaction key unit 216.

The lock slide plate 557 at the right side of the unit is similarly retained at its upper edge in slots 585 and 586 of the respective forward and rear end brackets 523 and 524, FIG. 5. This lock slide plate 557 has under edge forward and rear slots 587 and 588 through which upstanding bendable projections 589 and 590 are received to locate the lower edge of the lock slide plate 557 within the unit assembly. Thereafter, the upstanding projections 589 and 590 are bent to disalign them with the under edge slots and prevent the slide plate from being displaced therefrom. A tension spring 591 is anchored to the forward end bracket 523 and connected to a pin projection 592 extending outwardly from the lock slide plate 557 and pulls the lock slide plate 557 forwardly at all times.

The lock slide plate 557 has a series of slots 593, 594, 595, 596, 597, 598, 599, 600 and 601 extending upwardly from the lower edge of the slide plate, the slots 600 and 601, not now being put to use, and longitudinally-spaced apart to receive right sides of the bifurcated portions of the respective key plates 526, 527, 528, 529, 530, 531 and 532 and extending forwardly respectively from the rear edges of the slots are inclined lock projections 602, 603, 604, 605, 606, 607 and 608 differing from the inclined projections of the push plate slots by the provision of a short shoulder 609 at the top thereof and a long lower shoulder 610 at the bottom thereof with which the under edge 572 and a top edge 611 of the bifurcated key plates respectively engage when in the respective raised and depressed positions, FIGS. 5 and 8. This lock plate 557 by these projections thus serve to lock the individual keys in their depressed positions by the long lower shoulder 610 of the projections riding over the top edge 611 of the key plates and the undepressed keys by the engagement of the under edge 572 of the key plate with the top short shoulder 609, FIG. 5.

The lock slide plate 557 is normally held in its neutral position against the action of the tension spring 591 by its hook projection 612 at the rear end of the lock plate and a cam operated general release bar device 613 having its transversely-extending rod 614 lying in a lost-motion recess 615 provided by the hook projection 612, FIGS. 102, 103 and 104. At this time, the lock slide plate is kept by the release bar 613 so that inclined edges 616 of the respective inclined projections of the slots are vertically-aligned with the key plate under edges 572 removed from the short top shoulder 609 and upon the key plate being depressed the top edge 611 of the key plate will partly lock under the long lower shoulder 610 of the inclined projection. Also, at this time and before the machine has been started and another key plate may be depressed as it still would have remained vertically-aligned with its inclined edge 616 and upon being depressed automatically the already depressed key plate is released and the other key plate is locked under its long shoulder 610 of its inclined slot projection. This may be done so on until the most desired key plate is down and until the machine has been started. When the starting button "M" is depressed and the machine is started and immediately the cam and follower linkage, to be later identified, will operate the release bar device 613 to force its bar 614 against the forward end of the hook projection recess 615 so as to push the lock plate 557 forwardly home to register the long projection shoulder 610 fully over the edge 611 of the key plate and the top projection shoulders 609 of the lock plate projections fully under the under edges 572 of the other key plates and the key plates so held as shown in FIG. 103 and until near the end of the cycle of operation of the machine. Before the cycle has been completed the release bar device 613 with its transverse rod 614 pulls the lock plate 557 rearwardly and the key plates are released, FIG. 104 and against action of the spring 591 and the movement of the rod 614 to the neutral position, the slide plate is returned to neutral position in FIG. 102.

B. Value Key Units 217, 218, 219, 220 and 221
(FIGS. 1, 8, 22, 23, and 24)

A description now will be made of value key units 217, 218, 219, 220 and 221. Each value key unit is constructed and operates similarly to the transaction key unit 216. It differs only in that it has nine key buttons, instead of six as indicated by their numbers "1," "2," "3," "4," "5," "6," "7" and "8" and in that its push slide plate has all of its respective slots provided with respective inclined side projections acted upon respectively by under edges 572 of respective bifurcated key plates 636, 637, 638, 639, 640, 641, 642, 643 and 644 of the unit, FIG. 24, to move the push plate rearwardly as the key plates are depressed. One further difference is that the push slide plate has only one pin projection 645 at its forward end and that extends to the left thereof and is without the forward extension that the push plate 556 of the transaction key unit 216 has. As has been stated, this key unit is removed from the supporting frame 169 by removing fastening screws 215 from the front and rear transversely-extending spacing bars 209 and 210. There are five such value key units and are identical in construction.

Each value key unit has a slotted tubular base 646 made of parts braised together to which there is rigidly secured upstanding supporting members 647 and 648 that support a slotted top plate 649 intermediate its length thereof. At the ends the tubular base 519 and supporting the top plate 649, are end bracket supports 650 and 651 extending upwardly from the tubular base 519 and respectively secured to the front and rear ends of the top plate 649 by spot welding and through which with the top plate 649 the fastening screws 215 extend to secure the value key unit to the spacing bars 209 and 210.

The top plate 649 has a series of transversely-extending slots 652 running therealong and through which the respective key plates are respectively slidable. Each key plate has a side bracket projection 653 fixed thereto for retaining the upper end of a compression lift spring 654 supported in a depression 655 in the top surface of the tubular base 646. The compression lift spring 654 returns the key plate when it has been released from its depressed or latched down position. The bracket projection 653 has a bent up stop edge 656 that engages the underface of the top plate 649 to limit the upward movement of the key plate. The key plates differ in shape from one another like the transaction key unit key plates by their bifurcated lower ends that have a common width leg 535 but different width legs 536, 537, 538 and 539 the same as shown in FIGS. 7 and 8. The key plates 636, 640 and 644 have the large width legs 536, the key plate 640 being in a reverse position from the key plates 636 and 644, FIG. 23. The key plates 639 and 643 having the next smaller width legs 537 but used in reverse from one another. The key plates 638 and 642 having the still next smaller width legs 538 but used in reverse from one another. The key plates 637 and 641 have the smallest width legs 539 and that are also used in reverse from one another.

The tubular base 646 has a longitudinally-extending guideway 657 running through the bottom thereof in which a long rack bar 658 slides with some fourteen teeth 659 depending therefrom, FIGS. 23 and 24. It is supported by two series of four different length stop pins, one series of four stop pins 660, 661, 662 and 663 varying in length from long to short and extending from the left side of the rack bar 658, and the other series of four stop pins 664, 665, 666 and 667, from long to short, rearwardly of the one series of stop pins and a forward long pin 668, all extending from the right side of the rack bar. A series of spaced hold down projections 669 are provided within the base to keep this rack bar 658 from being elevated in the base while being slid through the guideway 657, FIG. 22. The rack teeth 659 engage a gear wheel assembly on the rotary transfer unit 340 and the rack will be moved rearwardly by the same a distance depending on the button that is depressed. The long forward pin 668 engages an inwardly bent stop 670 on the forward end of the base 646 to limit the forward sliding return movement of the rack bar, 658. Some movement is allowed without any key being depressed if a "zero" indication is needed as will be made more apparent later on.

If the No. "1" button and its key plate 636 are depressed, the large width leg 536 is put in the way of the long right side forward pin 668 and the rack bar is moved to the gear wheel assembly of the transfer unit to give a "1" indication. If the No. "2" button is depressed, the left side long pin 660 of the rack bar engages the smallest width leg 539 of key plate 637. If the No. "3" button is depressed the next smaller left side pin 661 will engage the still next smaller width leg 538 of key plate 638. If the No. "4" button is depressed, the still next shorter left side pin 662 will engage the next smaller width leg 537 of key plate 639. If the No. "5" button is depressed, the shortest left side pin 663 will engage the large width leg 536 of key plate 640. If the No. "6" button is depressed, the long right and opposite side stop pin 664 will engage the smallest width leg 539 of key plate 641. If the No. "7" button is depressed, the next shorter right side pin 665 will engage the still next smaller width leg 538 of key plate 642. If the No. "8" button is depressed, the still next shorter right side pin 666 will engage the next small width leg 537 of the key plate 644. If the No. "9" button is depressed, the shortest pin 667 will engage the large width leg 536 of key plate 644. As the higher numbered buttons are depressed the greater will be the rearward movement of the rack bar 658 and rotation of the gear wheel assembly of the rotary transfer unit 340.

At the left side of each value key unit, is a push slide plate 671 while at the right side of the unit is a releasable lock slide plate 672 that locks the key plates as the machine is started. The push slide plate 671 has a series of vertically-extending slots 673, 674, 675, 676, 677, 678, 679, 680 and 681 that are spaced apart to receive the left side of the bifurcated portions of the respective key plates 636, 637, 638, 639, 640, 641, 642, 643 and 644. The rear edges of all of these respective slots have respectively downwardly and forwardly and forwardly inclined slide pushing projections 682, 683, 684, 685, 686, 687, 688, 689 and 690. These inclined projections are engaged by the under edges 572 of the bifurcated portions of the respective key plates to push the slide plate rearwardly when the key plate is depressed.

This push slide plate 671 has small front and rear assemblying slots 691 and 692 in the under edge thereof to accommodate respectively upwardly-extending bendable projections 693 and 694 on the respective opposite ends of the tubular base 646 while locating the upper edge of the push plate 671 under guide slots 695 and 696 in the respective front and rear end bracket supports 650 and 651, FIG. 24. When the lower edge of the push plate 671 has cleared upwardly-extending bendable projections 693 and 694 and pushed inwardly thereof, these projections are bent inwardly to place them out of true horizontal alignment with the assemblying slots 691 and 692, thereby to slidably retain the push plate 671 upon the tubular base 646 against outward displacement therefrom until the projections would be straightened to disassemble the push plate. A tension spring 697 is anchored to the front end bracket support 650 and connected to a pin 698 on the outer face of the push plate and tends to hold the push plate forwardly against the key plates. So long as a key plate is kept depressed although not locked by the push slide plate 671, the push slide plate 671 cannot be returned to its forward or neutral position since the key plate will have been held down by the lock slide plate 672 at the right side of the unit. The key plate top edge 611 at no time is ever located under the inclined projection of the push slide plate 671, the lock slide plate 672 holds down the key plate.

The lock slide plate 672 is similarly retained, like the push slide plate, at its upper edge, in slots 699 and 700 in the respective front and rear end bracket supports 650 and 651 and has front and rear assembly slots 701 and 702 in its lower edge that pass over the upstanding bendable projections 703 and 704 to locate the lock slide plate 672 within the unit, FIG. 22. Thereafter, the upstanding projections 703 and 704 are respectively bent to disalign them with the slots 701 and 702 and to prevent the lock slide plate 672 from being displaced thereover. A tension return spring 705 is anchored to the front end bracket support 650 and connected to a pin projection 706 on the lock slide plate 672 and urges the lock slide plate forwardly at all times.

The lock slide plate 672 has a series of slots 707, 708, 709, 710, 711, 712, 713, 714 and 715 extending upwardly from its lower edge and spaced apart to receive the right sides of the bifurcated portions of the respective key plates, FIG. 22. Extending forwardly respectively from the rear edges of these respective slots are respective inclined lock projections 716, 717, 718, 719, 720, 721, 722, 723, and 724 differing in shape from the inclined projections of the push slide plate 672 by the provision of a short top shoulder 725, FIG. 22, that is engaged by the under edge 572 of the key plate, FIG. 8, and long bottom shoulder 726 that holds or locks the key plate when the top shoulder 611 of the key plate is disposed thereunder.

However, the lock slide plate 672 is normally held in its neutral position by its hook projection 727 at the rear end thereof and the cam-operated general release bar device 613 having its transverse rod 614 lying in a lost motion recess 728 provided by the hook projection, FIGS. 22, 102, 103 and 104. The slide lock plate 672 is kept by the release bar 613 in a position with under edges 572 of the key plates vertically-aligned with inclined edges 729, FIG. 22, of the inclined lock projections so that the lock slide plate 672 is pushed rearwardly when the key plate is depressed and the bottom long shoulder 726 will partially overlie the upper edge 611 of the depressed key plate but not sufficiently such that another key plate may not be depressed as it would have remained vertically-aligned with its inclined edge 729 and upon this other key being depressed the already retained key plate will be automatically released and the other key plate will be locked by its bottom long shoulder 726. This can be continually done with the still other keys until the machine is started.

When the starting button "M" is depressed and the machine is put into operation the transversely-extending rod 614 of the release device 613 is immediately forced against the forward edge of the lost-motion recess 728 of the hook end 727 and forces forwardly home the long lower edge 726 of the rear slot edge inclined projection over the top edge 611 of the depressed key plate to lock the key plate in its depressed position, FIG. 103, and the short upper edge 725 of the inclined projections under the bottom edges 572 of all of the undepressed key plates to prevent them from being depressed while the machine is in operation. Just before the end of the cycle of operation the rod 610 of the release bar device 613 is swung rearwardly by cam action and through means to be later described to pull the lock slide plate 672 rearwardly and release the key plates of the value key unit and that of any other of the transaction and value key units that may have been used, FIG. 104. This, of course, prevents breakage of parts. The description of this key unit 217 will suffice for all the key units 218, 219, 220 and 221 as they are to be taken identical.

C. *Selector Stop Assembly 434 for Controlling the Operation of the Operating Plates Cluster 429 (FIGS. 13 to 21)*

The selector stop assembly 434 lies beside and to the right of the transaction key unit 216 within the supporting frame 169 and is removably secured to the inner ends of the front and rear slide bar hexagonal pin supports 436 and 437 by the fastening screws 434' and 435'. The slide bar 440 is slidably carried on the same hexagonal pin supports beside and to the right of this selector stop assembly and flush against the right side plate 207. This selector stop assembly 434 comprises an elongated main plate 730 that has a series of nine vertically-extending elongated openings 731, 732, 733, 734, 735, 736, 737, 738 and 739, running throughout its length equally spaced from one another but only seven of which are being put into use with this machine. These vertically-extending openings respectively serve as vertical guideways for respective vertically-adjustable stops 740, 741, 742, 743, 744, 745 and 746.

Each of these adjustable selector stops include an inner plate 747 lying flush with the left face of the main plate 730 and with a bentout foot projection 747' extending inwardly to the left from its lower end and underlies the lower end of a key plate leg of the transaction key unit 216 which depresses the stop. A small spacer plate 748 is disposed in the vertical opening and a retaining plate 749 is disposed on the opposite side of the plate opening and the three plates are held in assembled relationship by two vertically-spaced rivets 750 running through them, FIG. 16. A stop pin extension 751 that extends outwardly and to the right from the lower rivet 750 for the attachment thereto of a vertically-extending return lift spring 752 thus is anchored to a similarly-extending pin 753 vertically-aligned with the pin extension 751 and extending outwardly and to the right of the top of the main elongated plate 730. The spacer plate 748 has the width of the elongated opening to guide the stop while the inner and retaining plates 747 and 749 have portions overlying the edges of the opening to hold the stops against inward and outward displacement from the opening.

The front and rear ends of the main plate 730 have holes for receiving the respective front and rear fastening screws 434' and 435 that mounts the selector stop assembly 434 upon the hexagonal pin supports 436 and 437. The right end of the main plate 730 has longitudinally-spaced front and rear depending portions 754 and 755 and extending to the right from these portions respectively are front and rear bottom guide pin supports 756 and 757 grooved for supporting a slide plate 758, FIGS. 16 and 17, and which has front and rear end extensions 759 and 760 that lie in the grooved guide pin supports 756 and 757. These front and rear extensions are held against upward displacement from the guide pin supports by front and rear vertically-spaced grooved pin guides 761 and 762 that respectively overlie the upper edges of the front and rear extensions of the slide plate 758. This slide plate 758 is thus slidable fore and aft on its extensions upon the right side of the main plate 730. Since guide pin supports and guides are grooved the slide plate 758 is held spaced from the outer face of the main plate 730 and against outward displacement therefrom and yet free to have fore and aft movement upon the selector plate 730.

Pivoted on the inner face of the slide member 758 on a pivot pin 763' adjacent the forward end thereof is a drop pivot arm 763 having a hook end 764. While the majority of the individual stops are constructed as best shown in FIG. 16, the one stop 744 as best shown in FIG. 15, has an inwardly bent extension 765 welded to the foot projection 747' of the stop 744 for lowering this drop arm 763 by the stop 744 when the key button "E" is depressed so as to have engagement with a pin 766 on the left end of rotary transfer mechanism unit 340 for a purpose which will be made more apparent later on herein.

On the slide plate 758 at the lower edge near to the rear extension 760, is a depending portion 767 having a notch 768 for receiving a pin 769 on an inwardly bent upstanding arm of the totalizer operating plates 429 by which the slide plate is moved to select the totalizer to be elevated in a manner to be later set forth. The upper edge of the slide plate 758 has a series of three upstanding projections 770, 771 and 772 near to the front extension end thereof and a single upstanding projection 773 near to the rear extension thereof, and all of which have vertically-extending stop edges 773'. The upstanding projections are respectively arranged to be engaged by the rivet pin extensions 751 of the stops 741(B), 742(C), 743(D), and 746(G) when any one of the stops have been depressed. There are no projections on the slide plate 758 to be engaged by the pin extensions 751 of the stops 740, 744 and 745.

On the rear end of the main selector plate 730 is a pivot pin projection 774 on which a forwardly-extending pivot hook arm 775 is pivoted. This hook arm is spaced from the right side of the main plate 730 by a spacing collar 774', FIG. 14, and overlying the slide plate upper pin guide 762 on which it is normally supported by its inwardly bent lug 776' on the top edge thereof, FIG. 17. This pivot arm has a hook end 776 with an inclined edge 777 that rides on a pin 778 extending to the right from the rear extension 760 of the selector slide plate 758 to lift the pivot arm 776 and cause the hook end to receive the pin 778 and thereby lock the slide plate 758 momentarily against too soon forward return movement when the "E" button is depressed for a purpose which will be made more apparent later on. The pivot hook arm 776 also has a lower cam edge 779 that is acted upon by a pin 780 on the rotary transfer mechanism unit 340 to lift the pivot arm 776 from the slide plate pin 778 at the appropriate time.

On the slide plate 758 intermediate the length thereof, is a pin 781 that is engaged by a double pivot work arm assembly 782 that is pivoted on the right side supporting frame plate 207, FIGS. 19, 20 and 21. A description of this double pivot arm assembly 782 will be made after the slide stop bar 440 has been described.

*D. Slide Stop Bar 440 To Return Totalizer Operating Plates to Their Neutral Positions (FIGS. 19, 20 and 21)*

The slide stop bar 440 includes a main runner 783 to the forward end of which is secured a laterally-outwardly-spaced short runner 784. These main and forward end short runners 783 and 784 have respectively elongated slots 785 and 786 that receive the roller 441 on the front hexagonal pin support 436 for sliding movement of the slide stop bar 440 thereover. A releasable bottom plate 787 is connected between the main and short runners 783 and 784 by forcing the bent front and rear ends 788 and 789 over respective spacing pins 790 and 791 that hold the runners spaced from one another. The bottom plate 787 can be sprung downwardly away from these spacing pins should an extra long depending pin 792 that it carries be broken therefrom and need to be replaced, FIG. 19.

The rear end of the main runner 783 also has a laterally-spaced short runner 793 at the right side thereof and an elongated slot 794 that registers with an elongated slot 795 in the short runner 793 and these slots receive the roller 442 on the rear hexagonal pin support 437. The rear short and main runners are held spaced from one another by spacing pins 445 and 796, FIG. 20, the operating tension spring 443 being attached to the spacing pin 445 and serving always to urge the slide stop bar forwardly.

On the left face of the slide bar main runner 783, there are welded a series of stop projections 797, 798, 799, 800, 801 and 802 spaced from one another. Each of these stop projections has a forwardly-bent, inwardly-spaced, vertically-extending stop edge 803 that will engage the stop pin 751 for respective corresponding vertically-adjustable selector stops 740, 741, 742, 743, 744 or 745 when the pin 751 of the stop has been lowered into the path of the stop edge 803 of the slide bar stop projection. Thus, the stop pins 751 of the vertically-adjustable stops 741, 742 or 743 will not only be engaged respectively by the forward vertically-extending stop edges 773' of the respective upstanding projections 770, 771 and 772 of the slide plate 758 but also respectively jointly with and by the respective vertically-extending stop edges 803 of the respective stop projections 798, 799 and 800, of the slide bar 440. The stop pin 751 of the selector stops 740, 744 or 745 are respectively engaged alone by the respective stop edges 803 of the respective slide bar stop projections 797, 801, and 802 and without the engagement of projections on the slide plate 758. There is not any stop projection on the slide bar 440 corresponding to the adjustable stop 746 on the selector stop assembly 434, and thus its stop pin 751 is engaged only by the stop edge 773' of the stop projection 773 of the slide plate 758 and this for reasons that will become apparent later from the description of the operation of the shiftable cam follower positioning linkage that is controlled by the slide bar 440. A pin projection 804 extends from the right face of the slide bar main runner 783 corresponding to the pin 781 of selector slide plate 758 for engagement therewith by the double pivot arm assembly 782.

*E. Double Pivot Arm Assembly 782 (FIGS. 19, 20 and 21)*

The double pivot arm assembly 782 has an upwardly-extending U-shaped member 805 that provides inner and outer pivot arms 806 and 807 of its legs, transversely spaced from one another, and which simultaneously move the slide plate 758 of the selector stop assembly 434 by engagement of the inner pivot arm 806 with its intermediate pin 781 and the slide bar 440 by engagement of the pivot arm 807 with the pin projection 804 of its main runner 783. The slide bar 440 is held in the neutral position shown in FIG. 19, all showings of figures being of the parts in their neutral or starting positions, by a cam 808 (I) on the first cam group assembly 479, FIG. 89, acting through the double pivot arm assembly 782 which has a cam follower 809 that rides the cam 808 and is suddenly dropped when the follower 809 rides off a sharp lobe portion 810 of the cam 808. The neutral or starting position being when the follower 809 is on the top of the lobe portion 810 of the cam 808 ready to ride off the lobe 810. For the neutral position, the pivot arms 806 and 807 will have pushed the slide plate 758 and the slide bar 440 rearwardly by engagement with pin 781 on the selector assembly slide plate 758 and with pin 804 on the cam slide bar 440. The slide bar 440 will have been moved to the end of its movement with front ends of the front and rear slots of the slide bar 440 abutting the rollers 441 and 442, FIG. 19. In this neutral position, the selector stops on the selector stop assembly 434 may be depressed without interference from the several projections on the slide bar 440. The movement of the selector slide bar 440 rearwardly to the neutral position has been against the action of its long tension spring 443 while the movement of the selector slide plate 758 has been against the action of a strong tension spring 811, FIG. 93, that is anchored to a pin 812 on the inner face of the right side plate 207 and connected to a hook arm 813 of the intermediate totalizer operating plate 447. This spring 811 tends to rotate the operating plate 447 in a clockwise direction as viewed in FIG. 93 so that a slide plate operating arm 814 that carries pin 769 lying in notch 768 of depending portion 767 of the slide plate 758, FIG. 13, tends to resist the rearward movement of the slide plate 758. As the machine is started, the cam follower 809 immediately drops from the lobe portion 810 of the first group cam 808 and the double arm assembly 782 is released and the selector slide plate 758 and the slide bar 440 are then immediately returned against the selected stop of the stop assembly 434 if one appears or in lesser instant to their full forward positions unaffected by the stops.

In the right supporting frame plate 207 is a sleeve bushing support 815 that extends outwardly therefrom and has a follower spacing flange 816 resting against the outer face of the frame plate 207 and extends through the plate itself and peened on the inner face of the plate 207 to hold the bushing against outward displacement from the side frame plate 207. The double pivot arm assembly 782 has a pivot shaft 817 that extends inwardly through the bushing support and pivotally caries on its inner end the U-shaped arm member 805 and a spacing collar 818 that comes flush against the inner face of the side plate. The cam follower 809 is fixed to the outer end of the pivot shaft 817 at the proper angle position relative to the U-shaped arm member 805 by its hub collar 819 and set screw 820. The U-shaped arm member 805, the spacing sleeve 818 and cam follower hub collar 819 hold the shaft 817 against axial displacement in the fixed sleeve bushing support 815, on the side frame plate 207.

The bottom of the U-shaped member 805 has an elongated hole 821 and a forward extension 822, FIG. 21. A stop pin 823 extends diametrically vertically through the shaft 817 and the elongated hole 821 to hold the U-shaped arm member 805 against axial displacement upon the pivot shaft 817 while permitting limited rotation of the cam member thereupon. A strong tension spring 824 is connected between the upper end of the pin 823 and the outer end of the forward extension 822 whereby to provide a spring cushion connection between the U-shaped arm member 805 and the cam follower 809. This connection is to accommodate for any disalignment between the cam follower 809 and the U-shaped member 805 and to have the U-shaped arm member biasingly hold the slide bar 440 against the rollers in the ends of slide bar slots. This arrangement will minimize breakage of parts. The purpose of this double arms assembly 782 will be made apparent later on in the description of the general operation of the machine.

*F. Shiftable Cam Follower Positioning Linkage Operated by Slide Bar (FIGS. 19, 20, 21, 85, 86 and 87)*

The extra long depending pin 792 at the forward end of the slide stop bar 440, that is detachably connected therewith through its bottom plate 787, lies in a notch 825 of a swing arm plate 826 that extends through an inclined elongated slot 827 in the right side supporting frame plate 207 to permit the swing plate arm 826 to be swung flatwise the fore and aft moment of the depending pin 792 and the slide stop bar 440, FIGS. 19 and 85. This swing arm plate 826 has a hub collar 828, FIGS. 86 and 87, that is fixed to a vertically-extending pivot shaft 829 by a tight fit tapered pin 830 so that the shaft 829 will be turned by the plate 826. The swing arm plate 826 rests on and is supported in its flatwise fore and aft swinging movement on outwardly bent upper end 831 of a mounting bracket 832 that is secured flush to the outer face of the right side supporting frame plate 207 by upper and lower fastening screws 833 and 834. The shaft 829 is journalled in the outwardly bent upper end 831 of the bracket 832 and in an outwardly bent end 835 at the lower end of the mounting bracket 832. Swingable upon this lower outwardly bent end 835, is an adjustable rearwardly-extending lower swing arm assembly 836 that has a hub collar 837 and tight fit tapered pin 838 connecting the swing arm assembly 836 to the vertical pivot shaft 829 to be turned thereby, FIGS. 85 and 87. The swing arm assembly 837 has a main arm 839, that is fixed by the tapered pin 838 to the shaft 829 and an adjustable arm extension 840 that is pivotally connected to the top of the main arm 839 and an adjustable arm extension 840 that is pivotally connected to the top of the main arm 839 by a pivot pin 841 and is angularly-adjusted laterally relative thereto by an adjustable eccentric bolt means 842. The outer end of the adjustable arm extension 840 is bifurcated and receives a pin 843 of a forked slide arm 844 that is laterally slidable upon a long pin support 845 threaded into the right side frame support plate 207 to extend outwardly therefrom by its threaded end 846 and a hexagonal flange portion 847. As the swing arm plate 826 is swung by the slide bar 440 the shaft 829 and the lower swing arm assembly 836 are turned laterally and the forked slide arm 844 is slid along the long pin support 845 to different points thereon depending upon the amount of return movement of the slide bar 440 and its projections as the machine is started.

The forked slide arm 844 has a vertically-extending end 848 that extends over a spool-shaped slide 849. This slide 849 is laterally shiftable upon a transversely-extending rod 850 extending outwardly from a main cam follower lever 851 that is pivoted upon the cam follower intermediate pinion gear supporting post 503 fixed to and extending outwardly from the right side frame supporting plate 207. This main cam follower lever 851 has an upper cam follower end 852 that rides on a cam 853 (VII) of the first cam group 479, FIGS. 89 and 90. The main cam lever 851 also has a rearwardly-extending portion 854 below its pivot that supports an outwardly extending bracing pin 855 with a small bracing plate 856 fixed to the outer end of the pin and connected to the outer end of the rod 850, whereby the rod 850 will be rigidly braced and supported, FIG. 85. The cam follower and pinion gear supporting post 503 is secured to the right side frame plate 207 by a nut 857 on the inner face thereof, FIGS. 90 and 93, which has a flange 858 that spaces the main cam follower lever 851 outwardly of the side frame plate to align the main cam lever 851 laterally with the second cam 854 of the first cam group, FIG. 90. The main cam lever 851 has a sleeve bushing 859 fixed thereto and extending outwardly therefrom and journalled on gear supporting post 503. The main cam lever 851 is held on the gear post 503 against the flange 858 and against outward displacement by the intermediate pinion gear 504 that is also carried on the supporting post 503 and abuts the outer end of the main lever sleeve bushing 859. The intermediate pinion gear 504 and the main cam follower lever 851 are held in place on the post 503 by the cover plate 425 that fits over the shank extension 505 of the intermediate gear and against the washer 507 thereon, FIGS. 82, 89.

A shiftable cam follower 860 corresponding in shape to cam follower portion 853 of the main cam follower 851 has an enlarged hole to have a loose fit thereupon. This slidable cam follower 860 is in its neutral position when over and without engagement with a second cam 861 (II) of the first cam group assembly 479 and is slid therefrom instantly as the group assembly 479 starts to turn and will according to the selected stop projection on the slide bar 440 move from this neutral position indicated at 860 in FIG. 89 to any one of four further positions 860a, 860b, 860c or 860d to engage respectively either a third cam 862 (III), a fourth cam 863 (IV), a fifth cam 864 (V) or a sixth cam 865 (VI). The time for raising and lowering the totalizers is controlled by these cams 862, 863, 864 and 853 in a manner that will be later set forth.

The shortest return stroke of the slide stop bar 440 is when the "E" key button of the transaction key unit 216 and the key plate 530 are depressed, FIG. 5. The key leg 535 of the key plate 530 depresses the projection 747' of the stop 744 of the selector assembly 434, in a manner best seen in FIGS. 7, 9, 17 so that the spring pin 751 of the stop is put in the path of the stop edge 803 of the stop projection 801 of the slide bar 440, the slide bar 440 being at first in its rearward or neutral position, FIGS. 19 and 20. Upon the start of the cycle and with the turning of the cam group 479 the cam follower 809 immediately drops from the cam lobe 810, FIG. 89, to release the slide bar 440 so that its spring 443 returns the slide bar forwardly so that the stop edge 803 of the stop 801 and the slide bar 440 comes to rest against the spring pin 751 of the selector stop 744, returning the shortest distance for any selection that is made. The depending pin 792 of the slide bar 440 turns the swing arm plate 826, the shaft 829 and its adjustable arm 836 in a counterclockwise direction as viewed in FIGS. 86 and 87 so as to slide the forked slide arm 844 inwardly along its pin support 845 and the spool-shaped slide 849 inwardly along its rod 850 and to place the shiftable cam follower 860 in the cam follower position 860a and upon third cam 862 so that cam follower 860 will be actuated thereby, FIG. 89. The position to which the shiftable cam follower 860 is placed is thus dependent upon the amount of the return stroke of the slide bar 440 from its neutral and rearward position to its forward position.

The next longer return stroke of the slide bar 440 is effected when the "A" and "C" buttons are depressed. When the "A" button is depressed, its key plate 526 depresses the stop 740 of the selector assembly 434, FIG. 17, and places the spring pin 751 of the stop 740 in the path of the stop edge 803 of the stop projection 797 on the slide stop bar 440, FIG. 20, which when the slide bar 440 is released from its rearward and neutral position returns a greater distance than was permitted by the stop projection 801 when pressing the "E" button as above explained. Accordingly, the depending pin 792 of the slide bar 440 turns the swing arm plate 826 a greater amount and acting through the adjustable arm 836, forked slide arm 844, and spool shaped slide 849, positions the shiftable cam follower 860 to the cam follower position 860b for engagement with the fourth cam 863, FIG. 89. When the "C" button is depressed, its plate 528 depresses stop 742, on the selector assembly 434, FIG. 17 and places the spring stop pin 751 of the stop 742 in the path of the stop projection 799 on the slide stop bar 440. The slide stop bar 440 is returned the same distance as when the "A" button was depressed and acts in the same above manner to shift the cam follower 860 to the same cam follower position 860b in engagement with the same fourth cam 863.

The still next longer return stroke of the slide bar is effected when the "B" and "F" buttons are depressed. When the "B" button is depressed, its key plate 532 depresses the stop 741 on the selector assembly 434, FIG. 17, and places its spring stop pin 751 in the path of the stop edge 803 of the stop projection 798 on the slide stop bar 440, FIGS. 19 and 20. When the slide bar 440 is released from its rearward neutral position it returns a further distance than it did with the stop projections 797 and 799 for the "A" and "C" buttons. Accordingly, the depending pin 792 turns the swing arm plate 826 a further amount and acting through the adjustable arm 836, forked slide arm 844 and spool-shaped slide 849, positions the shiftable cam follower 860 to the cam follower position 860c and in engagement with the fifth cam 864 (V), FIG. 89. When the "F" button is depressed, its key plate 531 depresses stop 745 of the selector stop assembly 434, FIG. 17 and places its spring pin 751 in the path of the vertical stop edge 803 of the stop projection 802 of the slide stop bar 440. The slide stop bar 440 returns the same further amount to the same cam follower position 860c and in engagement with the same fifth cam 864.

The longest forward return stroke of the slide stop bar 440 is effected, when the "D" and "G" key buttons are depressed. The "D" button and its key plate 529 depresses the stop 742 of the selector stop assembly 434, FIG. 17, and places its spring pin 751 in the path of the stop projection 800 of the slide stop bar 440 so that when the slide bar 440 is released it is returned forwardly a still further distance than when the buttons "B" and "F" were depressed. Accordingly, the depending pin 792 on the slide stop bar 440 turns the swing arm plate 826 a still further amount and acting through the same adjustable arm 836, forked slide arm 844 and the spool-shaped slide positions the shiftable cam follower 860 to the cam follower position 860d and into engagement with the sixth cam 865 (VI) and closed upon the main or fixed cam follower that always follows the seventh cam 854.

When the "G" button is depressed, its key plate 532 depresses stop 746 of the selector stop assembly 434. Since this stop 746 is the last of a succession of the stops on the selector assembly, there is no need for a stop projection on the slide stop bar 440 corresponding thereto. Accordingly, the slide stop bar 440 is allowed to return towards the full forward position so that shiftable cam follower 860 closes upon the main cam follower 853 to the same cam follower position 860d and onto the same seventh cam 854. The manner in which these cams of the first group operate to control the totalizer operating plates will be made clear when these plates will have been described.

*G. Totalizer Operating Plates Cluster 429*
*(FIGS. 91, 93, 96 and 100)*

A description will now be made of the cluster of independently operable plates 446, 447 and 448 that control the raising and lowering of the front and rear totalizers 317 and 318 to receive the accountings from the rotary transfer unit 340, to deliver the accountings from the totalizers to the transfer unit, to transfer the accountings through the transfer unit from totalizer to totalizer, and to transfer the accountings on the totalizers to the indicating mechanism 232 so that their amounts may be read. This is done through the rotary transfer unit 340, which will be later described in detail. These operating plates 446, 447 and 448 are all supported for rotation on the inwardly-extending heavy bushing portion 428 of the second cam group and transfer unit rod sleeve pin support 426 fixed to the right side frame plate 207, by the rivets 427' passing from its circular flange plate 427 through the plate 207, FIGS. 9 and 96, and by means of their respective bushing assemblies 450, 451 and 452 and retained upon the sleeve bushing portion 428 by the retaining nut 430 threaded upon the outer end thereof.

The first totalizer operating plate 446 is journalled in its bushing assembly 450 that is held on the bushing portion 428 flush against the circular flange 427 of the sleeve pin support 426 and so it does not rotate. The first operating plate 446 has a short tapered arm portion 867 extending upwardly, FIG. 98, that has a work pin 868 extending inwardly from its outer end. Approximately one hundred and twenty degrees to the right of the short arms 867 is a long depending arm portion 869 extending downwardly and forwardly toward the front and rear totalizers 317 and 318 and an arcuate stop edge 870 with angularly-spaced slots 871 and 872 provided therein. Projecting inwardly from the right side front supporting plate 207, is a stop pin 873 against which a lower edge 874 of the plate 446 rests when in its lowered position, FIG. 99. The operating plate 446 is retained in this position against the stop pin 873 by a vertically swingable arm 875 pivoted flush on the inner face of the side frame plate 207 upon a pin 876 and having an inwardly-extending front totalizer roller 877 that enters the forward slot 871 in the arcuate stop edge 870 of the plate 446 against the stop 873 and forward pivotal movement. This swing arm 875 is so positioned that its roller 877 overlies the upper end of the guideway 323 of the front totalizer right guide plate 319. This permits the front totalizer 317 to be elevated by the front totalizer spring biased feeding and retaining device with its end plate 327 engaging the roller 877 and forcing it into the slot 871, FIG. 99.

Forwardly of the operating plate 446 and projecting inwardly from the right side frame plate 207 is a front stop pin 878, FIG. 98, that is engaged by a forward stop edge 879 of the operating plate 446 and so as to position the rear slot 872 in the depending arm 869 of the plate 446 to receive a rear totalizer swing arm roller 881 overlying the guideway 325 of the rear totalizer right guide plate 321 extending from a vertically-swingable arm 880 pivoted flush on the inner face of the right side frame plate 207 by pivot pin 882. The swing arm roller 881 is moved upwardly into the rear slot 872 so that the rear rotalizer 318 can be elevated by its spring-biased feeding and retaining device 358, FIG. 100, upwardly into operative position to connect the rear totalizer with the rotary transfer unit 340. At this time, the front totalizer roller 877 will be held down by the arcuate stop edge 870 of the plate 446. The rear totalizer roller 880 was held down by this same arcuate stop edge 870 while the front totalizer roller 877 was in the front slot 871.

The angular spacing between the centers of the slots 871 and 872 is greater than the angular spacing between the front and rear totalizer swing arm rollers 877 and 880 and the guideways 323 and 325 in the respective guide plates 319 and 321. Both totalizers 317 and 318 are held biased by their respective spring biased feeding and retaining devices 357 and 358 toward their elevated positions at all times. The operating plate 446 is always biased toward the forward stop 878 and in position to receive the rear swing roller 881 and to allow the rear totalizer to be elevated. The operating plate 446 selects the totalizer that is to be elevated. When the operating plate 446 is against the rear stop pin 873, the front totalizer 317 may be elevated and when the plate 446 is against the front pin 878 the rear totalizer 318 may be elevated.

The intermediate operating plate 447, the smallest one of the operating plates, is journalled in its bushing assembly 451 that is held in tight with the bushing 450 of the plate 446 on the bushing portion 428 and against rotation while permitting this operation plate 447 to be turned therewithin. This intermediate plate 447 has in its slide plate operating arm 814, an elongated slot 883, FIG. 98, into which a stop pin 868′ on tapered arm 867 of the operating plate 446 extends to provide a lost motion driving connection between the two plates 446 and 447. The tension spring 811 pivots the intermediate plate 447 clockwise and the selector slide plate 758 forwardly, since this intermediate plate 447 is connected with the slide plate 758 through its pin 769 on the operating arm 814.

The operating plate 447 has a further hook arm 884 to which a tension spring 885 is connected. This tension spring 885 is connected to a pin 886 on the depending arm 869 of the first plate 446 and tends to draw the operating plates 446 and 447 angularly together and the stop pin 868 on the upper end of the tapered arm 867 and the stop edge 879 of the depending slotted arm 869 against the forward stop pin 878 of the plate 446 into the rear end of the small slot 883 in the arm 814 of the intermediate operating plate 447. A cushioned lost motion connection is thus provided between the operating plates 446 and 447 for a reason to be made soon apparent herein.

The slide plate operating arm 814 of the intermediate operating plate 447 has its upper end that carries the pin 769 inwardly offset for the vertical alignment of the pin 769 with the notch 768 in the depending portion 767 of the slide plate 758 of the selector stop assembly 434. The selector slide plate 758 is moved rearwardly against the action of the tension springs 811 and 885 of the intermediate operating plate 447 and is returned thereby. The slide stop plate 758 is returned to have one of its upstanding projections 770, 771, 772, or 773 engage a stop pin 751, one of the depressed stops 741, 742, 743 and 746, of the selector stop assembly 434 in the manner and for the purpose that will be made more apparent as this immediate description of the totalizer operating plates continues.

The third operating plate 448 is likewise journalled in its bushing assembly 452 that is held tight with the bushing assemblies 450 and 451 against turning upon the bushing portion 428 of the sleeve pin support 426 by the operating plates retaining nut 430. This third operating plate 448 is the largest plate of the plate cluster and extends substantially beyond the sides of the other two operating plates 446 and 447. This plate 448 serves to push totalizers 317 and 318 down into their lowered or out of engagement positions from the rotary transfer unit 340 against the action of their respective feeding devices 357 and 358. This operating plate 448 has a peripheral operating edge 887 that bears against the front and rear swing arm rollers 877 and 881 and in which are front and rear work recesses 888 and 889 that respectively have cam work edges 890 and 891 that upon the plate 448 being turned in a clockwise direction as viewed in FIGS. 95, 99, 100 forces the swing arm rollers 877 and 881 respectively downwardly out of the front and rear slots 871 and 872 of the depending arm 869 of the first operating plate 446 and the totalizers into their lowered and inoperative positions.

This third operating plate 448 is limited in its rearward turning movement and in a clockwise direction by a stop stud 892 extending inwardly from the right side frame plate 207 by engagement of its radially-extending stop edge 893 therewith, FIG. 95. In this position of the operating plate 448 against the stop stud 892, both totalizers 317 and 318 will have been lowered by the plate cam edges 890 and 891 working on the rollers 877 and 881 and held in their inoperative or neutral positions by its peripheral operating edge 887 and against the action of their spring-biased feeding and retaining devices 357 and 358 and the action of a long tension spring 894. This long tension spring 894 is connected to a pin 895 on the operating plate 448 and is anchored thereabove at its other end to a pin 896 projecting inwardly from the right side frame plate 207.

The operating plate 448 is worked from this neutral position against the stop stud 892 by bifurcated pivot arm 897 fixed by its set collar 898 and set screw 899 to a shaft 900 journalled in a sleeve bushing 901 in the right side frame plate 207 and with its bifurcated end slidably receiving roller 902′ journalled on a pin 902 projecting outwardly from the operating plate 448 adjacent to its neutral stop edge 893, FIGS. 95 and 96. This bifurcated pivot work arm 897 when allowed to be turned clockwise by cam and linkage means to be later set forth permits the plate 448 to be turned counterclockwise by the long tension spring 894, its front stop edge 903′ is brought against a small diameter pin extension 903 on the first plate front stop pin 878 and with the first operating plate 446 in its neutral position also brought against the same stop pin 878 and this taking place as the machine is started, the rear totalizer 318 is elevated into engagement with the transfer unit 340, FIG. 100.

When the operating plate 488 is so moved against the small diameter pin extension 903, the first plate 446 was positioned to have its rear edge 875 against the rear stop pin 873 as shown in FIG. 99, the front swing arm roller 877 will have entered the first plate front slot 871 and the front totalizer 317 will have been elevated, just as when the third operating plate 448 is moved against the small diameter extension 903 and the first plate 446 has its forward edge 879 against the front pin 878, as stated above as shown in FIG. 100 the rear swing arm roller 881 will have entered the first plate rear slot 872 and the rear totalizer 318 will have been elevated. It is more often that the rear totalizer is to be elevated and thus the first plate 446 is biased forwardly and in position to allow the swing roller 881 to enter recess 872 and the rear totalizer to be elevated.

The front totalizer 317 is held firmly elevated against the transfer unit 340, FIG. 99 by the engagement of a raised hook extension 904 on the totalizer right end plate 327 that catches on a spring-biased latch hook lever 905 carried upon the inner face of the plate 448 by a pivot pin 906 and normally biasingly held against a stop pin 907 on the plate 448 and against pivotal movement to receive the totalizer hook projection 904 by a short tension spring 908 connected between a pin 909 on the upper end of the latch hook lever 905 and an anchor pin 910 on the plate 448. As the operating plate 448 is rotated clockwise, FIG. 99, to force down the front totalizer 317 the hook lever 901 is withdrawn from the front totalizer hook projection 904 to release the front totalizer.

The rear totalizer 318 is held firmly elevated against the transfer unit 340, FIGS. 93, 97 and 100 by the engagement of a raised hook extension 911 on the rear totalizer right end plate 329 that catches on a spring-biased latch hook lever 912 carried upon the operating plate 448 by a pivot 913 and normally held against a stop pin 914 on the operating plate 448 and against pivotal movement to receive the totalizer hook extension 911 by a short tension spring 915 connected between a pin 916 on the latch hook lever 912 and a pin 917 on the operating plate 448. As the push out operating plate 448 is rotated clockwise and rearwardly the latch hook lever is withdrawn from the rear totalizer hook extension 911 and the rear totalizer 318 is forced downwardly to its lowered position. The hook extensions 904 and 911 on the front and rear totalizers and the hook catch levers on the operating plate 448 have cooperating inclined cam edges to facilitate their union with one another as the totalizers are permitted to be elevated by the operating cam edges 890 and 891 of the operating plate 448. Thus, the operating plate 448 serves to retain the totalizers in their elevated positions, and as well serves to force down the totalizers from the selecting operating plate 446 worked by the cooperating intermediate plate 447 and further to hold the totalizers lowered against the actions of their spring-biased feeding and retaining devices 357 and 358.

On the shaft 900, FIGS. 95, 96, outside of the right side frame plate 207 is a drop work arm 918 to the lower end of which, by a pivot pin 919, a forwardly-extending long link 920 is connected that has its forward end connected by a pivot pin 921 to the lower end of the main cam follower lever 851.

A tension spring 922, that is anchored to a pin 922' on the right side frame plate 207 and connected to the pivot pin 919 on the drop work arm 918, holds the cam follower portion 852 of the main cam follower lever 851 against its cam 853 on the first cam group assembly 479, FIGS. 85 and 89 and works with the long tension spring 894 connected between the plate 448 and to bias the totalizer catch and push out operating plate 448 counterclockwise against its small extension stop 903 on first totalizer operating plate drop pin 878, FIGS. 93, 99 and 100. In the neutral or starting position, the cam follower 852 is on a high lobe 923 on the main follower cam 853 and this operating plate 448 is held pivoted rearwardly thereby against the action of the springs 894 and 922. The selection of the totalizer to be elevated is thus generally effected through the return position of the selector slide plate 758 against the stop pin 751 of the selector stop and the positioning of the first and intermediate operating plates 446 and 447 thereby. While the timing of the movement of the totalizer in and out is effected by the return position of the slide stop bar 440, that positions the slide cam follower 860 upon its selected cam and the main cam follower 852 on the cam 853 the latter of which always serves at the end of the operating cycle to rotate the operating plate 448 rearwardly and force down the totalizer that may have been elevated.

The slotted selecting operating plate 446 is normally biased to the position shown in FIGS. 95, 98, 100 with its forward edge 879 against the forward stop pin 878 and in position at all times to permit the rear totalizer 318 to be elevated so that when the third operating plate 448 is turned counterclockwise in the same direction, and its edge 903' against the pin extension 903, the rear totalizer 318 is permitted to be elevated and without the first operating plate 446 needing to be shifted or turned rearwardly. When the front totalizer 317 is to be elevated the first operating plate 446 is turned rearward and clockwise to the dotted line position shown in FIG. 99 with its rear edge 874 against the rear stop pin 873 so that as the work plate 448 is allowed to be turned forwardly and counterclockwise the front totalizer is permitted to be elevated.

The selection of whether the rear or front totalizer is to be elevated is controlled by the amount of forward movement of the selector slide plate 758 and the angular positioning of the intermediate operating plate 447. If the selector slide plate 758 is permitted to be moved the full way forwardly without its upstanding projections 770, 771, 772 and 773 encountering a selector stop pin 751, this being effected by the upstanding arm 814 of the intermediate operating plate 447 through its pin connection 769 with the selector side plate 758 and the heavy tension spring 811 connected between the plate 447 and side plate 207 forwardly and the plate 447 clockwise, tension of the tension spring 885 connecting the plate 447 with the slotted operated plate 446 is released allowing the slotted operating plate 446 to fall by gravity against its rear stop pin 873, in position to permit the front totalizer to be elevated when the work operating plate 448 is turned counterclockwise against the stop extension 903. When the selector slide plate 758 is interrupted in its forward return movement by the engagement of any one of its upstanding projections 770, 771, 772, and 773 with a depressed selector stop pin 751 or when retained rearwardly by the selector pivot hook arm 775 engaging pin 778 of the slide plate 758, tension is maintained in the tension spring 885 to keep the slotted operating plate 446 forwardly against its stop pin 878 in its normal position to permit the rear totalizer to be elevated by the shifting forwardly of the work operating plate 448. The time when the movement of work operating plate 448 is effected to release the totalizer so that it can be elevated, is dependent upon the return position of the slide stop bar 440 to position the shiftable cam follower 860 on the first cam group assembly 479. The main cam follower 852 of the lever 851 acting through the operating plate always removes and lowers the totalizer at the end of the cycle of operation if not done so by any of the shiftable cam follower cams.

When depressing the "E" button the control of the selector slide plate 758 is taken over by the transfer unit 340 by engagement of its pin 766 when its swing arm assembly moves upwardly and rearwardly with the dropped hook arm 763 on the slide plate 758 which will have been lowered by the "E" key plate 530 depressing the selector stop assembly 744 and its inwardly bent drop arm supporting extension 765, FIGS. 13, 17, 42 and 43. The location of the rotary transfer unit pin 766 on the transfer unit 340 will be better identified as the description follows on. Immediately by depressing the main or repeat lever buttons "M" or "R" and putting the machine into operation the selector slide plate 758 is permitted to slide forwardly all the way to against the slide top guide support 761, thereby releasing the tension of the spring 885 so as to allow the slotted operating plate 446 to fall by gravity and thus the front totalizer 317 will be immediately elevated to transfer the accountings thereon from the front totalizer to the transfer unit 340 on the first turn of the hand crank 188. As the swing arm assembly of the transfer unit 340 is lifted the pin 766 thereon engages the hook end 764 of the dropped hook arm 763 to pull the slide plate 758 rearwardly at the end of the lifting movement of the swing arm assembly 1148 of the transfer unit 340. The slide plate pin 778 will ride under the cam edge 777 of the hook arm 775 so that its hook end 776 will latch the pin 778 and lock the slide plate 758 against forward movement, FIGS. 13 and 17. The intermediate operating plate 447 is thereby pivoted counterclockwise so that sufficient tension is put into the spring 885 so as to pull the slotted operating plate 446 forwardly against its front stop 878 into its normal neutral position so that on the beginning of the second turn of the hand crank 188 the cam 862, with two lobes thereon diametrically-spaced from each other will be made more clear later, will have caused the operating plate 448 to be worked to eject the front totalizer 317 and with the slotted plate 446 positioned to allow the rear totalizer to be elevated, the cam 862 immediately allows plates 448, from the second lobe, to be returned forwardly and rear totalizer to be elevated, FIG. 100, so that the accounting taken from the front totalizer 317 and put on the transfer unit 340 on the first turn of the hand crank 188 will be transferred from the transfer unit 340 to rear totalizer 318 on the second turn of the hand crank 188. At the end of the second turn of the hand crank the swing bar assembly on its return movement of the transfer unit 340 through its pin 780 engages the cam edge 779 of the selector stop assembly hook arm 775 to lift its hook end 776 from the pin 778 to allow the slide plate 758 to be returned to its forward position by the spring 811 of the intermediate operating plate 447, FIGS. 17, 42 and 93. The only operation, in which the selector stop assembly hook arm 775 latches the slide plate 758 in its rearward position is when the "E" button is depressed, as this is the only time that for one cycle of operation that both totalizers have to be elevated into engagement with the transfer unit 340.

This operation will be better understood after the detail construction and operation of the rotary transfer unit 340 and the general operation of the machine for the depressing of each of the various number value keys and transaction letter transaction keys has been made. For the present, it may be helpful to give the following brief general description of the operation of the totalizers when any of these value or transaction keys are depressed but it cannot be expected that what happens in detail can be understood until the detail description of the various units, cams, and linkages interconnecting them has been completed. Thus, for now the following general descrption is given.

If any one of the nine value keys of any one or more of the value key units 217, 218, 219, 220 and 221 are depressed, the amount is transferred from the value key unit to the rotary transfer unit 340 on the upward swing bar assembly of the unit 340 and first turn of the hand crank 188. At the beginning of the second turn of the hand crank, the front totalizer 317 is elevated and the amount taken from the value key unit and put into the front totalizer to thereafter be taken out when desired. Such plural amounts are thus accumulated on the front totalizer 317 by the depressing of the value keys in succession and putting the machine into operation. The amounts are not only put on the totalizer but they are indicated by the indicating mechanism 232 each time. A further detailed description of the construction and operation of the indicating unit 232 and how it is operated by the transfer unit 340 will be made hereinafter.

If when such accumulation of amounts has been made on the front totalizer and it is desired to know what is the total amount so placed thereon as with an adding machine, the "A" adding or summation transaction key button is depressed, the slidable cam follower 860 goes to the IV cam 863 and front totalizer is elevated at the beginning of the first turn of the hand crank 188 and is forced out at the end of the first turn, then on the second turn of the hand crank and return of the swing bar assembly 1148 the amount received by the transfer unit 340 is transferred to the indication unit 232 and a reading of the total amount will be taken which will appear in the front window opening 223 of the machine, FIG. 3. The front totalizer is wiped clean of the accumulations at the time in a manner that will be made apparent later on.

If the "B" button is depressed, a sub-total reading of the amount of the cash then in the drawer when it is desired to know what amount of cash has been taken in over a period of time can be determined. The slidable cam follower 860 will have gone to the cam 864 or position 860c, FIG. 89 and the rear totalizer 318 having the total amount thereon is elevated at the beginning of the first turn of the crank handle 188 and the amount is taken onto the transfer unit 340. On the second turn of the hand crank 188, the amount taken from rear totalizer by the transfer unit 340 is returned to the rear totalizer 318 and at the same time a reading is made on the indicating unit 232. The rear totalizer 312 is lowered at the end of the second turn after this has been done.

When the grand total of the amount on the rear totalizer is desired, as at the end of the day or when all of the cash is to be removed from the cash register, the "C" button is depressed and the slidable cam follower 860 goes to the IV cam 863 or position 860b, FIG. 89, and rear totalizer 318 is elevated at the beginning of the first turn of the hand crank 188 and is lowered at the end of the first turn thereof. Since the rear totalizer is lowered before the second turn, the amount is not returned thereto and the rear totalizer 318 is thereby cleared for the next day's receipts. On the second turn of the crank 188, the amount taken by the transfer unit 340 is delivered to the indication unit 232 from which the grand reading will be given. The cash register is then ready to be started afresh.

If the "D" button is depressed as when it is desired to add but a single item of sale or amount to be deposited in the cash register, the slidable cam follower 860 goes to the VI cam 865 or position 860d, FIG. 89. With this operation, the rear totalizer is not elevated until the beginning of the second turn of the crank handle 188. It is lowered at the end of this second turn. The single amount having been taken from the value key unit, delivered to the transfer unit 340 and thereby put directly into the rear totalizer 318 on the second turn of the crank end at the same time the indicating unit 232 is worked to display the item amount.

The "E" button is depressed to determine the total amount of several items sold to a customer after having been placed upon the front totalizer 317 by depressing the value keys alone, the slidable cam follower 860 goes to the III cam 862 or position 860a, FIG. 89, which has the two lobes 924 and 925, substantially one hundred and eighty degrees apart, so that upon release of the cam follower 860 from the lobe 924 and on the first turn of the hand crank the front totalizer 317 is elevated, so that the amount of the total items that had been placed on the front totalizer 317 are removed from the front totalizer 317 by the transfer unit on the first turn of the crank 188. The front totalizer 317 is then lowered at the end of this first turn by the second cam lobe 925. At the beginning of the second turn of the crank the rear totalizer 318 is elevated by the release of the cam follower 860 from the second lobe 925 of the cam 862. At the end of this second turn of the crank the rear totalizer 318 is lowered, the rear totalizer having received the amount from the transfer unit 340 that was taken from the front totalizer, and at the same time the indicating unit 232 is worked to give the reading of the amount of the items.

If the customer wants to know how much he has already before buying further items and without the amount being added into the total amount taken into the cash register with previous sales, the "F" button is depressed and the slidable cam follower 860 is moved to the V cam 864 or position 860c, FIG. 89. The front totalizer 317 is elevated to the transfer unit 340 at the beginning of the first turn of the hand crank 188 and is not lowered until the end of the second turn as the amount has to be put back into the front totalizer. Also, on the second turn of the crank the amount taken is placed on the indicating unit 232 and the amount spent thus far by the customer will be given. If the customer decides to include other items they may be added by the value keys upon the front totalizer and the final amount taken thereafter by depressing the "E" button that transfers the total amount on the front totalizer to the rear totalizer.

If it is desired to put an amount received on account the "G" button is depressed. The slidable cam follower 860 goes to the VI cam 865 or position 860d, FIG. 89. The amount is placed directly on the transfer unit from the key units during the first turn of the crank 188 and at the beginning of the second turn, the rear totalizer 318 is elevated to receive the amount and at the end of the second turn the rear totalizer is lowered. It should be kept in mind that cam portion 853 of the main cam lever 851 always serves to remove any totalizer that happens to be elevated upon the transfer unit at the end of the second turn of the crank and shiftable cam follower 860 comes into play to deal with the raising and lowering of the totalizers before the end of the second turn of the crank and end of the cycle.

The function of the several lettered key buttons of the transaction key unit 216 as they are depressed may be briefly defined as follows:

"A" Button—Adding machine total summation from front totalizer.

"B" Button—Sub-total in cash drawer after a period of time.

"C" Button—Grand total in cash drawer when money is removed at the end of the day and to start the cash register thereafter afresh.

"D" Button—One item sold and amount to be placed directly in rear totalizer.

"E" Button—Total sale of several items that had been put on front totalizer and to put into the register the total amount.

"F" Button—Sub-total of several items before being recorded on rear totalizer.

"G" Button—Received on account amount to be recorded in the rear totalizer.

Only the "D" and "G" key buttons can be depressed with the value key buttons. This is so because the slots 561 and 564 of the push plate 556 of the transaction key unit 216 are without the inclined projections that the other slots thereof have, FIG. 11. The value key unit amount always go directly onto the front totalizer when none of the transaction keys are depressed.

*H. Detail Construction of Transfer Release and Keys Lock Unit 286 (FIGS. 5, 25 to 36, 93)*

The transfer release and keys lock unit 286 has been described so far as to the manner in which it is mounted into the supporting frame 169 and removed therefrom. The present description will be made as to its detail construction and operation. This unit 286 generally comprises right and left end plates 287 and 307 and three parallel spacing rods 926, 927 and 928, FIG. 25. The ends of these rods have reduced diameter extensions that extend through the end plates and are peaned thereover so as to rigidly hold the plates to the ends of the rods. Extending outwardly from the right end plate 287 are the longitudinally-spaced, grooved mounting bracket-receiving pin supporting projections 288 and 289, FIG. 25, while extending outwardly from the left end plate 307 are longitudinally-spaced ungrooved mounting bracket-receiving supporting projections 305 and 306, FIG. 31. The use of these end plate pin projections for detachably mounting the release and lock unit 286 in the slotted mounting brackets 293 and 303 on the respective side frame plates 207 and 208 has been explained above.

At the forward end of this release and lock unit 286 are upstanding forward portions 929 and 930 of the respective right and left end plates 287 and 307 and extending between these projections is a pivot shaft 931 that fits at one end into a hole 932 of the upstanding portion 929 of the right end plate 287 and into a depending notch 933 on the upstanding portion 930 of the left end plate 307. By raising the left end of the pivot shaft 931 from the notch 933, the shaft is easily pulled from the hole 932 on the right end plate 287. The left end of the pivot shaft 931 has an annular groove 934 outwardly of the notch 933 for receiving a removable longitudinally-extending retaining plate 935, FIG. 31. This retaining plate 935 has an over size hole 936 for receiving the end of the pivot shaft 931 and the upper edge of the hole 936 is lowered into top of the annular groove 934 of the shaft 931 whereby to hold the shaft 931 in the bottom of the depending notch 933.

Rearwardly of this pivot shaft 931 is another pivot shaft 937 that extends through an opening 938 in the right end plate 287, FIGS. 25 and 30 and has secured to its right end a short bifurcated pivot arm 939 by a hub collar 940 and a driven tapered pin 941. This pivot arm 939 has a notch 942 for detachably receiving a pin 943 extending from a pivot arm 944 fixed to the inner end of a pivot shaft 945 that is journalled at its inner end in the right side bracket plate 293 and at its outer end in the right side frame plate 207. The bifurcated pivot arm 939 has a depending portion 947 that is held by a tension spring 948 against a stop pin 949. The tension spring 948 is anchored to a pin 950 extending outwardly from the right end plate 287 and is connected to the depending portion 947 above the stop pin 949. When the unit 286 is inserted into the supporting frame 169, care must be taken to align the notch 942 of the pivot arm 939 with the pin 943 on the pivot arm 944. The left end of the pivot shaft 937 extends through a notch 947 in the left end plate 307 and has an annular groove 948 for receiving the under edge of a depending notch 949 in the same removable longitudinally-extending retaining plate 935, FIG. 31.

A larger diameter pivot arm supporting shaft 951 extends through an opening 952 in the right end plate 287 and its opposite end rests in a notch 953 in the upper edge of the left end plate 307, FIGS. 25 and 31. This opposite end of the shaft 951 has an annular groove 954 for receiving the under edge of another depending notch 955 in the still same retaining plate 935. The connection of the retaining plate over size hole 936 notches 935 and 955 in the annular grooves 934, 948 and 954 of the respective shafts 931, 937 and 951 hold the shafts against axial displacement within the end plates 297 and 307 of the unit 286 and in a manner so that the shafts may easily be disassembled therefrom. The removable retaining plate 935 is held in place over the ends of those shafts 931, 937, and 951 on the left end plate 307 of the unit 286 by fastening screws 956 and 957. Upon removing this retaining plate 935, the grooved ends of the shafts can be lifted out of their respective notches 933, 947 and 953 in the left end plate 307 with their assemblies thereon, to be mentioned, and the right ends pulled from their respective openings 932, 938 and 952 in the left end plate 287.

At the rear of the right end plate 297 are upper and lower holes 958 and 959 for receiving respectively upper pivot and lower pivot arm supporting shafts 960 and 961. The upper pivot shaft 960 extends across the unit and through a notch 962 in the left end plate 307 and has a groove 963 on its left end for receiving the upper edge of an enlarged hole 964 of a removable vertically-extending retaining plate 965, FIGS. 25 and 31. The lower pivot arm supporting shaft 961 from the hole 959 in the right end plate 287 extends across the unit 286 and through a supporting hole 966 in the left end plate 307. The left end of the shaft 961 has an annular groove 967 that receives a depending notch 968 of the same vertically-extending retaining plate 965 to retain the shaft 961 in the end plate holes against axial displacement. The retaining plate 965 is made secure upon the end plate 307 by a single fastening screw 969. Each one of the shafts 931, 937, 951, 960 and 961 have arm assemblies upon them and in the manner just set forth, can readily be removed from the unit for repair or replacement by simply removing these two retaining plates 935 and 965 and except for the shaft 961, the shafts are lifted from their notches in the left end plate 307 and withdrawn from their openings in the right end plate 297. The shaft 961 since it is only a pivot supporting shaft without arms fixed thereto can be pulled through the hole in either end plate of the unit. Thus, it can now be seen that not only this unit 286 can be quickly detachable from the supporting frame 169 but the various parts of the unit itself can be quickly detached from its own supporting frame.

1. TRANSFER GEAR ASSEMBLY RELEASE PARTS (FIGS. 25 TO 31)

The pivot shaft 931 in the upstanding forward portions 929 and 930 of the unit 286 and pivotally supports a key lock out device 970 on right end thereof, which for now will not be described beyond that the device is so supported on the shaft 931. Spaced from the lock out devices 970 and equally spaced from one another are six operating arms 971, 972, 973, 974, 975 and 976, that extend rearwardly and have respectively on their rear ends upwardly-extending hook formations 971', 972', 973', 974', 975', and 976'. Each of these hook formations have a forwardly-facing inclined cam edge 977, and forwardly of the hook formation and on the upper edge of each operating arm is another forwardly-facing inclined cam edge 978. These operating arms extend rearwardly parallel to one another in the same transverse plane, and are rigidly secured to the shaft 931 as by welding or brazing. The operating arms on this shaft 931 are raised and lowered together and are connected with the lock out device 970 through a torsion spring 979 on the shaft 931 and connected between the arm 971 and the lock out device 970. The lock out device 970 has spring-biased independent pivotal lost-motion movement between limits upon the shaft 931 so that movement of the shaft and the fixed arms may be had independently of the lock out device 970 or vice versa.

The pivot shaft 937 is operated by the bifurcated pivot arm 939 at the right end of the unit to which is detachably connected pin arm 944 extending from the right side plate shaft 945. At the left end of the shaft 937 there is a forwardly and upwardly extending arm 980 rigidly fixed thereto, while at the right end of the pivot shaft 937 just left of the lock out device 970, there is rigidly fixed, a co-extending parallel arm 981, to the shaft 937. Rigidly connected to and between the outer ends of these parallel arms 980 and 981 is a transverse work rod 982 running parallel to the pivot shaft 937. When the machine is neutral the fixed rearwardly-extending operating upstanding hook arms of the forward shaft 931 are all held elevated toward the transverse rod 982 by the torsion spring 979 and the lock out device 970 so that it can work upon the forwardly-facing inclined cam edges 978 of the several operating arms of the shaft 931. As the machine is started and for certain operations as when taking accountings from the totalizers, the pivot shaft 937 is turned rearwardly so that transverse rod 982 runs over the cam edges 978 and depresses all of the upstanding hook ends to release them from the pins 645 on the push slide plates 671 of all of the respective several value key units FIGS. 22, 24, 26 and 27, the purpose of which will become more apparent as the description proceeds.

The push slide plate pins 645 respectively engage forwardly and upwardly inclined upstanding ends 983', 984', 985', 986, 987' and 988' of respective rocker arms 983, 984, 985, 986, 987 and 988 that are respectively pivotally supported on the pivot arm supporting shaft 951. At times when the total amount of accountings stored in the totalizers are to be given and the machine put in operation, this transverse rod 982 not only depresses the rearwardly-extending operating arms of the forward pivot shaft 931 but engages the forward ends of the push slide plates 671 of the several value key units themselves, FIG. 27, to cause all of the pins 645 of the slide plates, that always engage the upstanding arms of the rockers, to lift all of the rockers and thereby simultaneously release all of the gear transfer unit assemblies so that they may rotate as a unit at this time. Each of these rockers 983, 984, 985, 986, 987 and 988 have long spacing hub sleeves 989 fixed thereto and the rockers assembled in sequence upon the shaft so that the respective rockers can pivot independently thereon at other times when accountings are being put onto the totalizers. Each of these rockers has a bifurcated rearwardly-extending arm 990.

On the rocker supporting pivot shaft 951 at the right end thereof is the transaction key rocker 584 with its upstanding forwardly extending end 584' and a spacing hub sleeve 991 by which the rocker is journalled on the shaft 951 and which spaces the rocker 584 from the right end plate 287 of the unit. The other rockers are in turn spaced from the rocker 584 and from each other by their spacing sleeves 989. All of the rockers are held against sliding movement on the shaft 951 toward the left thereof by a spacing collar 992 at the left end of the shaft 951 between the rocker 988 and the left end plate 307. Each of the rockers also has a depending and rearward-extending stop arm 993 that engages the fixed spacing rod 927 to limit the downward pivotal movement of its upstanding forward end and is biasingly held thereagainst by a tension rocker return spring 994 anchored by a ring 995 to the fixed spacing rod 927 and fastened to a laterally-extending pin 996 on the forward portion of the rocker.

On the pivot arm supporting shaft 961, there is assembled a plurality of upstanding hook arms 997, 998, 999, 1000, 1001, 1002 and 1003 corresponding respectively to and operated by the bifurcated arms 990 of the respective rockers 584, 983, 984, 985, 986, 987 and 988. These upstanding hook arms respectively have rearwardly-extending hook projetcions 997', 998', 999', 1000', 1001', 1002' and 1003' adapted to respectively engage laterally-extending catch projections 1004, 1005, 1006, 1007, 1008, 1009 and 1010 on respective gear assemblies of the rotary transfer unit 340, FIG. 42, to be later named and for a purpose to be set forth later on. Each of these respective upstanding hook arms on the pivot arm supporting shaft 961 have a spacing hub sleeve 1011, the spacing hub sleeve for the pivot arm 997 adjacent to the right end plate 287 being but a short one, not shown, while the spacing sleeve hub for all the other hook arms being long ones. The spacing hub sleeves of these pivot arms serve to space the arms from the right end plate 287 and from each other. A collar, not shown, is provided on the left end of the pivot supporting shaft 961 to hold the last upstanding pivot hook arm 1002 in spaced relation from the left end plate 307 of the unit.

Each of these upstanding pivot hook arms also respectively have forwardly-extending arms 1012 with laterally-extending pins 1013 for respectively receiving the bifurcated rearwardly-extending arms 990 of respective rockers 584, 983, 984, 985, 986, 987 and 988 so that the respective pivot hook arms 997, 998, 999, 1000, 1001, 1002 and 1003 are worked by the respective rockers as the rocker bifurcated arms 990 are depressed, these upstanding pivot hook arms are retracted forwardly to release respectively the respective laterally-extending catch projections 1004, 1005, 1006, 1007, 1008, 1009 and 1010 of the respective gear assemblies of the rotary transfer unit.

The upper pivot shaft 960 has seven downwardly-extending parallel stop catch arms 1014, 1015, 1016, 1017, 1018, 1019 and 1020 rigidly secured thereto that are equally laterally-spaced from one another. The right and left stop arms 1014 and 1020 are less and similarly spaced from the respective end plates 287 and 307. These stop catch arms respectively have left laterally-extending catch projections 1014', 1015', 1016', 1017', 1018', 1019' and 1020' that respectively releasably engage respective spring-biased hook catches 1021, 1022, 1023, 1024, 1025, 1026 and 1027 on the respective gear assemblies of the rotary transfer unit 340, FIGS. 26, 27 and 42, for a purpose to be later made more apparent.

The pivot shaft 960 has a forwardly-extending operating arm 1028 at its right end with an outwardly and laterally-extending stop projection 1029 that lies in a recess in the upper edge of the right end plate 287 to thereby limit the upward turning movement of the stop catch arms 1014 to 1020 and their rearward extent, FIGS 25 to 29.

The operating arm 1028 is biased against the end plate recess 1030 by a tension spring 1031 anchored to a pin 1032 on the inner face of the right end plate 287 and connected to a pin 1033 on the outer end of the stop operating arm 1028.

Extending inwardly through the right mounting bracket plate 293 for this unit 236 and the right side frame plate 287 is a pivot shaft 1034, FIGS. 28, 93 and 94. This pivot shaft 1034 has a rearwardly-extending fixed arm 1035 that engages the underside of the laterally-extending stop projection 1029 of the stop operating arm 1028. A cam follower 1036 is fixed outside of the right side frame plate 287 to the outer end of the pivot shaft 1034 by its set collar 1037 and screw 1038 and engages the II cam 861 of the first cam group 479, FIG. 89. At the beginning of the cycle of operation, the catch arms release the drag levers of the gear assemblies and the indicating wheels are returned to their non-indicating positions in a manner which will be better understood from the later description.

2. KEYS LOCK OUT DEVICE 970 (FIGS. 25 TO 36)

The keys lock out device 970 comprises an inner set collar 1040, FIG. 30, that is fixed to the forward pivot shaft 931 by a set screw 1041. The set collar has an upstanding short bifurcated arm 1042 in which the bifurcation is sufficiently wide to more than accommodate the diameter of a top spacing bar 1043 and to allow spacing bar to have fore and aft lost-motion movement therein.

A rearwardly-extending hook arm 1044 having a depending hook end 1044', is pivoted on the pivot shaft 931 by a vertically-extending elongated hub 1045 laterally-spaced to the right from the set collar 1040 and to the upper end of which the top spacing bar 1043 is fixed and to the lower end of which a parallel spacing bar 1046 is fixed. These spacing bars 1043 and 1046 are connected to a laterally-spaced similar-shaped elongated hub plate 1047 pivotally carried on the shaft 931 on the opposite side of the set collar 1040 and to which the torsion spring 979 is anchored to resist the upward turning movement of the lock out hook arm 1044 relative to the upstanding hook arms 971 to 976. The other end of the torsion spring 979 being anchored to the first hook arm 971 fixed to the pivot shaft 931. This torsion spring 979 is biased to rotate the lock out device 970 in a clockwise direction as viewed from the right end of the unit 286 with its hook end 1044' lying over the left side pin 583 on the push slide plate 556 of the transaction key unit 216, FIGS. 5, 33 to 34. A small cam support lever 1048 is pivoted on a pin 1049 on the inner face of the hook arm 1044 and is also biased to turn in a clockwise direction as viewed from the right end of the unit 286 to have a top lug 1050 resting against the upper edge of the hook arm 1044 and so held thereagainst by means of a short tension spring 1051 anchored to the top spacing bar 1043 and connected to an inwardly-extending bottom lug 1052 on the forward end of the lever 1048. This small arm support lever 1048 has its lower edge 1048' normally extending below the lower edge of the hook lever 1050 that rests on the push plate pin 583 to hold the hook lever 1044 in a neutral position upon the pin 583 of the push plate 556 of the transaction key unit 216 and relative to the hook end 1044', FIG. 33, so that the hook end 1044' of the hook arm 1044 over the pin 583, FIG. 34, or drawn to an unhooked position over this pin 583 and along an inclined edge 1053 on the hook end 1044' so that an under edge 1054 of the hook end 1044' of the hook arm 1044 and to allow the push plate pin 583 to push against the forwardly and upwardly-extending portion 584' of the rocker lever 584 that releases the transaction gear assembly of the transfer unit 340 and without interference from the hook end 1044'.

On assembling the transaction key unit 216 on the transverse spacing bars 209 and 210, the lock out device 970 is slid to the left on the pivot shaft 931 by compressing the torsion spring 979 so that the hook end 1044' of the hook arm 1044 can be laterally-displaced to allow the pin 583 on the push slide plate 557 and the transaction key unit 216 to be lowered into place and the hook end 1044' to be elevated and placed upon the pin 583. In the FIGS. 33 to 36, there is shown the relative positions of this hook arm 1044 for the lock out device 971 and the hook arms 971 to 976 for the value key units when in their neutral positions and when first a key of the transaction unit 216, and then a key or keys of a value key unit or units, is depressed.

The lock out device 970 through the spring-biased small lever 1048 keeps the pin 583 normally out of the interior of the hook end 1044' and adjacent to the inclined work edge 1053 on the hook end 1044'. The pin 583 is thus kept unhooked by this means when the parts are in their neutral positions. Also, in the neutral position, the upstanding ends 983' to 988 of the rocker arms 983 to 988 'for the value key units 217 to 221 are all transversely aligned with the upstanding end 584' of the rocker arm 584 for the transaction key unit 216. The upstanding ends 983' to 988 of rocker arms 983 to 988 rest forwardly against the respective pins 645 of the value key unit push plates 671 while the upstanding end 584' of the rocker arm 584 rests forwardly against the pin 583 of the transaction key push plate 556. The upstanding hook arms 971 to 976 for the value key units extend up while the depending hook arm 1044 of the lock out device for the transaction key unit extends down so that the hook arm of the value key units work in opposition to hook arm 1044 for the transaction key unit. These hook arms thus serve to lock out on a key being depressed on one unit the keys from the other unit.

Figure 34:
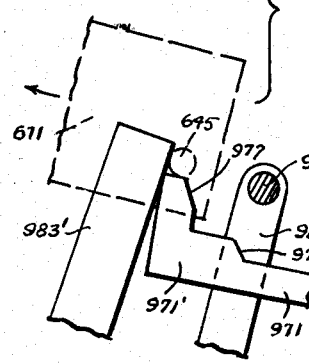

If a key button of any of the value key units 217 to 221 is depressed, the upstanding hook arms 971 to 976 on the shaft 931 and the depending hook arm 1044 of the transaction key unit will assume the positions shown in FIG. 34, the hook arm 971 will have been depressed by the rearward thrust of the push plate 617 of the value key unit 217, due to the action of the key plate upon an inclined projection of the push plate and the riding of the pin 645 against the inclined edge 977 of the upstanding hook end 971' so that the hook end 971' is depressed to a point below the pin so that the upstanding end 983' of rocker arm 983 will be lifted rearwardly by the pin 645 since the hook arm 971 is depressed downwardly out of the way. Through the bifurcated portion 990 of the rocker arm 983 acting upon the pin 1013 of the forwardly-extending operating arm 1012 of the upstanding hook arm 997 the hook arm 997 is pivoted forwardly to disengage its hook end 998' from the laterally-extending catch projection 1005 of the gear assembly on the rotary transfer unit 340 so that this gear assembly will be free to turn when the machine is started.

The depending hook arm 1044 of the lock out device 971 aligned with the upstanding hook arm 971 of the transaction key unit 216 will have been worked in the opposite manner, FIG. 34, the depending hook arm 1044 and its hook end 1044' will have been pulled through the torsion spring connection 979 by the value key hook arm 971 and shaft 931 and dropped against the action of small spring lever 1048 so that the pin 583 is made home under the hook end 1044' and the push slide plate 556 of the transaction key unit 216 will be positively locked against rearward movement and made ineffective to operate its rocker arm 584 and upstanding catch hook arm 997 and release the gear assembly of the transfer unit 340. The push plate 556, being locked, prvents the transaction keys from acting through the inclined projections of the push plate 556 to move the push plate and accordingly the key button from being depressed. None of the summation keys "A," "B," "C," "E" and "F" can be depressed at this time. Since the keys "D" and "G" are not summation keys and merely deal with single items, and push slide plate 556 does not have any inclined projections therefor these two key buttons "D" and "G" may thus be depressed with the value key buttons and the transaction gear assembly of the transfer unit released.

If now instead of the value key being depressed, a summation transaction key button is depressed, that is the summation keys "A," "B," "C," "E" and "F," not single item keys "D" and "G," but keys where the transfer unit must be totally released in order that the accumulations on the totalizers can be transferred from the front totalizer to the rear totalizer and/or from a totalizer to the indication mechanism unit 232 to give a summation reading, the value keys are prevented from being operated at this time by this same lock out device 970.

Figures 33, 35, 36:
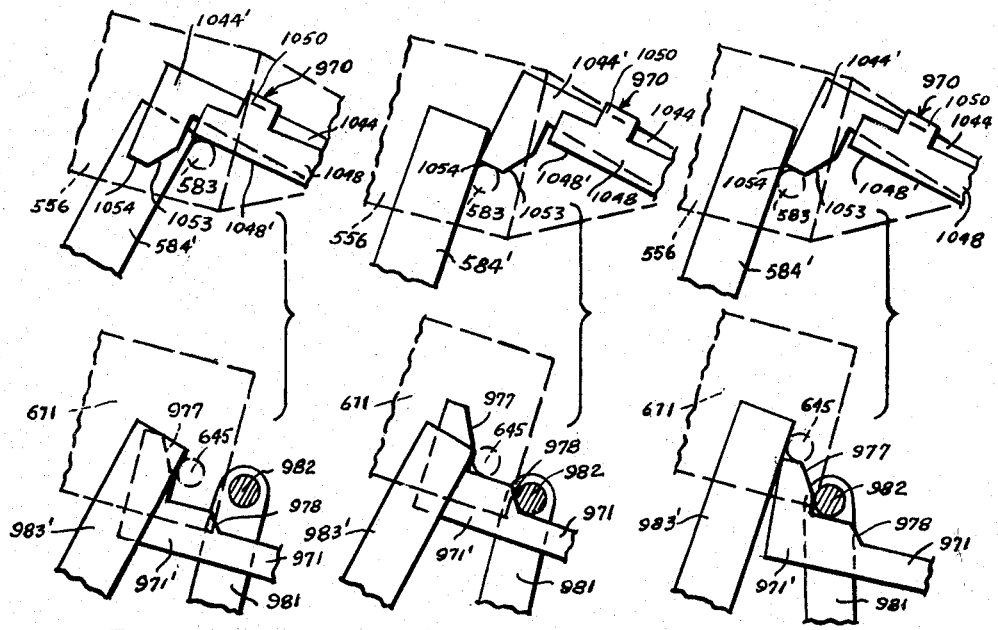

Assume the total adding machine summation key button "A" is depressed, the transaction key push plate is moved rearwardly and its pin 583 is pulled along the inclined edge 1053 of the hook end 1044' to thereby raise the hook arm 1044 so that its tip end 1054 rests on top of the pin 583, and out of the way, FIGS. 35 and 36. The pin 583 will have been made free and will have acted upon the upstanding forward end 584' of the rock lever 584 to lift the rock lever 584 through its rearwardly-extending bifurcated arm 990, pin 1013 and operating arm 1012 to pivot the upstanding hook catch arm 997 forwardly whereby to release the gear assembly 554 of the rotary transfer unit 340. The same can be done by depressing the key buttons "B," "C," "E" and "F" but not so with the "D" and "G" keys for the reasons set forth just above.

At the same time the summation key "A" is depressed, the lock out arm 1044 is raised by the rearward working of the pin 583 on its inclined edge 1053 and the upturned hook arms 971 to 976 are raised in unison to locate the pin 645 of the push slide plates 556 of all the value key units 217 to 221 home in front of the hook ends 971' to 976', FIG. 35, to positively lock all of the push slide plates 556 and the key buttons of the value key units against operation. The push plate pins 583 will thereby be prevented from acting upon the upstanding forward ends 983' to 988' of the rock levers 983 to 988 so that they cannot be lifted at this time by the value key push plates 556. The lifting of the transaction depending hook arm 1044 will have acted upon the torsion spring 979 to lift value key upstanding hooks arms 971 to 976 to positively locate the hook ends 971' to 976' behind the pins 645 to prevent the push slide plates from being operated by the key buttons of the value units. After the "M" button has been depressed and the machine has been started transverse rod 982 of the pivot shaft 937 is pivoted forwardly to work the forward inclined edges 978 of the upturned hook arms 971 to 976 and depress them so that the rod 982 can act upon the front end edge of the value key push plates 971 to move all of them in unison to cause their pins 645 to lift the rockers 983 to 988 and release the upstanding hook catch arm 998 to 1003 to thereby now permit all of the gear assemblies of the rotary transfer unit to be rotated for the summation operation.

3. TRANSVERSE PUSH ROD PIVOT SHAFT OPERATING LINKAGE 937 (FIGS. 25, 30, 85, 93 AND 94)

Since the pivot shaft 937 has the bifurcated swing arm 939 fixed to the right end of the shaft 937 at the right side of the unit 286 that is detachably connected to the pin 943 on the pivot arm 944 of right side pivot 945, this shaft 937 that moves the transverse push rod 982 upwardly and rearwardly to work the inclined edges 978 of the upturned hook arms 971 to 976 of the release unit 286 is worked by this pivot shaft 945. The outer end of the shaft 945 outside of the right side frame plate 207 is made secure against inward displacement by an upwardly and forwardly extending pivot arm 1055 fixed to the shaft by its hub collar 1055' and a set screw 1055", FIG. 85. The upper end of this arm 1055 has a work pin 1056 that extends into an upright dog leg slot 1057, having a raised work part 1058, in the forward end of a long top link 1059.

The top link 1059 is kept elevated in the neutral position with the pin 1056 on the upper end of the arm 1055 out of the raised part 1058 of the slot 1057, FIG. 85, by a pivot arm 1060 fixed to a shaft 1061 that is journalled in a sleeve pin 1062 extending inwardly from the right side frame plate 207 and having on its inner end the bifurcated pivot arm 582 into which the right side pin projection 581 on the forward end of the transaction key unit push slide plate 556 extends, FIGS. 5, 6, 11, 93, 94. The pivot arm 1060 is fixed to the shaft 1061 by its set collar 1063 and a set screw 1063' and is pivoted downwardly in the clockwise direction as viewed in FIG. 85, when a summation transaction key push button "A," "B," "C," "E" or "F" is depressed and its push plate 556 moved rearwardly to cause the push plate pin 581 to pull the bifurcated pivot arm 582 rearwardly against the action of the push slide plate tension spring 579, FIG. 11.

The upper end of the arm 1060 operated by the push slide plate 556 and this shaft 1061 has an outwardly-extending roller pin 1064 on which a grooved roller 1065 is journalled and seats the under edge of the long top link 1059 and through its arm 1060 normally supports the link 1059 in its elevated position against the under side of the pin 1056 on the rearwardly-extending pivot arm 1055. Thus when one of these transaction key buttons is depressed, the roller swing arm 1060 is lowered thereby in the manner just described and the pin 1056 is then put into the raised work part 1058 of the dog leg slot 1057 of the link 1059 so that the pivot arm 1055 fixed to the shaft 945 is made ready to be operated by the forward movement of the long top link 1059 as the machine is put into operation. When the machine is thus started and immediately at the beginning of the cycle of operation, the pivot shaft 937 is worked by the shaft 955 and rotatably forces its transverse rod 982 over the inclined edges 978 of the upstanding hook arms 971 to 976 thereby to cause the release in unison of all of the value key gear assemblies of the rotary transfer unit 340. With the link 1059 so lowered by the arm 1060 and the machine started, the top link 1059 will be pulled forwardly by the working of a cam follower lever 1066 by a VIII cam 1067 of the first cam group 479, FIGS. 85 and 89. The cam follower lever 1066 has a spacing hub sleeve 1068 that is journalled on the sleeve support 815 extending outwardly from the right side frame plate 207, FIGS. 20 and 21, and has an upwardly-extending crank 1069 that is pivotally connected at its upper end to the rear end of the top link 1059 by a pivot pin 1070. The cam follower 1066 is urged toward its cam 1067 and the pin 1056 of the swing arm 1055 in the rear end of the dog leg slot 1057 against the rear end thereof by a long tension spring 1071 connected to a pin 1072 on the rear end of the top link 1059 and anchored to a pin 1073 extending outwardly from the right side frame plate 207. Accordingly when a summation key button "A," "B," "C," "E" or "F" of the transaction key unit 216 is depressed, the link 1059 is lowered for engagement of the pin 1056 with the upper slot part 1058 so that the swing pivot arm 1055 is worked by the link 1059 through the cam follower 1066 on the cam 1067, as the machine is started and the cam 1067 is rotated, FIG. 85. At all other times, the top link 1059 runs free upon the grooved roller 1065 on the rearwardly-extending pivot arm 1060 and the pin 1056 of the upwardly-extending pivot arm 1055 runs free in the top link slot 1057. A stop pin 1073' on the side frame plate 207 is engaged by the forward edge of the arm 1055 to limit its forward movement and keeps its pin 1056 vertically aligned with the top part 1058 of the dog leg slot 1057 of the top link 1059 when in the neutral position and link ready to be lowered onto the pin 1056.

The mounting of the rotary transfer unit release in the supporting frame 169 and keys lock unit 286, its detailed construction and operation should now have been made clear and need only to be described further in the description of the general operation of the machine.

*I. Detail Construction of Front and Rear Totalizers 317, 318 (FIGS. 37 to 41)*

Since the front and rear totalizers 317 and 318 are of identical construction, a description of only one of these totalizers will be given. These totalizers 317 and 318 respectively have the right and left end plates 327, 328 and 329, 330 as above set forth in the description of the manner in which these units are mounted in the supporting frame 169 for quick detachment. The end plates 329 and 330 of the rear totalizer 318, this totalizer to be the one described, as only this one is shown in full, FIG. 37, are rigidly connected to the ends of two bottom transversely-extending spacing rods 1074 and 1075, one rod disposed behind the other. The end plates 329 and 330 carry the upper and lower mounting rollers 335, 336 and 337, 338 on their outer faces by which the totalizer is slide fitted in the guideways 325 and 326 of the guide plates 321 and 322 that are respectively fixed to the right and left side frame plates 207 and 208. The end plates 329 and 330 and these rods 1074 and 1075 constitute the supporting frame of the totalizer.

Inwardly of these respective end plates 329 and 330 and held in spaced relation therefrom by the respective upper and lower spacing pins 351, 352 and 353, 354, are the respective right and left inner plates 349 and 350. The lower spacing pins 352 and 354 respectively have the rollers 355 and 356 by which the bifurcated portions 367 and 368 of the respective feed plates 363 and 364 of the totalizer feed and retaining device 358 carry and feed the rear totalize toward the transfer unit 340, FIGS. 37 to 40. These inner plates 349 and 350 respectively have downwardly and rearwardly inclined slots 1076 and 1077 into which the ends of a pivot shaft 1078 are lowered and retained respectively by vertically-extending retaining plates 1079 and 1080 detachably carried on respective supporting pins 1081 and 1082 extending from the inner faces of the inner plates 349 and 350. Carried in grooves on the outer ends of the supporting pins 1081, 1082 and upper pins 1083, 1084 extending inwardly from the respective inner plates 349, 350 are bent wire clips 1085 and 1086 to hold the retaining plates 1079 and 1080 against inward displacement from the pins 1081 and 1082. The pivot shaft 1076 has its ends extending into the spaces between the inner and outer end plates and is held against axial displacement therein by the unslotted outer right and left end plates 329 and 330.

On the inner plates 349 and 350 and lying respectively above the respective slots 1076 and 1077 are upper similar downwardly and rearwardly-inclined slots 1087 and 1088 in which grooved ends 1089 and 1090 of a transversely-extending totalizer gear supporting shaft 1091 are disposed and retained against axial displacement by the grooves registering with the slot edges. This gear supporting shaft 1091 is retained in the slots 1087 and 1088 by the same removable vertically-extending retaining plates 1079 and 1080 that retain the pivot shaft 1078 in its slots 1076 and 1077.

On this shaft 1091 and spaced some distance from the right end of the totalizer and from each other are six totalizer amount receiving gears, 1092, 1093, 1094, 1095, 1096 and 1097 having respectively ten gear teeth. Each one of these gears has a spacing hub sleeve 1098 to hold the gears in equal spaced relationship with one another and the left end gear 1097 spaced from a set collar 1099 and set screw 1100 that can be adjusted along the shaft to align the gears with the several gear assemblies of the transfer unit 340 respectively having fixed to the left side thereof tens-transfer disks 1101, 1102, 1103, 1104, 1105 and 1106. These tens-transfer disks respectively have a single gear tooth projection 1101', 1102', 1103', 1104', 1105' and 1106' to transfer the tens from one totalizer gear to the next other through rotary transfer unit 340 in a manner to be later described in detail. Each tens-transfer disk is held spaced from the left face of its totalizer gear by a spacing flange 1107 that is enlarged from and integral with one end of the sleeve bushing 1098. The tens-transfer disk and the totalizer gear is made secure to opposite face of the spacing flange 1107 by rivets 1108, FIG. 41. The spacing hub sleeve 1098 with their respective gears are closed upon one another in abutting relationship but in a sufficiently loose manner to permit free turning of one gear independently of the other. The spacing hub sleeves and their gears are held in this closed relationship and against the left set collar 1099 and spaced from the right end plates of the totalizer by a right set collar 1109 and its set screw 1110.

The pivot rod 1078 that is journalled in the downwardly inclined inner plate slots 1076 and 1077 has right and left forwardly and upwardly-extending parallel arms 1111 and 1112 fixed thereto and connected between their outer ends is a transversely-extending equalizer rod 1113 of a diameter to fit between the teeth of the totalizer gears to equalize their positions with respect to one another and to lock them against turning movement on the shaft when the totalizer has been retracted from engagement with the rotary transfer unit 340. Projecting upwardly and forwardly from the right end of the rod 1078 is fixed an operating pin arm 1114 adapted to engage as the totalizer is elevated into engagement with the transfer unit a stop pin 1115 projecting inwardly from the side of the guide plate 321, FIG. 38. By this means, the totalizer gears are held against turning movement in their retracted position but just as their teeth enter the transverse unit teeth, the transversely-extending pivot rod 1078 and the pin arm 1114 are turned by the guide plate stop pin 1115, and the equalizer lock rod 1113 is turned away from the totalizer gears to allow them to be controlled and rotated by the gears of the transfer unit 340. In order that the totalizer gears will be automatically locked as the totalizer is retracted and as the totalizer gears are taken out of mesh from the transfer unit gears, a tension return spring 1116 is connected to the pin arm 1114 and anchored at its opposite end to the upper right end plates spacing pin 351, FIGS. 37 and 40, and pivots the rod 1078 to move the lock rod 1113 into the totalizer gears. Thus, totalizer gears equalizer and lock rod 1113 will come automatically into play to hold the totalizer gears in any newly adjusted positions that may have been made of them. In should still be understood that the above detailed description has been directed to the rear totalizer and that the numerals have been applied to the showing thereof but the description and numerals will be applied in full to the front totalizer and the showing thereof.

*J. Detail Construction and Operation of Rotary Transfer Unit 340 (FIGS. 4, 5, 7, 12, 17, 22, 42 to 76, 80, 93)*

The rotary transfer unit 340 has the heavy central sleeve bushing support 431 on which seven independently operable gear assemblies 554, 1117, 1118, 1119, 1120, 1121, 1122, FIGS. 42, 45, 48, 52, 58 and 61 journalled with all but the last assembly 1122 being respectively engaged by the respective rack bars 542 and 658 of the respective transaction and value key units 216, 217, 218, 219, 220 and 221, FIGS. 1, 5, 22, 45, 58 and 61, and from these units the key amount is taken by the respective gear assemblies of the transfer unit 340 and put into front or rear totalizer 317 or 318 and simultaneously into the indicating mechanism unit 232 to give a reading of the amount of the transaction for the value keys that are depressed. This transfer unit 340 also serves to transfer accounting from the front totalizer 317 to the rear totalizer 318 and simultaneously transfers the amount of the accounting to the indicating mechanism unit 232 for a reading to be given. These operations will become more apparent as to how they are performed after the detail description of the construction and operation of this transfer unit and the general operation of the machine has been made.

The central sleeve bushing 431 has the hole 432 extending throughout the full length thereof through which the rotary transfer unit center attaching pull rod 339 is extended to releasably support the transfer unit 340 within the supporting frame 169 and between the side frame plates 207 and 208. On this central bushing the seven transfer gear assemblies for the respective transaction and value key units are mounted for independent operation as best shown collectively in FIGS. 42 and 52. This sleeve bushing 431 comprises a long smooth main supporting portion 1123 extending to the left from a right end stop flange 1124. Extending to the left end of the main supporting portion 1123 of this bushing 431 is a first reduced diameter threaded portion 1125, a reduced diameter short smooth portion 1126 extending from this threaded portion 1125 and a second reduced diameter threaded portion 1127 extending from the short smooth portion 1126, FIG. 52. Extending to the right from the flange 1124 is a reduced diameter smooth portion 1128 and from which there extends a reduced diameter threaded portion 1129 providing thereby a shoulder 1130 therebetween. The reduced diameter portions 1125, 1126 and 1127 of the central sleeve bushing 431 besides the flange 1124 provide respectively shoulders 1131, 1132 and 1133. The transfer unit center attaching pull rod 339 extending through the central hole 432 in the transfer unit sleeve bushing 431 has the threaded ends 413 and 415 for receiving respectively the right hand and left hand bushing nuts 412 and 414, FIGS. 42 and 52. The seven gear assemblies 554, 1117, 1118, 1119, 1120, 1121 and 1122 are made as units and are assembled in that order on the central bushing smooth main supporting portion 1123 by placing them over the reduced diameter portion of the left end thereof and moving them to the right against the right end stop flange 1124 of the sleeve bushing 431.

1. DESCRIPTION OF TRANSACTION GEAR ASSEMBLY 554 (FIGS. 5, 7, 9, 12, 42, 45 to 47, 51 TO 54)

A detailed description will now be made of the gear assemblies 554 that is operated and controlled by the transaction key unit 216 through its rack bar 542. There is much similarity in the construction and operation of all seven gear assemblies. As a matter of fact, the last five assemblies 1118, 1119, 1120, 1121 and 1122 are identical upon the bushing 431 and accordingly, the description may be limited to but the first three assemblies 554, 1117 and 1118 and like numerals may apply throughout the several assemblies when the parts are the same. A description will be made first of this gear assembly 554, then of the gear assembly 1117 and finally of the gear assembly 1118. The description of the gear assembly 1118 will suffice for the gear assemblies 1119, 1120, 1121 and 1122. This gear assembly 554 has a back plate 1134 with a hub portion 1135, FIGS. 45 to 47, and 52. A sleeve bushing 1136 that mounts the gear assembly 554 onto the main smooth portion 1123 of transfer unit bushing 431 and against the flange 1124 thereof, extends inwardly from the back plate hub portion 1135. This sleeve bushing 1136 has a spacing flange 1137 on its right end and the back plate hub portion 1135 is fitted inwardly from the right end of the bushing 1136 and against the flange 1137 and the right end of the bushing 1136 is peened to hold the back plate thereupon. Upon this bushing 1136 the four main parts of the gear assembly 554 are mounted and the gear assembly is mounted upon the transfer unit bushing 431.

Forwardly of the hub projection 1135 of the back plate 1134 and extending outwardly from the right side face is a headed pivot pin 1138 on which a vertically-extending cam lever 1139 is mounted for limited pivotal movement in a vertical plane, FIGS. 45 and 46. This pivot pin 1138 has a spacing sleeve 1140 to hold the cam lever 1139 spaced outwardly from the face of the back plate 1134 and against the head of the pivot pin. The cam lever 1139 has a depending arm 1141 that extends between two stop pins 1142 and 1143 to limit the rearward and forward pivotal movement of the upper end cam lever 1139. A tension spring 1144 is connected to the cam lever 1139 and to the stop pin 1143 to normally hold the depending stop arm 1141 against the forward stop pin 1142 and with the upper end of the lever in its rearward position as shown in FIGS. 42, 45, 46 and 52.

The upper end of the cam lever 1139 has a flat extension 1145 that runs coextensively therewith and is formed by bending inwardly through ninety degrees from the rear edge of the cam lever so that it extends laterally inwardly therefrom and directly above the lever spacing sleeve 1140 and between the right face of the back plate 1134 and the main fore and aft portion of the cam lever 1139, FIG. 46. The heel of this extension 1145 of the lever 1139 has a downward and outwardly inclined cam edge 1146 that vertically overlies an upwardly-extending projection 1147 on the forward end of the back plate 1134 and that runs upwardly and coextensively with the lever 1139 to serve as a guide face over which the heel of the flat extension 1145 may bear to hold the cam lever 1134 true while it is being worked. The function of the cam edge 1146 is to operate parts of a transverse bar assembly 1148 that serves as the motivating part of the transfer unit and as will become apparent later on.

Extending inwardly from the rear end of the back plate 1134 is a fixed bushing sleeve 1149 having a flange 1150 spaced from the inner face of the back plate 1134 and between the flange and the outer face of the rearwardly-extending bifurcated arm 388 is journalled. This bifurcated arm 388 has an upstanding latch portion 1151 that lies just to the right of the gear teeth 1152 of a complete gear wheel 1153 of the gear assembly 554. This bifurcated arm 388 and its latch portion 1151 are operated by the vertically-swingable lock arm device 387 through a lost motion connection of its transverse rod within bifurcation 1154 of the arm 388, FIGS. 45 and 46. Extending inwardly from the latch portion is a pin 1155 on which a torsion spring 1156 formed of wire is mounted and that has one end anchored against an upper pin 1157 and the other end riding in a groove 1158 adjacent to the inner face of the arm 388 to give braking action to the pivotal movement of the bifurcated catch arm 388 that is pivoted upon the sleeve 1149. The fixed bushing 1149 serves to space the several gear assemblies of the transfer unit from one another at the rear of the unit as will be more apparent as the description proceeds. These bushings contain a pivot supporting shaft 1159 from which the mounting extension 422 of the transfer unit 340 extends for engagement with the slotted stud 423 on the right side frame plate 207, FIG. 42. All of the bifurcated pivot catch arms, 389, 390, 391, 392, 393, 394 and 395 are similarly and respectively provided with a braking torsion spring 1156 to frictionally retain the swing arms in their adjusted positions.

On the forward end and inner face of the back plate 1134, is fixed a stop plate 1160 that is adapted to be engaged by a stop plate 1161 fixed to the right face of the complete gear 1153 to limit the counterclockwise rotation of the gear 1153 to hold it in its neutral position, the back plate 1134, being fixed with the assembly of the transfer unit 340 in the supporting frame 169.

Extending inwardly from the rear end of the back plate 1134, FIG. 45, is a pin 1162 to which a long tension work spring 1163 is anchored. This tension spring is connected at its other end to another part of this gear assembly 554, in a manner and for a purpose to be soon mentioned. The central sleeve bushing 1136 has an intermediate portion 1164 and a reduced diameter inner end portion 1165 providing a shoulder 1166 on the sleeve bushing 1136, FIG. 52. The gear wheel plate 1153 has a fixed short sleeve hub 1167 that is journalled on the intermediate portion 1164 of the sleeve 1136 and against the flange 1137, and that serves when taken with the flange 1137 to space the gear wheel 1153 inwardly from the back plate 1134.

The gear wheel 1153 has a long arcuate slot 1168, FIG. 45 running to approximately one hundred and eighty degrees and through which there extends at right angles thereto the transverse bar assembly 1148 that is worked therein. This transverse bar assembly 1148 extends through similar slots in the gears of the other assemblies and runs from one end of the transfer unit 340 to the other end thereof. This transverse bar assembly 1148 is assembled endwise into these arcuate slots and in order to facilitate its assembly thereinto the arcuate slot is cut away on its upper edge as indicated at 1169. The stop 1161 retains the gear 1153 against the stop plate 1160 of the back plate 1134 to hold the gear against rotation forwardly and in its neutral position.

The latch portion 1151 of the bifurcated pivot arm 388 engages with an arcuate gear plate 1170 having gear teeth 1171 conforming in shape and size to the gear teeth 1152 of the gear wheel 1153 and is secured to the right face of the gear wheel plate 1153 by rivets 1172 to overlie the teeth 1152 thereof. The gear wheel 1153 has forty gear teeth 1152 while the arcuate gear plate 1170 has eleven gear teeth and openings with which the latch portion 1151 of the bifurcated pivot arm 388 may engage. Extending outwardly from the forward end of this gear plate 1170, is a stop pin 1173 that engages the upper stop edge 1174 of the back plate 1134 to limit the full rearward turning movement of the gear wheel 1153.

In the neutral position of the gear wheel plate 1153, the gear wheel is held with its stop 1161 against the back plate stop 1160 and against forward turning movement, by the latch portion 1151 of the bifurcated arm 388, the latch portion having been forwardly turned by the transverse rod 401 of the latch arms operating device 387 and held turned by this rod 401. When the machine is put into operation, the rod 401 is pivoted and turns downwardly the bifurcated arm 388 to release the latch portion 1151, the gear wheel 1153 to permit it to be rearwardly turned to the extent that gear rack 542 of the transaction key unit permits. At the end of the first turn of the hand crank and before the wheel 1153 is allowed to return to its normal forward position, the latch portion 1151 is returned for engagement with the gear teeth 1171 to prevent further rearward turning of the gear wheel 1153, and with the bar 401 merely dropping in the bifurcation of the arm 388 to allow ratcheting of the latch portion 1151 over the gear teeth 1171 and the gear wheel 1153 to be returned to its neutral position. At the end of the second turn of the crank and of the cycle of operation the bar 401 is again lifted to pivot the bifurcated arm and the latch portion 1151 into their latching position in engagement with the teeth 1171 and thereby to positively lock and retain the gear wheel 1153 in its neutral position with its stop plate 1161 right against the forward back stop 1160. The operation of the bifurcated pivot arm 388 will be better understood with the description of the other gear assemblies and of the latch operating device 387 and its cam for operating the same to be later made.

Radially inwardly of and adjacent to the forward end of the arcuate slot 1168 of the gear wheel plate 1153, is an elongated short arcuate slot 1175 behind which and flush upon the inner face of the gear plate 1153 is a dog leg shaped pivot arm 1176 pivoted thereto at one end and at the rear side of the central bushing 1136 by a flat headed pivot pin 1177. At the knee of the pivot arm 1176, is a pin 1178 extending inwardly to which a tension spring 1179 is connected to pull the lever 1176 in a forward direction and its upper free end 1180 against an inwardly-extending stop pin 1181, the tension spring 1179 being anchored to an inwardly-extending pin 1182 on the gear wheel plate 1153. The upper free end 1180 of the dog leg pivot arm 1176 itself has a small radially elongated hole 1183 that appears in the elongated slot 1173 of the gear wheel plate 1153, FIG. 45.

On the inner face of the gear wheel plate 1153 and overlying the long arcuate slot 1168 throughout the greater portion thereof, is a long arcuate-shaped plate 1184, fixed by rivets 1185 to the gear wheel 1153, and having an inclined cam edge 1186 that is common with the other gear assemblies but does not have any function on this assembly 554 that is operated by the transaction key unit 216. It will have function in connection with the gear assemblies as will be brought out in the later description of these gear assemblies. This same arcuate-shaped plate 1184 has at its forward end the inwardly-bent, laterally-extending, catch stop projection 1004 that is engaged by the hook end 997' of the upstanding hook arm 997 for the purpose of releasably holding the gear wheel 1153 and gear assembly 554 against full operation unless a transaction key button of transaction key unit 216 has been depressed. This hook arm end 997' lies in the path of movement of the catch projection 1004 just above the same and allows limited movement therebetween but not the full front to rear or clockwise movement of the gear plate 1153 as viewed in FIG. 45. The rack bar 542 of the transaction key unit has its teeth 543 in engagement with the teeth 1152 of the gear wheel 1153 and itself can move rearwardly a minimum amount without the keys being depressed but allows the gear wheel 1153 to rotate clockwise a greater extent upon the hook arm 997 being released from the catch projection 1004 and to a distance rearwardly, predetermined by and dependent upon one of the keys which may have been depressed.

Carried on the reduced diameter portion 1165 of the back plate sleeve 1136, is a radially-extending pivot arm plate 1187, FIGS. 48, 51 and 52, that has its hub 1188 journalled in opposing bushing parts 1189 and 1190 that fit over the reduced diameter bushing portion 1165 and are brought to bear against the sleeve shoulder 1166, FIG. 52. The pivot arm plate 1187 pivotally carries concentric inner and outer arcuate-shaped and radially-spaced transverse bar catch and drag gear levers 1191 and 1192. The inner transverse bar catch lever 1191 is pivoted on the outer face of the pivot arm plate 1187 by a pivot pin 1193. This lever 1191 has a depending arm 1194 from the lower end of which there extends outwardly a pin post 1195 to which a tension spring 1196 is connected. This tension spring 1196 is anchored at its other end to a pin post 1197 extending outwardly from the outer face of the pivot arm plate 1187 through an enlarged hole 1198 therein that limits movement of the transverse bar catch lever 1191 to between the edges of the hole 1198. The tension spring 1196 pulls upwardly upon the depending arm 1194 to expand the upper arcuate end of the lever 1191 and against the transverse bar assembly 1148, as illustrated best in FIG. 51, that is worked over an outer work edge 1199 of this lever 1191 as the transverse bar assembly 1148 is swung between its forward and rearward positions within the gear assemblies for a purpose to be later described. At the heel of the work edge 1199 of the lever 1191 is a catch depression 1200 into which the transverse bar assembly 1148 is received and resisted by an inclined cam edge portion 1201 against upward turning movement until sufficient force is applied to the bar assembly 1148 to work the assembly over the cam edge portion 1201 of the heel recess 1200 and to inwardly depress the lever 1191. Thus, the lever 1191 serves as a catch for retaining the bar assembly 1148 in its neutral position against turning except when adequate turning force is applied thereto in a manner which will later become apparent as the description continues.

The pin post 1197 that extends from the radially-extending pivot arm plate 1187 through the enlarged hole 1198 of the inner arcuate catch lever 1191 serves for the connection of the tension spring 1196 by which the catch lever 1191 is biased outwardly, also extends through the radially-elongated hole 1183 in the upper end 1180 of the dog leg-shaped pivot arm 1176 pivotally carried on the inner face of the gear wheel plate 1153 and through the elongated short arcuate slot 1175 of the gear plate 1153. Thus, this same pin post 1197 limits the relative pivotal movement of the dog leg lever 1176 with respect to the gear wheel 1153, as well as the movement of the arcuate catch lever 1191 upon the radially-extending plate 1187 and the further relative turning movement between the gear plate 1153 and the radially-extending pivot arm plate 1187 controlled by the ends of the elongated short arcuate slot 1175 in the gear wheel plate 1153. The dog lever 1136 and its tension spring 1179 and the pin post 1197 on the radially-extending pivot arm plate 1187 working in the short arcuate slot 1175 of the gear wheel plate 1153 provide a spring-biased lost motion connection between the pivot arm plate 1187 and the gear wheel plate 1153 so that upon the return forward movement of the transverse swing bar assembly 1148 with the gear wheel stop 1161 coming to rest against the back plate stop 1160, the pivot arm plate 1187 and swing bar assembly 1148 may forwardly overrun the gear wheel plate 1153 until the pin post 1197 and the pivot arm plate 1187 comes to a stop against the lower end of the short slot 1175 in the gear wheel plate 1153. This permits the transfer unit to accommodate the tens-transfer mechanism as will become apparent with the later description. If, however, on the first and rearward swing of the transverse bar assembly 1148, the hook end 997′ of the upstanding hook arm 997 does not release the catch stop projection 1104 of the long arcuate shaped plate 1184 fixed to the gear wheel 1153 for one operation, the transverse swing bar 1148 depresses inwardly the catch lever 1191 by riding rearwardly over the inclined cam edge portion 1201 and work edge 1199 thereof.

The radially-extending pivot plate 1187 has an upwardly-extending arcuate shaped arm 1202 with which the arcuate outer-shaped drag lever 1192 runs coextensively therewith and to which the drag lever 1192 runs coextensively therewith and to which the drag lever 1192 is pivotally connected intermediate its length to the upper end of the arm 1202 by a pivot pin 1203 and extends upwardly-rearwardly beyond the plate arm 1202. This drag lever 1192 has a drag hook depending end 1204 that engages with forwardly-inclined rounded gear teeth section 1205 of a pivot part of the gear assembly 554 soon to be described so that upon the return stroke of the drag lever 1192 as effected by the forward turning of the transverse swing bar assembly 1148 and the radially-extending pivot arm plate 1187 to which the drag lever 1193 is pivotally connected, the drag lever will pull the gear assembly pivot part forwardly therewith, that operates the indicating mechanism 232 to give the name of the transaction which has been effected. The drag lever releases the gear assembly part at the beginning of the next cycle, the workings of all this will become apparent as the description proceeds.

The heel of the drag lever 1192 has a radially-inwardly extending heel plate portion 1206 that is adapted to be engaged by the transfer swing bar assembly 1148 as it is swung forwardly in order that its drag end 1204 will be depressed radially inwardly to engage the rack teeth member 1205 against the action of a tension spring 1207 that is connected to an inwardly-extending pin 1208 on the heel of the drag lever 1192 and an inwardly-extending pin post 1209 on the pivot arm plate 1187, FIGS. 48 and 51. The inwardly-extending heel plate portion 1206 has an inclined rear work edge 1206′ on which the swing bar assemblies 1148 works to force radially outwardly the heel of the drag lever 1192 to depress its drag end 1204.

Carried on the arm plate 1187 below the heel plate portion 1206, is a small catch trip arm 1020 that is pivoted on a pivot pin 1211 extending from the inner face of the pivot arm plate 1187 and has an upwardly-extending inverted heel projection 1212. This heel projection 1212 is adapted to engage a depending shoulder 1213 at the heel of the drag lever 1192 so as to normally hold the heel 1206 against radial inward displacement with its drag end 1204 on the rounded gear teeth 1205 and against the action of the tension spring 1207 tending to release the drag lever hook end 1204 from the teeth 1205. The drag lever hook end 1204 is forced into engagement with teeth 1205 by the engagement of the swing bar assembly 1148 on its return forward movement and is held in its gripping position by the small catch trip arm 1021. When the swing arm assembly 1148 forces the pivot arm plate 1187 and drag lever forwardly after having swung the plate and lever forwardly, the drag lever 1192 brings the rack teeth and the parts to be soon named, and effects an indication of the transaction indicating wheel in the housing window opening 223, FIG. 3.

This part bearing the teeth 1205 is released at the beginning of a new cycle of operation, by the engagement of the catch trip arm 1020 with the lateral extension 1014′ of the downwardly-extending stop catch arm 1014 of the transfer release and lock unit 286 so that the rearmost gear and the catch lever 1021 are depressed against the action of its tension spring 1214 anchored to its stop pin 1215 carried on the pivot arm plate 1187 and connected to pin 1216 on the depending end of the catch trip arm 1021, FIGS. 51, 53 and 54. When this is done the depending shoulder 1213 on the heel of the drag lever 1192 will be released from the inverted heel projection 1212 of the catch trip arm 1021 so that the drag lever hook end 1204 releases the gear teeth and the parts thereof so that they are returned to their rearward and non-indicating position ready to be picked up again by the drag lever 1192. The upstanding projection 1212 of the catch trip arm 1021 will then rest against the lower end of the shoulder 1213 of the drag lever 1192 in the manner shown in FIG. 53. The stop pin 1215 has a flange 1215′ that serves as a guide to hold the trip arm against inward displacement, FIGS. 52 and 54. The swing bar assembly 1148 on its return forward stroke will then have to work the heel of the drag lever 1192 outwardly for it to again be caught by the upstanding projection 1212 of the catch trip arm 1021.

Just as soon as the downwardly-extending stop catch 1014 has served to release the drag lever 1192 by the engagement of its laterally-extending projection 1014′ with the catch trip arm 1021, the stop arm 1014 is rotated forwardly out of the way and so held until the pivot arm plate 1187 with the drag lever 1192 and catch trip arm 1021 has been returned forwardly to its neutral position, and then the projection 1014′ and catch arm 1014 are brought thereover ready to serve again the trip of the lever catch arm 1021.

The catch arm 1014 is the first one of the seven arms 1014 to 1020 that are fixed to the pivot shaft 960, the first of the transfer release and key locks unit 286, FIG. 25 and worked by the arm 1028 which is biased by its spring 1031 to retain its lateral projection 1029 in the notch 1030, FIG. 26, and all of the downwardly-extending catch arms 1014 to 1020 extending rearwardly for engagement by the respective catch trip arms of the transfer unit gear assemblies. The arm 1035 has its end in engageemnt with the lateral projection 1029 of the arm 1028 and is lifted by rotation of shaft 1034, FIGS. 93 and 94 that extends through the right side frame plate 207 and has the cam follower 1036 that engages with the cam 861 of the first cam group assembly 479. The cam 861, FIG. 89, has an inclined portion 1217 that raises the cam follower 1036 against the action of spring 1031 connected to the operating arm 1028 on the keys lock unit 286, FIGS. 27 and 28, to depress the downwardly-extending catch arms 1014 to 1020 and while riding over raised edge 1218 of the cam 861 through more than one hundred and eighty degrees in one turn of the cam until the cam follower is lowered down the inclined portion 1219 on the cam 861 and onto the low edge 1220 thereof, and after the pivot arm plate 1187 with the drag lever 1192 and the catch trip arms 1020 have been returned to the neutral position shown in FIG. 48, and to locate the laterally-extending projections of the catch arms above catch trip arms of the transfer unit.

The tooth section 1205 with which the hook end 1204 of the drag lever 1192, is fixed to a quadrant gear plate 1221 by rivets 1222 radially inwardly from twelve quadrant gear teeth 1223 adapted to drive a ten tooth gear wheel 1224 supported for rotation on the transversely-extending rocker drive shaft 410, the gear 1224 serving to drive a part of the indicating mechanism 232 in a manner which will be made apparent as the description proceeds. The quadrant gear plate 1221 has a hub portion 1226 that is journalled in an assembly of two cooperating bushing parts 1227 and 1228 that are supported upon the inner end of the reduced diameter portion 1165 of the gear assembly bushing 1136, FIG. 52. Thus the bushing 1136, the back plate 1134, the gears 1153, the radially-extending plate 1187 that carries the levers and this quadrant plate 1221 constitute the transaction gear assembly 554.

The quadrant gear plate 1221 has an outwardly extending pin 1229 to which the long tension spring 1163, aforementioned and anchored to the back plate pin 1162, is secured and serves to return the quadrant gear plate 1221 rearwardly to erase the readings of the indicating mechanism when the hook end 1204 of the drag lever 1192 has been lifted to release these parts from the forward position to which the lever has taken them. To cushion the return force of the quadrant gear plate there is provided, a spring-cushioned lever 1230 pivoted on the inner face of the quadrant gear plate by a pivot pin 1231 normally held against a stop 1232 by a strong tension spring 1233 connected to the forward short end of the spring lever 1230 and anchored to an inwardly-extending pin 1234 on the outer face of the quadrant gear plate 1221, FIG. 48. This lever 1230 has an inwardly-bent lip 1235 for engagement with an upper edge 1236 of a back plate 1237 of the next transfer gear assembly 1117 of the transfer unit 340. Thus, the quadrant gear plate 1221 is cushioned on rearward return movement under the action of the long tension spring 1163 and when it is released from the drag lever 1192.

The quadrant gear plate 1221 is held in its returned rearward position against the back plate 1237 of the next assembly 1117 by a depending catch arm 1238 pivotally supported by a spacing sleeve hub 1239' on a transversely-extending pivot support shaft 1239 that works a rod 1240 to lift the depending catch arm 1238 in unison, with other catch arms for the other assemblies to be later mentioned, and the engagement of its end 1238' with a stop plate projection 1241 secured to the inner face of the quadrant gear plate 1221 by rivets 1242, FIG. 48. The catch arm 1238 is biased toward the stop plate projection 1241 by a short tension spring 1240 connected to a pin 1240" on the catch arm 1238 and anchored to the transverse rod 1240 that has a lost motion with the catch arm 1238 by extending through an elongated hole 1238" in the catch arm 1238. The tension spring 1240' thus biasingly holds the catch arm against the transverse rod 1240 so as to permit independent outward ratchet movement as the gear 1221 is returned to its rearward position. The quadrant gear plate 1221 is locked against forward rotational movement until the depending catch arm 1238 has been lifted. When the gear section 1205 and the quadrant gear plate 1221 are released by the drag lever 1192 and returned rearwardly, the ratchet lever end 1238' can ratchet over the stop projection 1241 to hold the quadrant gear plate 1221 in its rearward position against the stop edge 1236 of the back plate 1237 of the next gear assembly 1117. The quadrant gear plate 1221 is thus locked positively by the catch arm 1238 against the back plate 1237 and remains there until released in the cycle of operation by means to be later set forth.

2. FIRST VALUE KEY UNIT GEAR ASSEMBLY 1117
(FIGS. 42, 58, 59 AND 60)

The value key unit gear assembly 1117 is controlled in its operation by the first value as the cents key unit 217 by the engagement of its rack bar 658 and teeth 659 with gear teeth 1243 of a gear wheel plate 1244 forming a principal part of this gear assembly 1117.

The back plate 1237 has a hub portion 1237' that carries an inwardly-extending bushing sleeve 1245, similar to the bushing 1136 of the transaction gear assembly 554, FIG. 52. This bushing sleeve likewise has a spacing flange 1245', and intermediate portion for supporting the gear wheel 1244 and a reduced diameter portion for supporting its lever and quadrant parts 1246 and 1247, FIG. 42, that are respectively of identical construction to the parts 1187, and 1221 above described, and best shown in FIGS. 48 to 54 and need not now be described in detail.

The back plate 1237 of this gear assembly 1117 also has an inwardly-extending bushing 1248 fixed to the rear end of the plate and on which the vertically-swingable bifurcated arm 389 is pivoted, FIG. 58. This bifurcated arm 389 has an upstanding latch portion 1249 that is adapted to engage an arcuate gear rack 1250 fixed to the gear wheel plate 1244 and having teeth 1250'. This bifurcated arm 389 also has a pivot post 1251 on which a torsion spring 1252 is carried and is operable between a stop pin 1249' on the latch portion 1249 and a groove 1248' in the bifurcated arm sleeve bushing 1248 to provide braking movement to the catch lever 389. This bifurcated arm 389 and its latch portion 1249 holds gear wheel plate 1244 against rearward rotation when in its forward neutral position and is operated by the operating device 387 in the same manner that the bifurcated arm 388 of the transaction gear assembly 554 is pivoted as above set forth.

Mounted first upon the inwardly-extending bushing 1245 of the back plate 1237 for rotation is the gear wheel plate 1244 inwardly from the back plate 1237 by the sleeve flange 1245' as is the gear wheel 1153 of the transaction gear assembly 554, FIG. 52. This gear wheel plate 1244 has a stop plate 1253 with a bent out projection 1253' fixed to its outer face and adapted to engage a radially-extending edge 1254 of the back plate 1237 to limit the forward turning movement of the gear wheel plate 1244 and to retain the gear wheel plate 1244 in its neutral position. On the outer face of the gear wheel plate 1244, there is secured the arcuate gear rack 1250 by rivets 1256 with its gear teeth 1250' to overlie a portion of the gear teeth 1243 of the gear wheel plate 1244 and with which the latch portion 1249 of the bifurcated arm 389 engages to lock the gear wheel plate 1244 in the neutral position with the stop projection 1253' against the back plate edge 1254 and against rearward rotation. Adjacent to the forward end of the arcuate gear rack 1250 is an outwardly-extending stop pin 1257 adapted to engage the upper edge 1236 of the back plate 1237 to limit the rearward movement of the gear wheel plate 1244.

The gear wheel plate 1244 has a long arcuate slot 1258 adjacent to its upper periphery and having a narrow camming edge portion 1259 at its rearward end, for a purpose to be later mentioned, and a relief portion 1260 for facilitating the initial insertion of the swing bar assembly 1148 endwise into the arcuate slot 1258 and through the transfer unit 340.

On the inner face of the gear wheel plate 1244, there is a dog leg pivot stop arm 1261 pivotally connected thereto at one side of the bushing sleeve 1245 by a pivot pin 1262. This pivot arm has an upstanding portion 1263 at the opposite and forward side of the bushing sleeve 1245 that is biased against a stop pin 1264 by a tension spring 1265 connected to an inwardly-extending pin 1266 at the knee portion of the pivot stop arm 1261 and anchored to an inwardly-extending pin 1267 on the gear wheel plate 1244 adjacent to the lower and forward end of the arcuate slot 1258 in the gear wheel plate 1244.

The upper end 1263 of the pivot stop arm 1261 has a radially-extending short elongated slot 1268 through which a pin 1269 projecting from the radially-extending pivot arm drag lever part 1246, FIG. 42, bearing the drag lever of this assembly 1117 and corresponding to the pin 1197 of the radially-extending arm plate 1187 of the transaction gear assembly 544 and the drag lever 1192 and as best seen in FIGS. 48 and 51. The gear wheel plate 1244 has an elongated arcuate slot 1270 to allow lost motion movement of the drag lever radially-extending plate part 1246 through its pin 1269 beyond the back plate stop edge 1254 of the gear wheel plate 1244, when so forced on the return movement of the swing bar assembly in the same manner that the radial arm 1187 with its drag lever 1192 is pushed relative to its gear wheel 1153. This permits the tens-transfer operation as will become more apparent later on.

On the inner face of the gear wheel plate 1244, there is fixed an arcuate runner plate 1271 by means of rivets 1272. This runner plate runs concentric with and above the arcuate slot 1258 of the gear wheel plate 1244 and has the stop projection 1005 on its forward end for engagement by the hook end 998' of the upstanding hook lever 998, FIGS. 25 and 58. At its rear end the runner plate 1271 has an inclined cam edge 1273 that works a forwardly-extending swing bar slide operating arm 1274 pivoted upon the rear bushing 1248 extending inwardly from the rear end of the back plate 1237. There is also one of these operating arms for each of the subsequent and respective gear assemblies 1118, 1119, 1120, 1121, 1122, as indicated respectively at 1275, 1276, 1277, 1278 and 1279, FIG. 42, and a detail description of the operating arm 1274 will apply to each of the other operating arms. This is one of the principal differences between this value key gear assemblies 1117 to 1122 over the transaction key assembly 554. Another difference is that the gear wheel stop 1253 engages with a radially-extending edge 1254 of the value gear back plate 1237 instead of the plate 1161 of gear wheel 1153 engaging with the plate 1160 on the inner face of the transaction gear back plate 1134, FIGS. 45 and 46, this difference being due principally to the difference in the shape of the back plate 1237 of the gear assembly 1117 over the back plate 1134 of the gear assembly 554.

The swing bar slide plate operating arm 1274 has a hub bushing 1280 which is journalled on the back plate rear bushing 1248 and extends forwardly therefrom. This slide plate operating arm 1274 can pivot up and down and it has on its forward end an inwardly-bent horizontal lip 1281 that has an inclined cam work edge 1282 adapted to engage the round side of an upstanding pin 1283, that is diametrically-recessed for no particular purpose except to conserve space, of a slide plate 1284 of the swing bar assembly 1148, FIGS. 55 to 57 to force and return the slide plate 1284 to the right on a swing slide plate bar 1285 from the position shown in FIG. 56 to the position shown in FIG. 55 so as to cover a forwardly and downwardly inclined slot 1286 in the forward edge of the swing slide bar 1285 and locate a weakened beveled forward portion 1287 of the slide plate 1284 over the slot 1286 in the slide bar 1285 so that the heel inclined edge 1206' on heel plate 1206 of the drag lever 1192 will ride the bevel edge portion 1287 and not enter the bar slot 1286 as it would have done had the slot 1288 of the slide plate 1284 been left to receive the drag lever heel edge 1206' of the drag lever as when a gear assembly is not rotated or being used. When the gear assembly is worked by depressing a key the gear assembly plate is turned rearwardly by the swing bar assembly 1148 to permit the operating arm 1274 to be pivoted down so that a swing bar slide plate 1284 is moved to the right and moving all of the plates to the right thereof at the same time including a long slide plate 1289 at the right end of the swing slide plate bar 1285 to have its weakened bevel forward portion 1290 cover a forwardly and downwardly inclined slot 1291 in the bar 1285 corresponding to the inclined slot 1286 for the other slide plates 1284 and slot 1289' of the slide plate 1289. Thus, movement of any of the slide plates by their operating arms moves the slide plates to the right thereof including the slide plates 1284 and 1289 as will be made more clear hereafter. This causes the drag lever heel inclined edge 1206' to ride up when the swing bar assembly 1148 returns onto the weakened forward portions 1287 and 1290 of the value swing bar slide plates 1284 and the transaction swing bar slide plate 1289. If no key to the right of the one key was depressed a zero reading at least for right one will appear. Zeros are thus made to appear without having to depress a key, if it is to the right of a key is depressed, for instance, a dollar key of key unit 219 is depressed the swing bar slide plate 1284 corresponding to this unit is moved to the right taking with it the cents by tens and cents slide plates 1284 and the transaction slide plate 1289 so that zeros for cents by ten and cents will appear. The hook ends 1204 of all the drag levers 1192 for four gear assemblies will be accordingly depressed to engage the teeth sections 1205 of the quadrant plate parts so that the quadrant plate parts will be dragged forwardly on the return forward movement of the swing bar assembly 1148 against the action of long tension quadrant plate part return springs 1292 and 1163 to effect the indications through gear wheels 1224 in the indication mechanism 282.

The long tension spring 1292 of the gear assembly 1117 is anchored to an inwardly-extending pin 1293 on the back plate 1237 and is connected to a pin 1294 extending outwardly from the quadrant gear plate part 1247, that is like the quadrant gear part 1221 of the transaction gear assembly 554, FIG. 48, and returns the quadrant gear part 1247 when it is released from the drag lever 1192 of the value gear assembly drag lever part 1246 that is like the radially-extending arm plate 1187 and the drag lever 1192 of the transaction gear assembly 554, FIG. 48. These quadrant plate parts stay dragged forwardly until released at the beginning of the next cycle of operation by the stop catch arms 1014 to 1020.

The slide plates 1284 and 1289 and the others are all moved to the left to uncover the downwardly and forwardly-extending slots 1286 and 1291 for the respective slide plates 1284 and 1289 toward the left end of the swing bar 1285 to assume the positions shown in FIG. 56 at the beginning of the cycle of operation by the engagement of cam edge 1146 on the vertically-extending lever 1139 pivoted on the pin 1138 on the back plate 1134 of the transaction gear assembly 554 with a pin 1295 extending upwardly from the right end of the transaction long slide plate 1289, FIGS. 45, 46 and 55. By moving all of the slide plates to the left by the lever 1139, the possibility of their showing "zero" has been eliminated. Only for a key of a "cents by tens" or above will bring a "zero" to the "cents" or to the right upon being depressed and the machine put into operation.

There are seven swing bar slide plates in all, the slide plates 1284 and 1289 just described and slide plates 1296, 1297, 1298, 1299 and 1300 corresponding to the respective gear assemblies 1118, 1119, 1120, 1121 and 1122 that are similarly operated by their respective forwardly-extending swing bar slide plate operating arms 1275, 1276, 1277, 1278 and 1279. All of these other slide plates are moved to the right of the gear assembly in the same manner that has been done as explained above by slide 1284 and the "cents by tens" and a dollars slide plates 1296 and 1297 to place the slide plates over their downwardly and forwardly inclined slots 1286 and 1291 on the bar 1285 so that the swing bar assembly 1148 may actuate the drag levers 1192 of the respective gear assemblies, and that likewise any slide plates that have been shifted to the right are shifted to the left on the next cycle of operation by the engagement of the cam edge 1146 on the cam lever 1139 of the transaction gear assembly 554 with the upstanding pin 1295 of the transaction swing bar slide plate 1289. So long as the slide plates are kept to the left no numerical or zero showings will be given. The top face of the slide plate bar 1285 has a spring groove 1301 running throughout the entire length of the bar face in which there runs a long bowed spring 1302 that is bowed or serpentine to provide frictional engagement with the underfaces of the several swing bar slide plates so that they will be respectively held in any position to which they are moved, FIGS. 55, 56 and 57. In the opposite side faces of the slide plate bar 1285, FIGS. 55, 56 and 57, are respectively grooves 1303 and 1304 running the full length of the bar 1285. Each of the slide plates 1284, 1289, 1296 to 1300 have downwardly and inwardly bent right and left opposing downwardly and inwardly turned lugs 1305 and 1306 that traverse the grooves 1303 and 1304 to guide the movement of the slide plates along the bar 1285 and to retain them against the action of the long bowed spring 1302 lying within the groove 1301 in the top face of the bar and from outward displacement from the bar 1285.

The weakened portion 1287 of the slide plates is provided by a slot 1307 cut transversely into the slide plate from forward side thereof, FIGS. 55 and 56. If it is necessary in order to change the engagement of the weakened portion 1287 with the drag lever heel edge 1206' for effecting a correction of the engagement of the depending drag lever hook end 1204 with the rounded gear teeth section 1205, the weakened portions 1287 can be bent upwardly or downwardly to alter the position of their beveled forward ends 1308 relative to the drag lever inclined heel edge 1206' and over which the heel of the drag lever rides to depress the hook ends 1204 of the drag lever 1192 therewith. More of the detail construction of this complete swing bar assembly will be set forth later on.

The swing bar slide plate operating arm 1274 has an outwardly-extending cam follower projection 1309 that engages with the inclined cam edge 1273 of the gear wheel arcuate runner stop and cam plate 1271 and with rearward rotation of the gear wheel plate 1244 the operating arm 1274 by the gear wheel 1244 being turned rearwardly, FIG. 58, the operating arm 1274 is depressed by the cam edge 1273 so that it is forced downwardly as it leaves the narrow end portion 1259 of the arcuate slot 1258 and is maintained radially down by the under edge of the arcuate plate 1271. The lateral inclined work edge 1282 on the forward lip end 1281 of the operating arm is thus put in position to engage the value slide plate upstanding pin 1283 of the slide plate 1284 as the swing bar assembly 1148 is swung rearwardly so that upon the return forward movement the slide plate 1284 and the transaction slide plate 1289 is moved to the right to locate their weakened cover portions 1287 and 1290 over their bar inclined slots 1286 and 1291.

The outwardly-extending cam follower large disk projection 1309 on the operating arm 1274 has an intermediate reduced diameter portion 1310 that is forced to ride the lower edge of the gear wheel arcuate slot 1258 and on the return forward rotational movement of the gear wheel 1244, the operating arm 1274 is elevated at this time by this reduced diameter portion 1310 riding up an inclined extent 1311 on the inner edge of the gear wheel arcuate slot 1258 and into the narrow end 1259 thereof. The operating arm cam follower projection 1309 also includes a large and small diameter disk portion 1309 and 1312 spaced by the reduced diameter portion 1310 and serving to restrain the forward end of the arm 1274 against outward and inward displacement from the lower edge of the gear wheel arcuate slot 1258, the large diameter disk portion 1309 riding the under-edge of the arcuate cam plate 1271. The small disk portion 1309 has a cut edge 1313 to facilitate the assembly of the operating arm projection 1309 into the arcuate slot 1258 of the gear wheel plate 1244. This completes the detail description of the first value gear assembly 1117 and while a detail description has not been made of the drag lever and radial arm part 1246 and the quadrant plate part 1247 it shall be understood that like parts have already been described in connection with the transaction gear assembly 554 and need not again be described in detail, but are actually a part of the transfer gear wheel assembly 1171 and are operated in the same manner for the purpose as has already been discussed.

3. SECOND VALUE GEAR ASSEMBLY 1118 WITH TENS-TRANSFER DEVICE 1314 (FIGS. 61, 63, 64, 65 to 69)

The second value gear assembly 1118 is similar to the first assembly 1117 just described but differs therefrom primarily by the inclusion of a tens-transfer device 1314, for releasing a stop edge plate arm 1315 with its stop edge 1315' on a back plate 1316 of the gear assembly 1118 to permit the rotation of the first gear 1092 on the totalizer 317 or 318, FIG. 37, an angular spacing of one tooth and so that a single amount will be put onto the second gear 1093 of the totalizer as will become more apparent after the detail description of this tens-transfer device 1314 has been made.

The third gear assembly 1118 has the same four main parts including the back plate 1316 on which the tens transfer device 1314 is carried, a gear wheel plate 1317 having teeth 1318 that mesh with teeth 659 of the rack bar 658 of the value key unit 218, a radially-extending arm plate and drag lever part 1246 of the first value gear assembly 1117 with release catches 1021, FIGS. 48, 51, and described in detail in connection with transaction gear assembly 554 and a quadrant plate part 1247 of the first value gear assembly 1117 and described in detail with reference to part 1221 of the transaction assembly 554 and that is returned upon being released by the drag lever part by a long tension spring 1292 connected to the pin 1293 on the quadrant plate part 1247 and anchored to a pin 1294 on the rear end of the back plate 1316 of the present gear assembly 1118, FIG. 61.

The rear end of the back plate 1316 also has the rear inwardly-extending bushing 1288 that pivotally carries the vertically-swingable bifurcated arm 390 with its upstanding latch portion 1249 that engages with the arcuate-shaped gear rack 1250 which is secured to the gear wheel plate 1317. The bifurcated arm 390 also has the torsion spring brake 1252 above described. Also journalled on the rear bushing 1248 is the hub bushing 1280 swing bar slide plate operating arm 1275 that is worked by engagement of its cam follower large disk projection 1309 with the inclined cam edge 1273 of the arcuate stop and cam plate 1271 fixed to the inner face of the gear wheel plate 1314 and overlying concentrically the gear wheel long arcuate slot 1258 and bearing the gear catch projection 1006 with which rearwardly-extending hook end 999' of release upstanding hook arm 999 engages to hold the gear wheel plate 1317 against rearward rotation until the hook end 999' is released therefrom upon the starting of the machine. The gear wheel plate 1317 also has on its inner face the lost-motion spring cushioned dog leg pivot stop arm 1261 that has the upstanding portion 1263 and normally held against a stop pin 1264 by its tension spring 1265. The pin 1269 on the drag lever part 1246 or 1187 of the gear assemblies 1117 or 554 extends through openings 1268 and 1270 in the respective dog leg stop arm 1261 and gear wheel plate 1317 and the operation is the same as that described above.

The new parts of the second gear assembly 1118 that render it different from the two preceding gear assemblies 554 and 1117 will now be described in detail. Journalled on the inwardly-extending bushing 1245 of a hub portion 1319 of the back plate 1316, is the radially-extending stop edge plate arm 1315, FIGS. 61, 65 and 66 having the radially-extending releasable stop edge 1315' that normally overlies the forward and lower end of the long arcuate slot 1258 in the gear wheel plate 1317 and serves as the abutment for the stop plate 1320 with its bent out projection 1320 fixed by rivets to the outer face of the gear wheel plate 1317 above the lower end of the arcuate slot 1258. This stop arm 1315 and its stop edge 1315' are disposed flush upon the inner face of the back plate 1316 and are biased toward its elevated position by a tension spring 1321 connected to a pin 1322 extending outwardly through a short vertically-extending elongated slot 1323 in the back plate 1316 and held against inward displacement by a guide disk portion 1324. This tension spring 1321 is anchored to a pin 1325 extending outwardly from the top of the back plate 1316 and normally retains the radial stop edge plate arm 1315 with the stop edge 1315' in its elevated position and against the stop plate 1329 that is in a location elevated above the lower end of the long arcuate slot 1258 of the gear wheel plate 1317 rather than below the lower end of the slot 1258 as with the stop plate 1253 on the gear wheel 1244 of the gear assembly 1117, FIG. 58.

The back plate 1316 of this gear assembly 1118 has two adjacent large front and rear round openings 1326 and 1327 over the rear of which there extends respectively arcuate-shaped, angularly-spaced, front and rear depending finger projections 1328 and 1329 and are integrally formed of the stop edge arm plate 1315. These fingers 1328 and 1329 ends bent outwardly into their respective openings are normally held elevated within the respective openings by the tension spring 1321 that holds the stop plate edge arm 1315 elevated by the engagement of the spring pin 1322 with the upper end of the back plate slot 1323.

Extending over the front round opening 1326 and pivotally connected to the outer face of the back plate 1316 by a pivot pin 1330, is a long depending catch arm 1331 that has a catch shoulder 1332 on its outer end adapted to be engaged by the end of a short catch pivot arm 1333 extending at right angles to the long catch arm 1331 and disposed over the opening 1326 and the outer face of the back plate 1316, FIGS. 61 and 65. This short catch pivot arm 1333 is fixed to an outwardly-extending bushing 1334 that is journalled on a spacing pivot pin 1335 fixed to and extending outwardly from the back plate 1316. This short catch arm 1333 has a stop pin 1336 that extends inwardly into the front opening 1326 to engage the sides thereof and thereby so limit the full up and down movement of the short arm 1332 but is normally held in the path of movement of the end of the finger projection 1328 so as to prohibit the stop edge plate arm 1315 and its stop edge 1315' from being depressed by the gear wheel stop plate 1320 and its bent out projection 1320'. The short arm pin 1336 is so held in front of the finger 1328 by the totalizer gear tens-transfer disk 1101 in a manner which will presently be made more clear. In other words, upon the front totalizer 317 being elevated into engagement with the transfer unit 340 and the totalizer gear wheels put into engagement with the transfer unit 340 and the totalizer gear wheels put into engagement with the gear wheel assemblies of the transfer unit, the short pivot arm 1333 is pivoted to locate the stop pin 1336 in the path of the finger 1328.

The spacing pin 1335 is fixed at its outer end to a small frame plate 1337 so that it and other spacing pins 1338, 1339 and 1340 are all held by the plate at their outer ends, FIG. 61. The outer end of the short arm bushing 1334 has a depending rounded edge operating arm 1341 that follows the peripheral edge of the tens-transfer disk 1101 of the front totalizer gear 1092. So long as this rounded operating arm 1341 is riding the circular portion of the tens-transfer disk the pin 1336 on the short catch pivot arm 1333 will lie in the path of the finger 1328 and prevent the release and downward displacement of the stop edge plate arm 1315. When the summation of the turnings of the totalizer gear 1092 pass from the "nine" to "ten" amounts, the tooth projection 1101' of the tens transfer plate 1101 moves the follower arm 1340 inwardly turning with it through the catch arm bushing 1335 and small catch pivot arm 1332 so as to remove upwardly its stop pin 1338 from the end of the finger projection and to hold it out of the way as the short catch pivot arm 1333 is hooked under the end catch shoulder 1332 of the long depending catch arm 1331. This permits the swing bar assembly 1148 to push the gear wheel plate 1317, the distance of one gear tooth so as to apply a turn of one tooth upon the next totalizer gear 1093 with which the gear wheel 1317 is then in mesh. If the tens-transfer device 1314 on the gear assembly 1118 had not been conditioned to allow the finger 1328 to pass the pin 1336, there would have been no release of the stop edge arm plate 1315. This release of the catch finger 1328 is prepared for before the gear wheel plate 1317 returns forwardly and its stop plate bent out projection 1320' engages the releasable stop arm edge 1315'. Accordingly the short catch arm 1333 is swung considerably inwardly so that its catch end will be retained in the catch shoulder end 1332 of the long catch arm 1331 as best illustrated in FIG. 68 but with reference to the rear totalizer pivot arms to be soon mentioned, and looking outwardly from the inner side of the back plate 1316.

The long catch arm 1331 is pulled and biased toward the end of the short catch arm by a tension spring 1342 that is connected between a lug 1343 on the short catch arm 1333 and a pin 1344 extending outwardly from the long catch arm 1331 intermediate its length thereof. This tension spring 1342 not only tends to pull the long catch arm 1328 toward the catch end of the short catch arm 1333 but also tends to rotate outwardly the short catch arm 1333 when it is released from the long catch arm 1331 to hold the disk follower operating arm 1340 against the tens-transfer disk 1001 of the totalizer gear 1092 on the front totalizer 317. The finger end 1328 is bent at its very end outwardly to be certain of its engagement with the stop pin 1336 on the short catch arm 1333. This stop pin 1336 also extends inwardly through the front opening 1326 so as to have engagement with the outer edge of the opening and thereby limit its downward pivotal movement against the action of the tension spring 1342. The long catch arm 1331 also has an inwardly-extending stop pin 1345 adjacent its shoulder end which may engage the edge of the hole 1323 to limit its rearward movement of the long catch arm 1331 but normally the long catch arm 1331 is kept against the short catch arm 1333 by the tension spring 1342. When the stop edge plate arm 1315 has been released due to the small catch arm 1333 being elevated and retained by the long catch arm shoulder end 1332 and its stop pin 1336 lifted from the path of movement of the finger 1328, the stop pin 1345 on the long catch arm 1328 will then lie in the path of the finger projection 1328 of the stop plate arm 1315 so that as the gear wheel stop plate 1329 depresses to the stop edge plate arm 1315 the end of the finger 1328 will engage the long catch arm pin 1345 so as to release the short catch arm 1333 from the long catch arm shoulder 1332 in the manner best illustrated in FIG. 69 so that it can pivot outwardly to place its stop pin 1336 again in the path of the finger 1328 with the rounded operating arm 1341 riding the circular portion of the tens-transfer disk 1101 of the totalizer gear 1092 and preparatory to the next inward movement of the front totalizer 317.

The description which has just been made has been with reference to the operation of the releasable stop edge plate arm 1315 by the front totalizer 317 to effect the tens-transfer from one gear wheel to the other thereon. The same parts and operation are provided for the tens-transfer between the gear wheels of the rear totalizer 318 and will be only thus now described generally, it being understood that the tens-transfer parts are identical thereto and that the operation is the same. These tens-transfer parts include a long depending catch arm 1346 pivotally connected to the back plate 1310 by a pivot pin 1347 and adapted to receive and retain a short catch arm 1348 by engagement of its catch end 1349 with a shoulder end 1350 of the long catch arm 1346. The short catch arm 1348 has an outwardly-extending bushing 1351 journalled on the spacing pin 1338 and with a round edge operating arm 1352 depending from the tens-transfer 1314 to engage with the ten-transfer disk 1101 and its tooth projection 1101' of the totalizer gear 1092 of the rear totalizer 318 whereby the short catch arm 1348 will be inwardly depressed to locate its inwardly-extending pin projection 1353 in the path of movement of the finger projection 1329 to thereby lock the stop edge plate arm 1315 against movement. Upon the rounded operating arm 1352 being struck by the projection 1101' of the tens-transfer disk 1101 the short catch arm 1348 is forced inwardly to have its end caught by the shoulder end 1350 to release the stop edge plate arm 1315 so that the next totalizer gear 1093 will be advanced by one tenth of a turn or one gear tooth on the return movement of the swing bar assembly 1148. The catch arms 1346 and 1348 are biased toward one another by a tension spring 1354 connected between a pin 1355 on the long catch arm 1346 and a lug 1356 on the short catch arm 1348, and the short arm 1348 pivoted downwardly thereby when it has been released from the long catch arm 1346 by the movement of the finger projection 1329 as the stop edge plate arm 1315 is depressed by the gear wheel stop plate 1320 and the finger engages an inwardly-extending pin 1357 on the long catch end 1350 to release the long catch arm 1346 from the short catch arm 1348 so that the catch arm 1348 may be pivoted downwardly preparatory to the next upward movement of the rear totalizer 318.

The operation of the tens-transfer device 1314 will now be briefly repeated with particular reference to the large illustrative FIGS. 66a, 67, 68 and 69 viewing the parts that are operated by the rear totalizer 1318. In FIG. 66a, the parts of the tens-transfer device are suspended and in their depending neutral positions, the rounded edge operating arm 1352 being out of contact with the rear totalizer as the totalizer is retracted. This operating arm is suspended and supported through bushing 1351, the short catch arm 1348 and its pin 1353 resting upon the lower edge of the plate opening 1327 and out of the path of the inwardly bent end of the rear finger 1329, and out of locking engagement with the shoulder end 1350 of the long catch arm 1346 biased toward the catch end 1349 of the short catch arm 1348.

When the rear totalizer is raised the operating arm 1352 is immediately put into contact with the circular edge of the tens-transfer cam disk 1101 to locate the short arm stop pin 1353 directly in the path of the inwardly bent end of the finger projection 1329, as is best seen in FIG. 67. The stop pin 1353 stays in this position as long as the arm 1352 rides the circular cam edge. This may be true of several cycles of operation on the machine and when the stop pin is in this position operation of the stop edge plate arm 1315 of which the finger projection 1329 is an integral part is prohibited. The spring bar assembly 1148 is thus arrested without making any tens-transfer.

However, when the operating arm 1352 is struck by the tooth projection 1101' on the tens-transfer cam disk 1101, the short catch arm 1348 and its pin is elevated and caught by the shoulder end 1350 of the long catch arm 1346 as shown in FIG. 68 so that the pin 1353 is held out of the way of the finger projection 1329 and accordingly the stop edge plate arm 1315 will be released to permit the gear wheel 1317 to move one further step and add to the totalizer gear wheel 1093 a turn of one tooth distance.

As this stop edge plate arm 1315 is moved its finger projection 1329 as best shown in FIG. 69 engages the inwardly-extending pin 1357 on the shoulder end 1350 of the long catch arm 1346 so as to release the catch end 1349 of the short catch arm 1348 and to allow the catch arm 1348 with its finger stop pin 1353 to be lowered to the neutral position shown in FIG. 66a as the finger projection 1329 is retracted.

The end edge of either of the operating arms 1341 or 1342 when lowered upon the edge of the tens-transfer cam disk serve as stops against the tooth projection of the cam disk to prevent return rotation of the totalizer gear wheel after the operating arm has ridden over the tooth projection on the cam disk and the tens-transfer made.

It shall be understood that this operation is carried out exactly the same with the front totalizer as above described in detail and that it is effected in exactly the same manner with the other value gear assemblies 1119, 1120, 1121 and 1122 that succeed this value gear assembly 1118 that has now been fully described. These gear assemblies are of identical construction to the gear assembly 1118 and when taken with the detail description of the gear assemblies 554 and 1117 make for a complete description of the features of all the gear assemblies.

The tens-transfer device 1314 of the gear assembly 1119 will be worked by the tens-transfer cam disk 1102 and its single tooth projection 1102' of the totalizer gear 1193. The tens-transfer device 1314 of the gear assembly 1120 will be worked by the tens-transfer cam disk 1103 and single tooth projection 1103' of the totalizer gear 1094. The tens-transfer device of the gear assembly 1121 will be worked by the tens-transfer cam disk 1104 and its tooth projection 1104' of the totalizer gear 1095.

A tens-transfer stop device 1358 of the last gear assembly 1122 is an independent assembly and serves only as a stop to prevent the return of the gear wheel 1097 of the front and rear totalizers by the respective engagement of the tooth projections 1106' of the tens-transfer cam disks 1106 with the end edges 1359' and 1360' of the depending engaging arms 1359 and 1360 thereof, as do the operating arms of the tens-transfer devices 1314 so serve, the teeth of the totalizer gear 1097 having been advanced by one gear tooth by the previous tens-transfer device 1314 to provide for the tens-transfer device on the thousands of dollars wheel of the indicating mechanism 232, FIGS. 42, 71, 72 and 73.

The tens-transfer stop 1358 is carried on a plate support 1361 similar in shape to the back plates 1237 and 1316 of the first and second value gear assemblies 1117 and 1118. This plate support 1361 has a hub portion 1362 in which there is fixed a bushing 1363 of but double the thickness of the plate to give spacing to the plate support 1361 upon the transfer unit central mounting bushing 431. The rear end of the plate 1361 has a similar double thickness bushing, not shown, against which a hub sleeve 1364 extending to the right of the bifurcated pivot arm 395 and operated by the transfer unit vertically-swingable latch arms operating device 387 and that has an upstanding projection 1365 serving to operate in unison and in one direction quadrant gear plate depending ratchet catch arms 1238, 1366, 1367, 1368, 1369, 1370 and 1371 of the respective gear assemblies 554, 1117, 1118, 1119, 1120, 1121 and 1122, the operation of which will be described later in detail.

The forward end of the plate support 1361 has front and rear openings 1372 and 1373 whose edges serve as stops for inwardly-extending stop pin projections 1374 and 1375 on respective short pivot stop arms 1376 and 1377. The pivot stop arm 1376 bearing the stop pin 1374 is fixed to a sleeve hub 1378 journalled in a spacing pin 1379 which is one of four spacing pins that support a plate 1380, the other three spacing pins being indicated respectively at 1381, 1382 and 1383 in spaced relationship to the right from the right face of the plate support 1361 and taken with this plate 1361 to provide the supporting structure of the tens stop device 1358. On the outer end of the sleeve hub 1378 of the front pivot stop arm 1376, is the rounded front cam disk engaging arm 1359 that rides the tooth projection 1106' of the cam disk 1106 for the front totalizer gear 1097 to allow the projection 1106' to pass rearwardly but this same rounded arm 1359 serves to prevent the projection 1106' from returning forwardly by the engagement of the tooth projection 1106' with its straight stop edge 1359' thus permitting one indication to be added to the indicating mechanism 232 and preventing the loss of the one indication. The pivot stop arm 1359' is biased toward its down position by a tension spring 1384 that is connected to a radially-extending lug 1385 and on the stop arm 1359 and anchored to the spacing pin 1382. This tension spring 1384 holds the stop pin 1373 of the pivot stop arm 1376 against the edge of the front opening 1372.

While the front cam disk engaging arm 1359 is worked by front totalizer cam disk 1106, the rear cam disk engaging arm 1360 is worked by the rear totalizer cam disk 1106. The tooth projection 1106' of the cam disk 1106 of the gear 1097 of the rear totalizer 318 works the arm 1360 as above described. This rear arm 1360 is rigidly connected to a hub sleeve 1386 that is journalled on the spacing pin 1381 and to the inner end of which the rear pivot stop arm 1377 is fixed. The stop arm 1377 has the inwardly-extending stop pin projection 1375 that is urged toward the edge of the rear plate opening 1373 by tension spring 1387 connected to a lug 1388 on the hub end of the stop arm 1377 and anchored to the spacing pin 1383. This rear cam engaging arm 1360 thus is worked by the rear totalizer in the same manner as above described in connection with the front cam engaging arm 1359.

As it has been pointed out, all seven of the transfer unit gear assemblies have been mounted upon the long smooth portion 1123 of the central transfer unit bushing 431 and against the flange 1124 at the right end thereof. These transfer unit gear assembly parts have been pre-assembled upon their own bushings 1136 and it is merely a matter of assembling the gear assemblies in their order from the left end of the bushing 431, one upon the other, the gear assemblies having been made up as units, and differing from one another only slightly and in the manner which has already been pointed out. This transfer unit upon the bushing 431 is finally capped by placing the tens stop device support plate 1361 on the left end of the bushing and thereafter these assemblies and the tens stop assembly 1358 are made secure against the right end bushing flange 1124 by the tightening of a large nut 1389 upon the threaded portion 1125 of the central bushing 431, FIGS. 42 and 52.

As above described the rearwardly spaced pivot supporting shaft 1159 runs through the rear ends of the back plates of the respective transfer unit gear assemblies and also through the plate 1361 of the totalizer tens-transfer stop device 1358 and thus the back plates are held against relative rotation to one another on the central bushing 431 by the pivot supporting shaft 1159. The back plates are held in spaced relationship from one another at the rear thereof by their rear end fixed bushing sleeves 1149 and engaging the next back plate in succession. The long forwardly-extending swing bar slide operating arm 1274 to 1279 of the respective gear assemblies 1117 to 1122 are pivoted on the back plate sleeve bushing 1149 of the pivot supporting shaft 1159 by their hub bushings 1280.

On the right end of the pivot supporting shaft 1159, there is disposed a spacing sleeve 1390 extending to the right from the back plate 1134 of the transaction gear assembly 554 and against this sleeve 1390 and shoulder 1130 to the central transfer unit bushing 431, there is disposed a right end frame plate 1391 of transfer unit 340, FIGS. 42 and 52. The pivot supporting shaft 1159 has a threaded portion 1392 from which the mounting extension 422 extends, and upon which a fastening nut 1393 is tightened to secure the right end frame plate 1391 upon the pivot shaft 1159. The right end frame plate 1391 is similarly secured upon the reduced diameter threaded portion 1129 of the unit central bushing 431 and against the shoulder 1130 thereof by a fastening nut 1394 made tight against the end plate 1391. On the left end of the transfer unit central bushing 431, is a left end frame plate 1395 that is fixed against the shoulder 1133 of the transfer unit central bushing 431 and a sleeve bushing 1396 on the left end of the rear pivot supporting shaft 1159 by a left end fastening nut 1397 threaded upon the transfer unit central bushing reduced threaded portion 1127 and a rear nut fastening 1398 tightened upon threaded end portion 1399 of the pivotally supporting shaft 1159.

4. SWING BAR ASSEMBLY OPERATING PARTS 1148
(FIGS. 43, 44)

Journalled upon the right end extension 1128 of the central bushing and inwardly between the right end plate 1391 and the bushing flange 1124 is a swing bar plate arm 1400 forming a part of the swing bar assembly 1148 to which the right end of the transverse swing side plate bar 1285 is fixed by a large head fastening bolt 1401. This swing bar plate arm 1400 has an upwardly-extending gear quadrant 1402 fixed to and spaced from the right side of the swing bar plate arm 1400 by four spacing pins 1403. The forward end of the plate arm 1400 has a rectangular shaped opening 1404 corresponding to the cross-section of the slide plate bar 1285 so as to receive the end of the bar 1285 and retain the bar 1285 against rotation with respect to the plate arm 1400. There is disposed on the reduced diameter portion 1126 of the bushing 431 and against the shoulder 1132 for rotation a left end swing bar operating plate arm 1405 that forms a part of the swing bar assembly 1148, and through a rectangular opening 1406 in the outer end thereof is extended the left end of the slide plate bar 1285 and connected by a left end large headed bolt 1407. This swing bar assembly left end plate arm 1405 carries a gear quadrant 1408 on the left face thereof and is held in spaced relationship therefrom by spacing pins 1409 to form a part of the swing bar assembly 1148. As pointed out above, the swing bar assembly 1148 provides the operating means by which the respective parts of the gear assemblies of the transfer unit are worked. In one cycle of operation swing bar moves upwardly and rearwardly from its forward neutral position to pull the rack bars 542 and 658 of transaction and value key units 216 to 221 to their predetermined extent and then returns forwardly to the neutral position taking with it by the drag lever indicating mechanism segment parts 1187, 1246 and 1221, 1247 of the respective gear assemblies 554, 1117, to 1122 to effect the operation and produce the reading on the indicating mechanism 232. The several swing bar assembly slide plates as explained above are pushed from right to left by the finger arm 1139 on the transaction gear assembly 554 and from left to right by the engagement of the forwardly-extending swing slide operating pivot arms 1274 to 1279 depending upon which key units have been depressed.

The swing bar assembly 1148 is worked by the rocker shaft 410 that is internally threaded on its left end to contain the hand turned bushing support screw 409 used in mounting the transfer unit 340 upon the left side frame plate 208, FIG. 42 in a manner that has already been described. The internally threaded left end of the rocker shaft 410 is journalled in rocker shaft left end bushing support 411 fixed to the left end plate 1395 and extending to the left thereof. The right end of rocker shaft 410 is journalled in a bushing support 1410 fixed to the right end plate 1391 and extends to the right thereof. This rocker shaft 410 carries the transfer unit indicating mechanism operating drive gear 1224, 1411, 1412, 1413, 1414, 1415 and 146 that respectively mesh with the gear teeth 223 of the transfer unit gear indicating mechanism quadrant gear plate parts 1221 and 1247 of the respective gear assemblies 554, 1117 to 1122 meshing and journalled for independent operation by their respective spacing hub sleeves 1417 on the rocker shaft 410, FIG. 42.

The rocker shaft driven arm 416 is fixed to the rocker shaft 410 outwardly of the bushing support 1411 on the right end plate 1301. The rocker arm 416 has a hub sleeve 1418 with a flange 1419 to which rocker arm 416 is fixed by rivets 1420. The rocker arm hub sleeve 1418 is fixed with the rocker arm 416 to the rocker shaft 410 by a driven tapered cotter pin 1421. The rocker arm 416 is powered by the driven removable drive clutch rocker assembly 417.

A drive gear segment arm 1422 has a hub sleeve 1423 that is similarly connected to the rocker shaft 410 inwardly of the right end plate 1391 by a taper driven cotter pin 1424. This drive gear 1422 meshes with the upwardly-extending gear quadrant 1402 fixed to the swing bar plate arm 1400 through spacing pins 1403, FIGS. 42 and 43.

The rotary transfer unit swing bar assembly selector hook arm lift pin 780 extends outwardly from the gear segment arm 1422 and is adapted to enter the slot 1425 in the forward edge of the right end plate 1391 to limit its rearward turning movement. The rotary transfer unit swing bar selector slide plate hook arm pin 766 extends from the right of the lower end of a depending bracket 1426 that is secured to the right face of the swing bar right plate operating arm 1400 by rivets 1427, FIG. 43.

When effecting the "E" or total sales operation, as explained above, the selector slide plate hook arm pin 766 on the swing bar right plate operating arm 1400 and the bracket 1426 is pivoted upwardly and rearwardly to engage the hook end 764 of the drop pivot arm 763 of the transaction key unit selector stop assembly 434, FIGS. 13, 17 to pull the selector stop assembly slide plate 758 rearwardly and allow the pivot hook and 776 of the pivot hook arm 775 to seat over the slide plate hook arm extension pin 778 to thereafter restrain the slide plate 758 against forward movement until the return movement of the swing bar selector hook arm lift pin 780 extending outwardly from the gear segment arm 1422, FIG. 43, engages the pivot arm lower cam edge 779 and lifts the selector stop assembly pivot hook arm 775 to release the pin extension 778 from the hook end 776 and allows the slide plate 758 to return forwardly.

The swing bar assembly left plate operating arm 1405 and its gear quadrant 1408 are operated by a rocker shaft left end drive gear segment arm 1428 that has its hub 1429 pivotally adjustable upon the swing bar rocker shaft 410 and is held in its pivotally adjustable position to a fixed arm 1430 by an eccentric adjustable screw device 1431, FIGS. 42, 44. The fixed arm 1430 has a hub sleeve 1432 that is fixed to the left end of the rocker shaft 410 by a driven tapered pin 1433. The gear segment 1428 is thus made through its eccentric adjustment means 1431 secured to the fixed arm 1430 and to the rocker shaft 1410 through the connection of the hub sleeve thereto. When the rocker shaft 410 is turned the right and left gear segments 1422 and 1429 work in unison to respectively pivot through their mesh connections with the respective gear quadrants 1402 and 1408 the respective bar operating plate arms 1400 and 1405 to move the swing slide plate bar 1285 of the swing bar assembly 1148 and the gear assemblies of the transfer unit 340.

The left gear segment 1429 is made adjustable relative to the rock shaft and to the right end gear segment 1422 so that correction may be made between the right and left ends of the swing slide plate bar 1285 with respect to the respective gear assemblies to properly effect the operation.

5. OPERATING MECHANISM FOR QUADRANT GEAR PLATE DEPENDING CATCH ARMS 1238, 1366 TO 1371 (FIGS. 42, 44, 48, 71, 74, 75, 76)

As explained above the quadrant gear plate parts 1221 and 1247 of any one of the gear assemblies is held in its returned rearward position against rebounding by the depending ratchet catch arms 1238 or 1366 to 1371, respectively, that are pivotally suspended from a transversely-extending catch arm pivot support shaft 1239 for independent ratcheting operation and as well in unison by the transversely-extending left rod 1240 running through the elongated slot 1238" of each of the catch arms 1238, 1366 to 1371. While the catch arms are mounted on the pivot supporting shaft 1239 by their hub spacing sleeves 1239', the transversely-extending lift rod 1240, that runs parallel thereto, and through the catch arms, is carried on right and left end operating pivot arms 1434 and 1435, FIG. 42, through which the ends of the rod 1240 extend and are fixed thereto. These respective operating pivot arms 1434 and 1435 are secured by their respective hub sleeves 1436 and 1437 to the pivot shaft 1239 and respectively fixed against rotation by respective cotter pins 1438 and 1439.

The left end operating pivot arm 1435 has a depending extension 1440, FIG. 71, that carries on its lower end a pin projection 1441 extending to the right thereof and which is adapted to be engaged by the upstanding projection 1365 of the vertically-swingable bifurcated pivot arm 395 pivoted with its sleeve 1364 upon the rear pivot supporting shaft 1159 and without lost motion by its narrow bifurcation connection 1442 with the transversely-extending work rod 401 of the transfer unit vertically-swingable latch arms operating device 387 that works the respective bifurcated arms 388 to 395. The upstanding projection 1365 when pivoted in a counterclockwise direction as viewed in FIG. 71 by the latch arms operating device 287 as at the end of the cycle of operation depresses forwardly the pin 1441 of the arm extension 440 to pivot clockwise the ratchet catch arms 1238, 1366 to 1371 in unison for the ends of the catch arms to be disposed forwardly of the stop plate projections 1241 of the quadrant gear plates 1221 and 1247 of the respective gear assemblies so as to lock the quadrant gear plates in their returned positions and against forward displacement, while at the same time permitting the return of those quadrant gear plates which have been taken forwardly by the drag lever parts 1187 and 1246 during previous cycle of operation. Upon the beginning of the next cycle of operation when the catch arms operating device 346 has immediately withdrawn the projection 1365 of the bifurcated arm 395 the quadrant gear plate parts 1221, 1247 which on the previous operation have operated the wheels of the indicating mechanism 232 are released from the drag levers 1192 and are returned to immediately blank the indicating mechanism 232 for the next indication and in a manner which will be made more apparent when the detailed description of the indicating mechanism 232 has been made.

The right end of the pivot supporting shaft 1239 is grooved at 1443 slightly removed from its very end to pass sideways through a narrow entrance slot 1444 in the rear edge of the transfer unit right end plate 1391 that has an enlarged bottom inner end bottom 1445 for receiving the full diameter of the shaft 1239 by axially displacing the shaft when once disposed in the slot 1444 to bring the left end thereof into the enlarged bottom end 1445 of the slot, FIG. 43.

The left end plate 1395 has a similar shaped slot 1446 with an enlarged diameter bottom inner end 1447. The left end of the pivot shaft 1239 is reduced in diameter to pass sideways through the narrow opening of the slot 1446. Slidably fitted upon the left end of the shaft is a set collar sleeve 1448 and set screw 1448' of a pivot double stop lever 1449 forming a part of the catch arms operating mechanism. The set collar hub sleeve 1448 has a reduced diameter sleeve extension 1450 that is slidable into the enlarged diameter bottom end 1447 of the left end plate mounting slot 1446 to fill the same and upon the reduced diameter left end of the shaft 1239 and against a spacing collar 1451, FIG. 42 provided on the shaft 1239 and engaging the left pivot arm hub sleeve 1437. With the set collar hub sleeve 1448 and the spacing collar 1451 acting upon the opposite side faces of the left end plate 1395, the pivot shaft 1239 is locked against axial displacement of the right end of the shaft from its mounting slot 1444 in the right end plate 1390 and from the left end plate slot 1446 while permitting the rotation of the shaft 1239 in the right and left end plates 1391 and 1395.

The catch arms 1238, 1366 to 1371 remain in their lowered catch positions throughout the first turn of the crank 188 and while the swing bar assembly 1148 is being moved rearwardly, but upon the second turn of the crank 188 and the forward return movement of the swing bar assembly 1148, the catch arms are elevated to permit the drag levers 1192 of the arm part 1187 to pull the quadrant gear plate parts 1221 and 1247 forwardly to operate the indicating mechanism 232. At the end of the second turn of the crank 188 and of the cycle of operation the projection 1365 of the bifurcated arm 395 serves to return the catch arms to their catch positions after the worked quadrant parts 1221 and 1247 have been dragged forwardly to finally lock down the remaining quadrant plates against forward movement until the second turn of the next cycle of operation.

The swing bar assembly 1148 serves to raise the catch arms 1238 and 1366 to 1371 at the beginning of its return forward movement in the following manner. Extending to the left from the forward end of the left swing bar operating plate arm 1405, FIGS. 42, 74, 75 is an laterally-extending pin 1452 that has an inclined end face 1453, that upon the rearward movement of the swing bar assembly 1148 rubs under an outwardly flared end 1454 of a pivot operating lever 1455 that extends forwardly on the left end plate 1395 of the transfer unit 340 and is pivoted intermediate its length upon a screw pivot pin 1456 threaded into the left face of the end plate 1395 for axial adjustment relative thereto. The operating lever 1455 is pivoted flush against the face of the left end plate 1395 and is biasingly held there against by a compression spring 1457 carried on the pivot screw pin 1456 and held against displacement therefrom by the screw pin head. By adjusting the screw pin in the end plate 1395 the pressure of the spring upon the operating lever 1455 can be varied, FIG. 75.

The lever 1455 is biasingly held against pivotal movement by a pivotal vertically-extending detent arm 1458 also pivoted on the left face of the end plate 1395 adjacent to the rear end of the operating lever 1455. The left end plate 1395 has a depending boss portion 1459 and the lower end of the detent arm 1458 is pivotally connected thereto by a pivot pin 1460, FIG. 74.

The lever 1455 has a pointed end 1461 adapted to enter either one of two detent openings 1462 or 1463 lying in the upper end and forward edge of the vertically-extending detent arm 1458 so that the lever 1455 may be biasingly restrained against pivotal movement upon the screw pivot pin 1456 in either one of two vertically-adjusted positions of the operating lever 1455. A tension spring 1464 anchored forwardly to a pin 1465 extending outwardly from the end plate 1395 and connected to a pin 1466 extending outwardly from the side of the detent arm 1458, FIG. 74.

The rear end of the lever 1455 has a pivot pin 1467 by which a vertically-extending link 1468 is connected. The upward end of this link is connected by a pivot pin 1469 to the double stop pivot lever 1449 that is fixed through its bushing 1448 and set screw 1450 to the pivot shaft 1239 in the manner above described.

As the swing bar assembly 1148 moves upwardly and rearwardly face 1453 rides past the flared end 1454 of the lever 1455 rubbing the face thereof to force the lever 1455 outwardly against the action of the pin compression spring 1457 to thereby locate the pin 1452 above and into alignment with rear edge 1470 of the flared end 1454 of the operation lever 1455 so that on the return movement of the swing bar assembly 1148 and the pin 1452 the lever 1455 is pivoted by the engagement of the side of pin 1452 with the flared end rear edge 1470 to cause the link 1468 to be elevated and the stop lever 1449 to be rotated to the position shown in FIG. 74 and its stop projection 1471 against the rocker shaft left end bushing support 411 so that the catch arms 1238, 1366 to 1371 are lifted from their engagement with the stop plate projections 1241 of the quadrant gear plate parts 1221 and 1246. The pointed end 1462 of the lever 1455 will have been moved to the elevated opening 1462 in the detent arm 1458 so as to thereby retain the catch arms 1238, 1366 to 1371 by the transverse rod 1240 having been elevated by the pivot arms 1434 and 1435 fixed to the pivot shaft 1239, in their elevated positions to permit the quadrant gear plate parts 1221 and 1247 to be taken forwardly by the swing bar assembly 1148 and the drag levers 1192 of the drag lever parts 1187 and 1246.

At the end of the cycle of operation after the quadrant parts 1221 and 1247 have been dragged forwardly the upstanding projection 1365 of the bifurcated arm 395 is worked by the cam-operated vertically-swingable latch arms device 387 to depress forwardly the pin projection 1441 and the extension 1440 to return the catch arms 1238, 1366 to 1371, to their catch positions with their ends 1238' lying over the remaining stop plate projections 1241 and the quadrant gear plate parts 1221 and 1247 that have not been dragged forwardly to thereby lock remaining ones against forward displacement. The pivot stop lever 1449 will be rotated counterclockwise as viewed in FIG. 74 so its stop projection 1472 to engage the underside of the bushing 411 and its link 1468 depressing the rear end of the operating lever 1455 and the pointed end 1462, disposed in the lower detent 1463 of the vertically-extending detent arm and with the flared end 1454 of the lever 1455 elevated to again be engaged by the pin 1452 to cause the lever 1455 to be again pivoted to release the catch arms 1238, 1366 to 1371. This concludes the detail description of the catch arms operating mechanism and finally of the rotary transfer mechanism unit 340. A detail description will now be made of the indicating mechanism unit 1232.

K. Detail Construction and Operation of Indicating Mechanism Unit 232 (FIGS. 77 to 81, 82, 83, 84, 93)

The indicating mechanism unit 232 comprises the left end plate 243 and the right end plate 253 which are held together by three frame rods, one rod 1473 being at the top and rear of the unit and two bottom rods 1474 and 1475 being at the front and rear thereof and interposed in spaced relationship between the end plates are six parallel vertically-extending plates 1476, 1477, 1478, 1479, 1480 and 1481 held apart by same length spacing sleeves 1482 in equal spaced relationship from each other and of the same extent from the left end plate 243 and of a greater extent at the transaction indicating end of the unit by longer spacing sleeves 1483 from right end plate 253 to give more space therebetween for the transaction indicating wheel 224. To the left of the transaction indicating wheel 224 are six indicating wheels 225, 226, 227, 228, 229 and 230 of less width and disposed in the spacings provided by the same length sleeves 1482. The left and right end plates 243 and 253 are made secure against the spacing sleeves 1482 and 1483 by left end and right end fastening bolts 1484' threaded respectively into the left and right ends of the upper and lower frame rods 1473, 1474 and 1475. This holds the vertically-extending end and spaced plates, the spacing sleeves and rods in rigid relationship and provides the indicating unit frame structure indicated generally at 1484.

The upper and lower mounting studs 235 and 244 and the window attaching brackets are rigidly secured to and project from the indicating left end plate 243. The upper and lower mounting studs 254 and 263 and the window attaching brackets 232' are rigidly secured to and project from the indicating left end plate 253. The use of these mounting studs and brackets has already been set forth in describing the disassembly and assembly of the indicating unit from and to the supporting frame 169.

The transaction and value indicating wheels 224 to 230 are held between the vertically-extending plates for rotation and for easy removal from the frame structure 1484 by means of a pivot supporting pull rod 1485 axially slidable through the frame structure and on which the respective indicating wheels 224 to 230 are journalled for free rotation. If it is desired to remove the indicating wheels from the frame structure, the pull rod 1485 is easily pulled from the frame structure 1484 out of either the left or right end plate 243 or 253, and the indicating wheels lifted free of the frame structure.

Below the pivot supporting pull rod 1485 and similarly slidable through the frame structure 1484 is a lower pivot supporting pull rod 1486 that removably supports seven input gear wheels 1487, 1488, 1489, 1490, 1491, 1492 and 1493 for driving the respective transaction and value indicating wheels 224 to 230 in a manner soon to be set forth. Each of these gear wheels have fifteen (15) teeth and they respectively lie flush against the right faces of the respective laterally-spaced vertically-extending and left end plates. The input gear wheel 1487 has a long spacing hub sleeve 1494 while the other gear wheels 1488 to 1493 have short spacing hub sleeves 1495 and through these sleeves and the frame structure the lower pull rod 1486 is slidably and removably extended. By axially removing this rod 1486, all of these input gear wheels 1487 to 1493 can be removed from the frame structure 1484.

Journalled by means of a flush large head pivot pin 1496 on the respective vertically-extending plates 1476 to 1481 and on the left end plate 243 are respective freely rotatable large intermediate gear wheels 1497, 1498, 1499, 1500, 1501, 1502 and 1503, that are respectively in mesh with the respective smaller input gear wheels 1487 to 1493. Each of these larger gear wheels have twenty (20) teeth.

These large intermediate gear wheels 1497 to 1503 are respectively in mesh with small gears 1504, 1505, 1506, 1507, 1508, 1509 and 1510 respectively fixed to respective transaction indicating wheels 224 to 230. Each of these small gears on the indicating wheel have eleven (11) teeth corresponding in number respectively with the number of the indicating members that can be flashed from each of the respective indicating wheels.

The transaction indicating wheel 224 has besides the small gear 1504 a long journal hub sleeve 1511 that supports the gear wheel on the pull rod 485 for rotation thereupon. The small gear 1504 and an integral flange 1512 on the hub sleeve 1511 has a thin generally circular plate 1513 disposed therebetween. This assembly is made secure by rivets 1514, FIG. 79.

Each of the value indicating wheels 225 to 230 has a journal hub sleeve 1515, FIG. 81 that has a flange 1516 to which a similar circular thin plate 1517 is secured. This value wheel assembly is similarly made secure by rivets 1518 so that the value wheel gear 1505, 1506 or the others and the indicating wheel thin plate 1507 are rigidly united with the flange 1516 of the hub sleeve 1515, FIG. 81. All of these value indicating wheels are thus similarly constructed.

The transaction indicating wheel 224 and the value indicating wheels 225 to 230 are assembled by their long and short hub sleeves 1511 and 1515 upon the pull rod 1485 and retained within the indicating unit frame structure 1484 for free rotation independently of one another and by their respective chains of gears starting with the respective input gear wheels 1487, 1488 to 1493 and adapted for engagement, when the indicating mechanism unit 233 is mounted in the supporting frame 169, with the respective drive gear wheels 1224, 1412 to 1417 of the rotary transfer unit, FIG. 42, so as to be driven by the respective quadrant gear parts of the respective gear assemblies 554, 1117 to 1122 of the rotary transfer unit 340.

The transaction indicating wheel 224 further includes a series of eleven pins 1519 extending from the right face of the thin plate 1513 equally angularly and circumferentially spaced from one another and lying close to the periphery of the thin wheel plate 1513. The periphery of the thin plate 1513 is provided with a series of angularly-spaced notches 1520 corresponding respectively to the number of pins. Each of these pins 1519 have a flash indicia-bearing indicating plate 1521 pivoted at its lower edge thereon by a tangentially-extending operating arm 1522 at the left end of the plate and a lug 1523 at the right end of the plate. The extension 1522 overlies the open end of the notch 1520.

Each plate 1521 is biased against a stop projection 1524 by a tension spring 1525 connected to a lug 1526 on the edge of the plate 1521 and anchored to an outwardly struck lug 1527 on the thin circular plate 1513. These indicia-bearing plates 1521 are adapted and sufficiently spaced from one another so they can be flashed to lie in the periphery of the tin plate 1513 and tangentially thereof in a vertical plane within the window opening 223 of the machine housing 168.

The value indicating wheels 225 to 230 are similarly constructed to the transaction indicating wheel 224 except that their pin projections 1528, also eleven in number, are shorter in length than the laterally-extending pin projections 1519, and their indicia-bearing flash plates 1530 are of less width than the transaction indicia-bearing flash plates 1521, otherwise, the construction is the same. Their plates 1530 have tangentially-extending operating arms 1531 that overlie peripheral notches 1532 in the value-indicating circular thin plate 1517. The value indicia-bearing plates 1530 are journalled by their operating arms 1531 and lugs 1533 upon the pin projections 1528. A tension spring 1534 acts between a lug 1535 on the flash plate 1530 and an outwardly struck lug 1536 on the thin circular plate 1517.

Only nine of the indicia-bearing flash plates of the transaction indicating wheel are used to display indicia. These nine plates in order and in a clockwise manner as viewed in FIG. 79 beginning with the display of indicia bearing plate 1521' and running 1521", 1521a, 1521b, 1521c, 1521d, 1521e, 1521f and 1521g will bear respectively the following indicia starting with 1521', "no registration"; 1521", "registration"; 1521a, "total" adding machine; 1521b, "sub total" cash register; 1521c, "grand total" cash register; 1521d, "one item"; 1521e, "total items" cash register; 1521f, "sub total items"; and 1521g, "received on account." The first "no registration" indicia will appear when the machine has been cleared and no key buttons have been depressed. The "registration" plate appears when only value key buttons have been depressed. The indicia-bearing plates from 1521a to 1521g will respectively appear in response to the depressing of the respective corresponding key buttons "A" to "G" of the transaction key unit 216.

The indicating wheels respectively have and make use of all eleven of their indicia bearing flash plates 1530. These indicia bearing plates 1530 starting with the vertically-extending one shown in FIG. 80 and passing clockwise are respectively of plain or non-bearing indicia, corresponding to the "no registration" plate 1521' on the transaction indicating wheel 224 and the second plate showing "zero" "0," corresponding to the "registration" plate 1521" of the transaction indicating wheel and the rest of the indicia bearing plates of each value indicating wheel bearing respectively numbers and "1," "2," "3," "4," "5," "6," "7," "8" and "9." When the machine is free and the indicating wheels are in neutral positions the blank plain non-indicia bearing flash plates will appear where non-full or indications smaller than thousands of dollars and certain of these blank indications will remain. This makes for easier reading of the numerical indications where smaller than thousands of dollars are more often being displayed. For instance, the indicating wheels 229 and 230 that indicate thousands of dollars will remain black or blank as the readings for a small business would more often run into hundreds rather than thousands most of the time. As explained above the "zero" indications will always arrive to the right of a value indication even though there is no "zero" "0" key button on any of the value key button units.

At the end of the cycle of operation when the indicating wheels have been operated by the drag lever parts 1221 and 1247 of the transfer unit gear assemblies and acting through the indicating unit gears that operate the indicating wheels, the finally aligned indicia-bearing flash plates are simultaneously flashed and brought to their vertically-extending positions by a forward pivot shaft operating device indicated generally at 1537 and operated by its pivot arm 274 detachably connected by the pin 273 to the bifurcated swing arm 272. The manner of detaching this connection when removing the indicating unit 232 from the supporting frame 169 has been previously set forth.

This transaction and value indicating wheel flash plates pivot shaft operating device 1537 comprises a pivot shaft 1538 that is grooved at its right end at 1539 to fit a narrow notch 1540 in the forward edge of the right end plate 253 and the pivot shaft 1538 is retained therein by a forwardly-extending hook arm 1541 pivoted on the end plate 253 and adapted to hook over the end of the shaft 1538 outside of the notch 1539, FIG. 77. The pivot arm 274 has a rearward extension 1542 with a bottom lug 1543 that comes to rest against a stop support pin 1544 when the pivot shaft operating device 1537 is in its inoperative or retracted position.

The left end of the shaft 1538 has a similar groove 1545 adapted to be slidably fitted into a narrow notch 1546 in the forward edge of the left end plate 243 and is similarly retained in the notch 1546 and is similarly retained therein by a forwardly-extended swing hook arm 1547 pivoted on the face of the left end plate 243. Outwardly of the hook arm 1547 and on the left end of the pivot shaft 1538 is a left end shaft operating arm 1548. The end plates 243 and 253 are cut away from their front edge rearwardly to permit a transversely-extending rod 1549 to extend between the free end of the fixed operating arm 1548 and the arm 274 and its extension 1542, FIG. 78.

Pivoted on the right faces of the vertically-extending plates 1476 to 1481 and the left end plate 243 are respectively vertically-extending pivot levers 1550, 1551, 1552, 1553, 1554, 1555 and 1556. The flash plate lever 1550 operates fore and aft and has lateral extension 1557 adapted to enter a peripheral notch 1520 of the transaction indicating wheel thin plate 1513 taking with it the tangentially-extending operating arm 1522 that when depressed will flash its indicia-bearing plate 1521. The value flash plate operating levers 1551 to 1556 have the same extensions 1558 that will enter the notches in the indication wheel thin plate to work the operating arms of the indicating wheels flash plates 1530.

Each of the transaction and value levers 1550 to 1556 have a laterally-extending lug 1559 to which a work tension pull spring 1560 is attached to pull the lower ends of the levers 1550 to 1556 upwardly and depress by the lateral pin projections 1557 and 1558 and the operating arms of the indicia-bearing plates so as to flash them to their vertical positions. These springs 1560 are respectively connected to the transverse work rod 1549 and are pulled upwardly thereby as the pivot shaft 1538 is pivoted by the arm 274 that is lifted by the bifurcated arm 272 carried by the bifurcated swing arm operating shaft journalled in the right side plate 207 and pivoted by the operating shaft pivot arm 277, FIG. 77.

*L. Cam Operated Mechanism for Driving Indicia Bearing Flash Plates Pivot Shaft Device (1537) FIGS. 77, 85, 89, 92*

The cam mechanism for operating the indicia bearing flash plates operating device 1537 generally comprises a double cam 1561 forming a part of the third cam group, FIGS. 85 and 89, a double cam follower lever 1562 and an upwardly-extending link 1563 that connects the cam follower with the bifurcated swing arm operating shaft pivot arm 277 and a long vertically-extending tension spring 1564 that biases the cam follower 1562, acting upon the pivot arm 277, toward the cam 1561 and serves to return the indicia bearing plate operating device 1537 to its inoperative position and the indicia operating plates 1521 and 1530 to their lowered and non-display positions 170.

The double cam 1561 has a double width outwardly offset cam portion 1565 secured to its side face by rivets 1566 to provide an offset portion by which a cam follower end 1567 of the lever 1562 is elevated and rides during a small part of the turn of the cam. The cam follower 1562 is pivotally connected upon a screw bolt assembly 1568 secured to and extending outwardly from the right side frame plate 207. This screw bolt assembly 1568 also serves as a support for another cam follower to be later mentioned. The upper end of the cam follower lever 1562 has the upwardly-extending link 1563 pivotally connected thereto by a pivot pin 1569. The upper end of the link 1563 is connected by a pivot pin 1570 to the bifurcated swing arm shaft pivot arm 277. To the outer end of this pivot arm, the long vertically-extending tension spring 1564 is connected by a spring pin 1571 and is anchored to the upper end of the right side frame plate by a pin 1572. This tension spring 1564 acts on the arm 277, the link 1563 and the cam follower lever 1562 to pivot the lever 1562 upon its screw bolt assembly 1568 to force the cam follower end 1567 against the offset cam portion 1565. The cam 1561 is always retained in its neutral position, FIG. 89, in readiness for the machine to be started and the cam follower end 1567 having been caused at the end of the previous cycle of operation to have traveled over the offset cam portion 1565 against the action of the spring 1564 to have caused the flashing of the indicia bearing flash plates 1521 and 1530 that were aligned on the previous operation of the machine so that they were in view of the operator, and now are still in view preparatory to the start of the next cycle of operation. The cam follower end 1567 lies adjacent to a sharp drop shoulder 1573 on the offset portion 1565 so that immediately as the machine is started the cam end 1567 drops over the shoulder 1573 to permit the spring 1564 to pull the pivot arm 277 and turn the bifurcated arm shaft 275 counterclockwise and the bifurcated swing arm 272 downwardly to effect the release of the indicia bearing plates operating device 1537 and the lower ring of the indicia bearing plates 1521 and 1530 and to allow again the free rotation of the indicating wheels 224 to 230 of the indicating mechanism unit 232, FIG. 77.

To assist the tension spring 1564, and to make certain the positive kick out and release of the indicia bearing flash plates operating device 1537 and the freeing of the indicating wheels 224 to 230, a cam lobe 1574 is provided upon the cam 1561, diametrically opposite from the offset portion 1565, FIG. 89, that, if the cam follower lever 1562 has not been pivoted on the bolt assembly 1568 upon the cam end 1567 riding off the cam shoulder 1573 by the tension spring 1564, will engage a laterally and inwardly-extending roller 1575 secured by a roller pin 1576 to a fixed arm 1577 depending from the upper end of the cam follower lever 1562. This is a safety feature and it will be seldom that the cam lobe will need to engage the roller 1575 to pivot the cam follower lever 1562 as the tension spring 1564 will normally turn the cam follower lever 1562 in a counterclockwise direction as viewed in FIG. 89 to instantly raise the roller 1575 out of the way from the cam lobe 1574. As the cam 1561 completes its turn at the end of the cycle of operation the cam end 1567 rides the offset cam portion 1565 to bring it again to the neutral position shown in FIG. 89 just ahead of the drop shoulder 1573 and in readiness for the next cycle of operation to lower the indicia-bearing flash plates of the indicating mechanism 232.

*M. Cam Operated Mechanism for Driving Transfer Unit Vertically Swingable Bifurcated Latch Arms Operating Device 387 (FIGS. 42, 85, 89, 92)*

The cam operated mechanism for operating the transfer unit vertically swingable bifurcated latch arms operating device 387 comprises generally a double lobe cam 1578, cam II of third cam group assembly 481, FIG. 89, that serves to operate a double cam follower lever 1579 that is pivoted on the pivot bolt assembly 1568 outwardly spaced from the cam follower lever 1562 and is detachably connected by an outwardly-extending pin 1580 to the bifurcated short work pivot arm 405 of the latch arms device long pivot shaft that is detachably connected to the rear ends of the right and left supporting frame plates 207 and 208 in the manner above described and having the transversely-extending rod 401 that enters the bifurcations of the vertically-swingably bifurcated latch arms 388 to 395 to engage and disengage their upstanding latch portions 1151 and 1249, FIGS. 45 and 58 to and from the gear wheel arcuate gear plates 1170 and 1250 to hold the respective gear wheels of the gear assemblies against their forward back plate stops and in their neutral positions. These upstanding latch portions are put into engagement with the arcuate plates to lock the transfer unit gear wheels at the end of the cycle of operation and release the gear wheels immediately upon the beginning of the cycle of new operation.

The double cam 1578 has a starting lobe 1581 and a diametrically opposite second lobe 1582. Riding this cam and its lobes is an inwardly-extending roller 1583 connected by a pin 1584 to a depending cam following arm portion 1585 of the cam follower lever 1579. When the cam 1578 rotates clockwise as viewed in FIG. 89, the roller 1583 rides off the cam lobe 1581 so as to free the cam follower lever 1579 to pivot clockwise on the bolt pivot assembly 1568 at this time, a forwardly-extending arm 1586 of the cam follower lever 1579 through its inclined work edge 1587 engages a roller 1588 extending to the right and outwardly from the cam lobe 1582 and journalled on a pin 1589 fixed to the cam lobe 1582. This roller 1588 acting on the inclined edge 1587 thus positively pivots the cam follower lever 1579 as its roller 1583 passes the cam lobe 1581. As the second cam lobe 1582 rides under the roller 1583, of the half cycle of operation and the beginning of the second turn of the crank, the cam follower lever 1579 is pivoted counterclockwise as viewed in FIG. 89 for a short duration to merely lock the gear wheels at the end of the first turn of the crank and at the end of the rearward stroke of the swing bar assembly to lock the gear wheels at this time against further rearward pivotal movement. The cam lobe 1582 soon passes and thereafter at the end of the cycle of operation the cam lobe 1581 will again engage the roller 1583 to pivot the cam follower lever 1579 so as to finally lock the gear wheels of the transfer unit 340 in their forward neutral positions and to place the inclined edge 1587 of the lever arm 1586 adjacent to the roller 1589 on the second cam lobe 1582 in readiness to again engage the inclined edge 1587 to work the cam follower lever 1579 on the next cycle of operation of release the upstanding latch portions 1151 and 1249 of the bifurcated arms 388 to 395 at the beginning of the next cycle of operation.

*N. Removable Drive Clutch Rocker 417 and its Cam Operated Mechanism (FIGS. 42, 85, 89, 93)*

The removable drive clutch rocker 417 is pivoted for rocking movement in the side frame plate by its circular boss portion 502 and rocks first counterclockwise and then clockwise as best viewed in FIG. 85. This removable drive clutch rocker 417 has a double rocker arm 1590 that extends to the opposite sides of its journal extension 502 and respectively carries on its forward and rear ends the front and rear rocker pins 418 and 419. These pins 418 and 419 respectively extend through the vertically-extending arcuate-shaped slots 1591 and 1592 for clutch engagement respectively with the front and rear rocker shaft arm pin receiving holes 420 and 421 of the transfer unit rocker shaft driven arm 416, FIG. 42. The double rocker arm 1590 is fixed to the rocker circular boss portion 502' by rivets 1593. Fixed to the clutch rocker journal extension 502 outwardly from the double rocker arm 1590 by means of its hub bushing 1594 and tapered driven pin 1595 is a depending crank arm plate 1596 having front and rear arms 1597 and 1598, the rear arm 1598 being longer than the front arm 1597. The rear crank arm has a roller 1599 extending outwardly of its lower end and journalled thereon by a roller pin 1600 and adapted to follow a cam in a manner to be later mentioned.

Pivoted upon the crank arm plate 1596 at the rear edge of the rear crank arm 1598 is a spring-biased pivot arm 1601 to cushion and prevent breakage of the parts operated by the rocker clutch 417. This arm 1601 is pivoted upon the crank arm plate 1596 by a pivot pin 1602 and has at its rear edge an inwardly bent stop portion 1603 adapted to engage the rear edge of the rear crank arm 1598 to limit its forward pivotal movement under the action of two strong inner and outer springs 1604 and 1605. The inner spring being connected to an extension 1606 of the inwardly bent stop portion 1603 and the outer spring 1605 being connected to an outwardly-extending lug 1607 on the forward edge of the pivot arm 1601.

The short crank arm 1597 of the crank arm plate 1596 has a notch 1608 through which a cross pin 1609 extends and to the opposite ends of which the strong tension springs 1604 and 1605 are respectively anchored. Extending inwardly from the lower end of the spring-biased pivot arm 1601 is a roller 1610 also adapted to engage a cam in a manner to be soon set forth.

Pivoted on the rocker journal extension 502 flush against the crank arm plate 1596 by its short hub sleeve 1611, is a long forwardly-extending pivot arm 1612 that extends beyond the end of the short arm 1597 and is connected to the short arm forwardly of the journal extension 502 by an eccentric adjustment device 1613 by which a slight angular adjustment of the pivot arm 1612 upon the short arm 1597 and relative to the long arm 1598, may be effected.

This pivot arm 1612 has an outwardly-extending lower roller 1614 pivotally supported thereon by a roller pin 1615 and is adapted to engage cam on the second group cam assembly 480 in a manner and for a purpose soon to be set forth. Also secured to this pivot arm 1612 is an inwardly-extending upper cam-engaging roller 1616 by means of a pin 1617 and adapted to engage a cam on the second group assembly 480.

On the third cam group assembly 481 are two cams 1618 and 1619 having their lobe portions angled relative to each other, with the lobe portion 1618 lying about ninety degrees of the lobe portion 1619 of the cam.

With the third cam group assembly 481 being rotated clockwise as viewed in FIG. 89, the roller 1610 of the spring biased pivot arm 1601 is first engaged by the cam 1618 to pivot the drive clutch rocker 417 in a counterclockwise direction during the first turn of the crank and at the beginning of the cycle of operation so that the swing bar assembly 1148 of the rotary transfer unit 340 is swung rearwardly by the rock shaft 410. At the end of the rearward movement of the swing bar assembly 1148 the right or trailing cam 1619 by its inclined arcuate outer push edge 1620 engages the roller 1599 on the lower end of the rear crank arm 1598 to give to the rocker clutch 417 and the swing bar assembly 1148 the final push to bring the swing bar assembly home to the end of its rearward movement.

On the forward return movement of the swing bar assembly 1148 the drive clutch rocker 417 has to be rocked in a counterclockwise direction as viewed in FIGS. 85 and 89. This is effected by the cams 1621 and 1622, the second and first cams of the second cam group assembly 480. The removable drive clutch rocker 417 will have been moved by the third group cams free of the second group cams 1621 or 1622 but with the beginning of the second turn of the crank the cam 1621 and last half of the cycle of operation will engage the upper inwardly-extending roller 1616 on the forwardly-extending pivot arm 1612 to lift upon the pivot arm and rock the drive clutch 417 in a clockwise direction, the rollers 1610 and 1599 then being free of their respective cams 1618 and 1619.

The major turning of the drive clutch rocker 417 will have been effected by the cam 1621 but the final push upon the rocker 417 and the swing bar assembly 1148 forwardly home to its neutral position is effected by the engagement of the cam 1622 with the lower roller 1614 by the engagement of inclined edge 1623 of the cam 1622 and the dwell edge 1624 to take the roller and the rocker 417 to the neutral position shown in FIG. 89. Through these cams provided upon the cam group assemblies 481 and 380, working in reverse rotation the drive clutch rocker 417 is rocked to furnish the power to the rock shaft 410 of the transfer unit that drives the swing bar assembly 1148. The drive clutch rocker 417 is rocked first in one direction and then in the other for each complete cycle of operation.

The removable drive clutch rocker 417 in addition to being supported at its inner end by the circular boss portion 502′ journalled in a large hole in the side frame plate 207 is supported at its outer end by its journal shaft extension 502 fitted into the inwardly-extending sleeve 501, FIGS. 42 and 82, carried on the removable cams cover plate 425. The cams cover plate 425 is removably secured upon posts extending outwardly from the right side frame plate 207 in the manner above described and held by hand nuts that are removed upon disassembly of the machine to permit the removal of the drive clutch rocker 417 and the three cam groups assemblies, 479, 480 and 481 and various small parts.

*O. Main Starting Lever and Cycle Stop Latch Lever Assembly 510 and 486 (FIGS. 1, 2, 82, 85, 89 and 91)*

The main starting button "M" is fixed to the top of the starting lever 510, FIGS. 1 and 2, and the starting lever 510 is pivoted upon its support pin 513 extending outwardly from the right side frame plate 207. The lever 510 has an inner pivot lug 1625 that fits over the support pin 513 and abuts a shoulder 1626 thereon to hold the lever 510 spaced from the outer face of the right side frame plate 207. At the right and outer side of the lever 510 and spaced from the inner lug 1625 is a long depending cycle stop latch operating arm 1627. The supporting post 513 extends through this arm 1627 and the lever and its arm are made secure on the post 513 against axial displacement therefrom by the cotter pin 516. The depending arm 1627 is outwardly offset at its lower end and carries a pivot pin 1628 to which the rearwardly-extending stop latch pin link 483 is pivotally connected.

The combined cycle stop latch and cammed lever 486 are pivoted on the reduced threaded end 493 of the outwardly-extending supporting post 490 that receives the cam cover plate 425 and is held thereby against the shoulder of the supporting post 490 provided by the reduced diameter portion 493, FIGS. 82, 85, and 89. This stop latch lever 486 can thus pivot between starting and stopping positions, rearwardly and forwardly. The stop latch pin link 483 is connected outside of the cams cover plate 425 by the stop latch and cam lever pin 485 that extends through the elongated slot 487 in the cams cover plate 425 to permit fore and aft movement of the lever pin 485, FIG. 82. Also secured to the lever pin 485 with the latch pin link 483 is the motor starting latch pin link 484. These links 483 and 484 are secured to the pin 485 after the cover plate 425 has been fixed in place to its supports by the small hand nut 482.

The combined cycle stop latch and cammed lever 486 is enlarged on its upper end overlying the drive gear 508 of the second cam group assembly 480 and is generally of arcuate shape, and can slide fore and aft over the outer face of the gear 508. This lever 486 has a rear arcuate-shaped arm 1629 and a forward arcuate shaped cam end arm 1630 diametrically-opposite therefrom. The rear stop latch lever arm 1629 has a radially-inwardly-extending stop latch projection 1631 that receives on its under edge a pin projection 1632 that projects outwardly from the face of the gear plate 508 and radially-spaced from its center. The engagement of this pin 1633 with the inwardly-extending stop latch projection 1631 has effected the stopping of the rotation of the gear 508 and since this gear 508 is intermeshed with the first and third gear group assemblies, 479 and 481, a locking action is effected to stop and lock the entire machine, the machine parts having been brought to their neutral positions.

When the lever 510 is depressed its depending arm 1627 forces the link 483 rearwardly and acting through the latch pin 485 of the cycle stop and cam lever 486, the lever 486 is pivoted rearwardly, in the direction of the arrow as viewed in FIG. 89, to release the gear wheel pin projection 1632 from the radially-inwardly-extending latch lever stop projection 1631. At this time the hand crank is released so that it can rotate the gear assemblies 479, 480 and 481. With the motor 453 being provided for the machine and the machine and the motor starting latch pin link having been simultaneously pulled to actuate the motor starting switch in a manner to be later described, the machine will be automatically put into operation without the turning of the hand crank 188.

The cycle stop latch and cammed lever 486 has in its outer face a small detent hole 1632 and as the latch lever is moved rearwardly this hole registers with a self-contained ball detent device 1634 carried by the cams cover plate 425 and extending through and against the outer face of the latch lever 486. When the latch lever ball detent hole 1634 comes into registry with the ball detent 1635 on the cover plate 425 the latch lever 486 is held in its released rearward position against gravity and forward displacement.

The gear 508 and its pin 1632 travels when so released in the direction of the arrow as shown in FIG. 89 through one hundred and eighty degrees when it strikes a cam end edge 1635 as indicated at 1632′ and an arcuate shaped inner edge 1636 running therefrom that causes the latch lever 486 to be detached from the cover plate detent 1634 and moved forwardly to thereafter position the radially-inwardly extending stop latch projection 1631 so that as the pin 1632 of the gear 508 approaches the end of one turn, the pin 1632 is stopped and the machine is arrested after having made one complete cycle of operation. The machine is at the same time prepared for the next cycle of operation with parts having been brought to their neutral positions.

The main starting lever 510 is returned to its elevated position by the latch lever 486 that is forced rearwardly by engagement of the gear pin 1632 with the cam end edge 1635. This action causes the pivot pin 485 to push forwardly the link 483 and the depending operating arm 1627 of the lever 510 and pivot the starting lever 510 upwardly, FIG. 85.

*P. Cam Operated General Release Bar Device 613 and the Operating Mechanism Therefor (FIGS. 5, 22, 82, 85, 89, 91, 102, 103 and 104)*

The lock slide plates 557 and 672 of the respective transaction key and value key units 216 and 217 to 221 have their rearwardly-extending hook projections 612 and 727 that provide lost motion connections 615 and 728 with the transversely-extending rod 614 of the cam-operated key units release bar device 613. The lock slide plates 557 and 676 of the transaction and value key units are respectively provided with the inclined lock projections 602 to 608, and 616 to 623 of the respective lock-slide plates. Each of these projections as set forth above have a short upper shoulder, a long lower shoulder and a forward inclined edge on which a vertically-extending key plate rides to push the slide plate rearwardly so that the top edge 611 of the key plate may register with the lower shoulder 610 as with the transaction key unit 216, FIGS. 5, 102, 103 and 104, against the action of the spring 591 of the lock slide plate 557 serving to catch the shoulder 611 of the key plate 530 under the lower shoulder 610. Thereafter as the machine is put into operation the key units release device 613 is pivoted so that the transverse rod 614 thereof engages the forward ends of the lost-motion recesses 615 and 728 of the lock slide plates 557 and 672, FIG. 103.

The under edge 610, or in the case of the value lock slide plate 672, the under edge 726, FIG. 22 are pushed forwardly home over the top edges 611 of the depressed key plates and the short top lock edges 609 and 725 of the slide plates are pushed under the undepressed key plates edges 572 to hold these key plates against being depressed while the machine is in operation. At the end of the cycle of operation the lock slide plates 557 and 672 of the transaction and value key units must be pulled rearwardly by their projections 612 and 727 to release the depressed key plates from the slide plate lock projections and to again permit the location of the under key plate edges 572 in vertical alignment with the inclined lock projection edges 616 and 729 of the respective slide plates 557 and 672. This is effected by the rearward thrust of the transverse rod 614 of the release bar device 613 at the end of the cycle of operation. The release bar device 613 includes a pivot shaft 1637, FIGS. 5, 22, 85, 102, 103 and 104 that is pivoted at its right end in the right side frame plate 207 and at its left end in the left side frame plate 208 so that it may be pivoted to move transverse rod 614 fore and aft, this transverse work rod 614 being connected between the ends of fixed depending laterally-spaced supporting arms 1638.

The pivot shaft 1637 extends laterally through the right end plate and has connected to its right end a depending operating arm 1639. This operating arm 1639 has a set hub bushing 1640 that is made secure to the shaft end by a set screw 1641. The operating arm 1639 lies flush against the other face of the side frame plate. Extending forwardly from the lower end of the operating arm 1639 is a forwardly and downwardly curved and outwardly offset connecting link 1642.

This link 1642 is connected to the arm 1639 by a pivot pin 1643 from which a long spring pin post 1644 extends. A tension spring 1645 is connected to the spring post and is anchored forwardly thereof to a spring post 1646. This tension spring 1645 biases the release bar device 615 and its transverse work rod 614 forwardly, FIG. 85.

The lower end of the forwardly-extending and downwardly curved link 1642 is connected by a pivot pin 1647′ to the upper end of a vertically-extending, laterally-shiftable cam following lever 1647 that is pivoted upon supporting post 1648. The cam follower lever supporting post 1648 extends outwardly from the right side frame plate 207 and secured thereto by a nut 1649 threaded on an inner reduced-diameter end 1650 of the post that is extended through the side frame plate 207 and tightened against the inner face thereof, FIG. 88. The lower end of the cam follower lever 1647 rides on the fourth and innermost cam 1651 of the second cam group assembly 480, FIG. 89. The tension spring 1645 holds the lower end of the cam follower lever 1647 against the cam 1651 and as the lower end of the cam follower rides off its dwell portion 1652, the keys release bar device 613 is turned clockwise by the tension spring to force the transverse rod 614 thereof against the rear edge of the recesses 615 and 728 of the respective lock slide plates 557 and 672 of the key units 216 to 221 to thereby lock the depressed key plates of the key units in the manner as immediately above set forth. The key plates are remained locked until the end of the cycle of operation and are then released by the raised projection 1653 on the beginning of the dwell portion 1652 of the cam 1651 as it rides counterclockwise over the lower end of the cam follower lever 1647. This gives to the cam follower 1647 a clockwise pivot movement and pushes the link 1642 rearwardly against the action of the tension spring 1645 to pivot the release bar device 613 counterclockwise sufficiently to cause the transverse rod 614 to engage the rear ends of the hook projections 612 and 727 and their lock slide plates 557 and 672 sufficiently to release the depressed key plates from the slide plate lock projections and prepare the key units for the next accounting and cycle of operation.

*Q. Repeat Lever "R" Operating Mechanism (FIGS. 2, 82, 85, 88 and 89)*

The repeat lever 511 is pivoted upon the support pin 514 by a depending side lug 1654, FIG. 82, and against a spacing flange 1655 extending from the outer face of the right side frame plate 207 to hold the lever 511 spaced therefrom. The support pin 514 is made secure upon the side frame plate 207 by its flange 1655 and a fastening nut tightened upon the support pin 514 and against the inner face of the side frame plate 207, in the same manner that the main lever support pin has been made secure, FIGS. 82 and 88. The outer side of the repeat lever 511 laterally spaced from the lug 1554 has a long depending operating arm 1656 which also receives the support pin 514. The cotter pin 517 extends through the support pin 514 and bears against the arm 1656 to retain the lever 511 upon the support pin 514.

The cam follower lever pivot pin post 1648 for the cam follower lever 1647 has a C-washer 1657 secured in a groove in the end of the pin post 1649 against which a heavy compression spring 1658 surrounding the post reacts to normally force the shiftable cam follower lever 1647, FIG. 88, by acting against its wear pad 1659 welded to the outer face thereof and tending to force its inclined cam projection 1660 on the inner face of the cam follower lever 1647 toward a vertically-extending bifurcated slide 1661 having its bifurcation lying astraddle the cam follower support pin 1648 and flush against the outer face of the right side frame plate 207. This vertically-extending bifurcated slide 1661 has opposed inclined work wedges 1662 lying respectively at opposite sides of the bifurcation, fixed securely thereto and adapted to cooperate with the inclined cam projection 1660 on the cam follower lever 1647 to upon the slide 1661 being depressed shift the cam follower lever 1647 outwardly against the action of the compression spring 1658 and the C-washer 1657 on the supporting pin 1648. The vertically-extending bifurcated slide 1661 is connected at its upper end by a pivot nut bolt assembly 1663 to a depending bracket 1664 fixed to the underface of the repeat lever 511 at the forward end thereof, FIG. 88. Thus, when the repeat lever 511 is depressed the above wedging action is effected to shift the cam follower lever 1647 outwardly and into alignment with a non-release cam 1665 outwardly spaced from the release cam 1651 and both cams being upon the second cam group assembly 480. This non-release cam 1665 has only a dwell edge portion 1666 and without a raised projection corresponding to the projection 1653 of the cam 1651. Accordingly, as the cam 1665 is turned and the lower end of the cam follower lever 1647 is returned to the smooth dwell edge 1666 of the cam 1665 and no additional lift is given to the lower end of the shiftable cam follower lever 1647 sufficiently to move the curved link 1642 and the release bar operating arm 1639 rearwardly to cause the transverse rod 614 to pull the key unit lock slide plates 557 and 672 rearwardly and thus the depressed keys of the one operation are left depressed for the next cycle of operation. The repeat lever 511, however, will be elevated and the vertically-extending bifurcated slide 1666 will be pulled upwardly by the lever 511 to disengage its work wedges 1662, from the inclined cam projection 1660 and to thereby permit the cam follower lever 1647 to be shifted inwardly upon the support pin 1648 by the compression spring 1658 and into its neutral position overlying the release cam 1651. The upward pivotal movement of the repeat lever 511 to lift the spaced work wedges 1663 is effected through a link 1667 that is connected for loss motion with the repeat lever depending operating arm 1656 by its enlarged slide end 1668 and a pivot pin 1669. The forward end of this main and repeat lever interconnecting link 1667 is connected by a pivot pin 1670 to the depending operating arm 1627 of the main starting lever 510 so that as the pin 485 of the latch lever 486 is pulled inwardly with the latch lever 486 upon the second gear cycle pin 1632 engaging the cam edge end 1635 of the latch lever 486, the link 483 acts through its pin connection 1628 with the operating arm 1627 of the main lever 510 to elevate it and at the same time the operating arm 1627 of the main lever 510 pulls forwardly the interconnecting link 1667 and the depending arm 1656 by the connection of the link with the pivot pin 1669 thereof to elevate the repeat lever 511 and the vertically-extending wedge slide plate 1661. In order to prevent the immediate inward shifting of the cam follower lever 1647, a substantially circular separating plate 1671 is provided between the release and non-release cams 1651 and 1665 to prevent the return shifting of the cam follower 1647 until the opening 1672 of the circular plate 1671 appears adjacent to the dwell portions 1652 and 1666 of these cams 1651 and 1665. As soon as the end of the circular portion 1672 and the lift portion 1653 of the cam 1651 has passed to locate the lower end of the cam lever 1647 near to its neutral position, FIG. 89 the cam follower lever 1647 is automatically returned to its neutral position overlying the dwell portion 1652 of the cam 1651 due to the release of the bifurcated slide and action of the pin support compression spring 1658. If there is to be another repeat operation of the previous selected accounting, the repeat lever 511 is again depressed and it acting through the levers interconnecting link 1667 causes the main lever 510 to be depressed which in turn acts through the link 483 to disengage the stop latch lever 486 from the gear pin 1632 and start the operation of the machine. As this is done the wedge slide plate 1661 is again depressed to again shift the cam follower lever 1647 to the non-release cam 1665 so that again the general release bar device 613 will not be operated and the key plates of the key units will be left depressed for another repeat operation.

At the end of the operation the cam follower 1647 will again be returned to its neutral position over the cam 1651. On the last repeat operation instead of the repeat lever 511 being depressed, the general starting lever 510 is depressed, and the cam follower lever 1647 for this operation is not outwardly shifted to the cam 1665 since the bifurcated slide 1661 is not depressed. Accordingly, with the cam follower lever 1647 being kept upon the cam 1651 the rotation of the cam and engagement of its projection 1653 with the lower end of the cam follower 1647 the release bar device 613 will be pivoted rearwardly to pull the lock slide plate rearwardly and release the depressed key buttons of the key units. Hence to complete the repeating operations, the main lever 510 is depressed to effect the last repeat operation and to terminate the repeat cycles. Only upon the last repeat operation does the main lever 510 have to be depressed. Accordingly, double motions effected with other machines by having to depress for repeat operations each time both the repeat and main lever buttons. With the present machine, for each repeat operation, except for the last one, the repeat lever 511 is only depressed and through its link connection with the main lever 510 the machine can be automatically started without having to depress the main lever. While the repeat lever 511 is tied to the main lever 510, the main lever is not tied to the repeat lever 511 and can be operated independently of the repeat lever because of the loss motion slotted connection slide end 1668 of the link 1667 with the repeat lever operating arm 1656. It will now be made apparent as to how the depressed key buttons of the transaction and value key units can be released or erased should the count of the repeat operations have been lost or at any other time after having depressed the buttons wrongfully.

*R. The Erasing Lever "X" and Its Cam Operating Mechanism (FIGS. 2, 5, 22, 82 and 85)*

The erasing lever 512 through its button "X" is depressed when it is desired to release the depressed keys without putting the machine into operation. This lever 512 has a depending operating arm 1673 by which and by an outer side lug 1674 the lever is pivotally connected to the support pin 515, FIGS. 82 and 85. This support pin 515 is fixed to the side frame plate 207 and extends outwardly therefrom and has a spacing flange to retain the lever 512 spaced outwardly from the side frame face. The lever 512 is held against axial displacement from the support pin 515 by the cotter pin 518. Pivotally connected to the operating arm 1673 by a pivot connection 1675 and for vertical swingable movement is a drop hook catch arm 1676. This drop hook catch arm 1676 has at its outer end a hook notch 1677 that as the erasing lever 512 is depressed will hook over the long spring pin extension 1644 of the pivot pin 1643 of the operating arm 1639 of the general release bar device 613 so as to pivot the general release bar device 613 and pull the lock slide plates 557 and 672 of the key units to release the key buttons. This can be effected any time that the operating parts of the machine are in their neutral positions. The pin extension parts 1644 and the release bar operating arm 1639 are worked at other times when the machine is in operation under the notch 1677 and the hook catch arm 1676 rearwardly of the hook end notch 1677 is an undercut inclined cam edge 1678 that rides in an annular groove provided in an outwardly extending hook catch arm guide support 1679 and which has a spring pin extension 1680 to which a tension spring 1681 is anchored. This tension spring 1681 is connected to a spring pin extension 1682 of the pivot connection 1675 of the hook catch arm 1676 with the erasing lever operating arm 1673 to hold the erasing lever 512 elevated and its cam edge 1678 against the guide support post 1679. To further hold the cam edge 1678 upon the guide post 1679, a tension spring 1683 is connected between a spring pin 1684 extending outwardly from the lower end of the eraser lever operating arm 1673 and a spring pin 1685 extending outwardly from the pivot lever 1676 to thereby pull the pivot lever 1676 downwardly as the erasing lever 512 is depressed so that the hook end notch 1677 will hook the spring pin extension post 1644 on the operating arm 639 of the release device 613 to operate the same and release the key buttons. As soon as the key buttons have been released the erasing lever is returned upwardly by its long tension spring.

S. First Cam Group Assembly 479 (FIGS. 82, 85, 89, 90)

The first cam group assembly 479 has the large drive gear 194 to which a journal mounting sleeve 1686 is secured by its flange 1687 and rivets 1688 on which the right cams 808, 861, 862, 863, 864, 865, 853 and 1067 are assembled, FIGS. 89 and 90.

This first cam group assembly 479 is removably carried for rotation on the supporting post 488 that is fixed by a reduced diameter threaded portion 1689 and a securing nut 1690 to the right side frame plate 207 to extend outwardly therefrom. The outer end of the supporting post 488 has the reduced diameter threaded extension 491 providing for a shoulder 1691 against which the cams cover plate bushing 495 abuts upon the cam cover plate 425 being finally assembled over the cams groups, FIG. 90. The hand turned nut 498 is threaded upon the threaded outer end 491 of the supporting post 488 to hold the cam cover plate 425 upon the post 488 and the first cam group assembly 479 against outward displacement from the supporting post 488 while permitting its rotation thereupon.

The inner end of the journal mounting sleeve 1686 is threaded to receive a securing nut 1691' to retain the cams and cam separating plates 1692, 1693, 1694, 1695, 1696, 1697, 1698 respectively disposed between adjacent cams beginning from the gear 194 and inwardly thereof and the entire assembly made secure by the nut 1691' against the flange 1687 of the journal sleeve 1686. These cams and their spacing plates are held against angular displacement from one another and from the drive gear 194 by a radially-spaced pin 1699 fixed to the gear 194 radially outwardly of the journal sleeve 1686 and extending through holes 1700 provided respectively in the respective cams and separating plates and similarly radially spaced from the sleeve to accommodate the retaining pin 1699.

The separating plates 1693 to 1698 are generally of circular shape and of larger diameter than the cams and serve to confine the cam followers 809, 1036, 860, 852 and 1066 to their respective cams against lateral displacement while the machine is in operation.

The shiftable cam follower 860 is adapted to overlie in its neutral position without riding the cam 861 and can be moved to be worked by any one of four different cams 862, 863, 864 and 865 when shifted therefor. The cam separating plates 1694, 1695, 1696, 1697 are respectively cut away at 1694', 1695', 1696' and 1697' to allow the shiftable cam follower 860 to be shifted to any one of its four different cam stations 860a, 860b, 860c and 860d, FIG. 89. The cut away portions 1694', 1695', 1696' and 1697' are axially aligned through only a short duration of rotation of the cam group and are axially aligned with the shiftable cam follower 860 to permit the lateral shifting of the cam follower 860 close to its neutral position and at the start of the cycle of operation. When the machine is put into operation the shiftable cam follower 860 is confined to the selected cam by the separating plates and against lateral shifting. This shiftable cam follower 860 is operated by the transaction key selector slide bar 440 and serves the actuation of the totalizer operating plates cluster 429 and the raising and lowering of the front and rear totalizers 317 and 318. The main cam follower 851 and its cam follower upper end 852 serves to lower the totalizers at the end of the cycle, all of which has been set forth above in connection with the description of the construction and operation of the slide bar 440 and the operating parts cluster 429. More will be stated in the description of the general operation of the machine. The high and drop edges of the respective cams of this cam group are made and angled with respect to one another to effect the proper timing of the various parts of the machine operated by the respective cams.

As described above, the totalizer selector slide bar 440 is brought to its neutral position and held by the cam lobe portion 810 of the cam 808 and the location of the cam follower 809 thereupon. The slide bar 440 is held in its neutral position against the action of its tension spring 443 and is immediately released upon cam follower 809 being dropped from the cam lobe 810.

The cam follower 1036 follows the lobe cam 861 and through the pivot shaft 1034 serves to pivot rearwardly the keys release unit depending catch arms 1014 to 1020 from the transfer unit hook catches 1021 to 1027.

The cam follower 1066 rides the last cam 1067 and serves to release the transfer release and lock unit upstanding hook arms 997 to 1003 and the respective transfer unit gear assemblies 554, 1117 to 1122.

T. The Second Cam Group Assembly 480 (FIGS. 82, 85, 89, 91)

The second cam group assembly 480 has the large drive gear 508 to which a journal mounting sleeve 1701 is connected by its flange 1702 and rivets 1703, FIGS. 89 and 91. This mounting sleeve 1701 carries the four cams 1622, 1621, 1665 and 1651. These cams are spaced inwardly from the sleeve flange 1702 and respectively from each other by thick spacing rings 1704, 1705, a thin spacing washer 1706 and thin cam follower separating guide plate 1671. On the inner end of the journal sleeve 1701 is a final ring 1708 and a nut 1709 that is threaded upon the inner end of the journal sleeve to clamp the parts against the sleeve flange 1702. The cams and the thin separating plate 1707 are retained against angular displacement with respect to the gear 508 and with respect to each other by a radially-offset axially-extending pin 1710 that extends through respective radially-offset holes 1711 of the respective cams and the thin separating plate 1707, FIGS. 89 and 91.

The cam assembly 480 is removably supported and journalled upon the transfer unit rod support sleeve 426. The cams cover plate 425 through the cover plate pull rod bushing sleeve 424 retains the cam group 480 upon the pull rod support sleeve 426 against axial displacement therefrom. The stop latch and cammed lever supporting post 490 is fixed to the right side frame plate 207 to extend outwardly therefrom by a reduced diameter threaded portion 1712 and a securing nut 1713 and is provided with a shoulder 1714 against which the cycle stop latch 486 is held while being pivoted upon its pivot portion 493 and against the outer face of the gear 508 for cooperation with the stop latch pin 1632 fixed to the gear face. The cams 1662 and 1621 respectively work together to operate the removable drive clutch rocker 417 to turn the same in a clockwise direction and to effect the return movement of the swing bar assembly 1148. These cams 1621 and 1622 respectively engage and act upon the upper and lower rollers 1616 and 1614 in sequence to rock the drive clutch rocker 417 in the clockwise direction.

The cam 1651 acts upon the vertically-extending laterally-shiftable follower 1647 to effect the automatic release of the key buttons at the end of the cycle of operation through its raised projection 1653. The cam follower 1647 is shifted to the cam 1665 when a repeat accounting operation is to be had.

U. The Third Cam Group Assembly 481 (FIGS. 82, 85, 89, 92)

The third cam group assembly 481 has a journal mounting sleeve 1715 that is secured by its flange 1716 to the gear 509 by rivets 1717. The cash drawer release cam 178 is disposed upon the outer face of the gear 509 and is held fixed thereagainst by the rivets 1717 that secure the flange to the gear 508. This lift cam 178 has a single lobe that acts upon the cash drawer hook latch cam follower arm 179 to lift the cash drawer hook latch 161 against the action of the spring 176 at the end of the cycle of operation to release the cash drawer 152 and allow the same to move outwardly under the action of the compression spring 165, FIG. 2. The double lobe cam 1581 is held tightly against the sleeve flange 1716 and spaced from the gear plate 509. The second lobe 1582 carries the pin 1588 against which the inclined edge 1587 of the double cam follower lever 1579 that operate the vertically-swingable bifurcated latch arms operating device 387, the roller 1583 of the lever 1579 riding the cam lobes 1581, 1582 of the cam 1578. A radially-spaced pin 1718 extends from the cam 178 and gear 509 through the respective holes 1719 of the respective cams 1578, 1619, 1618 and 1561 to retain the cams against angular displacement with respect to the gear 509 and respect to each other. The cam 1619 is spaced from the cam 1581 by a spacing ring 1720 and in turn the cam 1618 is spaced from the cam 1619 by spacing ring 1721. The cam 1561 is spaced from the cam 1618 by the spacing ring 1722. A washer 1723 is placed upon cam 1561 and the entire assembly of cams and spacing rings are made secure against the flange 1716 of the journal sleeve 1715 by a securing nut 1724 threaded upon the inner end of the sleeve 1715. This third cam group is journalled by its sleeve 1715 upon the third cam group supporting post 489 which is made secure to the right frame side plate 207 by its reduced diameter threaded portion 1725 and securing nut 1726. The cam group 481 is held against axial displacement from the suporting post 489 by the engagement of the cover plate bushing 496 and the cover plate 425, with the hand nut 499 securing the cover plate 425 upon the reduced threaded end 492 of the supporting post 489 and against a shoulder 1727 provided thereby upon the supporting post 489. The drive clutch rocker rollers 1610 and 1599 ride respectively on cams 1618 and 1619 to rock the clutch rocker 417 in an initial counterclockwise direction and working in cooperation with the cams 1621 and 1622 of the second cam group and to give the transfer unit swing bar assembly 1148 its initial forward swing movement.

The double cam 1561 works the follower lever 1562 through the engagement of the follower end 1567 with the offset cam plate 1565 and the engagement of the roller 1575 with the cam lobe 1574 to assist the action of the spring 1564, FIG. 85 in the working of the bifurcated arm 272, FIG. 93 and the indicia bearing flash plates operating device 1537 for flashing the indicia bearing plates of the indicating mechanism 232 at the end of the cycle to register the accountings.

*V. Construction of Motor Drive Gear and Switch Control Unit 458 (FIGS. 82, 83 and 84)*

The combined motor drive gear and switch control unit 458 will now be described in detail. This unit is removably supported upon the right side frame plate 207 by the small diameter mounting pins 474 so that its input gear 457 is in engagement with the motor drive pinion 456 to be driven thereby. This unit has a base plate 1728 that has three spacing sleeves 1729, 1730 and 1731 that respectively receive the mounting pins 474. The base plate lies against the studs 475 and on the outer ends of the spacing sleeves is an outer plate 1732. The mounting pin hand fastening nuts 476 are tightened upon the mounting pins 474 against the outer plate 1732. The input gear 457 that is driven from the motor pinion 456, is made of plastic to silence the drive and has a long pinion gear 1733 connected to it. These gears 457 and 1733 are journaled together on a center pin 1734 fixed between the base and outer plates 1728 and 1732, FIGS. 82 and 83.

The long pinion gear 1733, in turn, meshes with a large gear 1735 to drive the same. This large gear 1735 is journaled upon a pivot pin 1736 extending between an outwardly offset extension 1737 at the rear of the base plate 1728 and a rear extension 1738 of the outer plate 1732. This large gear 1735 has a ratchet wheel 1739 secured to its inner face by means of rivets 1740, FIG. 84. Pivoted upon the upper spacing sleeve 1730 is a switch supporting plate arm 1741 that extends rearwardly and is biased downwardly by a tension spring 1742 connected to a spring pin 1743 on the switch supporting plate arm 1741 and anchored to the plates spacing sleeve 1729. The large gear 1735 has a spacing ring 1744 on its outer face to hold the gear 1735 inwardly spaced from the outer plate 1732.

On the pivot pin 1736 inwardly of the large gear 1735, is a one way clutch assembly 1745 that carries the major drive and switch unit output pinion 477 that meshes with the driven gear 194 of the first cam group 479 to drive the cam groups in lieu of the hand crank 188, FIG. 84. This clutch assembly 1745 comprises a generally circular base plate 1746 that has a radially-extending stop edge 1747 adapted to come to rest against an outwardly-extending pin projection 1748 on the switch-supporting plate arm 1741.

The drive unit output pinion gear 477 is secured to the clutch base plate 1746 by its outwardly-extending hub 1749 to an inwardly-extending hub 1750 of the clutch assembly base plate to provide a space between the gear 477 and the clutch base plate 1746 and a central hub on which a lock plate 1751, similar in shape to the base plate 1746 and a stop edge 1752 also adapted to engage the pin projection 1748 on the switch supporting plate arm 1741 is journaled. The circular base plate 1746 has a cut away recess 1753 in the peripheral edge thereof and outwardly from the lock plate 1751 and through the recess 1753 there extends a stop pin 1754 that engages the ends of the cut away recess 1753 to limit the rotational movement of the lock plate 1751 relative to the base plate 1746 and the pinion gear 477. The base plate 1746 by its hub 1750 is joined to the hub 1749 of the pinion gear 477 by rivets 1755, FIG. 84.

In the neutral positions, the radially-extending stop edges 1747 and 1752 of the circular base and lock plates 1746 and 1751 are aligned with one another due to the reaction of the gearing of the machine against the pinion gear 477. A tension spring 1756 is stretched, as shown in FIG. 84, by the push of the radial edge 1752 of the lock plate 1751 against the switch supporting arm pin. This tension spring 1756 is connected to the recess pin 1754 on the lock plate 1751 and is anchored to a spring pin 1757 on the outer face of the clutch base plate 1746.

A ratchet pawl 1758 is pivoted on the outer face of the clutch base plate 1746 by a pivot pin 1759 and engages the ratchet wheel 1739. This ratchet pawl 1758 has an outwardly-extending pin projection 1760 to which a tension spring 1761 is connected and anchored to an outwardly-extending spring pin 1762 on the base plate 1746 to bias the pawl into engagement with the ratchet wheel 1739 fixed to the large gear 1735.

In the clutch base plate 1746 under the ratchet pawl 1758 is an oversize hole 1763 through which an inwardly-extending stop pin 1764 on the pawl 1758 extends for engagement with a stop edge 1765 cut in the lock plate 1751 and after the pawl pin 1764 has been worked outwardly over a cam edge 1766 so as to release the pawl 1758 from the ratchet wheel 1739 and to detach the machine operating mechanism from the motor drive so that the motor cam can overrun itself when the cycle of operation has been completed before the motor has come to a stop.

The pin projection 1748 on the switch-supporting plate arm 1741 is mounted on a cushioning slide plate assembly 1767 that is biased to a forward position by a tension spring 1768 connected between an inwardly-extending pin 1769 thereof and a guide pin 1770 that extends inwardly from the switch arm plate 1741 and through an elongated slot 1771 in the slide plate 1767 to normally urge the pin 1748 forwardly against the bottom of a slot 1772 in the rearward end of the switch arm plate 1741 that supports the pin 1748. This slide plate assembly 1767 gives the rearward cushioning action to the pin 1748 to minimize breakage on the stopping and starting of the driving gears.

When the radially-extending stop edge 1752 of the lock plate 1751 is brought by the pin 1748 of the switch supporting plate arm 1741 to the radially-extending stop edge 1747 of the clutch base plate 1746, the ratchet pawl 1758 will have been worked outwardly by the cam edge 1766 of the lock plate 1751 so that the motor is free to overrun the machine operating mechanism. On the switch-supporting plate arm 1741 is a rearward extension 1773 held outwardly from the outer face of the supporting plate arm 1741 by spacing pins 1774 and having on its end a bent out projection 1775 with which an inverted hook arm 1776 engages to lift the supporting arm 1741 as the cycle stop latch 486 is disengaged from the pin 1632 on the second cam group drive gear 508. This inverted hook arm 1776 is pivotally carried on the cams cover plate 425 by a pivot screw 1777 and has a pivot pin 1778 that supports a lost motion elongated slotted forward end 1779 of the motor starting latch pin link 484 that is connected to the cycle stop latch and cam lever pin 485, FIG. 82. As the starting or repeat levers 510 and 511 are depressed to release through the starting lever stop latch pin link 483 to release the stop latch lever 486, the motor starting latch link 484 is pulled so that its elongated slotted end 1779 pivots the inverted hook arm 1776 about the screw pivot pin 1777 on the cover plate 425 to lift the switch supporting plate arm 1741 from the clutch base and lock plates 1746 and 1751. When this is done the lock plate 1751 is pivoted by the tension spring 1756 so that its radially-extending edge 1752 is advanced beyond the radially-extending edge 1747 of the clutch base plate 1746 and the cam edge 1766 of the lock plate 1751 allows the pin 1764 of the pawl 1758 to travel inwardly to thereby effect the engagement of the pawl and 1760 of the pawl 1758 with the ratchet wheel 1739 of the gear wheel 1735 and thereby through this base plate 1746 that carries the pawl 1758 and the rivets 1755 effect a drive connection with the output pinion 477 of the motor drive and switch unit 458. The machine will then be motor driven by its cam group assemblies with which the output gear 477 is connected and without the need for the crank 188. The hand crank clutch assembly 193, FIG. 101, as explained in the beginning of the detail description and also connected to the first cam group gear 194 will be overrun by the motor drive unit 458 and be ineffective in a manner that has already been set forth.

When the cycle of operation has been completed and the cycle latch stop 486 returned to its engagement with the pin 1632 on the second cam assembly gear wheel 508 the motor starting latch pin link 484 is moved forwardly to allow the inverted motor hook arm 1776 to lower the supporting arm plate 1741 so that the pin 1748 on the switch supporting plate arm 1741 is cushioned into engagement with the radially-extending stop edges 1752 and 1747 of the lock and base plates 1751 and 1746 to pivot the lock plate 1751 counterclockwise upon the base plate 1746 against the action of the tension spring 1756 and cause the ratchet pawl 1764 to be worked by the cam edge 1766 of the lock plate 1751 against the action of the pawl tension spring 1761 to release the pawl 1758 from the ratchet wheel 1739 of the gear 1775 and allow the motor drive and gear wheel 1735 to overrun the clutch assembly 1745 and the output pinion gear 477 upon the motor being stopped.

Extending upwardly from the switch-supporting plate arm 1741 and fixed thereto, is an insulating member 1780 that carries a fixed contact 1781 with a lug 1782 to which a wire 1783 is connected. Pivoted on the switch-supporting plate arm 1741 by a pivot pin 1784 is an insulating member 1775 that carries a movable contact 1786 adapted for engagement with the fixed contact 1781. This contact 1781 has a lug to which a wire 1787 is connected. Fixed to the movable contact insulating member 1785 is a rearwardly-extending follower member 1788 to which a tension spring 1789 is connected and anchored to a pin 1790 on the plate arm 1740 to bias the movable contact 1786 toward the fixed contact 1781 and the finger end 1791 of the follower member 1788 toward an outwardly-extending pin 1792 in the clutch baseplate 1746 adjacent to its radially-extending stop edge 1747. When the stop edges 1747 and 1752 of the base and lock plates 1746 and 1751 are held together by the pin 1748 on the switch-supporting plate arm 1741 and plate arm 1741 is in the neutral down position, the finger end 1791 of the follower 1788 is pivoted upwardly to hold the movable contact 1786 pivoted away from the fixed contact 1781 so that motor that is controlled by the switch does not run. On lifting the switch supporting arm 1741 by the inverted hook arm 1776 as upon depressing the starting and repeat levers 510 and 511, the movable contact 1786 is closed upon the fixed contact 1781 by the movable contact tension spring 1789 and the motor 453 is started and the machine put through its cycle of operation. At the end of the cycle of operation the inverted hook arm 1776 is lowered and the switch supporting arm 1741 is dropped upon the clutch assembly 1745 so that not only does the clutch assembly 1745 disengage the motor drive but the movable switch contact 1786 is separated from the fixed contact 1781 by the engagement of the finger end 1791 of the follower 1788.

The wires 1783 and 1787 are respectively connected to plug sockets 1793 carried respectively by insulating plate member 1794 fixed to the opposite sides of an upwardly-extending projection 1795 on the forward end of the switch-supporting plate arm 1741 by fastening screw bolts 1796.

The electric motor unit 453 will have wire connections with the plug receptacles 1793 and with an electric supply source in the usual manner so that the motor unit will be started by the drive and switch unit 458 as above stated.

The description of the construction of the present machine has now been completed with the detail operation of the parts of the various units having been given and now a general operation of the machine as the various buttons of the value and transaction key units are depressed will be given.

IV. THE GENERAL OPERATION OF THE MACHINE

A. Neutral Positions of the Parts

As stated above and from the drawings, the parts of the machine are generally shown in the neutral positions. In many instances, various parts are spring-biased and pre-loaded in their neutral positions so that upon the machine being started the parts are released to permit the actuation of their springs while with other parts they are actuated against the action of their springs. Power is supplied either by hand crank or motor drive to cam groups which in turn operate the rock and pivot shafts.

In the neutral position of the parts, all of the key buttons of transaction and value key units 216 to 221 have been made ready to be depressed, FIGS. 1, 2, 22 to 24. The push and lock slide plates 556 and 557 of the transaction key unit 216 are forwardly retracted and all of the key buttons are elevated, FIGS. 5 to 8. The depending gear rack 542 of the transaction key unit 216 is also retracted forwardly at this time while remaining in engagement with the gear wheel 1153 of the rotary transfer unit transaction gear wheel assembly 554, FIGS. 5 and 45. The value key units 217 to 221, FIG. 1, have their parts similarly positioned at this time. The push and lock slide plates 671 and 672, FIG. 22, of the value key units are forwardly retracted and their key buttons are elevated. Their depending gear racks 658 are retracted and kept respectively in mesh with the respective gear wheels 1244 and 1317 of the rotary transfer unit value gear assemblies 1117 to 1122, FIGS. 22, 42, 58 and 61.

The cam-operated general release bar device 613, FIG. 4, that is pivoted between the side frame plates 207 and 208 just in rear of the transaction and value key units 216 to 221, has its transversely-extending work rod 614 lying within the hook projections 612 and 727 of the lock slide plates 557 and 672 of the transaction and value gear units, FIGS. 5, 22, 102, 103 and 104. The cam operated general release bar 613 in its neutral position locates its transverse work rod 614 loosely in the rear of the recesses 615 and 728 without applying any force to the projections 612 and 727, by the cam 1651 of the second cam group assembly 480, acting through the cam follower 1647, the downwardly and forwardly extending link 1642 and the depending operating arm 1639 of the release bar device 613 and against the action of the tension spring 1645, FIGS. 85 and 89.

The selector stop assembly 434 that is operated by the transaction key unit 216, will have all of its vertically-adjustable stops 740 to 746 elevated and undepressed, FIGS. 7, 9, 13 to 20, 21. The selector stop assembly slide plate 758 and the slide stop bar 440 will have been forced rearwardly by the double pivot work arm assembly 782 by engagement with the pins 781 and 804 thereof and against the action of the tension springs 811 and 443 of the totalizer operating plate 447 to the pin 769 of which the selector slide plate 758 is connected, and of the slide stop bar 440. The cam follower 809 is elevated by the lobe portion 810 of the cam 808 on the first cam group 479 and operates the double arms assembly 872 to force the selector slide plate 758 and slide bar 440 rearwardly and to hold them against the action of the springs 811 and 443 and ready to have immediate release from the sharp lobe portion 810 of the cam 808, FIGS. 19, 20, 21, 89 and 93.

The pivot hook arm 775 on the rear of the selector stop assembly 434 is held out of engagement with the selector slide plate pin 778 at this time, FIG. 13, and only when the "E" button of the transaction key unit 216 is depressed, FIG. 17, will the pivot hook arm 775 be permitted to come into engagement with the pin 778 to hold the slide plate 758 in a rearward position as already described but will again be set forth in this description of the general operation.

The cycle stop latch lever 486, FIGS. 85, 89 and 91 is held in its latch position with its inwardly-extending projection 1631 against the latch pin 1632 on the gear plate 508 of the second cam group assembly 480, and is connected through the starting lever latch pin link 483 with the main starting lever 510 that is elevated in its neutral position.

The totalizers operating plates 446 and 447, FIGS. 19, 42 and 91 to 100 in their neutral positions will have been rotated counterclockwise as viewed in FIG. 95 by the selector slide plate 758 against the action of the spring 811 and the selector and stop operating plate 446 pulled by the tension spring 885 forwardly against the stop pin 878 into its neutral position so that the peripheral rear slot 872 is put in readiness to receive the rear totalizer swing arm roller 881 but held therefrom by the push out operating plate 448.

The push out operating plate 448, FIGS. 42, 91 is maintained in its rearwardly pivoted neutral position and against the action of the long tension spring 894 by bifurcated pivot work arm 897 and the tension spring 922 of the drop work arm 918 connected by the link 920 to the follower end 852 of the main cam follower 851 and the high lobe 923 of the main follower cam 853, FIGS. 85 and 89. The front and rear totalizers 317 and 318 are held in their retracted positions by the push out operating plate 448 against the action of their retracted positions by the push out retaining devices 357 and 358.

In the neutral position, the swing bar assembly 1148, FIGS. 42 to 46, lies forwardly and the gear assemblies 554, 1117 to 1121 are held forwardly against their back plate stops 1160 and 1254, FIGS. 45 and 58, by the vertically-swingable latch arm device 387. This vertically-swingable latch arms device 387 and the latch arms are held in their latching and neutral positions by the latch arms cam follower 1579 and the double cam 1582 of the third cam group assembly 481.

The quadrant gear plates 1221 and 1247, FIG. 42, of the transfer unit gear assemblies 554, 1117 to 1121, as for the beginning of a day, when the machine has been cleared, will lie in their rear positions and released from the drag levers 1192, FIG. 48. The transfer release unit upstanding hook arms 997 to 1003 have their hook ends 997′ to 1003′ respectively overlying the respective rotary transfer laterally-extending catch projections 1004 to 1010 to also hold respectively the gear assemblies 554, 1117 to 1122 for individual release against rearward rotation until a key button has been depressed, FIGS. 25 to 28. The release unit drag lever downwardly extending stop catch arms 1014 to 1020 of the transfer release and keys lock unit 286 will be extended rearwardly so that their respective laterally-extending catch projections 1014′ to 1020′ overlie the drag lever spring-biased hook catches 1021 to 1027 of the respective gear assemblies 554, 1117 to 1122 of the transfer unit 340, FIGS. 42, 51 to 54.

In the neutral position, the transverse work rod 982, FIGS. 22, 24, 25, 31, of the upstanding hook arms operating pivot shaft 937 is held close to and over the forwardly-facing inclined cam edges 978 of the lock out upstanding hook arms 971 to 976 extending rearwardly from the keys lock unit front pivot shaft 931, FIGS. 25, 26, 27 and 30. The slotted long top link 1059 is held in its elevated position by the links supporting arm 1060 that is connected through its pivot link supporting arm shaft 1061 with the bifurcated pivot arm 582 which receives the forward right side pin projection 581 of the transaction key unit plate 556.

The indicia-bearing flash plates 1521 and 1530, FIGS. 77, 80 and 81, of the indicating mechanism 232 are positioned when the machine is in the full neutral position as at the beginning of a day so that they display the full blank and black plates of the value indicating wheels 225 to 230 and the transaction indicating wheel displaying the "No Registration" indicia, FIG. 77. The indicia bearing flash plates pivot shaft operating device 1537, FIGS. 78 and 79, is held out of engagement with the indicia bearing flash plates 1521 and 1530 by the double cam follower lever 1562 being held by its cam follower end 1567 on the offset cam portion 1565 of the flash plate device operating cam 1561 on the third cam group 481, FIG. 89.

*B. Upon Pressing a "Value" Key Button, Sequence of Operation*

Any one of the nine value key buttons of any of the value key units 217 to 221 may be considered to have been depressed, the operation will be considered the same, FIGS. 1, 2, 22 to 24, 58 and 61. For illustration, however, the value key button "5" of the "cents" value key unit 217 will be assumed to have been depressed as shown in FIG. 22. At this time its key plate 640 is depressed against the action of its individual return spring 654 so that the plate under edge 572, FIG. 8, reacts against the inclined projection 686 of the value key unit push slide plate 671, FIG. 24, and the inclined edge 729 of the corresponding projection of the lock slide plate 672 to move these push and lock slide plates rearwardly. The push slide plate pin projection 645 will have reacted against the inclined cam edge 977 to force downwardly the rearwardly-extending upstanding hook arm 971 of the lockout device 572 and upwardly the rocker arm upstanding end 983′ of the pivotally-supported rocker arm 983 of the transfer release and keys lock unit 286, FIG. 25, so that its bifurcated rearwardly-extending arm portion 990 acts upon the laterally-extending pin 1013 of the pivot hook arm 1012 to depress the same and cause the hook end 998′ of the upstanding hook arm 998 to be forwardly retracted from its engagement with the catch projection 1005 on the gear wheel 1244 of the transfer unit gear assembly 1117, FIG. 26. This releases the individual gear assembly 1117 so that when the machine is put into operation this gear assembly can be worked by the swing bar assembly 1148 of the transfer unit 340.

When the key button of one of the value key units has been depressed and the operator has made a mistake, he could still press another key button on the same key unit or on the other value key units since the value key units key are not locked with reference to one another until the machine is started or the operator could depress an eraser lever 512, FIGS. 2, 82, 85 and 93, to operate the release bar device 613 to erase all of the value unit keys or even a transaction key should it have been depressed.

The depressing of the hook arm 971 by the push plate pin 645 as best shown in FIGS. 25, 30, 33 to 36 has lowered the lock out device rearwardly-extending hook arm 1044 so that its hook end 1044′ overlies the left side slide plate forward pin 583 of the push slide plate 556 of the transaction key unit 216 to prevent the access of the pin 583 to the upstanding forward end 584′ of the rock lever 584 so that the push slide plate 556 of the transaction key unit 216 is prevented from being operated and the summation key buttons "A," "B," "C," "E" and "F" from being depressed. Thus, these summation keys of the transaction key unit 216 cannot be depressed with the depressing of the value key units and will positively lock out therefrom by the lock out device 472. The single item key buttons "D" and "G" may, however, be depressed with the value key buttons without the lock out device 472 being effective as has been described in more detail hereinabove. The machine is now ready for operation.

The main starting lever 510 is depressed, FIGS. 2, 82, 85, 93. The depending arm 1627 of the starting lever 510 forces rearwardly the starting lever stop latch pin link 483 and stop latch pin 485 to release the radially-inwardly-extending stop latch projection 1631 by pivoting the cycle stop latch lever 486 rearwardly from the pin projection 1632 on the gear 508 of the second cam group 480, FIGS. 85 and 89. If the machine has a motor it is immediately and automatically put into operation. The forwardly-extending motor starting latch pin link 484 extends forwardly from the stop latch pin 485 to the stop latch operated inverted hook arm 1776 and when operated lifts the switch-supporting plate arm 1741 so that the one way clutch assembly 1745 of the motor drive and switch unit 458 is put into clutching engagement with the gear wheel 1735 and to operate the drive pinion 477. The drive pinion 477 drives the gear 194 of the first cam group 479, which, in turn, through the intermediate pinion gear 504, drives the gear 508 of the second cam group 480 and the gear 508 of the second cam group 480 drives the gear 509 of the third cam group assembly 481.

If there is no motor or drive and switch control unit 458 on the machine, and after depressing the starting lever 510, it becomes necessary in order to operate the machine to turn the crank handle 188 through two full turns to complete a cycle of operation. As explained above the one-way drive clutch connection 193 of the hand crank 188 permits the operation of the motor drive and switch control unit 458 and of the electric motor 453 independently of the hand crank 188, FIGS. 82, 83. However, the hand crank 188, FIGS. 1 and 2, can be left on the machine and turned in case of emergency or repair.

Since no transaction key has been depressed, the selector stop assembly 434 will remain ineffective at this time FIGS. 7, 9, 13 to 21. The slide stop bar 440, which, as explained above when in its neutral position has been extended rearwardly by the double arms device 782, FIGS. 19 to 21, 93, is nevertheless released and the slide stop bar 440 moves its full distance forwardly so that the slide bars depending pin 792 swings the horizontal swing arm plate 826, FIGS. 19 to 21, forwardly its full extent and acting through the vertically-extending swing arm pivot shaft 829, FIGS. 85 to 87, causes the swing arm assembly 836 to move inwardly its full extent so that the shiftable cam follower 860 is placed inwardly against the main cam follower 851 and put into position 860d to be worked by the cam 865 of the first cam group 479, FIG. 89. The shiftable cam follower 860 in its position 860d rides the cam 865 through nearly the first turn of the crank before it is effected by the cam 865. It rides a long dwell portion 1800 until it is lowered over a drop edge 1801 and onto a dwell edge 1802. Thus, the cam follower 860 is pivoted in a counterclockwise direction as viewed in FIGS. 82 and 89 and acting through the main cam follower 851 which has been freed of the high lobe 923 of its cam 853 to pivot rearwardly the long forwardly-extending cam follower link 920 to permit its rearward actuation by the long tension spring 922 to release downwardly the operating plate bifurcated pivot work arm 897 and the totalizer operating plate 448 to bring its plate edge 903′ against the stop pin extension 903, FIG. 99.

The totalizers selector and stop operating plate 447, FIGS. 19, 42, 91 to 100, will have been moved rearwardly by the full forward movement of the slide plate 758 of the selector stop assembly 434 that was released with the slide stop bar 440 acting upon the pin 769 of the upwardly extending arm 814 of the intermediate operating plate 447 to relieve the tension from the hook arm tension spring 885 so that the first operating plate 446 will have been lowered by gravity so that its lower stop edge 874 will rest against the stop pin 873. Within the movement of the push out operating plate 448 forwardly by the shiftable cam follower 860 riding down the drop edge 1801, the front totalizer 317 is immediately elevated under the action of its spring-biased feeding and retaining device 357 and its gear wheels 1092 to 1097 are respectively put into engagement with the gear wheels of the respective value gear assemblies 1117 to 1121 of the transfer unit to be operated by the transfer unit 340.

Before the front totalizer 317 has been elevated, the transverse swing bar assembly 1148, FIGS. 42 to 64, will have been pivoted rearwardly by the drive clutch rocker 417 that is operated by the cams 1618 and 1619 of the third group cam assembly 481 so that the rock shaft 410 of the transfer unit 340 is turned and acting through the gear segments 1422, 1402 and 1428, 1408, FIGS. 43 and 44 to cause the swing slide plate bar 1285 of the transverse swing bar assembly 1148 to push against the cam edge portion 1201 of the arcuate catch lever 1191, FIG. 51 to rotate the gear assembly 1117 rearwardly since this gear assembly is the only one that has been released. The other gear assemblies will not be rotated rearwardly and the swing slide plate bar 1285 will have depressed and will ride over the catch lever 1191 of the unreleased assemblies while moving rearwardly the gear assembly 1117, FIG. 51.

The gear wheel 1244 of the "cents" value gear assembly 1117, FIGS. 28, 42, 51, 58, 60, 79, having been released from the upstanding hook arm 998 of the transfer release and lock unit 286, rotates rearwardly and since this gear wheel 1244, FIG. 58, is in engagement with the rack bar 658 of the value key unit 217, the rack bar 658 is extended rearwardly until the left side rack bar shortest stop pin 663 engages the full width leg portion 536 of the key plate 640, FIG. 23 and the rotation of the gear wheel is stopped. In order for the swing bar assembly 1148 to continue its rearward movement, the swing slide plate bar 1285 will depress the arcuate catch lever 1191 and ride over its edge 1119 to the end of its movement as it has done with the unreleased gear assembly.

Since the gear wheel 1244 has been rotated rearwardly, FIGS. 42, 58, 59, 60, the cam follower projection 1309, FIGS. 55, 56, 57, rides forwardly and downwardly over the inclined extent 1311, FIGS. 58, 61, 70, of the arcuate slot 1258 of the gear wheel 1244 to locate its inclined cam work lip edge 1282 to engage the upstanding cam engaging pin 1283, to move the value swing bar slide plate 1284, FIG. 51, to the right to cause the cover portion 1287 of the slide plate 1284 to overlie the inclined slot 1286 of the swing slide plate bar 1285.

At the beginning of the first turn of the hand crank 188, FIGS. 1, 2, and of the cycle of operation, after the key button has been depressed, and in order to lock all of the key buttons of the transaction and value key units, the depressed ones in their down positions and the undepressed ones in their raised positions by the forward pivotal movement of the transversely-extending rod 614 of the keys lock and release bar device 613, FIGS. 4, 5, 11, 22, 24, 93, 102 to 104 engaging the forward edges of the recesses 615, 728 of the hook projections 612, 727 of the lock slide plates 557 and 672, FIGS. 5 and 22, the release bar device 613 forces home the inclined projections of the lock slide plates and locates their long lower edges 610 and 726 over the upper edges 611 of the key plates and their short upper edges 607, 725 under the under inside edge 572 of the undepressed keys, whereby all keys are positively locked immediately upon the start of the cycle of operation and during the operation of the machine no keys can be depressed or released. The keys lock and release bar device 613 is as has been stated operated by the release bar device tension spring 1645, FIG. 82, as the cam follower 1647 rides off the initial dwell portion 1652 of the cam 1651 of the second cam group assembly 480 being rotated counterclockwise as viewed in FIG. 89.

Also, before the gear wheel 1244 of the gear assembly 1117 can be released, FIGS. 28, 48, 52, 60 and 79, and at the beginning of the cycle of operation, the swingable latch arms operating device 387 is lowered to disengage the latch portion 1249 of the bifurcated arm 389, FIG. 58, from the gear wheel teeth 1243 of the gear wheel 1244 of the first value gear assembly 1117. The gear wheel latch arms operating device 387 is operated as the roller 1583 rolls off the cam lobe 1581 and the cam follower inclined edge 1587 is engaged by the roller 1588 on the cam lobe 1582, so that the bifurcated latch arms 388 to 394 are released.

Also, immediately when the machine is put into operation the flash plate pivot shaft operating device 1537 is released to lower the indicia bearing flash plates 1521 and 1530 of the indicating mechanism 232, FIGS. 77 to 80 and to free the indicating wheels 224 to 230 for rotation and the next registration. This is effected when the offset cam follower end 1567 of the cam follower lever 1562, FIGS. 82, 85, 89, rides off the shoulder 1573 of the offset portion 1565 of the flash plates device double cam 1561 to permit the vertically-extending tension spring 1564 to elevate the work pivot arm 277 of the bifurcated swing arm operating shaft 275 to rock outwardly the indicating wheel flash plates pivot shaft device 1537.

At the end of the first turn of the crank handle 188 or the second part of the cycle of operation, the cams 1621 and 1622 of the intermediate cam group 480 FIGS. 85, 89, 91 act respectively upon the respective rollers 1616 and 1614 of the clutch rocker 417 to pivot the rocker clockwise as viewed in FIG. 89 and to rotate the rock shaft 410 of the transfer unit 340 and effect thereby through the quadrant gears at the opposite sides of the transfer unit the forward and return movement of the transverse swing bar assembly 1148.

Immediately upon the return movement of the swing bar assembly 1148, FIGS. 42 to 61, the left swing bar plate laterally-extending pin 1452 whose inclined end face 1453 would have swung under the face of the flared pin-engaging end 1454 of the catch arms operating lever 1455, engages the rear edge 1470 of the flared end 1454 to pivot clockwise the catch arms operating lever 1455 to act through the vertically-extending lever rear end link 1468, FIG. 74 and the double stop pivot lever shaft 1449 to operate the transversely-extending rod 1240 to lift the quadrant gear plate catch arms so that the indicating mechanism operating quadrant gear plates will be free to be pivoted forwardly by the drag lever 1192 of the transaction and value gear assemblies 554 and 1117 which are being worked. At the end of the cycle of operation the catch arms 1238 are returned to their catch positions by the upstanding arm 1365 of the bifurcated arm 395, FIG. 71, which acting upon the left pivot arm extension pin projection 1441 of the catch arm support shaft pivot arm 1435 which in turn operates the catch arms operating mechanism double stop pivot lever 1449 to put again through the connection of the double stop lever 1449 by the vertical link 1468 to the catch arms operating lever 1455, the flared end 1454 of the operating lever 1455 into the path of the swing bar assembly laterally-extending pin 1452.

Since the indicating mechanism quadrant gear plates 1221 and 1247 which operate the indicating mechanism 232, FIGS. 3, 4, 77, 93 have been released and the swing bar assembly 1148 is moving rearwardly, these quadrant gear plates are now latched by the drag levers 1192 and pulled forwardly by the forward movement of the drag levers and swing bar assembly 1148. The slide plate supporting bar 1285 of the swing bar assembly 1148 will thus ride over the depressed outer edges 1199 of the arcuate catch levers 1191 depending in extent the amount to which the gear assemblies have been permitted to be rotated by the key unit rack bar 658 and upon the rearward movement of the swing slide plate supporting bar 1285, further, it will drop into the recess 1290 of the arcuate catch levers 1191. Since the slide plate 1284 is acted upon to cover the slot 1286 in the swing slide plate bar 1285 and cause engagement of the cover portion 1287 with the inclined edge 1206' on the inwardly-extending heel portion 1206 on the drag lever 1192 so that its rear hook end 1204 will be depressed to engage with the upwardly and forwardly inclined teeth section 1205 of the quadrant gear plates 1221 and 1247. Upon further forward movement of the swing bar assembly 1148, these quadrant gear plates 1221 and 1247 are pulled forwardly an extent equivalent to the extent that the gear wheel 1244 has moved rearwardly as predetermined by the distance to which the rack bar 658 of the key unit 217 has been permitted to be moved rearwardly.

While the quadrant gear plates 1221 and 1249 are being pulled forwardly these quadrant teeth 1223 have acted through the value gears 1334 and 1411 journalled on the rock shaft 410, FIG. 48, and which in turn works the gear wheels 1487, 1493, and 1488, 1498 of the indicating mechanism unit 232, FIGS. 77, 79 and 80 to operate the indicating wheels 223 and 224 so to rotate them forwardly and indicate the denomination "5" of the key button that has been depressed. The indicating wheel 224 will indicate "Registration."

With the gear assemblies having been returned by the transverse swing bar assembly 1148, FIGS. 42 to 46, the catch arms release device 387 will have been actuated to hold the gear assemblies through their catch arm portions 1151, FIG. 45, and simultaneously with the actuation of the depending catch arms 1238 are brought over the quadrant gear plate stop projections 1241 to provide catches to hold the quadrant plates 1221 and 1247 when they will be returned at the beginning of the next operation. This is done by the riding of the roller 1583 of the double cam follower 1579 onto the lobe 1581 of the cam 1578 of the third cam group 481, FIG. 89.

The indicia-bearing flash plates 1521 and 1530 of the indicating unit 232 are forced outwardly by the return of the cam follower end 1567 of the cam follower 1562 to the offset portion 1565 of the cam 1561 of the third cam group 481, FIG. 89. The key units will have had their key buttons released by the actuation of the release bar device 613 by the cam 1651 of the second cam group 480 by the follower 1647 being elevated over the raised projection 1653 of the cam 1651 so as to cause a slight outward movement of the lock slide plates of the key units and the release of the depressed key buttons from the lower edges of the lock slide plate inclined projections.

The key buttons are elevated by their own individual springs.

The main starting lever 510 will have been returned at the beginning of the second turn of the crank after the pin projection 1632 of the cam group gear 508 has come into engagement with the cam end 1635 and worked the catch lever back to its pin catch position. This is effected through the movement of the starting lever link 483 by catch lever pin 485 as best seen in FIG. 85. If the machine had been hooked up for electric operation the pin 485 of the catch lever 486 would have actuated the link 484 and pivoted downwardly the inverted hook lever 1776 to lower the switch-supporting plate arm 1741 into engagement with the clutch assembly 1745 to disengage the motor drive unit 458 and open the switch contacts 1781 and 1786 of the motor switch.

The main cam follower lever 851 for totalizer operating plates 429, FIGS. 42, 91 to 100, will ride onto the cam lobe 923 of the cam 853 to cause the link 920 to be pulled forwardly for the rotation of the totalizer operating plate 448 to eject the swing arm roller 877 and the front totalizer 317 and to return the operating plate 448 to its rearward position against the side frame plate stop 892, FIG. 95. The forward totalizer is thus released from its hook 905, and the roller 877 of the swing arm 875 is forced downwardly by the inclined edge 890 of the push out operating plate 448 and the totalizer is forced downwardly in its guideways against the action of its spring biased feed device 357.

Also, at the end of the cycle of operation the cam 808 of the first cam assembly 479, FIGS. 83, 85, 89, 90 being turned in a counterclockwise direction will have made a complete turn and its sharp lobe portion 810 will have lifted the cam follower 809 to its high position and through its shaft 817 will work the double pivot arm work assembly 782, FIGS. 19 to 21, 93 and force the slide plate 758 of the selector stop assembly 434, FIGS. 7, 9, 13 to 21 and the slide stop bar 440 rearwardly against the action of the operating plate spring 811 and the slide bar spring 443 to thereby hold the slide plate and the slide bar in their rearward and neutral positions in readiness for the next operation. The long depending pin 792 of the slide bar 440 will have worked upon the horizontal arm 826 that pivots the vertically-extending shaft 829 and which through the adjustable swing arm assembly 836 and its engagement with the forked slide arm 844 will return the shiftable cam follower 860 to its initial position overlying the second cam 861 outwardly and without engagement therewith and in readiness upon release again of the slide stop bar 440 to be returned to any one of its four working positions of the respective other cams.

The release unit drag lever stop catch arms 1014 to 1020, FIGS. 25 to 29, are at the end of the first turn of the crank retracted due to the engagement of the cam follower 1036 with the raised portion 1217 of the cam 861, FIG. 89, and at the end of the cycle of operation and after the catch levers 1021 to 1027 have been returned to their forward positions, the cam follower 1036 rides off the raised portion 1219 of the cam 861 and down the inclined portion 1219 so that the drag lever downwardly-extending stop catch arms 1014 to 1020 are returned to their rear positions in readiness for the next operation so that their laterally-extending projections 1014' to 1020' can be engaged by the drag lever releasing hook catches 1021 to 1027 of the released gear assemblies and will be tripped on the next operation.

The machine has now had its parts returned and put in readiness for the next operation, the indicating quadrant plate arm having been drawn forwardly and retained so that the amount of the transaction will remain in the window to be observed by the operator and until the next operation has been started.

C. Upon Pressing a "Value" Key Button To Total With Previous Key Button More Than "Ten"

In the last description of the cycle of operation, the value key button "5" of the key unit 217 was depressed and now in order to effect an amount more than "ten" to require the operation of the "tens" transfer device 1314, the value key button "5" will again be depressed.

The "5" cents key button which had been depressed on the previous operation had caused, upon the front totalizer 317, FIGS. 4, 38 to 40 being elevated on the last part of the cycle of operation and return movement of the gear wheel 1244 of the value gear assembly 1117, the gear wheel 1092, that has ten gear teeth, to have been angularly advanced "five" gear teeth. Upon the previous pressing of the "5" value key button, a description has been made as to the operation of various parts of the machine and these operations will be effected in the same sequence and manner with this operation but operations will have to be effected in order to prepare the machine for the operation of the tens transfer device and in order that the additional "5" cents will be accumulated on the front totalizer 317. The operations which are common to the previous operation will, since they have been set forth in detail previously, only be dealt with briefly in this description.

The transaction and value key units will again be locked by the keys lock and release device 286, FIGS. 4, 4a, 25 to 36 and released at the proper time at the end of the cycle of operation by the cam 1651. The slide stop bar 440 will have been positioned rearwardly along with the selector stop plate 758 against the action of the springs 443 and 811 preparatory to being released upon the starting lever 510 being depressed to put the machine into operation. The slide bar 440 and the selector stop plate 758 will with this operation be similarly returned to the full rearward extent, since no transaction key will have been depressed, again allowing the selector totalizer operating plate 446 to be moved rearwardly against its stop 873 and in position to receive again the front totalizer. The shiftable cam follower 860 will again be moved to its position 860d against the main cam follower and similarly through the cam 865, the cam follower 860 follows the dwell portion 1800 of the cam 865, upon reaching the drop portion 1801, the operating plate 448 is released to permit the front totalizer to again be elevated just prior to the return movement of the swing bar assembly 1148.

Since the previous operation has caused the indicating unit to display the "5" cents and the indicating unit must now be prepared to again display the next "5" cents, upon the beginning the new cycle of operation the quadrant gear plates 1221 and 1247 which had been pulled forwardly by the drag levers 1192 on the previous operation are released. This was not necessary on the first operation where the machine at the beginning was clean and had no accumulation upon the front totalizer 317.

In order to effect the release of the drag levers 1192, FIGS. 48 to 54, the trip spring-biased catches 1022 strike the downwardly-extending catch arm laterally-extending projection 1015' of the transfer release and keys lock unit 286 as the gear assembly 1117 is again rotated rearwardly by the swing bar assembly 1148, FIGS. 51, 53 and 54. This trip catch 1022 releases its inverted heel projection 1212 from the drag lever heel depending trip shoulder 1213 of the drag lever 1192 so that the drag lever 1192 under the action of its tension spring 1207 is pivoted to release its hook end 1204 from the gear teeth section 1205 on the indicating mechanism operating quadrant gear part 1247 of the gear assembly 1117. The quadrant gear part 1247 is thereby automatically returned by the long tension return spring 1292 that is anchored to the gear assembly back plate 1237, FIG. 58, and is connected by a pin 1294 to the quadrant gear part 1247. Before the end of the first turn of the hand crank 188 and after the catch arm 1015 has served the purpose to trip the drag lever trip catch 1022, the catch arm 1015 is withdrawn from the path of movement of the catch 1022 by the action of the cam 861 of the first cam group 479 having its raised portion 1217 engaged with the end of the follower arm 1036 to lift the follower cam, pivot its shaft 1034 and due to the engagement of the arm 1035 on the shaft 1034 with the stop projetcion 1029 of the forwardly extending arm 1028, the shaft 960 of the transfer release and keys lock unit 286 is rotated so that the depending catch arm 1015 is forwardly withdrawn, as best shown in FIG. 27. Near the end of the cycle of operation and after the drag levers 1192 with their catches 1022 have been returned, the catch arm 1015 is returned over the drag lever trip catch 1022 as the follower 1036 drops from the catch arm cam raised edge 1218 down the inclined cam portion 1219 of the catch arm cam 861, FIG. 89. With the drag lever 1192 having released the indicating mechanism quadrant gear part 1247, this quadrant gear part 1247 will have acted through the gear wheels 1488 and 1498 to return the value indicating wheel 225 to its initial blank plate showing and the transaction indicating wheel 224 to "No Registration" indication and preparatory to this next indication.

Since the swing bar slide plates 1284 and 1289 have been moved to the right on the swing slide plate bar 1285, it must prior to the next engagement of the cam work edge 1282 of the swing bar slide operating arm 1274 for their operation have been returned to their left positions, FIG. 56. This is effected by the inclined cam edge 1146, FIGS. 45 and 46, of the back plate vertically-extending lever 1139, acting against the upwardly-extending pin 1295 on the transaction swing bar slide plate 1289 to cause the transaction slide plate 1289, the slide plate 1284 and any other slide plates that might have been moved to the right to be moved to the left as shown in FIG. 56 and so that the inclined slots 1286 and 1291 of the swing slide plate bar 1285 will be uncovered.

So that again with this next cycle of operation the inclined cam work edge 1282 of the swing bar slide plate operating arm 1274 will again act upon the upstanding cam extending pin 1283 of the swing bar slide plate 1284 to place the cover portion 1287 over the inclined slot 1286 and the cover portion 1290 of the transaction swing bar slide plate 1289 over the inclined slot 1291, FIG. 55. Accordingly, the drag levers 1192 of the transaction and value gear assemblies 544 and 1117 will be depressed on the return movement of the swing bar assembly 1148 by the engagement of the respective cover portions 1287 and 1290 with the inclined rear work 1206' of the heel plate portion 1206 of the drag lever 1192 so that the drag lever 1192 of these assemblies will have their hook ends 1204 engage with the indication operating quadrant gear parts 1121 and 1247 to be pulled forwardly by the drag levers to the last half of the cycle of operation as the swing bar assembly 1148 is returned forwardly.

Upon the beginning of the second turn of the crank to return the swing bar assembly 1148, FIGS. 42 to 61, the front totalizer will have been elevated and put into engagement with the gear wheel 1244 of the gear assemblies 1117 and the amount of turning of the gear assembly which had been permitted by the rack bar 658 of the value key unit 217 is now to be returned to the totalizer wheel 1092 to advance this wheel the equivalent of five teeth, the "5" key button having been depressed this second time. Since now the value key units and the gear wheels of the gear assemblies can at the most only be advanced rearwardly at the amount nine teeth, and the "5" further teeth is now needed to make "10" teeth, a turn of one tooth upon the totalizer gear wheel 1092 is added. The "5" teeth for the second operation will have been added to the "5" of the first operation and the gear wheel 1092 of the totalizer will at the end of this cycle of operation have been turned the equivalent of ten teeth or its full turn.

It is now necessary that a transfer be made of the additional tooth to the next gear wheel 1093 of the front totalizer 317 and so that a tens indication will be made by the indication mechanism and that the mechanism will make a showing of "ten cents" of its first and second value indicating wheels 225 and 226. The tens transfer disk 1101 fixed to the gear wheel 1092 and which has a single gear tooth 1101' is utilized to place this one tooth turn upon the second value gear wheel 1093. The single gear tooth 1101' engages with the tens transfer device operating arm 1341 to engage its short catch arm 1333 with the catch shoulder 1332 of the long depending catch arm 1331 so that the stop edge 1315' of the stop edge plate arm 1315 can be released upon the return movement of the swing bar 1148, and the swing bar 1148 can move further in the arcuate slot 1258 of the gear wheel 1317 of the "cents by tens" gear wheel assembly 1118 and cause the front totalizer gear wheel 1093 to be rotated by one tooth by thus allowing the gear wheel 1317 to be moved to put this one tooth on the gear wheel 1093 of the front totalizer 317, FIGS. 61 and 65. When this has been effected as explained above tens-transfer short catch pivot arm 1333 is automatically released from the long catch arm 1333 and is turned by its tension spring 1342 so that the rounded operating arm 1341 which had been engaged by the single gear tooth 1101' will again be lowered for the next tens transfer operation.

A similar transfer of the tens can be effected between the other value gear assemblies and other denominations or amounts, this operation being done as between the cents value gear assembly 1117 and the cents-by-ten value gear assembly 1118.

While the tens transfer has been made to the front second totalizer gear wheel 1093, FIG. 37, no indication is made of this transfer in the indicating mechanism 232 by the value gear assembly 1118. The indicating gear wheel 225 will merely indicate the value amount of "5" that has been depressed on the first value key unit 217, as done with the previous operation. The transaction indicating wheel 224 will indicate "Registration." While ten cents has been accumulated on the front totalizer unit 317 no indication of this amount is made at this time.

All of the parts in the machine will be returned to their neutral preloaded and spring-biased positions in the manner explained above and in the previous sequence of operation and when any of the value key units have been depressed. Except for the release of indicating quadrant gear parts at the beginning of the cycle of operation and the tens-transfer operation at the end thereof, there has not been any difference between this operation and the previous one. Both have been value key operations.

D. Upon Depressing of Repeat Lever—Sequence of Operation

If the repeat lever 511 had been used for the first value key operation instead of depressing the starting lever, the second "5" operation could have been duplicated without having to have depressed the value "5" key again. Then, automatically the starting lever 510, FIGS. 2, 82, 85, 93, is depressed through the interconnecting link 1667 of the repeat lever 511 with the starting lever 510 and thence from the depending arm 1627 of the starting lever through the link 483 that acts upon the catch lever pin 486 to disengage the catch lever projection 1631 from the cam assembly gear wheel pin 1632. The bifurcated slide 1661 connected to the forward end of the repeat lever 511 acts through its wedges 1667 to move the release bar cam follower lever 1647 laterally so that it is destined to follow the non-release or repeat cam 1665 of the cam group 480, FIG. 89. Since this repeat cam 1665 has no raised projection on it like the raised projection 1653 of the release cam 1651, the non-release cam 1665 will not at the end of the cycle of operation cause the release bar cam follower lever 1647 to be worked in such a manner as to actuate through the release bar curved operating link 1642 the depending operating arm 1639 of the keys release and lock device 613 to cause its transverse rod 614 to hold against the hook projections 612 and 727 of the lock slide plates 557 and 672 of the transaction and value key units to release the lock slide plates. The cam follower 1647 nevertheless always returns to the cam 1651 at the end of the cycle, FIGS. 88, 89, since the wedge on the lower end of the repeat lever vertically-extending bifurcated slide 1661 is retracted and the compression spring 1638 serves to move the shiftable cam follower lever 1647 to the release cam 1651 after the raised projection 1653 has been passed, FIGS. 88 and 89. Should the repeat operation need to be ended, the starting lever 510 as explained above is depressed for the last repeat cycle so the cam follower 1647 is not shifted to the non-release cam 1665. For this last operation the raised projection 1653 operates the release bar device 613 and kicks out the depressed key plates of key units.

E. Upon Depressing Transaction "A" Key Button—Sequence of Operation

For the two previous operations the "5" cent key button has been twice depressed and the total becomes "10." In order that the summation can be determined and the total amount indicated with the machine being used as an adding machine, the "A" button is depressed. The front totalizer 317 will have accumulated the two "5" cent amounts, totaling "10" and this operation is to cause these amounts to be taken from the totalizer and transferred to the indicating mechanism 232 so that the total amount can be determined and read.

Except for a few of the parts the majority of the parts of the machine will have been returned on the last operation to their neutral positions, which positions have been named and set forth hereinabove. The selector slide plate 758 and the slide stop bar 440 will have been moved rearwardly to its neutral position by the double arm assembly 782 and its cam 808. The release bar device 613 will have released the "5" key button, FIGS. 4, 5, 22, 24. The vertically-swingable bifurcated latch arms operating device 387 will have locked the transfer unit gear wheels against their forward stops. The quadrant gear plate catch arms 1238 will have been positioned to engage the stop projections 1241 of the quadrants gear plates parts 1221 and 1247 to hold the quadrant gear plates that are in their neutral rearwardly-disposed positions against forward movement and also when the gear quadrant gear plates that have been pulled forwardly are released at the beginning of this next operation they will be caught against any bounce resulting from the effect of spring-cushioned stop lever 1230, FIG. 48.

On the previous operation, the transaction indicating wheel 224 will have been moved one step so that the "Registration" flash plate 1521 will appear and the indicating wheel 225 will show the "5" cents amount from the previous operation. The other indicating wheels will show blank. The transaction and value quadrant gear plates 1221 and 1247 will have been moved forwardly in the last previous value key operation by the drag levers 1192 of the transaction and value gear assemblies 554 and 1117.

Now, with the adding machine button "A" depressed none of the value keys can be depressed. Another one of the transaction keys can, of course, be depressed prior to depressing the starting lever or if desired, the erasing lever can be depressed to operate the release bar device 613 to return the "A" button to its undepressed position.

In order to lock out the value keys, the depressing of the "A" button will have operated the transaction and value keys lockout device 970 FIGS. 25 to 36. The left side forward pin 583 of the push slide plate 556 of the transaction key unit 216 will have acted against the inclined work edge 1053 of the hook end 1044' of the lockout device rearwardly-extending hook arm 1044 so that the forward pin 583 becomes located under the support edge 1054 of the hook end 1044', FIGS. 11, 25 and 35. The value inverted rearwardly-extending hook arms 971 to 976 will under the action of moving the transaction hook arm 1044 and through the connections of the keys lockout device 970 and front pivot shaft 931 with the hook arms 971 to 976 so that the push slide plates 671 of all of the value key units 217 to 221 are prevented from being operated by their key buttons. Their pin projections 645 of the value key units push slide plates are brought to lie fully and together within the hook ends 971' to 976' of the inverted hook arms 971 to 976 so that the pin projections 645 and the push slide plates 671 can not at this time have access to or engage the forwardly and upwardly inclined ends 983' to 988' of the respective rocker arms 983 to 988, on the pivot supporting shaft 951. Accordingly, the value keys cannot now be depressed and the upstanding hook arms 997 to 1003 release their respective value gear assemblies 1117 to 1122.

However, for a totalizing operation such as this one all of the upstanding hook arms 997 to 1003 will have to be simultaneously released when the machine is started so that gear assemblies can be made free to turn. As the "A" is depressed, the push slide plate 556 of the transaction key unit 216, FIGS. 1 to 11, 93 is moved rearwardly with its forward right side pin 581 to turn the bifurcated arm 582 of the pivot link supporting arm shaft 1061 which is turn lowers the top link supporting arm 1060 and its grooved roller 1065 to allow the long top link 1059 to be lowered to locate the pivot arm work pin 1056 in the raised work part 1058 of the dog leg slot 1057 on the forward end of the top link 1059 to provide a working connection between the top link 1059 and the link supporting pivot arm 1055, FIGS. 5, 6, 11, 85 and 94. This link supporting pivot arm 1055 when pivoted will work the pin arm pivot shaft 945, pin arm 944 and its pin 943, bifurcated pivot arm 939 and its shaft 937 to work the transverse rod 982 against the hook arms forwardly-facing cam edges 978 and cause the simultaneous release of the inverted hook arms 971' to 976', FIG. 25 from the pin projections 645 of the push slide plates 671 of all the value key units 217 to 221 and the follow through of the transverse work rod 982 to push against the end edges of the slide plates 671, and through the pins 645, against which the inclined ends 983' to 988' have rested and cause thereby their ends to be lifted and the rocker arms 983 to 988 pivoted to effect through their bifurcated rear ends 990 the release of all the transfer unit release arms 998 to 1003 from the value gear assemblies 1117 to 1122 and permit their free operation when the machine is started.

The depressing of the "A" button through the engagement of the lower end of its key plate 526 with the adjustable stop 740 of the selector stop assembly 434 has the selector stop 740, FIGS. 7, 9, 13 to 21, to be depressed so that its pin 751 is lowered to serve as a stop for the return of the slide stop bar 440.

Now the main starting lever 510 is depressed. The cycle stop latch lever 486 is released thereby and thereafter the hand crank 188 is either turned or the motor 453 is put into operation in a manner that has already been described. The first thing that happens, the slide stop bar 440 is released by cam 808 so that the "A" stop projection 797 of the slide bar 440 engages the pin 751 of the selector stop 740 to bring it to a stop. This has permitted the depending pin 792 to work the swing arm plate 826, the vertically-extending shaft 829 and the swing arm assembly 836 to move the forked slide arm 844 so as to position the shiftable cam follower 860 over the cam 863 and in its position 860b, FIG. 89. The main and shiftable cam followers 852 and 860 will now control the timing of the raising of the front totalizer 317. The shiftable cam follower 860 shortly runs off the shoulder 1803 on the cam 863, and acting through the link 920, the arm 918, shaft 900, the bifurcated arm 897, FIGS. 93 and 95, permits the totalizer operating plate 448 to be lowered so that its front stop edge 879 is brought against the stop pin extension 903 and to thereupon immediately allow the swing arm roller 877 to enter the slot 871 of the totalizer selector operating plate 446 and the front totalizer 317 to be elevated.

The totalizer selector and stop operating plate 446 will have been positioned rearwardly due to the movement of the selector slide plate 758 and the removal of the tension from the spring 855 connecting the intermediate totalizer operating plate 477 with the selector slide plate 758 so as to allow the selector slide plate to drop rearwardly against the rear stop 873 so and position the slot 871 to receive the front totalizer swing roller 877 and the front totalizer to be elevated.

The front totalizer 317 is thus elevated at the beginning of the first turn of the hand crank 188 as the shiftable cam follower slides off shoulder 1803 and follows the lowered edge 1804 of the cam 863, FIGS. 8, 9. Near the end of the first turn of the hand crank the shiftable cam follower 860 rides up onto the raised edge 1805 so that the front totalizer will be rejected from the transfer unit 340 by the operating plate 448 before the second turn of the hand crank and of the return forward movement of the swing bar assembly 1148.

Since with this operation the totalizing is made of the accumulations on the front totalizer merely for adding purposes, the accumulations when taken are wiped from the front totalizer 317 by the transfer gear assemblies 1117 and 1118, on the first turn of the crank. The totalizer wheels 1092 and 1093 by this operation are put back to their key positions so that other accumulations can then be made on the totalizer and this adding machine summation operation repeated.

The totalizer gears 1092 and 1093 will have been turned in the reverse direction from which the totalizer gears had been turned on accumulating the amounts from the totalizer gears and back to their zero positions ready to be used again and left there, as the totalizer is withdrawn before the return movement of the gear assembly by the swing bar assembly 1148. The value key gear assemblies 1117 and 1118 are stopped by the tens-transfer device depending operating arm 1341. The swing arm assembly 1148 will ride off the cam edge portion 1201 of lever catch depression 1200 to depress the arcuate levers 1191 and ride along the outer arcuate edge 1199 for the continuation of its rearward movement, FIG. 48. The transaction gear assembly 554 is also turned by the swing bar assembly 1148 but is stopped by the engagement of the rack bar pin 552 with the depressed "A" button key plate 526 before the arcuate lever 1191 is depressed by the swing bar assembly 1148. The fact that the rack bar 542 has a play of one step due to the long stop 555, the gear wheel 1153 of the transaction gear assembly 554 is advanced two steps before the swing bar assembly 1148 overrides the arcuate catch lever 1191, FIGS. 5 and 48.

Upon the return forward movement of the swing bar assembly 1148 the swing bar slide plates of the swing arm assembly 1148 will have been moved to the right so that their cover portions 1287 will engage with the inclined work edge 1206' of the drag levers heel plates 1206, FIGS. 48 to 54 to cause the drag lever ends 1204 to engage the gear section 1205 to drag the guadrant gear parts 1221 and 1247 forwardly to effect as has been described above the final indication and summation of the amounts which had been accumulated on the front totalizer. This amount will be "10." The value indicating wheel 226 will be dragged to "1," then the value indicating wheel 225 will be dragged to "0" and the transaction wheel 224 will be dragged to "Total" or flash plate 1521a.

It shall be understood that all of the other operations which have been explained will be effected in proper sequence to put the machine back into the neutral positions so that the machine may now be used for other operations. The front totalizer will now have been cleared of its accumulations and ready to be put to use again for another summation of accumulations.

*F. Upon Depressing the "F" Sub-Total Items Button— Sequence of Operation*

In the previous operation where the summation was taken from the front totalizer 317, upon the "A" button being depressed the front totalizer was retracted before the return movement of the swing bar assembly 1148 was returned forwardly thus the gear wheels 1092 and 1093 of the totalizer were removed from the transfer unit gear wheel assemblies and the front totalizer was thereby cleared or cleaned of its accumulations and the totalizer wheels were returned to their neutral positions. Thus, the machine can be used as an adding machine at any time without interfering with any accumulations on the rear totalizer 318 resulting from sales that may have been made and the deposits which will have been placed in the cash drawer.

If now we treat the summation of the two previous operations in which the "5" cents button had been depressed for making a total of "10," as sales to a customer and it is desired to know how much these sales have been and without wiping the summations from the front totalizer as a result of the operation give a "sub-total" of the items purchased, the "F" button is depressed. This operation is similar to the previous operation where the "A" button was depressed but instead of the front totalizer being retracted at the end of the first turn of the hand crank or part of the cycle of operation, it is left in engagement with the gear wheel assemblies so that the accumulation taken therefrom by the transfer unit 340 is returned to the same as transfer unit implants the amount so taken upon the indicating mechanism 232. The front totalizer will thus be left uncleared so that further accumulations can be made upon it. The customer having been informed how much he has already spent can now decide whether or not he can now spend more money and make other purchases.

The "F" button is thus now depressed and in doing so the value and transaction keys lockout device 970, FIGS. 25 to 36, will have prevented thereafter the pressing of any of the value key buttons in a manner which has already been just previously described. The quadrant gear plates 1121 and 1247 will have been retained by the drag lever 1192 of the gear assemblies 554 and 1117 to indicate "Registration" and "5" cents and are ready to be released. The gear wheel assemblies will have been locked in their forward positions by the transfer unit vertically-swingable latch arms operating device 387 and the quadrant gear plates which have not been moved forwardly on the previous operation will be locked against movement by the quadrant gear plate 1221 catch depending arms 1238, FIGS. 42, 48 and 50.

Also, upon depressing the "F" button, the vertically-adjustable selector stop assembly 745, FIGS. 13 to 18, of the selector stop assembly 434 is depressed so that its selector stop pin extension 751 of the stop assembly, FIG. 17, is put in the path of the slide bar stop projection 802 of the slide stop bar 440 so that its vertical edge 803 will engage with the pin 751 upon the slide stop bar 440 being released as the machine is put into operation, FIGS. 19, 20. The selector slide stop plate 758 has a gap in its upper edge free of projections and this vertically-adjustable selector stop 745 for the "F" button overlies the gap of the selector slide stop plate 758 and thus its pin 751 will not be engaged by any projections on the selector slide plate 758, like when the "A" button was depressed. Accordingly, the selector slide plate 758 is returned forwardly its full extent so that the stop edge 773' of the slide plate upstanding projection 770 engages with the grooved pin guide 761 and the slide plate 758 will have been returned its full extent, FIGS. 13, 14, 17. Thus the totalizers selector and stop operating plate 446 for the front and rear totalizers will have been permitted through the weakening of the spring 885 of the operating plate assembly to be lowered to its returned position against first operating plate rear stop pin 873 so that again the first operating plate front slot 871 will be positioned to receive the front totalizer vertically-swingable arm roller 877 of the front totalizer unit 317. The slide plate 758 will have been moved forwardly under the actuation of the totalizer operating plate tension spring 811 for the intermediate totalizer operating plate 447.

This, of course, is effected when the general or main starting lever 510 is depressed and the double arms assembly or first cam 808 of the first cam group assembly 479 will have released from its double arm cam sharp lobe portion 810, FIG. 89, the double arm assembly cam follower 809 so that the slide stop bar 440 is returned under the action of the slide bar tension spring 443 and the spring 811 of the totalizer operating plate 447.

Since in this operation, the front totalizer 317 is to stay in engagement with the transfer unit throughout substantially the full cycle of operation, a different cam from that which was selected upon the depressing of the "A" button must be selected so that the totalizer will be kept elevated for both the removal of the accumulations on the totalizer and for indicating purposes and the return of these accumulations to the totalizer so that the totalizer can still be used for further accumulations. Accordingly, upon engagement of the "F" slide bar stop projection 802 of the slide stop bar 440 with the selector stop pin extension 751 of the vertically-adjustable selector stop 745, FIGS. 13 to 20, the slide bar 440 will move a distance to cause the bottom plate extra long depending pin 792 to swing the arm plate 826 and the vertical shaft swing arm 836 through the vertically-extending swing arm pivot shaft 829 to move the forked slide arm 844 and the shiftable cam follower 860 so that it overlies the cam 864 of the first cam group assembly 479 and with the cam follower 860 in the position 860c, FIG. 89. With the turning of the cam 864 the shiftable cam follower 860 soon drops from the raised cam lobe 1806 and will continue to be dropped throughout substantially the full turn of the cam 864, leaving the front totalizer in its elevated position, throughout substantially the full cycle of operation. When the "A" button was depressed the shiftable cam follower 860 was put in its position 860b upon the cam 863, FIGS. 89 and 90, and was raised after about one half turn of the cam 863 onto the edge 1806 so that the front totalizer 317 was retracted after the accumulations had been taken from the totalizer.

The shiftable cam follower 860 accordingly works through the main cam follower lever 851 to operate the link 920 and cause the bifurcated pivot work arm 897 and the totalizer catch and push out operating plate 448 to be pivoted downwardly so that its front stop edge 903′, FIGS. 93 to 100, engages the small diameter stop pin extension on first plate front stop pin 903 so that the front totalizer is elevated early in the cycle of operation and remains elevated until near the end of the operation.

The quadrant gear parts 1221 and 1247 will have early been released on the new cycle of operation and the "F" key button will have been locked by the key unit release bar in a manner already explained and now since a summation is to be made all of the upstanding catch members of the combined rotary transfer release and keys lock unit 286 will have to be simultaneously released so that all of the gear wheel assemblies of the transfer unit are free to be turned. The release of all of the gear wheels is done in a manner as above previously described in connection with the depressing of the "A" button and earlier in the detail description of the various parts.

The rotary transfer swing bar assembly 1148 thus tends to turn all of the gear wheel assemblies on its rearward movement until stopped by tens-transfer operating arm 1341, FIGS. 61, 64, 66. The gear wheel assemblies which are engaged with the totalizer wheels that have no accumulations upon them will not be rotated as the tens-transfer device operating arms 1341 prevent them from doing so. Whereas the first wheel value gear assemblies and the transaction value assembly 554 will be turned rearwardly, the value gear assemblies will be stopped before the end of the rearward movement of the swing bar by the tens-transfer operating arms 1341 since these arms are being engaged from their non-ratcheting direction. The transaction gear assembly will be stopped before the full rearward movement of the swing bar assembly by the rack bar 542 of the transfer key unit 216. This rack bar 542 will come to a stop upon the engagement of the rack bar right side long stop pin 548 with the smallest width leg 539 of the transaction key unit "F" button key plate 531, FIG. 10. The depending rack bar 542 as described above is so provided in the transaction key unit 216 due to the base rack bar inwardly bent base stop 555 being longer to provide an additional step, FIGS. 5, 6 and 10, the transaction indicating wheel can be permitted to be rotated to display the "Sub-Total Items" indication 1521a, FIG. 79 upon the return movement of the swing bar assembly 1148, the front totalizer 317 will continue to remain in engagement with the gear wheel assemblies, the swing bar assembly 1148 will pick up the value gear wheel assemblies 1117 and 1118 which have been stopped and return their same amounts to the totalizer amount receiving gear wheels 1092 and 1093 of the front totalizer 317. At the same time that the swing bar assembly picks up these previously stopped gear assemblies the drag gear lever 1192 of these assemblies will be operated by the engagement of the slide plate cover portions of the swing bar slide plate with the inclined rear work edge 1206′ of the drag lever heel plates 1206 to depress their hook ends 1204 against the gear sections 1205 of the quadrant gear parts 1221 and 1247. As the swing bar assembly 1148 is moved forwardly not only will the accumulations be put back into the front totalizer 317 but the quadrant plates 1221 and 1247 are pulled forwardly to make indications of the gear wheels so that the sub total of the items purchased will be displayed by the indicating mechanism unit 232. This amount, when considering the illustration that is being made, will be an accumulation of "ten," with a "1" appearing upon the indicating mechanism cents by tens indicating wheel 226 and a "0" appearing upon the indicating mechanism cents indicating wheel 225. The transaction gear assembly 554 and its gear wheel would have come to a stop on the rearward movement of the swing bar assembly 1148 when the rack bar of the transaction key unit 216 has come to stop against the transaction key unit "F" button key plate 531. Since as explained there is a lost motion step provided for the depending rack bar 542 of the transaction key unit 216 the transaction gear wheel assembly 554 will have been permitted to move the six steps for the "F" button and in addition a single lost motion step further to make a total of seven steps which when returned will bring the "Sub-Total Items" flash plate 1521g to the window 223 for display, FIG. 79. At the end of the cycle of this operation the various parts are returned to their neutral positions which have been named and set forth hereinbefore.

*G. Upon Depressing "E" Total Items Button—Sequence of Operation*

On the previous operation the "F" sub-total items button was depressed and the accumulation of ten cents made upon the front totalizer upon pressing the "5" button of the cents value key unit twice and running through the cycle of operation the amount of ten cents was determined and this amount was put back onto the front totalizer since the front totalizer was kept in engagement with the transfer gear unit assembly throughout the full cycle of operation. The amount that was taken for indicating purposes was returned to the front totalizer and for the present description is to be considered as having to be still on the front totalizer. Suppose the customer has decided to buy another five cent item then it must be considered that he has concluded his purchases and that he will now want to know his total amount. Thus we should interpose at this point another value key operation where the five cent key has been depressed. This operation has now been carried out and the amount has been placed on the front totalizer so that when it is taken off it will total fifteen cents. The operator must take this amount from this customer for deposit in the cash drawer. In order for the operator to know what this amount is he will press the "E" button.

This "E" button operation differs from all of the other operations in that the amount must be taken from the front totalizer and indicated and put on the rear totalizer which keeps the record of the cash register for all sales. To accomplish this, the front totalizer is raised for the first turn of the crank, is cleared and is lowered for the second turn of the crank. Upon the second turn of the crank the rear totalizer is raised for the amount that has been taken from the front totalizer and it is placed on the rear totalizer and at this time an indication is made of the amount that was taken from the front totalizer on the total sale. If there had been other sales for the day this amount that was taken from the front totalizer would have been accumulated and added to the other sales of the day.

To start out the parts of the machine must be assumed to be in their neutral positions to which they were brought on the previous operation, all parts being in their full neutral positions except for the drag levers and the quadrant gear indicating mechanism operating parts 1221 and 1247, FIG. 42 that have been pulled forwardly and the indicating wheels 224, 225 of the indicating mechanism which have been rotated to display the amount of the previous transaction. It is to be assumed that it was a five cent value key operation and thus the indication would be merely five cents on the indicating wheel 225 and "Registration" on the transaction wheel 224.

Accordingly the "E" button is depressed and it is held in its depressed posiiton by the push slide plate 566 of the transaction key unit 216, FIG. 11. When this has been done the lockout device 970 has been actuated to prevent as explained up above the operation thereafter of any of the value keys. The operator may depress another transaction key of the transaction key unit 216 but he cannot depress a value key once the transaction key has been depressed. He may erase the transaction key by pressing the erasing lever if after he has depressed the transaction key button, a value key operation was necessary. This can be done any time before the machine is started but once the machine is started all of the keys are locked by the bar release device 613 in the manner which has already been described.

It must be considered now however that the operator has been definite about the depresison of the "E" button and that it has now been finally depressed. Upon the "E" button being depressed its key plate 530 is forced downwardly to assume the position shown in FIG. 5. It is temporarily held in this position by the push slide plate 556 and its projection 570 against the action of the key plate spring 534. Later after the starting lever 510 has been depressed the bar release device 613 is brought against the lock slide plate 557 to positively lock the "E" button in its depressed position. In the meantime the key plate 530 through its edge 535 will have depressed adjustable stop 744 of the selector stop assembly 434 by engagement with the foot 747 of the stop 744 and against the action of its spring 752, FIGS. 5, 10, 15 and 17. The pin 751 of the stop 754 is thus lowered so that it will be engaged by the stop projections 801 of the slide bar 440, FIGS. 19 and 20. The selector slide plate 758 has no projections to engage the pin 751, and this pin 751 lies in the long gap of the top edge of the slide plate so again the slide plate 758 is, when released, returned its full extent so as to loosen the spring 855 of the totalizer selector operating plate 446 so that it can be lowered to its rearward position and made ready to receive the front totalizer. It may now be said that in order to effect this that the main starting lever 510 has been depressed.

The slide stop bar 440 also has been released with the slide plate 758 by the double arms device 782 and is moved a distance rearwardly so that its stop 801 has come against the pin 751. In so doing, the depending pin 792 of the slide stop bar 440 has turned the arm 826, the vertical shaft 829, and the arm 836 to move the fork slide arm 844 and the shiftable cam follower 860 to its position 860a, the minimum distance to locate upon the double lobe cam 862 of the first cam group 479, FIG. 89. With the machine being started the shiftable cam follower 860 drops sharply from the lobe 924 and operates through the link 920 the bifurcated swing arm 897 to lower the totalizer operating plate 448 against the stop extension 903, FIG. 89, to have the front totalizer 317 brought into engagement with the gear assemblies of the rotary transfer unit 340. This is done immediately on the first turn of the crank so that the accumulations of fifteen cents will be taken from the front totalizer by the transfer gear assemblies 1117 and 1118. Since the front totalizer will be rejected at the end of the first turn of the crank it will be clean or cleared for the next sale of items or for use as in an adding machine. As both totalizers are used on this operation and only on this operation, first the front totalizer and then the rear totalizer, different means are provided than with the other operations.

The selector stop 744 has a depending bracket extension 765 that carries and supports a drop arm 763 that is pivoted by a pin 763' to the selector slide plate 758, FIGS. 13 to 18. This drop lever has a hook end 764, FIG. 13. When the stop 744 is depressed and held down by the "E" button key plate, the hook end 764 is made to be engaged by the pin 766 on the depending plate 426 of the swing arm plate 1400, FIGS. 42 and 43, so that as the swing arm assembly 1148 is moved rearwardly on the first turn of the crank the pin 766 is brought upwardly and rearwardly to pull rearwardly the slide plate 758 so as to permit the hook arm 775 to be pivoted by a pivot pin 774 on the rear end of the selector stop assembly elongated plate 730, FIG. 17, so that its hook end 776 will overlie and catch the pin 778 of the slide plate and thereby hold at the first turn of the crank the slide plate 758 in a rearward position.

The selector slide plate 758 as has been stated above, during this operation carries with it the pin 769 on the upwardly extending arm 814, of the totalizer operating plate 447 to a rearwardly turned position to place tension in the spring 885, FIGS. 93 to 100, FIG. 95, as permitted by the lost motion connection 869—883 with the selector operating plate 446 and without the selector operating plate 446 being turned at this time and while the front totalizer is still elevated. In the end of the first turn of the crank and before the second turn of the crank, the shiftable cam follower 860 will ride the cam lobe 925 of the cam 862, FIG. 89, so that the ejecting operating plate 448 is lifted rearwardly by the swing arm 897 and as this is done the spring 855 will ordinarily quickly pull the selector operating plate 446 from its rearward position, the front totalizer swing roller 877 and the front totalizer being ejected due to the engagement of the edge 879 of the selector plate 446 with the stop end 878, FIGS. 95 and 98. This is the normal position for most of the operations of the plate 446 since it is biased toward this position for receiving the rear swing roller 881 and the elevation of the rear totalizer. Since now this selector operating plate 446 has been moved to its forward position with the passing of the shiftable cam follower 860 from the lobe 925 of the cam 862, the bifurcated swing arm 897 is again released and the ejector operating plate 448 is lowered to allow the swing arm roller 881 to enter the slot 872 of the plate 446 and the rear totalizer 318 to be elevated, FIGS. 93 to 100. Thus for this single cycle of operation the front totalizer is elevated and ejected on the first turn of the crank and the rear totalizer is elevated and rejected on the second turn of the crank. The rear totalizer at the end of the cycle of operation will be ejected by again the engagement of the cam follower 860 with the starting lobe 924 of the cam 862 and as well as by the main cam follower 82 riding upwardly onto the lobe 923 of its cam 853. Thus there has been explained the manner in which the front and rear totalizer 317 and 318 are handled in this operation.

In the meantime, the gear assemblies 1117 and 1118 will have cleared the front totalizer by the front totalizer wheels 1092 and 1093 having their single disc plate tooth projections 1101' and 1102', FIG. 37, coming to stop on their reverse rotation against the depending operating arms 1341 of the tens transfer device 1314 carried respectively by the transfer unit gear assembly 1118 and 1119. Since in this manner the totalizer wheels 1092 and 1093 are brought back to their zero positions and the front totalizer is rejected immediately thereafter and not left in engagement with the gear assemblies, the front totalizer will have been automatically cleared for use on adding the sales of other customers and for adding machine purposes.

The transfer unit gear assemblies 1117 and 1118 now hold the accumulations taken from the front totalizer and has left the front totalizer clean. With the rear totalizer now in engagement with the transfer unit value gear assembly these accumulations are now to be implanted upon the rear totalizer. The swing bar assembly 1148 through its operation by the rock shaft 410 and the rocker 417 connected with the cams of the second and third cam groups 480 and 481 is now turned forwardly and in so doing its slide plate bar 1285 rides into the catch recesses 1200 of the arcuate catch levers 1191 of the gear wheel assemblies 554, 1117 and 1118, the slide plate cover portions 1287 and 1290 of the respective slide plates 1284, 1296 and 1289, FIG. 55, in a manner above described, these slide plates having been moved to the left and returned to the right by the slide plates cammed end operating arms 1274 and 1275, to engage the inclined edges 1206' of the right levers 1192, FIGS. 48 to 54, of these assemblies to depress the hook ends against the gear sections 1205 of the quadrant gear parts 1221 and to pull them forwardly as the swing bar assembly completes its forward movement and to operate at this time the indicating mechanism so that the total of the items purchased by the customer will be displayed. At the same time the gear wheels 1244 and 1317 of the respective gear wheel assemblies 1117 and 1118, FIGS. 58 and 61, will have been in engagement with the wheels 1092 and 1093 of the rear totalizer 318 and will put thereon the accumulations amounting to fifteen cents that was taken from the front totalizer. Thereafter when this has been done the rear totalizer is retracted and lowered in the manner already described and having been stored within it the total amount of this one sale. The various parts of the machine as the cycle of operation is completed will be cleared and brought to their neutral positions and the "E" button released to prepare the machine for the next operation in a manner which has already been described in detail.

In order to bring the slide plate 758 to its neutral position, the pin 780 carried on the swing arm assembly gear segment 1422, FIGS. 17 and 43, will engage near the end of the cycle of operation the inclined lower edge 779 of the selector assembly hook arm 775 to release its hook end 776 from the pin 778 of the selector slide plate 758 to permit its return to its neutral position by the double arms device 782 and against the action of the operating plate tension spring 811 that is connected through its pin 769 with the slide plate 758 and the long tension spring 443 of the slide stop bar 440.

H. Upon Depressing the "D" Single Item Button—Sequence of Operation

The cash register will now have deposits in it amounting to fifteen cents which has been taken from the first sale of the day and which has now been recorded on the rear totalizer. Suppose now that the purchaser still desires to have another single item after this previous transaction has been completed or any other purchaser may come to the operator with but a single item. Since there is but a single item, there is no need for the addition of items upon the front totalizer and since the cash is to be received immediately for this item, the single item "D" button is depressed and the amount can therefore be placed directly upon the rear totalizer accumulations. In order to permit this and to have but one single operation, it must be made possible for this operation that both value and transaction keys may be pressed together. Let it be assumed that the amount of this single item would still be five cents. Accordingly the "5" button of the cents value key unit 217 is depressed and in order for this amount to be added directly to the rear totalizer, the single item key button "D" is depressed, because of the lockout device 970 between the transaction and value key units this automatically would be prevented.

Since the push slide plate 556 of the transaction key unit is at its slot 561 without an inclined projection so that downward movement of the "E" button key plate 529 is ineffective to move the push slide plate 556 and operate in a manner previously described the keys lockout device 970. The "D" key button however will be held down by the engagement of the lock slide plate projection 605 with the top edge 611 of the transaction key plate 529, FIGS. 5 and 8. This is effected by the partial engagement of the lower edge 610 of the projection 605 with the top edge 611 of the key plate 529, the lock slide plate 557, upon the machine being started, forced forwardly home by the bar release device 613 in a manner which has already been described and which not only locks the transaction key, but also locks the "5" key of the cents value key unit 217, FIG. 22, also in the same manner described.

With the "D" button depressed, the selector stop 743 of the selector stop assembly 434 is depressed by the engagement of key plate 529 therewith so that its pin projection 751 will be placed in the path of movement of the upstanding projection 772 of the selector slide plate 758 so that its edge 773' will engage the pin 751 upon the selector slide plate 758 being released, FIGS. 13, 14 and 17. Also this pin 751 of the selector stop 743 will be engaged by the vertical edge 803 of the stop projection 800 of the slide stop bar 440. Accordingly, little forward movement of the selector slide plate 758 is permitted upon this plate being released as when the machine is started. This forward movement of the selector slide plate 758 is insufficient to permit the tension of the spring 885 to release the selector operating plate 446 from its neutral forward position to normally receive the swing arm roller 881 and to permit the elevation of the rear totalizer 318. With the slide stop bar 440 being released and its projection 800 engaging the stop pin 751, the shiftable cam follower 860 is shifted in a manner above described by the slide plate bar 440 to the cam follower position 860d, FIG. 89, from its neutral position 860 and onto the cam 865 of the first follower cam follower assembly 479. This cam due to its continuous high edge 1800 for the first turn of the crank keeps the cam follower 860 elevated and the bifurcated swing arm 897 elevated to hold the totalizer operating plate 448 in its rearward position throughout the one turn of the crank. During this one first turn of the crank the swing bar assembly is swung rearwardly, taking with it the gear racks 542 and 658 of the respective transaction and value key units 216 and 217 by its drive connection of the transaction and value gear assemblies 554 and 1117 with the key unit gear racks so that the gear wheels 1153 and 1244 are stopped by the "D" and "5" button key plates 529 and 640. The swing bar assembly 1148 releases these gear wheels and moves on through the arcuate slots of the gear wheels to the end of its rearward movement. The amount of the transaction having been transferred to the gear wheel assembly 1117 now.

After this has been done and before the return forward movement of the swing bar assembly 1148 the shiftable cam follower 860 is lowered over the drop edge 801 of the cam 865 onto the lower edge 1802 of this cam and is thus operable to permit the bifurcated swing arm 897 to be lowered and the totalizers operating plate 448 to be rotated to its forward position and to allow the rear totalizer 318 to be elevated against the transfer unit.

The swing bar assembly 1148 then starts its return movement and the gear wheel 1244 of the gear assembly 1117 is picked up by the engagement of the swing slide plate bar with the recess 1200 of the catch lever 1191. The drag lever 1192 of the gear assembly 1117 is also operated at this time to have its hook end 1204 engage the gear section 1205 of the quadrant gear part 1247 and to pull the gear part with it for the remainder of the forward movement of the swing bar assembly 1148 so that an indication of the transaction will be given to the indicating mechanism. Since the rear totalizer already has through the previous operations, as explained above, 15-cents added thereupon, the new additional amount of 5-cents by the adding of this single five cent item will bring the total upon the rear totalizer at this time to 20-cents. Thus upon the return movement of the swing arm assembly 1148 the tens transfer device 1314 of the gear assembly 1118 will be operated. The gear wheel 1092 will have been advanced five steps for its single tooth projection 1102' of its cam disc 1102 to pass and move upwardly the tens transfer device rear operating arm 1352, FIG. 61, to set the tens transfer device so that the gear wheel 1317 that has the releasable stop edge 1315 will be set to release so as to permit the further movement of the gear wheel 1317 to place one step on the rear totalizer gear wheel 1093.

The indicating wheel 225 will display a "5" for its return movement, the amount of the single item purchase, but the return totalizer will now have a total amount thereon of 20-cents. The transaction indicating wheel 224 will have been advanced five steps and will display the indicia bearing flash plate 1521d at the end of the cycle of operation, FIG. 79.

At the end of the cycle of operation all of the parts are brought back into their neutral positions in the manner above described, the depressed keys will have been released, the totalizer returned, the gear assemblies and the quadrant gear plates latched, and the slide stop bar 440 advanced by the double arm device. The front totalizer will have its wheels in their neutral positions while the rear totalizer will bear the accumulation of the cash register up until now.

*I. Upon Depressing the "G" Received on Account Button—Sequence of Operation*

If a customer makes a payment upon a bill which he may owe and assuming this amount to be 5-cents, the "5" button is depressed and also the "G" received on account button is depressed, since this sum is to be placed in the cash drawer directly and which may be added directly to the rear totalizer, the operation will be similar to the previous operation when the cash for the purchaser's single 5-cent item was added and the "D" button was depressed.

Assuming now that the "5" button has been depressed the "G" button may also be depressed with the lockout device 970 being ineffective for the same reason as when the "D" button was depressed.

The "G" button 532 operates in the slot 564 of the push slide plate 556 which likewise is without an inclined projection by which the push slide plate 556 could be moved. The "G" key button is accordingly locked in its depressed position by the lock slide plate 557 by engagement of the top edge 611 of the key plate 532 with the under edge 610 of the lock slide plate projection 608.

The lower end of the key plate 532 will engage the foot portion 747 of the selector stop assembly 746 to depress the same and to lower the pin projections 751 of the stop assembly 746 for engagement by the upstanding projectioin 773 of the selector slide plate 758 upon the slide plate 758 being released. There is no corresponding projection on the slide stop bar 440 that needs to engage the pin projection 751 of the stop 746. Thus the slide stop bar, upon the machine being set into operation, is permitted to move rearwardly the full extent while the selector slide plate 758 has little movement. The selector slide plate thus leaves the totalizer selector operating plate 446 in its forward position to receive the swing arm roller 881 within its recess 872 as shown in FIGS. 95 and 98. Tension will be maintained in the spring 885 connected between the intermediate operating part 447 and the selector operating part 446.

The slide stop bar 440 is returned its full distance and through the connections above set forth the shiftable cam follower 860 is moved to its position 860d and onto the cam 865. The operation of the cam upon this cam 865 is to sustain its movement by the long raised edge 1800, FIG. 89, of the cam until at the end of the first turn of the crank and the beginning of the second turn when it is necessary that the rear totalizer 318 on which the accumulations are being made is to be elevated as the cam follower 860 is lowered over the edge 801 of the cam 865, the cam follower acts through the link 920, the bifurcated swing arm 897 to at that time release the totalizer operating plate 448 and permit the rear totalizer 318 to be elevated. The totalizer selector operating plate 446 will not have been shifted for this operation.

As the swing arm assembly 1148 moves rearwardly the gear wheel 1244, of the value gear assembly 1117 will be moved rearwardly five steps until it is stopped by the engagement of the short pin 663 of the rack bar 658 that is in engagement with the gear wheel 1244, engages the wide leg 536 of the key plate 640, FIGS. 22 and 23. The swing bar assembly 1148 will continue its rearward movement and will override the catch 1191 and upon its return movement with its slide plates 1284 and 1289 having been moved to the right, the return movement of the swing bar with the rear totalizer having been engaged will through the swing slide plate cover portions 1286 and 1290, have the drag levers 1192 of these gear assemblies 1117 and 544 engage the quadrant gear plates 1121 and 1247 to make the indication of the indicating wheels 225 and 224. At the same time the 5-cents is placed on the rear totalizer to bring the accumulations thereon to 25-cents. On the indicating wheel 225 only 5-cents will be indicated. The transaction indicating wheel will, of course, indicate "Received on Account" and the plate 1521g will be flashed.

The parts now will be returned to neutral in the same manner as with the previous operations. The key buttons "5" and "G" will be released and elevated and the machine made ready for the next operation.

*J. Upon Depressing "B" Sub-Total Button—Sequence of Operation*

If after several transactions have been made during the day it is desired to know how much money has been taken in, the "B" Sub-Total button of the transaction key unit 216 is depressed. Upon the previous operations, the total transactions have amounted to 25-cents, by pressing this "B" button this amount can be determined and read and returned to the rear totalizer so that still other accumulations can be made upon it. Upon depressing the "B" button its plate 527 is lowered and the push slide plate 556 is pushed rearwardly due to the under edge 572 of the key plate 527 acting upon the inclined projection 568 of the push slide plate, FIG. 11. Since this key plate 527 locks the push slide plate 556, the pin 583 is pulled against the edge 1053 of the lockout device hook arm 1044 to elevate the hook arm and cause the value key inverted hook arms 971 to 976 to be elevated and prevent the actuation of the push slide plates 571 of the value key units and thereby prevent the depression of their key buttons, FIG. 35. This is effective until the machine is put into operation. However, when the machine is put into operation and it is necessary for all of the gear wheels assemblies 1117 to 1122 to be released the transverse work rod 982 is operated in the manner already set forth against the forwardly facing inclined cam edge 978 of the inverted hook arms 971 to 976 so as to depress them and allow the transverse work rod 982 to engage the rear edges of the push rods and move them rearwardly to act through their pins 645 upon the upstanding ends 983' to 988' of the rocker arms 983 to 988 which in turn operate the upstanding catch arms 988 to 1003 and simultaneously release the transfer unit gear assemblies, FIGS. 25 and 36. The upstanding hook arm 997 will have been actuated independently when the "B" button was depressed and by the engagement of its push slide plate pin 583 with the upstanding end 584' of the transaction rocker arm 584, FIG. 5.

The key plate 527 depresses the adjustable stop 741 of the selector stop assembly 434 by engagement of the lower end of the key plate with the foot portion 744' of the stop 741. The pin projection 751 of the stop assembly 741 is accordingly lowered so that upon the machine being started the selector slide plate 758 is retained by engagement of its upstanding projection 770 through its vertical edge 773' with the pin 751, FIG. 17. Since the selector slide plate 758 is not returned forwardly upon release of the double arms assembly 782 by the cam 808, the totalizer selector operating plate 446 is retained in its forward position such that it may readily receive the rear swing arm roller 881 and the rear totalizer 318 when permitted. The slide stop bar 440 when released will have its projection 798 engaged with the pin extension 751 of the selector stop 741. This return movement of the slide bar 440 is of sufficient extent that the shiftable cam follower 860 is brought to the cam follower position 860c, FIG. 89, and onto the cam 864 of the first cam group assembly 479. This cam 864 has a raised portion 1806 which immediately upon the starting of the machine releases the cam follower 860c so that the cam follower acting through the main cam follower 851, long link 920, bifurcated swing arm 897 releases the totalizer operating plate 448 so that its swung downwardly and forwardly against the front stop extension 903 so as to immediately permit the elevation of the rear totalizer 318, FIG. 100. The rear totalizer is thus immediately put into engagement with the gear wheel assembly of the transfer unit 340. The rear totalizer will remain in engagement with the transfer unit throughout substantially the full cycle of operation and lowered near the end thereof and after the swing bar assembly 1148 has been moved forwardly to return the totalizer gear wheels to their previous positions and uneffected by this operation.

With the rear totalizer immediately put into engagement with the gear assembly of the transfer unit and the upstanding catch arms 997 to 1003 released, the gear assembly can be rotated rearwardly by the swing bar through the releasable catch arms 1191 until the rack bar 542 of the transaction key unit stops the gear wheel 1153 of the transaction gear assembly 554 due to the engagement of the pin 544 of the rack bar with the depending leg 539 of the "B" key plate 527, FIGS. 5 and 10 and the value gear wheels 1244 and 1317 of the respective value gear assemblies 1117 and 1118 have been stopped by the rear totalizer cam disc teeth projections 1101' and 1102' upon the reverse rotation of the totalizer gear wheels 1092 and 1093 engage with the depending operating arms 1352 of the tens-transfer device 1314 of the gear wheel assemblies 1118 and 1119. Since the remaining gear wheels 1094, 1095, 1096 and 1097 of the rear totalizer, FIG. 37, have not been used in any of the previous operations, their respective teeth projections 1103', 1104', 1105' and 1106' will respectively come into engagement immediately upon the reverse rotation of the gear wheels of the totalizer with the depending operating arms 1352 of the tens-transfer device 1314 with the last tooth projection 1106' coming to a stop against a depending stop arm 1360, its edge 1360', of the tens-transfer stop device 1358, FIG. 71.

Since the total is 25-cents, the gear wheel 1244 of the first value gear assembly 1117 will in this way be brought to a stop against the depending arm 1352 when five steps have been made and the gear wheel 1244 of the gear wheel assembly 1118 will be brought to a stop when two steps have been made and the tooth projection 1102' of the totalizer wheel 1093 is brought against the depending arm 1352 of the tens-transfer device 1314 of the gear wheel assembly 1119.

The swing bar assembly 1148 thereafter continues rearwardly and then reverses its motion to be moved forwardly on the second turn of the crank so that it picks up the gear wheels and operates the drag levers 1192 of the transaction and value gear wheel assemblies 554, 1117 and 1118 and moving forwardly the quadrant gear plates 1121 and 1247 which respectively operate the indicating wheels 224, 225 and 226 so that the reading of the indicating mechanism 232 will be "25 Sub-Total." The rear totalizer since it has remained in engagement with the gear wheel assemblies throughout both the first and second turn of the crank will have the steps that were taken from it by the transfer gear assemblies returned to it. Thereafter the rear totalizer is withdrawn with the accumulations which it had before it was elevated and the operator will now be advised of the total receipts for this period of time and without the rear totalizer being cleared. Further transactions can be made and thus be added upon this rear totalizer. The machine will also upon the cycle of operation being completed have its other parts returned to their neutral positions as have been named and in the manner which has been set forth above.

*K. Upon Depressing the "C" Grand Total Button— Sequence of Operation*

Before depressing the Grand Total button it shall be assumed that before it is done, a five cent purchase has been made in the form of a single item and has been placed on the rear totalizer, as by depressing the "D" button and so that the accumulations on the rear totalizer are now 30-cents.

It may now be the end of the day when the operator desires to know the amount that has been taken in for the entire day or the Grand Total. The operator thus now depresses the "C" Grand Total button, the key plate 528 is accordingly depressed and will be retained in its depressed position by the lock slide plate 557 of the transaction key unit, its projection 604 overlying the top edge 611 of the key plate 528. The push slide plate 556 will have been moved rearwardly and its pin 583 will have lifted the lockout device hook arm 1044 to prevent thereafter in manner already set forth the operation of the value key press buttons.

The "C" key plate 528 engages the selector stop 742 and depresses the same to put its pin 751 to be engaged by the upstanding projection 771 of the selector slide plate 758, FIG. 17 so that upon the slide plate being released little movement is permitted and accordingly as explained above this movement is insufficient to allow the selector operating plate 446 to be moved away from its neutral position in which it can permit the elevation of the rear totalizer.

The projection 799 of the slide stop bar 440 upon being released comes against the selector stop pin 751 so that the shiftable cam follower 860 is moved to its position 806b for engagement with the cam 863. This cam 863 through the operation of the shiftable cam follower 860, link 920, bifurcated swing arm 897, releases immediately upon the beginning of the cycle of operation by the dropping of the cam follower 860 from the shoulder 1803 of the cam 863, the totalizer operating plate 448 and allows the rear totalizer to be elevated. The rear totalizer 318, however, is to be used only for the accumulations thereon to be given up to the transfer unit gear assemblies. This is the grand total operation and the machine is to be cleared for the next day. Accordingly the shiftable cam follower 860 rides the lower edge 1804 just long enough to permit the rear totalizer to give up its total accumulations and then the rear totalizer before the second turn of the crank is lowered when the shiftable cam follower 860 rides onto the raised edge 1805 of the cam 863. Because the rear totalizer is then lowered it is fully cleared of its accumulations and its gear wheels will have been put back to zero.

The gear wheel assemblies of the transfer unit will have been released and the swing bar assembly 1148 will have taken those gear assemblies which are not struck by the engagement of the teeth projections of the totalizer gear wheels to the reverse rotation of the same and the engagement of the teeth projections with the depending operating arms 1352 of the tens-transfer devices on the gear assemblies. Since there is a total of 30-cents on the totalizer the totalizer gear wheel 1092 will immediately have been stopped and will be unturned by the engagement of the tooth projections 1101' with the depending operating arm 1352 of the tens-transfer device 1314 of the gear wheel assembly 1118. Thus the gear wheel 1224 of the first value gear assembly 1117 will not have been moved but one step since it is to make only a zero indication.

The gear wheel 1244 of the second value gear assembly 1118 will have been permitted to move three steps before the tooth projection 1102' of the gear wheel 1093 engages the depending operating arm 1352 of the tens-transfer device 1314 of the gear wheel assembly 1119, FIG. 42.

The swing bar assembly upon its return forward movement will thus bring forwardly the quadrant gear parts 1121 and 1247 in the manner above stated to effect a showing of "30 Grand Total" by the indicating mechanism. The machine will now have been cleared of any accumulations and substantially all of the parts, as the cycle of operation is completed, except the quadrant gear part and the indicating gear wheels, for the machine to be ready to be started afresh with the next operation.

If it is desired to leave the machine without the showing of the Grand Total on the machine for the night, the general starting lever 510 can be depressed so the machine is put through the cycle of operation to release the indicating wheels and to bring the indicating mechanism back to blank showings and "No Registration." Then all of the parts of the machine will have been put into their neutral positions.

It should now be understood that the objects of this invention can as now described be carried out. The structure set forth for carrying out these objects will now be claimed.

What is claimed is:

1. In a cash register, a supporting frame having spaced right and left side frame plates, a rotary transfer unit disposed within the supporting frame, a supporting pull rod extending through the transfer unit and supported on the end plates, said pull rod being removable to release the transfer unit from the supporting frame, an indicating mechanism unit detachably connected to the side frame plates and having engagement with the transfer unit to be operated thereby, totalizer guide plates fixed to the inner faces of the side frame plates, totalizers slidably carried by the guide frame plates and combined aligning and retaining means for removably retaining said totalizer in said guideways, said totalizers being biased toward said transfer unit, an operating mechanism for the totalizers carried on one of the side frame plates, key units removably carried upon the supporting frame above the transfer unit and engaging therewith, and a transfer release and keys lockout unit responsive to the operation of the key unit for controlling the operation of the transfer unit and said release and keys lockout unit disposed within the supporting frame under the key units and slidably and detachably removable from the front of the supporting frame, and power operated means on the one side frame plate for operating the transfer unit and the totalizer operating parts.

2. In a cash register as defined in claim 1, and said power operating means including a rock shaft supported on the transfer unit, a clutch rocker removably supported in the side frame plate, and detachably connected to the transfer unit rock shaft to permit the removal of the transfer unit upon the pull rod being removed therefrom.

3. In a cash register as defined in claim 1, and said transfer release and keys lockout unit having side end extensions and said side frame plates having supporting bracket plates opposing one another, said bracket plates respectively having guideways open at their front end and said pin extensions of said release and keys lock units slidable in said guideways and releasable catch means on said brackets for retaining said release and keys lock unit within the guideways against forward displacement therefrom.

4. In a cash register as defined in claim 1, said power operated means including a slide bar and a selector stop assembly, said selector stop assembly adapted to be operated by one of the key units and running parallel therewith, and common means projecting inwardly from one side plate for supporting the selector stop assembly and the slide stop bar thereupon.

5. In a cash register as defined in claim 2, said power operating means further including removable cam groups rotatably supported upon the outer side of the side frame plate, drive gear means having gears common with the cam group assemblies connected together, and said removable clutch rocker operably connected between two cam groups for operation thereby and cover plate means secured over the cam group assemblies and the clutch rocker for retaining in assembled relationship upon the side frame plate.

6. In a cash register as defined in claim 5, said power operating means further including a motor switch and overrunning clutch unit detachably connected to the side frame plate and to one of the drive gears of the cam assembly, an electric motor detachably connected to the supporting frame and drivingly connected with the combined overrunning clutch and switch unit, a cycle stop catch arm pivoted on the side frame plate and having a stop hook arm, a gear of one of the cam assemblies having a pin projection for engagement with said catch arm, a starting lever carried on the side frame plate and connected to the stop catch arm to release the same from the cam gear pin projection.

7. In a cash register as defined in claim 1, said transfer unit having latch arms extending rearwardly therefrom for locking the transfer unit against operation, a latch arms operating device detachably connected to the side frame plates and to the latch arms of the transfer unit, and said power operating means having means for detachably connecting said latch arms operating device thereto.

(References on following page)

References Cited in the file of this patent

UNITED STATES PATENTS

| | | |
|---|---|---|
| 1,708,189 | Paden | Apr. 9, 1929 |
| 1,817,883 | Shipley | Aug. 4, 1931 |
| 1,853,052 | Horton | Apr. 12, 1932 |
| 1,895,848 | Gubelmann | Jan. 31, 1933 |
| 1,930,870 | Ball | Oct. 17, 1933 |
| 2,101,636 | Breitling et al. | Dec. 7, 1937 |
| 2,309,901 | Hogfors | Feb. 2, 1943 |
| 2,756,926 | Dodsworth | July 31, 1956 |
| 2,880,930 | Werner et al. | Apr. 7, 1959 |
| 2,954,158 | Jackson | Sept. 27, 1960 |